(12) United States Patent
Asandei

(10) Patent No.: US 9,862,789 B2
(45) Date of Patent: Jan. 9, 2018

(54) POLYMERIZATION OF DIENE MONOMERS

(71) Applicant: UNIVERSITY OF CONNECTICUT, Farmington, CT (US)

(72) Inventor: Alexandru D. Asandei, Vernon, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 14/901,846

(22) PCT Filed: Jul. 3, 2014

(86) PCT No.: PCT/US2014/045415
§ 371 (c)(1),
(2) Date: Dec. 29, 2015

(87) PCT Pub. No.: WO2015/003137
PCT Pub. Date: Jan. 8, 2015

(65) Prior Publication Data
US 2016/0369027 A1    Dec. 22, 2016

Related U.S. Application Data

(60) Provisional application No. 61/842,611, filed on Jul. 3, 2013.

(51) Int. Cl.
*C08F 236/08* (2006.01)
*C08F 2/48* (2006.01)
(Continued)

(52) U.S. Cl.
CPC .............. *C08F 236/08* (2013.01); *C08F 2/38* (2013.01); *C08F 2/48* (2013.01); *C08F 4/40* (2013.01);
(Continued)

(58) Field of Classification Search
CPC .......... C08F 236/08; C08F 236/06; C08F 2/48
See application file for complete search history.

(56) References Cited

U.S. PATENT DOCUMENTS 5,811,500 A    9/1998  Dubois et al.
5,854,364 A   12/1998  Senninger et al.
(Continued)

OTHER PUBLICATIONS

Kwak et al., "Photoirradiated Atom Transfer Radical Polymerization with an Alkyl Dithiocarbamate at Ambient Temperature," Macromolecules, 2010, 43, 5180-5183.*
(Continued)

*Primary Examiner* — Catherine S Branch
(74) *Attorney, Agent, or Firm* — Cantor Colburn LLP

(57) ABSTRACT

A free radical or controlled radical polymerization process of atom or group transfer radical polymerization. The process comprises radically polymerizing one or more radically (co)polymerizable monomers in the presence of a polymerization system. The one or more radically (co)polymerizable monomers comprise at least one or more radically (co) polymerizable diene monomers. The polymerization system comprises: an initiator having one or more radically transferable atoms or groups; a transition metal-ligand complex catalyst, wherein the ligand comprises any C-, N-, O-, P- or S-containing ligand which coordinates with the transition metal; an optional reducing agent capable of regenerating the lower oxidation state of the transition metal catalyst; and an optional organic solvent or water capable of solubilizing the transition metal-ligand complex catalyst. (Co)polymers produced by the free radical or controlled radical polymerization process of atom or group transfer radical polymerization.

32 Claims, 80 Drawing Sheets

(51) Int. Cl.
C08F 236/06 (2006.01)
C08F 36/02 (2006.01)
C08F 2/38 (2006.01)
C08F 4/40 (2006.01)

(52) U.S. Cl.
CPC ............ *C08F 36/02* (2013.01); *C08F 236/06* (2013.01); *C08F 2438/01* (2013.01)

(56) References Cited

U.S. PATENT DOCUMENTS

| | | | |
|---|---|---|---|
| 6,559,234 B1 | 5/2003 | Arai et al. | |
| 8,404,788 B2 | 3/2013 | Matyjaszewski et al. | |
| 2003/0019554 A1 | 1/2003 | Agostini et al. | |
| 2011/0218306 A1* | 9/2011 | Matyjaszewski | C08F 4/40 526/90 |

OTHER PUBLICATIONS

International Search Report dated Oct. 29, 2014 from corresponding PCT/US2014/045415, pp. 6.
International Written Opinion dated Oct. 29, 2014 from corresponding PCT/US2014/045415, pp. 13.
Braunecker et al., "Controlled/living radical polymerization:Features, developments, and perspectives", Progress in Polymer Science, vol. 32, 2007, pp. 93-146.
Braunecker et al., "Towards understanding monomer coordination in atom transfer radical polymerization: synthesis of [CuI(PMDETA)(p-M)][BPh4] (M=methyl acrylate, styrene, 1-octene, and methyl methacrylate) and structural studies by FT-IR and 1H NMR spectroscopy and X-ray crystallography", Journal of Organometallic Chemistry, vol. 690, 2005, pp. 916-924.
Braunecker et al., Quantifying Vinyl Monomer Coordination to CuI in Solution and the Effect of Coordination on Monomer Reactivity in Radical Copolymerization, Macromolecules, vol. 38, 2005, pp. 4081-4088.
Gillies et al., "A DFT Study of R-X Bond Dissociation Enthalpies of Relevance to the Initiation Process of Atom Transfer Radical Polymerization", Macromolecules, vol. 36, 2003, pp. 8551-8559.
Hakansson et al., "A Complex between Isoprene and Copper(I)Chloride: Synthesis and Structural Characterization", Organometallics, vol. 10, 1991, pp. 1317-1319.
Hakansson et al., "Copper(I)complexes with conjugated dienes", Journal of Organometallic Chemistry, vol. 602, 2000, pp. 5-14.
Hendra et al., "Co-ordination complexes of butadiene with platinum-II, palladium-II and copper-I", Spectrochimica Acta, vol. 18, 1962, pp. 1195-1199.
Matyjaszewski et al., "An Investigation into the CuX/2,2'-Bipyridine (X) Br or Cl) Mediated Atom Transfer Radical Polymerization of Acrylonitrile", Macromolecules, vol. 32, 1999, pp. 6431-6438.
Matyjaszewski et al., "Atom Transfer Radical Polymerization (ATRP): Current Status and Future Perspectives", Macromolecules, vol. 45, 2012, pp. 4015-4039.
Matyjaszewski et al., "Synthesis of Well-Defined Polyacrylonitrile by Atom Transfer Radical Polymerization", Macromolecules, vol. 30, 1997, pp. 6398-6400.
Munakata et al., "Studies od Copper(I) Olefin Complexes. Formation Constants of Copper Olefin Complexes with 2,2'-Bipyridine, 1,10-Phenanthroline, and Their Derivatives", Inorganic Chemistry, vol. 25, No. 15, 1986, pp. 2622-2627.
Nickel et al., "A Copper(I) Complex with Chelating 1,5-Hexadiene", Inorganic Chemistry, vol. 31, No. 21, 1992, pp. 4428-4430.
Pintauer et al., "Synthesis, characterization, and the role of counterion in stabilizing trigonal pyramidal copper (I)/ 2,2'bipyridine complexes containing electron-poor methyl acrylate", Journal of Organometallic Chemistry, vol. 691, 2006, pp. 3948-3953.
Slade, Jr., et al., "Olefin Coordination Compounds. III. Coordination Compounds of Butadiene with Platinum(II), Palladium(II) and Copper(I) Halides", Contribution from the Department of Chemistry of Tulane University, 1956, 3 pages.
Wang et al. "Olefin-copper(I) complexes and their properties", Topics in Catalysis, vol. 35, 2005, 20 pages.

* cited by examiner

FIG. 5B

Activation of Initiator

$$R\text{-}X + Cu(I)X/L_n \underset{k_{d,i}}{\overset{k_{a,i}}{\rightleftharpoons}} R\bullet + Cu(II)X_2/L_n \quad (1)$$
$$1 \qquad 2 \qquad\qquad 1a \qquad 2a$$

Initiation

$$R\bullet + \underset{3}{\overset{2}{\diagup\!\!\diagdown}} \xrightarrow{k_i} P_i^* \quad (2)$$
$$1a \qquad\qquad\quad 4$$

Propagation

$$P_i^* + n\underset{3}{\diagup\!\!\diagdown} \xrightarrow{k_p} P_n^* \quad (3)$$
$$4 \qquad\qquad\qquad 5$$

Reversible Termination

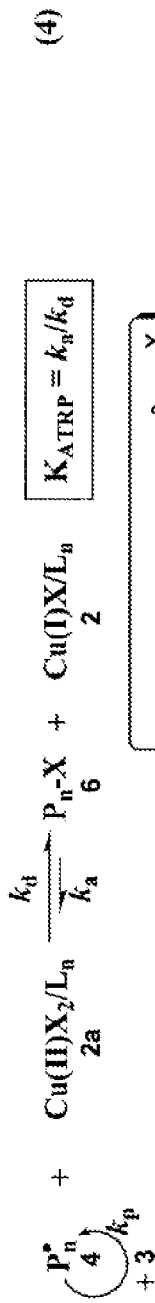

$$P_n^* + Cu(II)X_2/L_n \underset{k_a}{\overset{k_d}{\rightleftharpoons}} P_n\text{-}X + Cu(I)X/L_n \quad (4)$$
$$4 \qquad\qquad 2a \qquad\qquad 6 \qquad\quad 2$$
$$+3 \,\, k_p$$

$$P_n\text{-}X \rightleftharpoons$$

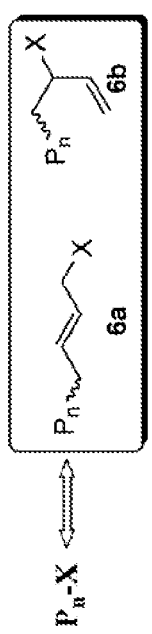

$$K_{ATRP} = k_a/k_d$$

FIG. 6A
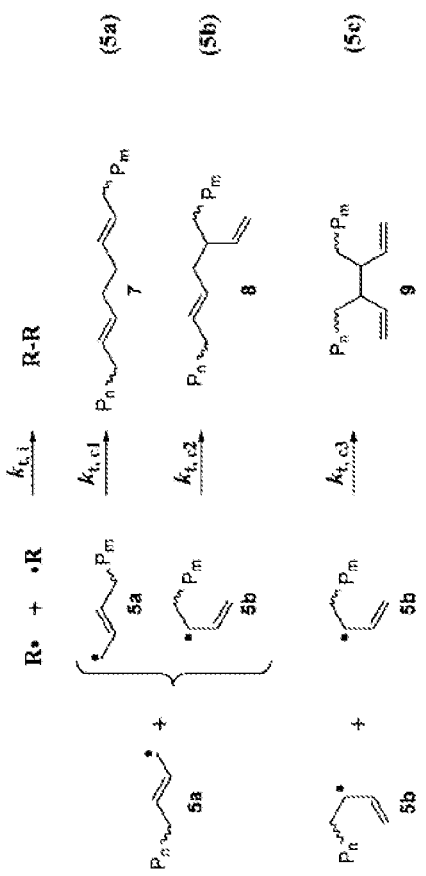
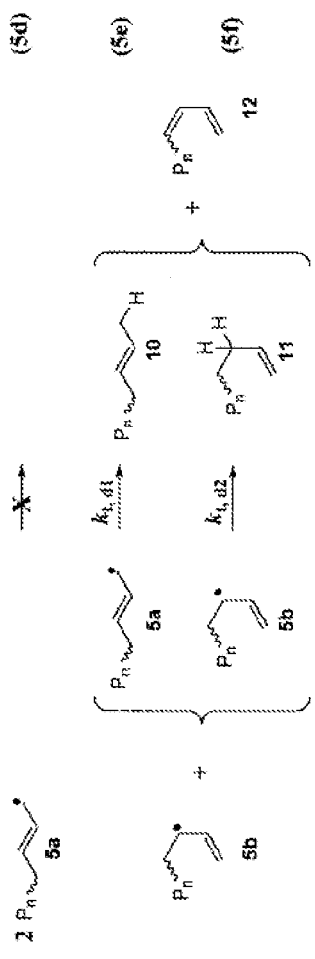

FIG. 6B
(c) Possible Side Reactions in Diene-ATRP:
Halide Elimination (dehydrohalogenation) from Dormant Chain
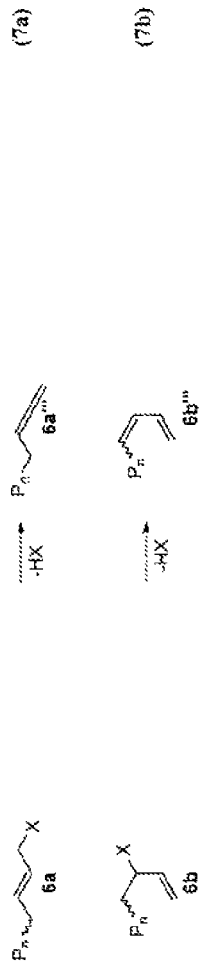
Quaternization with a Ligand, followed by Fragmentation or Onium Salt Elimination
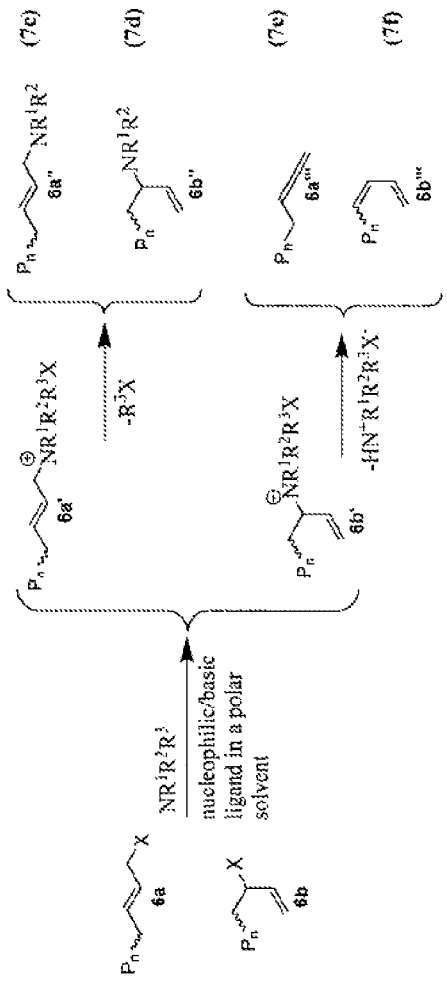

Effect of initiators in the CuBr-mediated butadiene polymerization in toluene. (a) dependence of $M_n$ and $M_w/M_n$ on conversion. (b) kinetics. [BD]/[I]/[CuBr]/[bpy] = 100/1/1/3, EtBriB ($\blacktriangle$), BEB ($\blacksquare$), AB ($\bullet$), MBSC ($\blacklozenge$), CBr$_4$ ($\blacktriangledown$), DBPX ($\bigstar$), DBPX$^a$ (☆). $T = 110$ °C. $^a$ in diglyme.

EtBriB/CuBr (▲), EtBriB/CuCl (△), MBSC/CuBr (●), and MBSC/CuCl (○).

FIG. 11

| entry | initiator | catalyst | [BD]/[I]/[Cat]/[Lig$^a$] | time (h) | $M_n$ (g/mol) | $M_n/M_w$ | conv (%) | IE | $k_p^{app}$ (h$^{-1}$) |
|---|---|---|---|---|---|---|---|---|---|
| 1 | MBSC | CuCl | 100/1/1/3 | 166.5 | 12864 | 1.79 | 52 | 0.22 | 0.004 |
| 2 | MBSC | CuBr | 100/1/1/3 | 126.5 | 11096 | 1.57 | 53 | 0.26 | 0.006 |
| 3 | AB | CuBr | 100/1/1/3 | 102.0 | 8648 | 1.27 | 46 | 0.29 | 0.006 |
| 4 | BEB | CuBr | 100/1/1/3 | 125.0 | 10747 | 1.34 | 52 | 0.26 | 0.006 |
| 5 | DBPX | CuBr | 100/1/2/6 | 24.0 | 15928 | 1.53 | 47 | 0.16 | 0.027 |
| 5 | CBr4 | CuBr | 100/1/1/3 | 96.0 | 9195 | 1.27 | 45 | 0.26 | 0.006 |
| 6 | EtBriB | CuCl | 100/1/1/3 | 124.0 | 9954 | 1.74 | 56 | 0.30 | 0.007 |
| 7 | EtBriB | CuBr | 100/1/1/3 | 120.5 | 10272 | 1.28 | 52 | 0.28 | 0.006 |

$^a$Bpy. All reactions are in toluene at 110 °C.

FIG. 13

| entry | temp (°C) | time (h) | $M_n^b$ (g/mol) | $M_n/M_w$ | conv (%) | IE | $k_p^{app}$ (h$^{-1}$) |
|---|---|---|---|---|---|---|---|
| 1 | 90 | 21.0 | 3623 | 1.86 | 17 | 0.26 | 0.009 |
| 2 | 110 | 15.0 | 2977 | 1.64 | 19 | 0.34 | 0.014 |
| 3 | 130 | 5.0 | 3505 | 1.49 | 21 | 0.32 | 0.046 |

Toluene (▲), anisole (■), THF (●), dioxane (♦), diglyme (▼), DMC (★), ACN (△), and toluene/THF (1/1 v/v) (□). [BD]/[EtBriB]/[CuBr]/[bpy] = 100/1/1/3, T = 110 °C.

FIG. 15

| entry | solvents | time (h) | $M_n$ (g/mol) | $M_n/M_w$ | conv (%) | IE | $k_p^{app}$ (h$^{-1}$) |
|---|---|---|---|---|---|---|---|
| 1 | toluene | 51.0 | 5,359 | 1.44 | 0.32 | 0.32 | 0.008 |
| 2 | anisole | 52.0 | 6,073 | 1.18 | 0.31 | 0.28 | 0.007 |
| 3 | THF | 75.5 | 5,707 | 1.15 | 0.30 | 0.28 | 0.005 |
| 4 | dioxane | 94.0 | 5,385 | 1.20 | 0.30 | 0.30 | 0.004 |
| 5 | diglyme | 49.5 | 5,660 | 1.18 | 0.30 | 0.28 | 0.007 |
| 6 | DMC | 68.0 | 4,829 | 1.22 | 0.29 | 0.32 | 0.005 |
| 7 | ACN | 94.0 | 785 | 1.23 | 0.06 | 0.43 | 0.001 |
| 8[b] | Tol/THF (1/1) | 66.5 | 6,597 | 1.20 | 0.31 | 0.26 | 0.006 |

[BD]/[EtBriB]/[CuBr]/[bpy] = 100/1/1/3 at 110 °C.

Toluene (▲) and toluene/diglyme (2/1 v/v) (■); [BD]/[EtBriB]/[CuBr]/[bpy] = 100/1/1/3, T = 130 °C.

[BD]/[EtBriBI]/[CuBr]/[Lig] = 100/1/1/3, T = 110 °C, toluene.
bpy (▲), dNbpy (■), Bu₃P (●), 100/1/1/6, Ph₃P (♦), 100/1/1/2.5, 2-PMA (▼), and 100/1/1/2, (TMS)₃P (★).

FIG. 20

| entry | [ISO]/[EtBriB]/[CuBr]/[Bpy] | time (h) | $M_n$ (g/mol) | $M_n/M_w$ | conv (%) | IE | $k_p^{app}$ (h⁻¹) |
|---|---|---|---|---|---|---|---|
| 1 | 100/1/1/1 | 76.5 | 5441 | 1.39 | 31 | 0.30 | 0.005 |
| 2 | 100/1/1/3 | 51.0 | 5359 | 1.44 | 32 | 0.33 | 0.008 |
| 3 | 100/1/1/6 | 24.5 | 7936 | 1.48 | 35 | 0.24 | 0.017 |

FIG. 22

| entry | [ISO]/[EtBriB]/[CuBr]/[Bpy] | time (h) | $M_n$ (g/mol) | $M_n/M_w$ | conv (%) | IE | $k_p^{app}$ (h⁻¹) |
|---|---|---|---|---|---|---|---|
| 1 | 100/1/0.1/1 | 213.5 | 3094 | 1.33 | 22 | 0.38 | 0.001 |
| 2 | 100/1/.5/1.5 | 50.0 | 3342 | 1.51 | 24 | 0.40 | 0.006 |
| 3 | 100/1/1/3 | 22.0 | 3732 | 1.57 | 23 | 0.33 | 0.012 |
| 4 | 100/1/2/6 | 8.0 | 5586 | 1.53 | 21 | 0.20 | 0.029 |
| 5 | 100/1/3/9 | 8.0 | 6409 | 1.42 | 24 | 0.21 | 0.035 |

[ISO]/[EtBriB]/[CuBr]/[CuBr$_2$]/[bpy] = 100/1/1/0/3 (▲), 100/1/1/0.5/3 (■), and 100/1/1/1/4 (●); T = 110 °C, toluene.

FIG. 25

| entry | [ISO]/[EtBriB]/[CuBr]/[CuBr$_2$]/[Bpy] | time (h) | $M_n$ (g/mol) | $M_n/M_w$ | conv (%) | IE | $k_p^{app}$ (h$^{-1}$) |
|---|---|---|---|---|---|---|---|
| 1 | 100/1/1/0/3 | 51.0 | 5359 | 1.44 | 32 | 0.33 | 0.008 |
| 2 | 100/1/1/0.5/3 | 70.0 | 4850 | 1.28 | 31 | 0.35 | 0.005 |
| 3 | 100/1/1/1/4 | 48.0 | 5450 | 1.31 | 33 | 0.32 | 0.008 |

(a) [BD]/[EtBriB]/[CuBr]/[bpy] = 100/1/1/2 and (b) 100/1/1/3. crude (▲) and precipitated in MeOH (■).

EtBriB in toluene (▲), EtBriB in diglyme (■), and DBPX in diglyme (●); [BD]/[I]/[CuBr]/[bpy] = 100/1/1/3, $T = 110°C$.

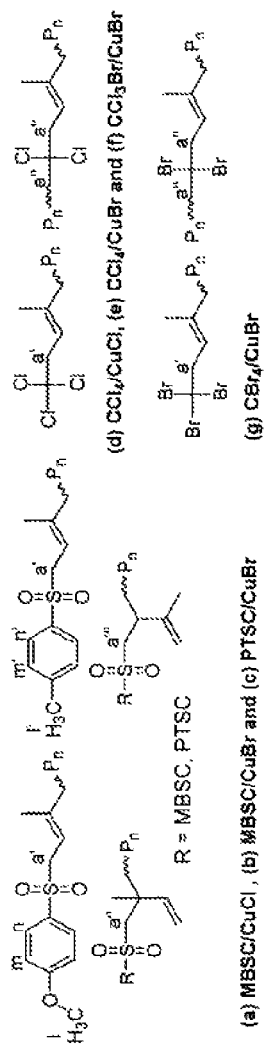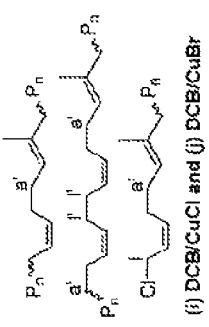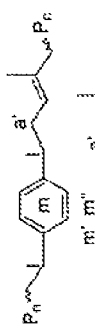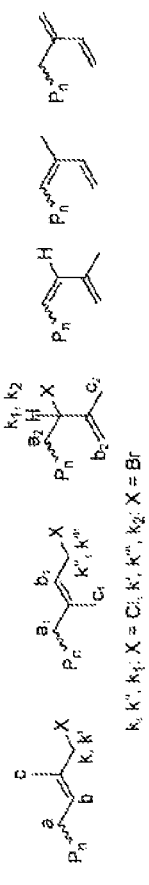
FIG. 32

FIG. 33

| No | Initiator | Cat | [Iso]/[I]/[Cat]/[bpy] | Time (h) | Conv (%) | Mn$^{GPC}$ | Mn$^{NMR}$ | M$_w$/M$_n$ | 1,4- (%) | 1,2- (%) | 3,4- (%) | % Cl | % Br | % Σ | Mono/Di (%) |
|---|---|---|---|---|---|---|---|---|---|---|---|---|---|---|---|
| a | MBSC | CuCl | 100/1/1/3 | 50.5 | 46 | 10773 | 4864 | 1.45 | 90 | 5 | 5 | 30 | - | 30 | - |
| b | MBSC | CuBr | 50/1/1/3 | 11 | 28 | 3110 | 1290 | 1.27 | 89 | 4 | 7 | 22 | 11 | 33 | - |
| c | PTSC | CuBr | 100/1/1/1 | 95 | 38 | 4817 | 1829 | 1.31 | 89 | 4 | 7 | 5 | 4 | 9 | - |
| d | CCl$_4$ | CuCl | 100/1/2/6 | 6.7 | 32 | 8884 | 3444 | 1.51 | 90 | 5 | 5 | 30 | - | 30 | 61/39 |
| e | CCl$_4$ | CuBr | 100/1/2/6 | 4.5 | 14 | 3437 | 1843 | 1.49 | 90 | 4 | 6 | 22 | 13 | 35 | 78/22 |
| f | CCl$_3$Br | CuBr | 100/1/2/6 | 5 | 27 | 6965 | 2725 | 1.43 | 90 | 4 | 6 | 8 | 15 | 23 | 30/70 |
| g | CBr$_4$ | CuBr | 100/1/2/6 | 5 | 25 | 4583 | 1350 | 1.55 | 90 | 4 | 6 | - | 11 | 11 | 89/11 |
| h | AB | CuBr | 100/1/1/3 | 23 | 36 | 5140 |  | 1.40 | 87 | 7 | 3 | - | - | - | - |
| i | DCB | CuCl | 100/1/2/6 | 9 | 23 | 9569 | 2619 | 1.39 | 90 | 6 | 4 |  |  |  |  |
| j | DCB | CuBr | 100/1/2/6 | 9 | 29 | 9253 |  | 1.35 | 90 | 5 | 5 |  |  |  |  |
| k | BEB | CuBr | 100/1/2/6 | 22 | 29 | 5245 | 4768 | 1.29 | 90 | 4 | 6 | - | 41 | 41 | - |
| l | DCPX | CuCl | 100/1/2/6 | 23.5 | 38 | 9215 | 4768 | 1.52 | 91 | 4 | 5 | 9 | - | 9 | 90/10 |
| m | DCPX | CuBr | 100/1/1/3 | 47.5 | 62 | 15365 | 5964 | 1.43 | 91 | 4 | 5 | 7 | 3 | 10 | 90/10 |
| n | DBPX | CuBr | 100/1/1/3 | 23.5 | 43 | 9140 | 3790 | 1.26 | 91 | 4 | 5 | - | 13 | 13 | 33/67 |
| o | EtBriB | CuCl | 100/1/1/3 | 29.5 | 39 | 4843 | 2486 | 1.37 | 90 | 4 | 6 | 3 | - | 3 | - |
| p | EtBriB | CuBr | 100/1/1/3 | 20.5 | 26 | 5083 | 2450 | 1.29 | 90 | 4 | 6 | - | 29 | 29 | - |

All reactions at 110 °C, toluene.

Table 1. Cu$^I$-Mediated Polymerization of Isoprene Initiated from Alkyl and Sulfonyl Halides

| entry | initiator | catalyst | [ISO]/[I]/[Cat]/[Bpy] | time (h) | $M_n^b$ (g/mol) | $M_n/M_w$ | conv (%) | IE | $k_p^{app}$ (h$^{-1}$) |
|---|---|---|---|---|---|---|---|---|---|
| 1 | MBSC | CuCl | 100/1/1/3 | 75.5 | 13,101 | 1.60 | 54 | 0.28 | 0.010 |
| 2 | MBSC | CuBr | 100/1/1/3 | 73.0 | 4,105 | 2.73 | 50 | 0.84 | 0.010 |
| 3 | CCl$_4$ | CuCl | 100/1/2/6 | 24.7 | 19,535 | 1.60 | 63 | 0.22 | 0.040 |
| 4 | CCl$_4$ | CuBr | 100/1/2/6 | 30.0 | 10,739 | 1.59 | 47 | 0.30 | 0.021 |
| 5 | CCl$_3$Br | CuBr | 100/1/2/6 | 17.0 | 10,526 | 1.50 | 48 | 0.31 | 0.039 |
| 6 | CBr$_4$ | CuBr | 100/1/2/6 | 24.5 | 8,734 | 1.61 | 45 | 0.35 | 0.024 |
| 7 | AB | CuBr | 100/1/1/3 | 72.0 | 5,503 | 1.42 | 55 | 0.68 | 0.011 |
| 8 | DCB | CuCl | 100/1/2/6 | 49.0 | 13,336 | 1.59 | 65 | 0.33 | 0.022 |
| 9 | DCB | CuBr | 100/1/2/6 | 49.0 | 13,429 | 1.54 | 63 | 0.32 | 0.020 |
| 10 | DCPX | CuBr | 100/1/2/6 | 24.5 | 13,164 | 1.72 | 40 | 0.21 | 0.021 |
| 11 | DBPX | CuBr | 100/1/2/6 | 22.0 | 8,748 | 1.48 | 52 | 0.40 | 0.033 |
| 12 | BEB | CuBr | 100/1/1/3 | 67.5 | 5,808 | 1.42 | 51 | 0.60 | 0.011 |
| 13 | EtBriB | CuCl | 100/1/1/3 | 73.0 | 6,255 | 1.47 | 52 | 0.56 | 0.010 |
| 14 | EtBriB | CuBr | 100/1/1/3 | 74.0 | 3,646 | 1.46 | 48 | 0.90 | 0.009 |

$T = 70°C$ (▲), 90°C (■), 100°C (●), 110°C (◆), 120°C (▼), and 130°C (★); [ISO]/[EtBriB]/[CuBr]/[bpy] = 100/1/1/3 in toluene.

FIG. 43

Table #. Results of Polymerization of Isoprene at Various Temperatures[a]

| entry | temp (°C) | time (h) | $M_n$ (g/mol) | $M_n/M_w$ | conv (%) | IE | $k_p^{app}$ (h$^{-1}$) |
|---|---|---|---|---|---|---|---|
| 1 | 70 | 385.5 | 11,235 | 1.57 | 47 | 0.28 | 0.002 |
| 2 | 90 | 125.0 | 9,226 | 1.65 | 51 | 0.38 | 0.006 |
| 3 | 100 | 125.5 | 6,731 | 1.45 | 51 | 0.51 | 0.006 |
| 4 | 110 | 74.0 | 3,646 | 1.46 | 48 | 0.90 | 0.009 |
| 5 | 120 | 76.0 | 3,240 | 1.53 | 46 | 0.97 | 0.008 |
| 6 | 130 | 45.5 | 3,169 | 1.57 | 50 | 1.08 | 0.015 |

[a] [ISO]/[EtBriB]/[CuBr]/[Bpy] = 100/1/1/3 in toluene.

Solvent = toluene (▲), xylenes (■), mesitylene (●), and hexanes (♦); [ISO]/[EtBriB]/[CuBr]/[bpy] = 100/1/1/3. $T = 110$ °C.

Solvent = DMF (▲), THF (■), ACN (●), anisole (♦), and DMC (▼).
[ISO]/[EtBriB]/[CuBr]/[bpy] = 100/1/1/3, T = 110 °C.

FIG. 46

| entry | solvent | time (h) | $M_n$ (g/mol) | $M_w/M_n$ | conv (%) | IE | $k_p^{app}$ (h$^{-1}$) |
|---|---|---|---|---|---|---|---|
| 1 | Hexanes | 52.0 | 7778 | 2.31 | 0.35 | 0.31 | 0.008 |
| 2 | Benzene | 127.5 | 2934 | 1.70 | 0.42 | 0.99 | 0.004 |
| 3 | Toluene | 42.0 | 3404 | 1.45 | 0.37 | 0.75 | 0.011 |
| 4 | Xylenes | 27.5 | 4290 | 1.52 | 0.39 | 0.63 | 0.018 |
| 5 | Mesitylene | 24.0 | 3845 | 1.63 | 0.36 | 0.63 | 0.018 |
| 6 | DMC | 78.5 | 1620 | 1.54 | 0.37 | 1.57 | 0.006 |
| 7 | Anisole | 147.0 | 1746 | 1.73 | 0.37 | 1.43 | 0.003 |
| 8 | THF | 80.5 | 1813 | 1.58 | 0.36 | 1.36 | 0.006 |
| 9 | DMF | 94.5 | 690 | 1.09 | 0.32 | 3.20 | 0.004 |
| 10 | Acetonitrile | 144.0 | 449 | 1.12 | 0.10 | 1.52 | 0.001 |

$^a$ [ISO]/[EtBriB]/[CuBr]/[Bpy] = 100/1/1/3 at 110 °C.

FIG. 49

| entry | [ISO]/[EtBriB]/[CuBr]/[Bpy] | time (h) | $M_n$ (g/mol) | $M_w/M_n$ | conv (%) | IE | $k_p^{app}$ (h$^{-1}$) |
|---|---|---|---|---|---|---|---|
| 1 | 100/1/1/3 | 74.0 | 3646 | 1.46 | 48 | 0.90 | 0.009 |
| 2 | 100/1/2/6 | 26.0 | 10698 | 1.69 | 52 | 0.33 | 0.028 |
| 3 | 100/1/3/9 | 26.0 | 9538 | 1.82 | 48 | 0.34 | 0.025 |

All reactions were in toluene at 110 °C.

FIG. 51

| entry | [ISO]/[EtBriB]/[CuBr]/[Bpy] | time (h) | $M_n$ (g/mol) | $M_w/M_n$ | conv (%) | IE | $k_p^{app}$ ($h^{-1}$) |
|---|---|---|---|---|---|---|---|
| 1 | 100/1/1/1 | 96.5 | 2193 | 1.63 | 0.39 | 1.20 | 0.005 |
| 2 | 100/1/1/2 | 73.7 | 2691 | 1.66 | 0.42 | 1.06 | 0.007 |
| 3 | 100/1/1/3 | 42.0 | 3404 | 1.45 | 0.37 | 0.75 | 0.011 |
| 4 | 100/1/1/6 | 23.5 | 8535 | 1.41 | 0.46 | 0.37 | 0.027 |
| 5 | 100/1/1/12 | 19.5 | 8546 | 1.61 | 0.40 | 0.32 | 0.026 |

All reactions were in toluene at 110 °C.

[ISO]/[EtBriB]/[CuBr]/[bpy] = 100/1/1/3 (▲), [ISO]/[EtBriB]/[CuBr]/[bpy]/[2-pma] = 100/1/1/1.5/1.5 (■), and 100/1/1/3/2.5 (●); T = 110 °C, toluene

FIG. 54

| entry | Ligand | [ISO]/[I][a]/[Cat][b]/[Lig] | time (h) | $M_n$ (g/mol) | $M_w/M_n$ | conv (%) | IE | $k_p^{app}$ ($h^{-1}$) |
|---|---|---|---|---|---|---|---|---|
| 1[c] | - | 100/1/1 | 141.0 | 57888 | 1.65 | 36 | 0.04 | 0.003 |
| 2 | Bpy | 100/1/1/3 | 42.0 | 3404 | 1.45 | 37 | 0.75 | 0.011 |
| 3 | dNbpy | 100/1/1/3 | 72.5 | 413 | 1.17 | 36 | 5.94 | 0.006 |
| 4 | dtBpy | 100/1/1/3 | 120.0 | 1628 | 1.32 | 36 | 1.50 | 0.004 |
| 5 | terpy | 100/1/1/3 | 20.0 | 15856 | 3.03 | 36 | 0.15 | 0.022 |
| 6 | PMDETA | 100/1/1/2 | 74.0 | 45870 | 1.86 | 38 | 0.06 | 0.007 |
| 7 | 2-PMA | 100/1/1/2.5 | 47.0 | 9308 | 1.75 | 54 | 0.40 | 0.017 |
| 8 | 2-PMA | 100/1/0.1/0.3 | 151.3 | 10014 | 2.26 | 54 | 0.36 | 0.005 |
| 9 | Bpy/2-PMA | 100/1/1/1.5/1.5 | 46.5 | 3160 | 1.85 | 52 | 1.13 | 0.016 |
| 10 | Bpy/2-PMA | 100/1/2/3/2.5 | 49.5 | 5619 | 2.00 | 46 | 0.56 | 0.013 |
| 11 | Bpy/dNbpy | 100/1/1/1.5/1.5 | 100.5 | 2088 | 1.31 | 37 | 1.20 | 0.005 |

[a] EtBriB and [b] CuBr. [c] Iso/Tol v/v = 10/1 and 1/1 for entries 2 – 11.
All reactions were in toluene at 110 °C.

[ISO]/[AIBN]/[CuBr$_2$]/[bpy] = 100/1/2/6 (▲) and [ISO]/[AIBN]/[CuCl$_2$]/[bpy] = 100/1/2/6 (■); $T = 110$ °C, toluene.

[BD]/[I]/[TBPO]/[CuX$_2$]/[MeO-bpy] = 100/1/0.2/0.04/1.2, EtBriB/CuBr$_2$ (▲), EtBriB/CuCl$_2$ (△), MBSC/CuBr$_2$ (●), and MBSC/CuCl$_2$ (○); T = 110 °C.

[BD]/[DB3BiPh]/[TBPO]/[CuBr$_2$]/[MeO-bpy] = 100/1/0.2/0.04/0.12, 110 °C (●), 100/1/0.5/0.04/0.12, 110 °C (●), 100/1/0.2/0.04/0.12, 130 °C (●), and 100/1/0.5/0.04/0.12, 130 °C (●).

FIG. 77

1. Synthesis of PBD Macroinitiator:
BD/DB3BisPh/TBPO/CuBr$_2$/MeO-bpy 100/1/0.2/0.04/0.12 at 110 °C in toluene, 119 h.

| Conv. (%) | $M_n^{GPC}$ | $M_R^{NMR}$ | PDI | 1,2-% | 1,4-% | 1,2-f (%) | cis-1,4-f (%) | trans-1,4-f (%) | Total f (%) |
|---|---|---|---|---|---|---|---|---|---|
| 31 | 4636 | 3795 | 1.26 | 10 | 90 | 18 | 8 | 64 | 90 |

2. Synthesis of PMMA-b-PBD-b-PMMA tri-Block Copolymer
MMA/Br-PBD-Br/CuCl/bpy = 100/1/2/6 at 110 °C in toluene, 19 h.

| $M_n^{GPC}$ | $M_n^{NMR}$ | PDI | PBD % | PMMA % | Cl-f (%) |
|---|---|---|---|---|---|
| 11781 | 9100 | 1.55 | 57 | 43 | 60 |

POLYMERIZATION OF DIENE MONOMERS

RELATED APPLICATIONS

This application claims the benefit, and is the U.S. national phase application under §371, of International Application No. PCT/US2014/045415, filed on Jul. 3, 2014, which claims the benefit of U.S. Patent Application Ser. No. 61/842,611, filed Jul. 3, 2013, both of which are incorporated herein by reference in their entirety.

BACKGROUND

1. Field of the Disclosure

This disclosure relates to free radical and controlled radical polymerization processes of atom or group transfer radical polymerization, and to (co)polymers prepared therefrom.

2. Discussion of the Background Art

Atom transfer radical polymerization ("ATRP") is considered to be one of the most successul controlled radical polymerizations ("CRP"). A CRP process is a process performed under controlled polymerization conditions with chain growth proceeding via a radical mechanism, such as, but not limited to, ATRP, stable free radical polymerization, ("SFRP"), nitroxide mediated polymerization, ("NMP"), reversible addition-fragmentation transfer, ("RAFT") or degenerative transfer systems.

A feature of CRP is the creation of an equilibrium between active polymer chain and dormant polymer chain. In certain embodiments, it may be preferable if a majority of polymer chains are present as dormant polymer chains. The equilibrium between the active and dormant chains typically provides for more controlled chain growth relative to conventional free radical polymerization. CRP processes are capable of producing mere uniform polymers; however, the active propagating chain may react in termination reactions resulting in higher polydispersities. Therefore, typically, to minimize termination reactions, the instantaneous concentration of active propagating species is maintained at a low concentration.

In CRP, the ability to maintain or adjust the equilibrium between active and dormant species and quantitative initiation early in the polymerization process allows, under appropriate conditions, the capability for synthesis of polymers with special architecture and functionality. In addition, if desired, the overall rate of monomer conversion may occur at rates equivalent to uncontrolled polymerization. Controlled polymerization process may be used to prepare polymers having a degree of polymerization that may be approximated from the ratio of the amount of consumed monomer to the initiator, a polydispersity close to a Poisson distribution and functionalized chain ends.

ATRP is the most often used CRP technique with a significant commercial potential for many specialty materials including coatings, sealants, adhesives, dispersants but also materials for health and beauty products, electronics and biomedical applications. The most frequently used ATRP is based on a simple reversible halogen atom transfer catalyzed by redox active transition metal compounds.

Certain advantages of an ATRP are as follows, many commercially available inexpensive initiators, catalysts and ligands may be used; many polymers produced by ATRP allow facile functionalization or transformation of the end groups by replacing terminal halogens with azides, amines, phosphines and other functionalities via nucleophilic substitution, radical addition or other radical combination reactions; an abundance of polymerizable monomers are available; allows production of macromolecules with complex topology such as stars, combs and dendrimers, coupled with the ability to control composition (block, gradient, periodic copolymers) and even control of polymer tacticity; and allows a simple reaction which may be carried out in bulk, or in the presence of organic solvents or in water under homogeneous or heterogeneous conditions, in ionic liquids, and $CO_2$.

Rising economies across the globe are increasing demand for diene-based polymers, especially those commonly used in the automotive industry. In addition to the automotive industry, the market for diene-based polymers is bolstered by expanded applications for these materials in adhesives and as substitutes for metal and glass, and also engineered plastics. The industry is continuously looking for ways of gaining a competitive advantage and reducing production costs.

Current diene industrial polymerization is carried out using water sensitive anionic techniques. Carrying out the diene polymerization using free radical methodologies would greatly simplify the process and give new structures. For example, if diene polymerization could be carried out by ATRP including block polymer synthesis, it would be possible to bypass all the stringent purification procedures associated with anionic polymerizations. It would also be possible to make block copolymers and other structures not accessible via anionic polymerization.

The industrial manufacture of polymers of conjugated 1,3-dienes such as butadiene (BD), isoprene (ISO) and chloroprene ranks in the billions of pounds/year, thus rendering their synthesis very relevant. However, while the large scale production of adhesives, rubbers, coatings and high impact materials based on random copolymers of dienes with AN or Sty can take advantage of radical emulsion polymerizations, the industrial synthesis of the corresponding well-defined thermoplastic elastomer block copolymers is still carried out only by expensive, air and water sensitive, anionic or coordination polymerization techniques which require stringent conditions, and limit the range of initiator/chain end functionalities. As such, less demanding, inexpensive and water tolerant, reversible deactivation controlled radical polymerizations (RDCRPs), would be highly beneficial. However, the radical polymerization of dienes is plagued by a set of problems including a low boiling point ($b_p^{BD}$=-4.4° C., $b_p^{ISO}$=34° C.), one of the lowest rate constant of propagation ($k_p$) of all monomers, Diels Alder dimerization, as well as a weak, side reactions prone, allylic chain end in CRPs.

Accordingly, the low $k_p$ and low $b_p$ prompt the need for high temperature (T>50° C.), pressurized metal reactors. Experimentally, this presents a problem for reaction optimization, as by contrast to trivial MMA or Sty CRPs, easily sampled from Schlenk tubes, diene kinetics involve cumbersome one data point experiment sets (i.e. 4-5 polymerizations for a kinetic plot).

As such, while a vast body of literature exists on the CRP of non-gaseous monomers, only very few papers address dienes, and predominantly, isoprene. Notable examples include CRPs mediated by nitroxides, RAFT reagents, organo-Te derivatives, and to a much smaller extent by iodine degenerative transfer telomerization.

Clearly, the widely popular, Cu-mediated ATRP would greatly benefit the industrial synthesis of dienes-based polymers, especially in view of the low cost and commercial availability of all reagents, its catalytic nature, water tolerance, and the great flexibility in fine-tuning the polymerization by the rational selection of the alkyl halide initiator, metal/ligand combination and of other reaction parameters. Yet, after almost 20 years since the original reports, and over 10,000 ATRP papers later, while the in-depth mechanistic understanding has made considerable advances, enabling ATRP optimization to excellent control over styrene and (meth)acrylates, its extension to VAc, VDF, ethylene or dienes has proven troublesome/challenging. Indeed, the results of the very few attempts at diene ATRP, are at best disappointing, and to date, there is no convincing evidence of the ATRP of dienes, no reliable diene ATRP procedures, or a quantitative understanding of the specifics of diene ATRP including kinetics, mechanism, catalyst, ligand or solvent effects and of the complex interplay of various rates, rate constants and especially of side reactions.

Thus, there is a need to develop reliable diene ATRP procedures. Further, there is a need to simplify and reduce costs associated with current diene industrial polymerization that uses water sensitive anionic techniques.

The present disclosure also provides many additional advantages, which shall become apparent as described below.

SUMMARY OF THE DISCLOSURE

This disclosure addresses the problems above. In accordance with this disclosure, diene polymerization can be carried out using ATRP techniques, e.g., normal ATRP, reverse ATRP, AGET-ATRP, ARGET-ATRP, ICAR ATRP, SARA-ATRP, SR&NI ATRP, e-ATRP, photo-ATRP, and the like. Thus, diene polymerization is no longer limited to water sensitive anionic techniques. Also, in accordance with this disclosure, new block copolymers can be made from diene polymerization carried out using the ATRP techniques.

This disclosure relates in part to a free radical or controlled radical polymerization process of atom or group transfer radical polymerization. The process comprises radically polymerizing one or more radically (co)polymerizable monomers in the presence of a polymerization system. The one or more radically (co)polymerizable monomers comprise at least one or more radically (co)polymerizable diene monomers. The polymerization system comprises: an initiator having one or more radically transferable atoms or groups, or a free radical initiator; a transition metal-ligand complex catalyst, wherein the ligand comprises a hydrocarbon ligand or a hereroatom-containing hydrocarbon ligand which coordinates with the transition metal, wherein said transition metal and said ligand are matched with one another in order to provide reaction with said initiator to generate a radical; optionally a reducing agent of either chemical, photoirradiation or electrical current nature, capable of reducing the higher oxidation state of the transition metal to a lower oxidation state so as to enable the use of catalytic low amounts of the transition metal complex catalyst; and optionally an organic solvent or water capable of at least partially solubilizing the transition metal-ligand complex catalyst. The process is conducted at a temperature and a pressure sufficient to form a (co)polymer.

This disclosure also relates in part to (co)polymers prepared by the above free radical or controlled radical polymerization processes of atom or group transfer radical polymerization.

This disclosure further relates in part to a free radical or controlled radical polymerization process of atom or group transfer radical polymerization. The process comprises: radically polymerizing one or more radically (co)polymerizable monomers in the presence of a polymerization system, wherein said one or more radically (co)polymerizable monomers comprise at least one or more radically (co)polymerizable conjugated diene monomers. The polymerization system comprises: an initiator having one or more radically transferable atoms or groups, or a free radical initiator; a transition metal-ligand complex catalyst, wherein the ligand comprises a hydrocarbon ligand or a heteroatom-containing hydrocarbon ligand which coordinates with the transition metal, wherein said transition metal and said ligand are matched with one another in order to provide reaction with said initiator to generate a radical; a reducing agent capable of reducing the higher oxidation state of the transition metal to a lower oxidation state so as to enable the use of catalytic low amounts of the transition metal-ligand complex catalyst; and a non-polar organic solvent or water capable of at least partially solubilizing the transition metal-ligand complex catalyst. The process is conducted at a temperature and a pressure sufficient to form a (co)polymer.

This disclosure yet further relates in part to (co)polymers prepared by the above free radical or controlled radical polymerization processes of atom or group transfer radical polymerization.

This disclosure relates in part to a free radical or controlled radical polymerization process of atom or group transfer radical polymerization. The process comprises polymerizing at least one diene monomer in the presence of an initiator, a transition metal-ligand complex catalyst, optionally a reducing agent, and optionally an organic solvent or water, under reaction conditions and for a time sufficient to controllably polymerize the at least one diene monomer to form a (co)polymer.

This disclosure relates in part to (co)polymers prepared by the above free radical or controlled radical polymerization processes of atom or group transfer radical polymerization This disclosure relates in part to a free radical or controlled radical polymerization process of atom or group transfer radical polymerization. The process comprises polymerizing at least one conjugated diene monomer in the presence of an initiator, a transition metal-ligand complex catalyst, a reducing agent, and an organic solvent or water, under reaction conditions and for a time sufficient to controllably polymerize the at least one diene monomer to form a (co)polymer.

This disclosure relates in part to (co)polymers prepared by the above free radical or controlled radical polymerization processes of atom or group transfer radical polymerization.

The disclosure provides a number of advantages. A larger number and wider variety of alkene monomers can be polymerized by radical polymerization, relative to ionic and other chain polymerizations. Polymers and copolymers produced by the present ATRP process exhibit a low polydispersity (e.g., $M_w/M_n$ is less than or equal to 1.5, preferably less than or equal to 1.4, more preferably less than or equal to 1.25, and most preferably, less than or equal to 1.10), thus ensuring a greater degree of uniformity, control and predictability in the (co)polymer properties. One can select an initiator which provides an end group having the same structure as the repeating polymer units or is endowed with extra functional groups (e.g. azide, alcohol, etc) that enable later chemistry towards the synthesis of complex polymer structures. The present ATRP process can provide high conversion of monomer and high initiator efficiency. The present ATRP process exhibits excellent "living/controlled" character, and high chain end functionality, thus facilitating the preparation of block copolymers in the presence of water, which cannot be accomplished by ionic processes. Polymers produced by the present ATRP process are well-defined and highly uniform, comparable to polymers produced by living ionic polymerization.

Other advantages include that end-functional initiators (e.g., containing COOH, OH, NO$_2$, N$_3$, SCN, etc., groups) can be used to provide an end-functional polymer in one pot, and/or polymer products with different functionalities at each end (e.g, in addition to one of the above groups at one end, a carbon-carbon double bond, epoxy, imino, amide, etc., group at another end). The end functionality of the (co)polymers produced by the present ATRP process (e.g., Cl, Br, I, CN, CO$_2$R) can be easily converted to other functional groups (e.g., Cl, Br and I can be converted to OH or NH$_2$ by known processes, CN or CO$_2$R can be hydrolyzed to form a carboxylic acid by known processes, and a carboxylic acid may be converted by known processes to a carboxylic acid halide), thus facilitating their use in chain extension processes (e.g., to form long-chain polyamides, polyurethanes and/or polyesters). In some cases (e.g., where "X" is Cl, Br and I), the end functionality of the polymers produced by the present ATRP process can be reduced by known methods to provide end groups having the same structure as the repeating polymer units. A wide variety of (co)polymers having various structures and topologies (e.g., block, random, graft, alternating, tapered (or "gradient"), star, "hyperbranched", cross-linked and water-soluble copolymers and hydrogels) which may have certain desired properties or a certain desired structure may be easily synthesized.

Further objects, features and advantages of the present disclosure will be understood by reference to the following drawings and detailed description.

BRIEF DESCRIPTION OF THE DRAWINGS

FIG. 5B depicts a reaction scheme showing activation of an initiator, initiation of a diene monomer, propagation and reversible termination.

FIGS. 6A and 6B depict reaction schemes showing irreversible termination, i.e., recombination, disproportionation, chain end alkylation (quaternization) and elimination form dormant chain.

FIG. 11 lists data showing the effect of initiators in the CuBr-mediated butadiene polymerization in toluene at 110° C. See FIG. 8.

FIG. 13 lists data showing the effect of temperature in the CuBr-mediated butadiene polymerization in toluene. [BD]/[EtBriB]/[CuBr]/[Bpy]=100/1/1/3, T=110° C. M$_n$ was determined by gel permeation chromatography in THF against linear polystyrene standards. See FIG. 11.

FIG. 15 lists data showing the effect of solvents in the CuBr-mediated butadiene polymerization. [BD]/[EtBriB]/[CuBr]/[Bpy]=100/1/1/3, T=110° C. The toluene/THF has a v/v of 1/1. See FIG. 13.

FIG. 20 lists data showing the effect of [CuBr]/[bpy] ratio in the CuBr-mediated butadiene polymerization in toluene initiated from EtBriB. See FIG. 18.

FIG. 22 lists data showing the effect of [I]/[CuBr] ratio in the CuBr-mediated butadiene polymerization in toluene initiated from EtBriB. See FIG. 20.

FIG. 25 lists data showing the effect of $CuBr_2$ addition in the CuBr-mediated isoprene polymerization in toluene initiated from EtBriB. See FIG. 23.

FIG. 32 depicts structural assignments for the nuclear magnetic resonance (NMR) spectra of (A) initiator fragment and first unit of isoprene bonded to an initiator and (B) halide-capped and eliminated end units.

FIG. 33 lists chain end characterizations of polymers prepared in accordance with the processes of this disclosure.

Figure 35B:
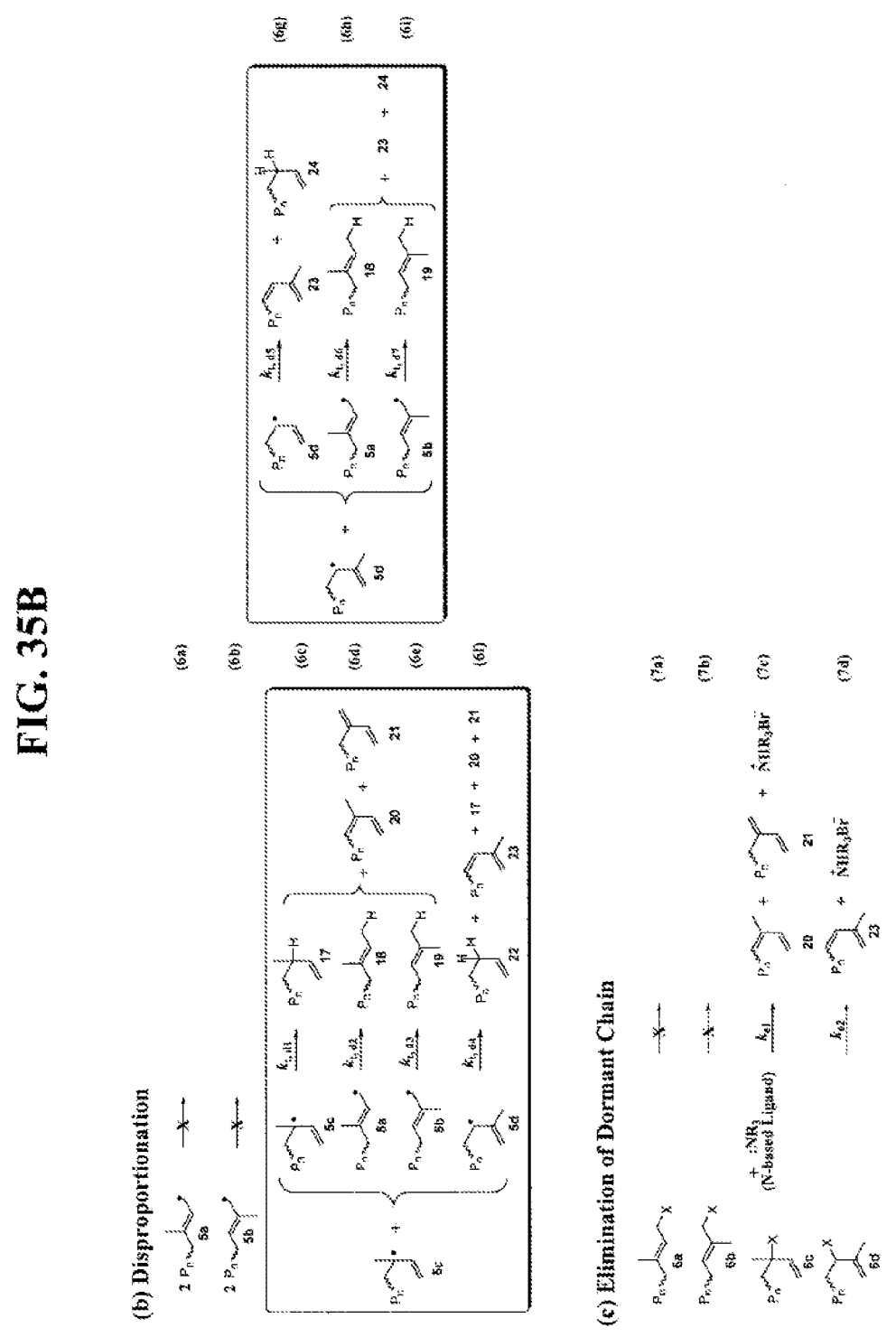

FIGS. 35A and 35B depict reaction schemes showing irreversible termination, i.e., recombination, disproportionation, and elimination of dormant chain.

FIG. 41 lists data showing the effects of halides in the CuBr-mediated isoprene polymerization in toluene. See FIG. 40.

FIG. 43 lists data showing the effects of temperature in the CuBr-mediated isoprene polymerization initiated from EtBriB. See FIG. 42.

FIG. 46 lists data showing the effect of non-polar and polar solvents in the CuBr-mediated isoprene polymerization. See FIGS. 44 and 45.

FIG. 49 lists data showing the effect of [I]/[CuBr] ratio in the CuBr-mediated isoprene polymerization in toluene initiated from EtBriB. See FIG. 48.

FIG. 51 lists data showing the effect of [CuBr]/[bpy] ratio in the CuBr-mediated isoprene polymerization in toluene initiated from EtBriB. See FIG. 50.

FIG. 54 lists data showing the effect of ligands and mixed-ligands in the CuBr-mediated isoprene polymerization in toluene. See FIGS. 52 and 53.

FIG. 77 shows results from the synthesis of polybutadiene macroinitiator and the synthesis of polybutadiene/polymethylmethacrylate block copolymer in accordance with the processes of this disclosure.

DETAILED DESCRIPTION OF THE PREFERRED EMBODIMENT

Figure 1:
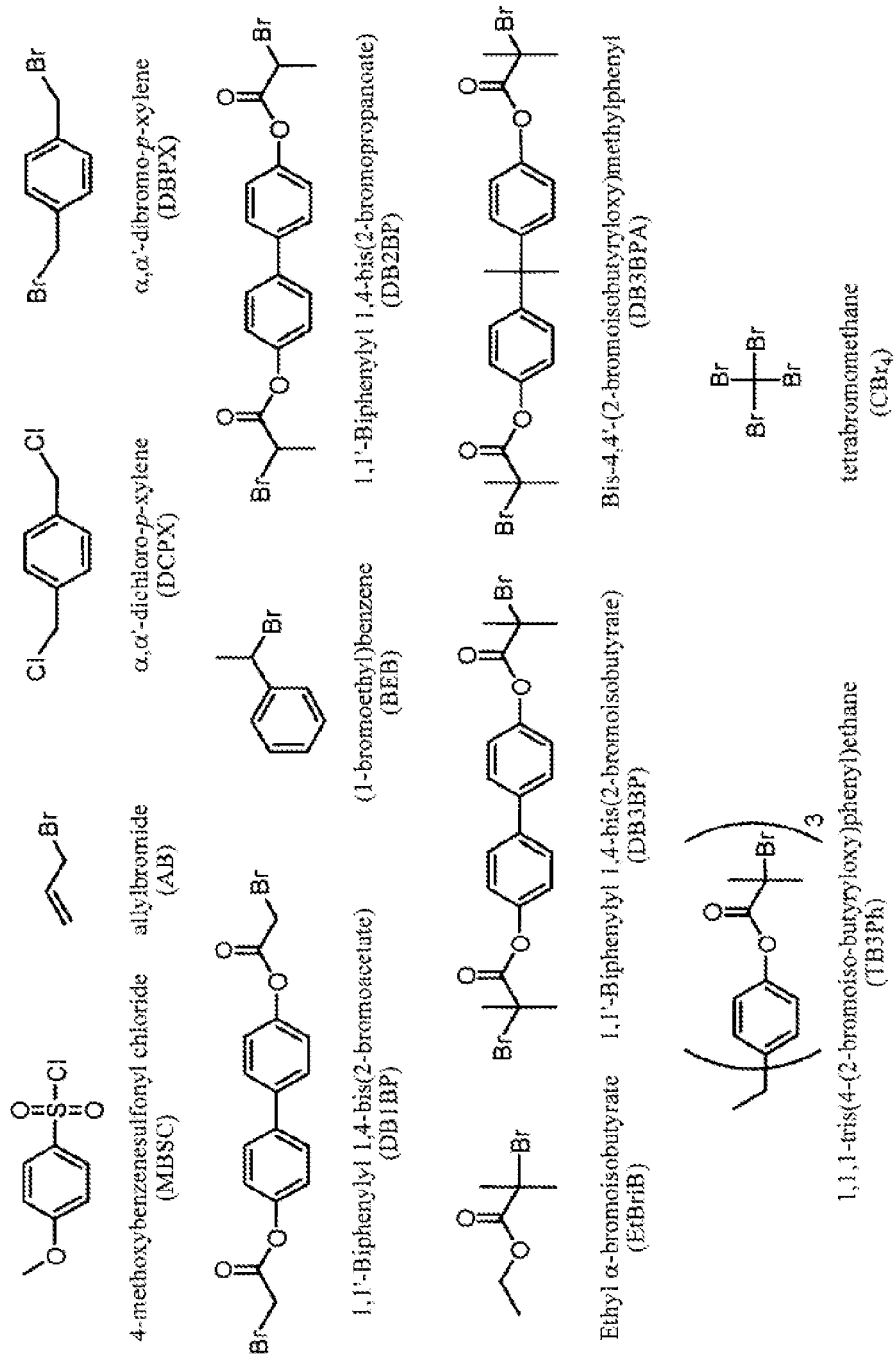
FIG. 1 depicts illustrative initiator structures useful in the processes of this disclosure and exemplified in FIGS. 2, 3 and 4 for butadiene.

As used herein, the following terms have the indicated meanings:
"ATRP" Atom transfer radical polymerization
"CRP" Controlled radical polymerization
"SFRP" Stable free radical polymerization
"NMP" Nitroxide mediated polymerization
"RAFT" Reversible addition-fragmentation transfer
"SR&NI" Simultaneous reverse and normal initiation
"AGET" Activators generated by electron transfer
"ARGET" Activators regenerated by electron transfer
"ICAR" Initiators for continuous activator regeneration
"SARA" Supplemental activators and reducing agents
"e-ATRP" Electrochemically mediated ATRP
"photo-ATRP" ATRP mediated by photoirradiation
"RDCRP" reversible deactivation controlled radical polymerization As used herein, the term "polymerization" includes oligomerization, cooligomerization, polymerization and copolymerization. The copolymerization can be block or random.

As used herein, the term "ATRP" encompasses all known and future ATRP techniques including, for example, the so called normal ATRP, reverse ATRP, AGET-ATRP, ARGET-ATRP, ICAR ATRP, SARA-ATRP, SR&NI ATRP, e-ATRP, photo-ATRP, etc.

As used herein, "polymer" refers to a macromolecule formed by the chemical union of monomers, typically five or more monomers. The term polymer includes homopolymer and copolymer block copolymers, and polymers of any topology including star polymers, block copolymers, gradient copolymers, periodic copolymers, telechelic polymers, bottle-brush copolymers, random copolymers, statistical copolymers, alternating copolymers, graft polymers, branched or hyperbranched polymers, comb polymers, such polymers tethered from particle surfaces, as well as other polymer structures.

As used herein, the term "polymer" includes oligomer, cooligomer, polymer and copolymer. The copolymer can be block or random.

As used herein, the term "polymer" includes molecules of varying sizes having at least two repeating units. Most generally polymers include copolymers which may in turn include random or block copolymers. Specifically, "polymer" includes oligomers (molecules having from 2-10 repeating units). Polymers formed using the disclosure have varying degrees of polymerization (number of monomer units attached together), for example from 2-10; 11-25; 26-100; 101-250; 251-500; 501-750; 751-1000; 1,000-2,000; and even larger; and all individual values and ranges and sub-ranges therein, and other degrees of polymerization.

As known in the art, the degree of polymerization can be modified by changing polymerizing conditions.

As known in the art, there are different measures of molecular weight of polymers: average molecular weight ($M_w$, the weight-average molecular weight, or $M_n$, the number-average molecular weight) and molecular weight distribution ($M_w/M_n$, a measure of polydispersity because $M_w$ emphasizes the heavier chains, while $M_n$ emphasizes the lighter ones). The number average molecular weight is the average of the molecular weights of the individual polymers in a sample. The number average molecular weight is determined by measuring the molecular weight of n polymer molecules, summing the weights, and dividing by n. The weight average molecular weight ($M_w$) is calculated by $$\overline{M}_w = \frac{\sum_i N_i M_i^2}{\sum_i N_i M_i}$$

where $N_i$ is the number of molecules of molecular weight $M_i$. The polydispersity index (PDI) is a measure of the distribution of molecular weights of the polymer and is the weight average molecular weight divided by the number average molecular weight. As the chains approach uniform chain length, the PDI approaches I. The degree of polymerization is the total molecular weight of the polymer divided by the molecular weight of the monomer and is a measure of the number of repeat units in an average polymer chain. As described elsewhere herein, the average molecular weights of the polymers produced can vary, depending on the polymerizing conditions, and other factors, as known in the art.

As used herein, "polymerizing conditions" are the temperature, pressure, solvent, water or bulk medium, reagent ratios and the presence of an initiator and/or of a catalyst system that result in a detectable amount of polymer formation. Useful temperatures for polymerization are easily determined by one of ordinary skill in the art without undue experimentation in further view of the description herein. Ambient temperature may be used. In industrial use, a temperature of between about 50° C. and 100° C. is particularly useful since reaction heat can be removed easily. One example of polymerizing conditions is a temperature below the temperature at which the initiator ordinarily decomposes. Useful pressures for polymerization are readily determined by one of ordinary skill in the art without undue experimentation in further view of descriptions herein. Ambient atmospheric pressure may be used. It is known that polymerizing conditions can vary depending on the desired product. Any combination of pressure and temperature which produce a detectable amount of polymer can be used in the methods described here.

As used herein, the term "hydrocarbon" includes any permissible group containing carbon and hydrogen atoms, in particular, groups or substituents having from about 1 to about 24 or more carbon atoms. The hydrocarbon can be substituted (e.g., fluorohydrocarbon, acrylate, methacrylate, etc) or unsubstituted. As used herein, • refers to a radical.

Mechanistically, ATRP relies on the $CuX_2$-generated persistent radical effect to mediate the equilibrium of halide terminated dormant species with their corresponding active, propagating radical chains, Scheme 1 (ATRP and ATGET, SARA, AND ICAR).

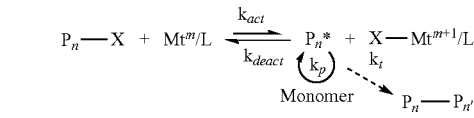

Representation of the ATRP equilibrium (Note: $k_{act} \ll k_{deact}$).

The outcome of an ATRP (i.e. rate, $M_n$, PDI, chain end functionality, etc.) is dependent not only on initial reagent ratios e.g. [monomer]/[initiator]/[catalyst]/[ligand]/[optional additive] and conversion, but also on the relative amounts of $CuX$ and $CuX_2$, (X=Cl, Br) and on kinetic parameters such as the propagation rate constant, $k_p$ and $K_{ATRP}=k_{act}/k_{deact}$ (Scheme 1, eq S1, eq S2), which in turn embed the effect of the nature of the halide, monomer, and reaction conditions including pressure, temperature, solvent, ligand etc. While such correlations have been reliably demonstrated for acrylates and styrene, there is very little data for dienes. There are actually quite a few reasons for this, as described below.

First, while the low boiling dienes ($b_p^{BD}=-4.4°$ C., $b_p^{ISO}=34°$ C.), polymerize fast enough for anionic or coordination processes to proceed at or below rt, their unique radical propagation mode, driven by the equilibrium of the dominant primary 1,4-radical with several allylic delocalized resonance structures, leads not only to mixtures of constitutionally isomeric 1,2- 1,3- and 1,4-cis/trans modes of enchainment, and different material properties, but also to the lowest propagation rate constants of all conventional ($k_p^{acrylates} > 10^4 > k_p^{Sty,5°\ C.} \sim 180 > k_p^{BD,5°\ C.} \sim 150 > k_p^{Iso,5°\ C.} \sim 125\ M^{-1}\ s^{-1}$), ($k_p^{BD,60°\ C.} \sim 200\ L\ mol^{-1}\ s^{-1}$).

Second, the C—X bond dissociation energies (BDEs) of allyl halides reminiscent of e.g. PBD—$CH_2$—CH=CH—$CH_2$—X and PBD—$CH_2$—CH(CH=$CH_2$)—X are the lowest of all halide chain end models of conventional polymers ($BDE_{25°\ C.}^{Allyl—Cl}=71.3\pm1.2$ kcal/mol, $BDE_{25°\ C.}^{Allyl—Br}=56.7+1.2$ kcal/mol). As such, the $P_n$—X BDE order is $P_n$=allyl<AN<MMA<St<MA<VAc<VDF<Et, and sterics aside, this sequence is maintained regardless of the CRP capping agent (X=halides, dithioesters, metal complexes, nitroxides, etc.). Thus, dienes are expected to have the highest values of the reversible dissociation equilibrium constant in CRPs mediated by the persistent radical effect (PRE), and also to display the fastest exchange rates in degenerative transfer mediated CRPs, especially at the high temperatures (T=110-130° C.) required for a reasonable polymerization rate.

Indeed, for ATRP under identical conditions, and based solely on C—X BDE values, DFT calculations indicate that $K_{ATRP,90°\ C.}^{Allyl-Br}/K_{ATRP,90°\ C.}^{CH3—CH(CN)—Br}/K_{ATRP,90°\ C.}^{CH3—(C(CH3)(COOCH3)—Br}/K_{ATRP,90°\ C.}^{CH3—CH(Ph)—Br}/K_{ATRP,90°\ C.}^{CH3—CH(COOCH3)—Br}=890/729/27.8/5.6/1$ and: $K_{ATRP,25°\ C.}^{Allyl-Br}/K_{ATRP,25°\ C.}^{CH3—CH(CN)—Br}/K_{ATRP,25°\ C.}^{CH3—C(CH3)(COOCH3)—Br}/K_{ATRP,25°\ C.}^{CH3—CH(Ph)—Br}/K_{ATRP,25°\ C.}^{CH3—CH(COOCH3)—Br}=3980/2520/58.4/14.2/1$ i.e. BD>AN>MMA>St>MA.

Furthermore, the ratio of the ATRP rates under the same conditions (temp ligand solvent etc) (or reaction times to the same conversion), qualitatively given by $(k_p^{mon1} \times K_{ATRP}^{mon1})/(k_p^{mon2} \times K_{ATRP}^{mon2})$, would suggest that $rate_{BD,90°\ C.}^{ATRP}/rate_{MA,90°\ C.}^{ATRP}/rate_{St,90°\ C.}^{ATRP} \sim 100/10/1$. However, as described herein, diene ATRPs are much slower than those of acrylates or styrene. In addition, $k_{act}^{Allyl-X}$, $k_{deact}^{Allyl-X}$ and thus $K_{ATRP}^{Allyl-X}$ depend not only on BDE, solvent and temperature, but also, very strongly on the ligands. As such, in ACN, $k_{act\ CuX,PMDETA}^{Allyl-Br,\ 20°\ C.}=2.84\times10^{-3}$ L mol$^{-1}$ s$^{-1}$, but $k_{act\ CuX,\ Me6Tren}^{Allyl-Br,\ 25°\ C.}=3.26\times10^{2}$ L mol$^{-1}$ s$^{-1}$, $K_{ATRP\ CuBr,\ bpy}^{Allyl-Br,\ 22°\ C.}=3\times10^{-9}$, $K_{ATRP\ CuCl,\ TPMA}^{Allyl-Cl,\ 22°\ C.}=2.3\times10^{-6}$ and $K_{ATRP\ CuBr,\ TPMA}^{Allyl-Br,\ 22°\ C.}=1.7\times10^{-5}$.

Consequently, while $k_{deact}^{Allyl-X}$ is not available, (and can be at best approximated by assuming the same activity for TMPA and Me$_6$TREN to be ~$2\times10^7$L mol$^{-1}$ s$^{-1}$), one could reasonably assume that, under the same conditions, the BD halide chain ends have among the highest $K_{act}$, and correspondingly, among the lowest $k_{deact}$ of all typical monomers. Thus, PBD-X would be easily activated, but comparatively slowly deactivated, thus enabling competition from other radical side reactions, leading to a decreased halide chain end functionality and broader polydispersity.

Third, (by contrast to nitroxide, RAFT, Te or Ti diene-CRPs,) the low allyl halide C—X BDE, also suggests that in ATRP, the primary and secondary allylic PBD-X are the most prone of all polymeric halide chain ends ($P_n$—X: St, acrylates, etc.), to a variety of catalyst and basic or nucleophilic ligand-induced, solvent-supported, polar side reactions, such as the CuX$_2$/L mediated oxidation of the terminal halide or propagating radical to an allylic carbocation$^i$ followed by β-H elimination, or the CuX/L catalytic radical termination, as well as to PBD-X dehydrohalogenation via either basic ligand assisted HX elimination, or following chain end quaternization by nucleophilic substitution of X with N- or P-ligands and thermal onium salt elimination in amino/phosphino dehalogenations.

Fourth, while the allyl radical is a poor H abstractor, and PBD terminates primarily by recombination, chain transfer (CT) processes should not be discounted. Thus, PBD could be prone to CT to polymer at the allylic main chain Hs which may lead to branching or crosslinking at high conversion. Likewise, H transfer from the amine ligands is also possible (e.g. PMDETA can act as a H transfer agent and reduce the Br chain ends of PMMA-Br).

Finally, another side reaction driven solely by the required high polymerization temperature, and insensitive to the CRP mechanism, is the slow, but competing Diels-Alder dimerization of BD to 4-vinyl cyclohexene (4-VCH), and of ISO to limonene. Luckily, 4-VCH is only a weak CT agent and does not interfere with BD emulsion polymerization at T=62° C. or telomerization at 145° C. Thus, considering the many drawbacks above, it is not surprising that only very few reports on diene-CRPs actually exist.

Clearly, side reactions that scale with the catalyst and ligand amount (e.g. catalytic radical termination, etc.) would be minimized in catalytic ATRP methods like ARGET or ICAR, while the ones associated with the monomer (e.g. catalyst coordination) would be minimized in normal or reverse ATRP. The examples herein include a comparative study of all typical ATRP procedures (normal, reverse, ARGET, SARA and ICAR) and evaluate their scope and limitations in BD-CRP.

In accordance with this disclosure, ATRP has been found to provide control over polymer topology, composition, microstructure, and functionality. While the examples set forth herein have been conducted on an academic scale, the processes of this disclosure can be conducted on an industrial scale. The processes of this disclosure can overcome problems or limitations associated with industrial scale production such as (i) special handling procedures are often required to remove all oxygen and oxidants from systems employing highly active (i.e., very reducing) ATRP catalysts; (ii) catalyst concentrations required by ATRP can approach 0.1M in bulk monomer, and extensive post-polymerization purification of the product is often necessary and expensive, and (iii) many of the transition metal species employed in this technique (i.e., Cu complexes) are generally considered mildly toxic, meaning the removal/disposal of large quantities of these catalysts can have environmental repercussions. The several ATRP initiation systems of this disclosure address these problems or limitations, including a simultaneous reverse and normal initiation procedure used to simplify the handling of catalyst precursors, hybrid and bimetallic systems designed to maximize control with economically attractive and environmentally friendly (but otherwise inefficient) catalysts, and systems employing organic reducing agents to dramatically lower the amount of required catalyst.

A normal ATRP initiating system, consisting of an alkyl halide initiator and transition metal catalyst in the lower oxidation state, can be conducted on an academic scale with systems that are relatively insensitive to air. However, as more and more reducing catalysts are developed in a dual effort to polymerize less reactive monomers and to employ smaller total amounts of catalyst, the systems become inherently less oxidatively stable. Additionally, polymerization systems in large vessels and in aqueous media can be difficult to deoxygenate, which can lead to irreversible oxidation and loss of the ATRP activator.

Reverse ATRP is a method for circumventing such oxidation problems. The ATRP initiator and lower oxidation state transition metal activator (i.e., CuI) are generated in situ from conventional radical initiators and the higher oxidation state deactivator (CuII). The initial polymerization components are thus less sensitive to oxygen in reverse ATRP and can therefore be easily prepared, stored, and shipped for commercial use. Additionally, this technique can be employed in the development of new catalysts to help verify the ATRP mechanism is operating, as it allows the ATRP equilibrium to be established from another direction.

However, because the transferable halogen atom or group is added as a part of the copper salt in reverse ATRP, the catalyst concentration must be comparable to the concentration of initiator and cannot be independently lowered. Additionally, block copolymers cannot be formed with this technique. Such is not the case with a dual initiation system comprised of both standard free radical initiators (e.g.. AIBN) as well as initiators with a transferable atom or group. In this technique, simply known as simultaneous reverse and normal initiation (SR&NI), radicals generated by AIBN are subsequently deactivated by an oxidatively stable CuII salt forming CuI and some halogenated chains. CuI can then reactivate alkyl halide (macro)initiator and concurrently mediate normal ATRP. In addition to bulk and solution systems, this technique can be successfully employed in emulsion and miniemulsions, where addition of the catalyst precursor as an oxidatively stable salt prior to sonication could greatly simplify commercial procedures.

The limitation of both simultaneous reverse and normal initiation in ATRP is evident in the inability of these techniques to produce clean block copolymers. In AGET ATRP, reducing agents that are unable to initiate new chains (rather than organic radicals) are used to reduce the higher oxidation state transition metal complex. No homopolymers are produced during block copolymerization with this technique. Many reducing agents could theoretically be used. The AGET principle can use tinII 2-ethylhexanoate, ascorbic acid, or triethylamine as the reducing agents, which reacted with the CuII complex to generate the CuI ATRP activator. Normal ATRP then proceeds in the presence of alkyl halide initiators or macromonomers. The technique is useful in aqueous and miniemulsion systems.

Radical termination reactions lead to the irreversible accumulation of persistent radical deactivators under typical ATRP conditions. If the initial catalyst concentration employed is too low, all of the activator will eventually be consumed as a persistent radical and polymerization will only reach limited conversion. A technique known as initiators for continuous activator regeneration (ICAR) in ATRP can be used to both scavenge oxidants and decrease the amount of catalyst needed to the point (ppm levels) where its removal or recycling would be unwarranted for many industrial applications.

In ICAR ATRP, free radicals are slowly and continuously generated by conventional radical initiators (e.g., AIBN) throughout a polymerization to constantly reduce and regenerate Cu that accumulates as a persistent radical. The development of this technique has industrial implications as it lowers the amount of necessary Cu catalyst from several thousand ppm under normal conditions to <50 ppm while still allowing for excellent control over molecular weights and molecular weight distribution. ICAR ATRP is distinguished from SR&NI procedures by the fact that a large excess of free radical reducing agent to catalyst is employed, and the radicals are slowly generated over the course of the reaction.

An industrially relevant development for the production of block copolymers was the realization that the relative concentration of catalyst to initiator could be significantly decreased when the reducing agent is present in excess relative to the catalyst. Cu$^{II}$ that accumulates as a persistent radical is continuously reduced to Cu$^{I}$ in ARGET ATRP, provided a large enough excess of reducing agent to Cu is supplied. Reducing agents used in AGET ATRP can in principle be used for ARGET, including organic derivatives of hydrazine, phenol, sugar, or ascorbic acid, and inorganic species such as Sn$^{II}$ or Cu0. Well-defined block copolymers can be synthesized employing only 50 ppm of Cu catalyst. Additionally, the catalyst and excess reducing agent can effectively work to scavenge and remove dissolved oxygen from the polymerization system.

SR&NI and AGET ATRP are used to quickly generate the Cu$^{I}$ activator from oxidatively stable Cu$^{II}$ catalyst precursors with nearly stoichiometric amounts of organic radicals and non-radical generating reducing agents, respectively. ICAR and ARGET differ from these techniques primarily in the ratio of catalyst to reducing agent employed and in the fact that they continuously regenerate the Cu$^{I}$ species throughout the reaction. They have the advantage that only small amounts of catalyst are needed to mediate polymerization. Some side reactions between the catalyst and chain end (such as outer sphere electron transfer or b-hydrogen elimination) that can affect polymer molecular weights and chain end functionality are minimized in ICAR and ARGET ATRP, while other side reactions that can affect catalyst performance (such as complex dissociation at low concentrations, monomer coordination to the catalyst, Lewis and protic acid evolution, etc.) create challenges in ICAR and ARGET ATRP.

ICAR has several advantages over ARGET ATRP, including a broader choice of ligand (the reductive properties of the catalyst are less important in ICAR whose kinetics are determined by thermal decomposition of the organic free radical initiator) and the fact that ligands can be used in lower concentrations (they do not compete for complexation with excess reducing agents and are not needed to trap acid). However, the reducing agents in ARGET do not generate new chains, making ARGET more applicable in the production of block copolymers. Typical ratios of all reagents employed in these techniques are described herein.

The processes of this disclosure minimize the number of undesirable side reactions that can occur in ATRP and can affect catalyst performance as well as polymer molecular weights and chain end functionality. The appropriate selection of catalyst/monomer combinations, ligands, solvents and polymerization conditions is often sufficient for this purpose. The application of ICAR and ARGET ATRP can also minimize undesirable reactions between the catalyst and polymer chain end.

In addition to atom transfer redox process (which is also known as inner sphere electron transfer), outer sphere electron transfer (OSET) may occur between organic radicals and transition metal complexes whereby growing radicals are oxidized to carbocations by Cu$^{II}$ or reduced to carbanions by Cu$^{I}$. The extent of OSET is dictated by the relative redox potentials of the species involved.

More active (i.e., reducing) catalysts reduce electrophilic radicals to their corresponding anions. This side reaction is responsible for limiting the attainable MW of polymers prepared by ATRP. OSET may be responsible for limited conversions reached in the ATRP of electrophilic monomers with highly active/reducing Cu catalysts. In accordance with this disclosure, OSET reactions are minimized through appropriate selection of catalyst/monomer combinations, ligands, solvents and polymerization conditions, and by matching the reducing power of the catalysts with a given monomer. The application of ICAR ATRP may minimize OSET between electrophilic radicals and extremely reducing Cu catalysts. The majority of the Cu catalyst is present as the higher oxidation state persistent radical in ICAR, in contrast to normal ATRP where the majority is in the lower oxidation state.

Halide chain end functionality can also be lost during the ATRP of monomers due to electron transfer reactions catalyzed by the Cu$^{II}$ deactivator. HBr is evolved from propagating radicals and Cu$^{II}$Br$_2$ to give unsaturated chain ends and Cu$^{I}$Br. The effect of this reaction on chain end functionality becomes particularly pronounced at high conversions as the absolute time between monomer propagation events becomes longer with decreasing monomer concentration; thus, stopping a reaction at lower conversion is a simple yet effective technique for retaining high chain end functionality. However, this side reaction thwarts the production of well-defined high molecular weight (co)polymers in ATRP.

ARGET and ICAR ATRP minimize Cu concentrations and allow high molecular weight (co)polymers with narrow molecular weight distributions to be synthesized with just 10 ppm of Cu catalyst. This can be attributed to the fact that side reactions between the chain end and the catalyst are minimized when the catalyst concentration is dramatically lowered.

Under typical ATRP conditions ([M]/[Cu]=100/1, bulk), as much as 10% of a monomer can displace Br$^-$ and coordinate to Cu$^{I}$(PMDETA)+ at room temperature. Monomer reactivity may not significantly affected in radical copolymerization by $\pi$-coordination to Cu$^{I}$ with the tridentate ligand PMDETA, and furthermore, that this coordination plays no significant role in the chain extension step of ATRP. However, under ICAR and ARGET conditions where [M]/[Cu]=20,000/1, the degree of monomer coordination to the Cu$^{I}$/PMDETA activator will be more significant. Monomer coordination to Cu can stabilize the lower oxidation state and affect the redox properties of the catalyst. Monomer coordination to Cu can be minimized by employing tetradentate ligands with very high Cu/L stability constants.

While certain monomers do not coordinate significantly to CuII (a hard Lewis acid) through the alkene double bond, nitrogen containing monomers can displace halogen from the CuII deactivator, which can result in a loss of control in the polymerization. The addition of halide salt to the reaction medium may help suppress this side reaction. Additional side reactions peculiar to nitrogen containing monomers involve reactions of the alkyl bromide polymer chain end with nitrogen containing monomer units in the monomer and polymer. This can lead to the formation of branched polymeric structures.

Conducting ATRP in aqueous media allows the controlled polymerization of many hydrophilic and ionic monomers that cannot otherwise be polymerized in organic media. Additionally, replacing organic solvents with aqueous media has both economic and environmental advantages. Unfortunately, the equilibrium constant for disproportionation of two CuI centers into CuII and Cu0 is very large in water (Kdisp=106), and loss of the activator to this side reaction prevents the use of many Cu catalysts that are otherwise attractive for their activity or for economic reasons. However, with knowledge of the overall stability constants of Cu/L complexes for the CuI and CuII oxidation states, disproportionation can be suppressed with the choice of appropriate ligands.

Hydrolysis of CuII-halide complexes occurs to a significant extent in aqueous media. Solvation of ions and, hence, dissociation of the halide anion from the metal complex will be much more significant in aqueous than in organic media. Dissociation of the halide is presumably followed by coordination of water to CuII, and this ultimately lowers the available deactivator concentration during ATRP and results in faster and less controlled polymerization in aqueous and protic media. However, control can be achieved with the addition of extra halide salts to the reaction, which suppress deactivator solvolysis.

Through the appropriate selection of catalyst/monomer combinations, ligands, solvents and polymerization conditions, processes of this disclosure minimize the number of undesirable side reactions that can occur in ATRP and can affect catalyst performance as well as polymer molecular weights and chain end functionality.

According to the present disclosure, a polymerization process is described for conducting polymerization of monomers, particularly controlled "living" polymerization of dienes. In the context of the present disclosure, the term "living" refers to the ability to produce a product having one or more properties which are reasonably close to their predicted value. The polymerization is said to be "living" if the resulting number average molecular weight is close to the predicted molecular weight based on the ratio of the concentration of the consumed monomer to the initiator; e.g., within an order of magnitude, preferably within a factor of five, more preferably within a factor of 3, and most preferably within a factor of two, and to produce a product having narrow molecular weight distribution as defined by the ratio of weight average molecular weight to number molecular weight (MWD); e.g., less than 10, preferably less than 2, more preferably less than 1.5, most preferably less than 1.3.

Living/controlled polymerization (i.e., when chain breaking reactions such as transfer and termination are substantially absent) enables control of various parameters of macromolecular structure such as molecular weight, molecular weight distribution and terminal functionalities. It also allows the preparation of various copolymers, including block and star copolymers. Living/controlled radical polymerization requires a low stationary concentration of radicals, in equilibrium with various dormant species.

In the context of the present disclosure, the term "controlled" refers to the ability to produce a product having one or more properties which are reasonably close to their predicted value (presuming a particular initiator efficiency). For example, if one assumes 100% initiator efficiency, the molar ratio of catalyst to monomer leads to a particular predicted molecular weight. The polymerization is said to be "controlled" if the resulting number average molecular weight ($M_w$ (act)) is reasonably close to the predicted number average molecular weight ($M_w$ (pred)), e.g., within an order of magnitude, preferably within a factor of four, more preferably within a factor of three and most preferably within a factor of two (i.e., $M_w$ (act) is in the range of from (0.1)×$M_w$ (pred) to 10×$M_w$ (pred), preferably from (0.25)×$M_w$ (pred) to 4×$M_w$ (pred), more preferably from (0.5)×$M_w$ (pred) to 2 $M_w$ (pred), and most preferably from (0.8)×$M_w$ (pred) to 1.2×$M_w$ (pred)).

Similarly, one can "control" the polydispersity by ensuring that the rate of deactivation is the same or greater than the initial rate of propagation. However, the importance of the relative deactivation/propagation rates decreases proportionally with increasing polymer chain length and/or increasing predicted molecular weight or degree of polymerization.

In accordance with this disclosure, the ATRP process is conducted by radically polymerizing one or more radically (co)polymerizable monomers in the presence of a polymerization system. The one or more radically (co)polymerizable monomers comprise at least one or more radically (co) polymerizable diene monomers. The polymerization system comprises an initiator having one or more radically transferable atoms or groups; a transition metal-ligand complex catalyst, wherein the ligand comprises any C-, N-, O-, P- or S-containing ligand which coordinates with the transition metal, wherein the transition metal and the ligand are matched with one another in order to provide reaction with said initiator to reversibly generate a radical; and an organic solvent capable of solubilizing the transition metal-ligand complex catalyst.

The ATRP process can undergo normal initiation by the redox reaction between an initiator comprising one or more transferable atom(s) or group(s) and a catalyst complex comprising a transition metal salt in a lower oxidation state complexed with a ligand, solvent molecule or monomer. The transferable atom or group is an atom or group that may be homolytically cleaved from the initiator by the catalyst, thereby oxidizing the catalyst to a higher oxidation state and forming an active propagating species capable of monomer addition. After initiation, the ATRP process, generally, is based on a dynamic equilibrium between a transition metal complex reversibly activating and deactivating the polymer chain via a similar homolytic atom or group transfer via a redox reaction. During the dynamic equilibrium, the transition metal complex cycles between a lower oxidation state and a higher oxidation state.

The advantages of normal initiation of the ATRP process include that the added initiator molecule includes the transferable atom or group needed to initiate and subsequently repeatedly terminate each polymer chain, therefore no additional transferable atoms or groups are required to be added by other components of the polymerization process. Therefore, adding sufficient transition metal complex in the lower oxidation state provides suitable catalytic activity to the process. By "suitable catalytic activity" it is meant that the polymerization comprises an amount of catalyst needed to drive the reaction to a desired degree of polymerization with appropriate heat control to produce a polymer with the desired properties. Typically, the ATRP process requires a sufficient catalyst amount to compensate for any loss of catalytic activity due to termination reactions.

The ATRP catalysts may vary in catalytic activity based upon the properties of the transition metal, the ligands and the temperature and polarity of the reaction medium, as well as other factors. Generally, more active catalysts are less oxidatively stable in their lower oxidation states. Due to this oxidative instability, active catalysts in their lower oxidation states are more difficult to handle; for instance, trace levels of oxygen or other oxidants should be to be removed from the polymerization medium prior to addition of the active catalyst in a lower oxidation state to prevent the catalyst from being converted to the higher oxidation state deactivator.

The ATRP process of this disclosure can also undergo reverse ATRP initiation. In a reverse ATRP, a more stable catalyst complex in the higher oxidation state may be added to the polymerization medium. Generally, the higher oxidation state of a transition metal complex is a lower cost and more oxidatively stable state of the complex and may often be stored in the presence of air.

In reverse ATRP, as opposed to normal ATRP, the transferable atom or group begins as a counterion or ligand on the transition metal salt or transition metal complex in the higher oxidation state. A "reverse ATRP" the reaction is then initiated by generation of a radical by known processes, such as by decomposition of a standard free radical initiator which either directly participates in a redox reaction with the higher oxidation state transition metal forming the transition metal complex in the lower oxidation state, and a molecule with a transferable atom suitable for initiation of an ATRP reaction, or it may initiate a polymerization that is quickly deactivated by the transition metal complex in the higher oxidation state. Typically, reverse ATRP processes require a high catalyst concentration in order to introduce the appropriate concentration of radically transferable atoms or groups to the reaction to both maintain a controlled polymerization and attain polymers of the desired molecular weight at high conversion of monomer to polymer.

In addition, a typical reverse ATRP process should be initiated in a narrow temperature range to ensure efficient thermal decomposition of the standard free radical initiator to reduce the catalyst complex and produce polymers with low polydispersities. Further, since the first radicals are provided by normal radical initiators, it not as easy to prepare homo-telechelic polymers, block, or graft copolymers of more complex architecture than with normal initiation.

The ATRP process of this disclosure can typically be conducted between −50° C. and 280° C., preferably between 0° C. and 180° C., more preferably between 20° C. and 150° C., most preferably between 20° C. and 130° C. The ATRP process can be conducted under a pressure from 0.1. to 50,000 kPa, preferably from 1 to 1,000 kPa. The addition order of various ingredients in according with the ATRP process of the disclosure can vary and generally do not affect the outcome of the living polymerization. Depending the expected molecular weight and other factors, polymerization time may vary from 10 seconds to 200 hours, preferably from 1 minute to 100 hours, more preferably from 10 minutes to 48 hours, most preferably from 30 minutes to 24 hours. The polymerization procedure can consist of mixing the desired diene monomer, optionally monoene or diene monomer, transition metal-ligand complex catalyst an alkyl halide, and the radical initiator in predetermined ratios and in appropriate solvents for a given amount of time.

The final polymer can be used as it is or is further purified, isolated, and stored. Purification and isolation may involve removing residual monomer, solvent, and catalyst. The purification and isolation process may vary. Examples of isolation of polymers include but not limited to precipitation, extraction, filtration, and the like. Final polymer product can also be used without further isolation such as in the form of the latex or emulsion.

After the polymerizing step is complete, the formed polymer is isolated. The isolating step of the present process is conducted by known procedures, and may comprise evaporating any residual monomer and/or solvent, precipitating in a suitable solvent, filtering or centrifuging the precipitated polymer, washing the polymer and drying the washed polymer. Transition metal compounds may be removed by passing a mixture containing them through a column or pad of alumina, silica and/or clay. Alternatively, transition metal compounds may be oxidized (if necessary) and retained in the (co)polymer as a stabilizer.

Precipitation can be typically conducted using a suitable $C_5$-$C_8$-alkane or $C_5$-$C_8$-cycloalkane solvent, such as pentane, hexane, heptane, cyclohexane or mineral spirits, or using a $C_1$-$C_6$-alcohol, such as methanol, ethanol or isopropanol, or any mixture of suitable solvents. Preferably, the solvent for precipitating is water, hexane, mixtures of hexanes, or methanol.

The precipitated (co)polymer can be filtered by gravity or by vacuum filtration, in accordance with known methods (e.g., using a Buchner funnel and an aspirator). Alternatively, the precipitated (co)polymer can be centrifuged, and the supernatant liquid decanted to isolate the (co)polymer. The (co)polymer can then be washed with the solvent used to precipitate the polymer, if desired. The steps of precipitating and/or centrifuging, filtering and washing may be repeated, as desired.

Once isolated, the (co)polymer may be dried by drawing air through the (co)polymer, by vacuum, etc., in accordance with known methods (preferably by vacuum). The present (co)polymer may be analyzed and/or characterized by size exclusion chromatography, NMR spectroscopy, etc., in accordance with known procedures.

Diene Monomers

Various conjugated diene monomers or mixtures thereof can be employed. Examples of conjugated diene monomers include, for example, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and mixtures thereof plus all types of substituted dienes (including natural ones as described in http://en.wikipedia.org/wiki/Myrcene) and including any heteroatom/and functional group substituted dienes: from $CH_2$=CH—CH=$CH_2$ to $R_1R_2C$=$CR_3$—$CR_4$=$CR_5R_6$ with Rs being any functional group R=H, halide, and any possible organic functional group (acid, ester, aromatic ether, CN, acrylate etc. Moreover, we should claim all kinds of longer chain conjugated dienes such as $CH_2$=CH—(CH=CH)$_n$—CH=$CH_2$ n=0, 1, 2, 3 etc with H or substituted.

The preferred dienes used in this disclosure are conjugated and propagate with an allyl radical.

Examples of suitable dienes or polyenes include, for example, those containing about 4 to about 12 carbon atoms or greater per molecule. The presently preferred polyenes are diolefins. Such diolefins include, but are not limited to, propadiene, 1,2-butadiene, 1,3-butadiene, isoprene, 1,2-pentadiene, 1,3-pentadiene, 1,4-pentadiene, 1,2-hexadiene, 1,3-hexadiene, 1,4-hexadiene, 1,5-hexadiene, 2-methyl-1,2-pentadiene, 2,3-dimethyl-1,3-butadiene, heptadienes, methylhexadienes, octadienes, methylheptadienes, dimethylhexadienes, ethylhexadienes, trimethylpentadienes, methyloctadienes, dimethylheptadienes, ethyloctadienes, trimethylhexadienes, nonadienes, decadienes, undecadienes, dodecadienes, cyclopentadienes, cyclohexadienes, methylcyclopentadienes, cycloheptadienes, methylcyclohexadienes dimethylcyclopentadienes, ethylcyclopentadienes, dicyclopentadiene, and mixtures of one or two of these diolefins. Presently preferred diolefins are 1,3-butadiene, isoprene, 2,3, dimethyl butadiene, chloroprene, pentadienes (such as 1,3-pentadiene), cyclopentadienes (such as 1,3-cyclopentadiene), and the like.

Preferably, the monomeric material comprises at least one conjugated diene and optionally one or more 1-olefins. Dienes employed in the polymerization process of the present disclosure preferably have the general formula.

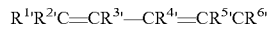

wherein $R^{1'}$ to $R^{6'}$ are independently selected from hydrogen, halogen, alkyl, cycloalkyl, aryl, aralkyl, alkaryl, halogen and all types of C-, O-, N-, S-, P-containing functional groups (e.g., ester, ether, carbonate, ether, cyano, etc). For example, they can be chloro, methyl, ethyl, n-propyl, isopropyl, or single or mixtures of isomeric forms of pentyl, hexyl, octyl, decyl; or aryl groups selected from, for example, phenyl 2 chloro-phenyl, o-biphenyl, naphthyl, phenanthryl and anthryl; or alkaryl groups selected from, for example, phenylmethyl, phenylethyl, phenyl-n-propyl, naphthylmethyl; or aralkyl groups, for example, tolyl, xylyl, mesityl or 2-methylnaphthyl. However, when the diene is too heavily substituted by bulky groups it may be difficult or impossible to cause the diene to homopolymerize due to steric hinderance. Nonetheless, it would still copolymerize. The diene employed preferably has the general formula

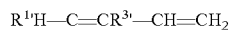

or

wherein $R^{1'}$ and $R^{3'}$ are independently selected from hydrogen, chlorine and a $C_1$ to $C_{10}$ hydrocarbyl group. Preferred dienes are 1,3-butadiene, 2-methyl-1,3-butadiene (isoprene), and 2-chloro-1,3-butadiene (chloroprene). This depends on whether 1,2 propagation vs 1,4 propagation is desired, as the sterics may inhibit one mode but not the other.

Non-limiting examples of suitable dienes, preferably containing 3-12 carbon or more atoms per molecule which can be hydrogenated (actually the polymer made can also be hydrogenated after polymerization) in the process of this disclosure include propadiene, 1,2-butadiene, 1,3-butadiene, isoprene, 1,2-pentadiene, 1,3-pentadiene, 1,4-pentadiene, 1,2-hexadiene, 1,3-hexadiene, 1,4-hexadiene, 1,5-hexadiene, 2-methyl-1,2-pentadiene, 2,3-dimethyl-1,3-butadiene, heptadienes, methylhexadienes, octadienes, methylheptadienes, dimethylhexadienes, ethylhexadienes, trimethylpentadienes, methyloctadienes, dimethylheptadienes, ethyloctadienes, trimethylhexadienes, nonadienes, decadienes, undecadienes, dodecadienes, cyclopentadienes, cyclohexadienes, methylcyclopentadienes, cycloheptadienes, methylcyclohexadienes dimethylcyclopentadienes, ethylcyclopentadienes, dicyclopentadiene, and mixtures of one or two of these diolefins. Presently preferred dienes are propadiene, 1,3-butadiene, pentadienes (such as 1,3-pentadiene, 1,4-pentadiene, isoprene), cyclopentadienes (such as 1,3-cyclopentadiene) and dicyclopentadiene.

The (co)polymers produced in accordance with this disclosure can be transformed by methods known in the art, for example, oxidized, hydrogenated, cross linked by conventional double bond chemistry, and the like.

Monoene Monomers

It is also possible in the process according to the disclosure additionally to use, as well as the conjugated diolefins, further unsaturated compounds, such as acrylates, methacrylates, styrene, ethylene, propene, 1-butene, 1-pentene, 1-hexene, 1-octene and/or cyclopentene, fluorinated monomer such as vinylidene fluoride, acrylonitrile, ABS copolmers, preferably styrene, ethylene, propene and/or 1-octene, which may be copolymerized with the stated diolefins. All vinyl monomers that polymerize radically are suitable monoene monomers.

The monomeric material used in the polymerization process of the present disclosure can contain one or more 1-olefins. Suitable 1-olefins are any which are capable of being copolymerized with conjugated dienes. Examples of suitable 1-olefins are acrylates, methacrylates, ethylene, propylene, butene, hexene, 4-methylpentene-1, 1-octene, norbornene, substituted norbornenes, styrene, fluorinated monomers, actylonitrile, and the like.

In the present disclosure any radically polymerizable alkene can serve as a monomer for polymerization. The preferred monomers include those of the formula:

wherein $R^1$ and $R^2$ are independently selected the group consisting of H, halogen, CN, $CF_3$, straight or branched alkyl of 1 to 20 carbon atoms (preferably from 1 to 6 carbon atoms, more preferably from 1 to 4 carbon atoms), aryl, α, β-unsaturated straight or branched alkenyl or alkynyl of 2 to 10 carbon atoms (preferably from 2 to 6 carbon atoms, more preferably from 2 to 4 carbon atoms), α, β-unsaturated straight or branched alkenyl of 2 to 6 carbon atoms (preferably vinyl) substituted (preferably at the α-position) with a halogen (preferably chlorine), $C_3$-$C_8$ cycloalkyl, heterocyclyl, phenyl which may optionally have from 1-5 substituents on the phenyl ring, $C(=Y)R^5$, $C(=Y)NR^6R^7$, $YCR^6R^7R^8$ and $YC(=Y)R^8$, where Y may be $NR^8$ or O (preferably O), $R^5$ is alkyl of from 1 to 20 carbon atoms, alkoxy of from 1 to 20 carbon atoms, aryloxy or heterocyclyloxy, $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, and $R^8$ is H, straight or branched $C_1$-$C_{20}$, alkyl and aryl; and $R^3$ is selected from the group consisting of H, halogen (preferably fluorine or chlorine), $C_1$-$C_6$ (preferably $C_1$) alkyl, CN, $COOR^9$ (where $R^9$ is H, an alkali metal, or a $C_1$-$C_6$ alkyl group) or aryl; or $R^1$ and $R^3$ may be joined to form a group of the formula $(CH_2)_{n'}$, (which may be substituted with from 1 to 2n' halogen atoms or $C_1$-$C_4$ alkyl groups) or $C(=O)-Y-C(=O)$, where n' is from 2 to 6 (preferably 3 or 4) and Y is as defined above; or $R^4$ is the same as $R^1$ or $R^2$ or optionally $R^4$ is a CN group; at least two of $R^1$, $R^2$, and $R^3$ are H or halogen.

In the context of the present application, the terms "alkyl", "alkenyl" and "alkynyl" refer to straight-chain or branched groups (except for $C_1$ and $C_2$ groups).

Furthermore, in the present application, "aryl" refers to phenyl, naphthyl, phenanthryl, phenalenyl, anthracenyl, triphenylenyl, fluoranthenyl, pyrenyl, pentacenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and more preferably methyl), alkyl of from 1 to 20 carbon atoms (preferably from 1 to 6 carbon atoms and more preferably methyl) in which each of the hydrogen atoms is independently replaced by a halide (preferably a fluoride or a chloride), alkenyl of from 2 to 20 carbon atoms, allynyl of from 1 to 20 carbon atoms, alkoxy of from 1 to 6 carbon atoms, alkylthio of from 1 to 6 carbon atoms, $C_3$-$C_8$ cycloalkyl, phenyl, halogen, $NH_2$, $C_1$-$C_6$-alkylamino, $C_1$-$C_6$-dialkylamino, and phenyl which may be substituted with from 1 to 5 halogen atoms and/or $C_1$-$C_4$ alkyl groups. This definition of "aryl" also applies to the aryl groups in "aryloxy" and "aralkyl." Thus, phenyl may be substituted from 1 to 5 times and naphthyl may be substituted from 1 to 7 times (preferably, any aryl group, if substituted, is substituted from 1 to 3 times) with one of the above substituents. More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

In the context of the present disclosure, "heterocyclyl" refers to pyridyl, furyl, pyrrolyl, thienyl, imidazolyl, pyrazolyl, pyrazinyl, pyrimidinyl, pyridazinvl, pyranyl, indolyl, isoindolyl, indazolyl, benzofuryl, isobenzofuryl, benzothienyl, isobenzothienyl, chromenyl, xanthenyl, purinyl, pteridinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art. Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocycles to be used as a monomer in the present disclosure include 2-vinyl pyridine, 4-vinyl pyridine, 2-vinyl pyrrole, 3-vinyl pyrrole, 2-vinyl oxazole, 4-vinyl oxazole, 5-vinyl oxazole, 2-vinyl thiazole, 4-vinyl thiazole, 5-vinyl thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyrimidine, and any vinyl pyrazine, the most preferred being 2-vinyl pyridine. The vinyl heterocycles mentioned above may bear one or more (preferably 1 or 2) $C_1$-$C_6$ alkyl or alkoxy groups, cyano groups, ester groups or halogen atoms, either on the vinyl group or the heterocyclyl group, but preferably on the heterocyclyl group. Further, those vinyl heterocycles which, when unsubstituted, contain an N—H group may be protected at that position with a conventional blocking or protecting group, such as a $C_1$-$C_6$ alkyl group, a tris-$C_1$-$C_6$ alkylsilyl group, an acyl group of the formula $R^{10}$ CO (where $R^{10}$ is alkyl of from 1 to 20 carbon atoms, in which each of the hydrogen atoms may be independently replaced by halide, preferably fluoride or chloride), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc. This definition of "heterocyclyl" also applies to the heterocyclyl groups in "heterocyclyloxy" and "heterocyclic ring".

More specifically, preferred monomers include (but not limited to) styrene, p-chloromethylstyrene, vinyl chloroacetate, acrylate and methacrylate esters of $C_1$-$C_{20}$ alcohols, isobutene, 2-(2-bromopropionoxy) ethyl acrylate, acrylonitrile, and methacrylonitrile.

The diene monomer may be present in an amount of 5 to 100 wt % by weight based on the total amount of monomers. A preferred amount of the diene monomer is 10 to 100 wt %; the most preferred amount is 20 to 100 wt % based on the total amount of monomers. The monoene monomer may be present in an amount of 5 to 75 wt % by weight based on the total amount of monomers. A preferred amount of the monoene monomer is 10 to 50 wt %; the most preferred amount is 10 to 25 wt % based on the total amount of monomers.

Initiators

In the present disclosure, the initiator may be any compound having one or more atom(s) or group(s) which are radically transferable under the polymerizing conditions. Preferred initiators include alkyl halides, aryl sulfonyl compounds, aryl halides, allyl halides, haloester compounds, fluoroalkyl halides, pseudohalides, dithioesters, polyhalides, fluorinated halides, and the like. Suitable initiators include those of the formula:

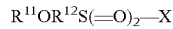

$R^{11}OR^{12}S(=O)_2$—X

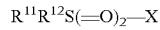

$R^{11}R^{12}S(=O)_2$—X

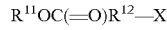

$R^{11}OC(=O)R^{12}$—X

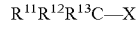

$R^{11}R^{12}R^{13}C$—X

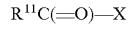

$R^{11}C(=O)$—X

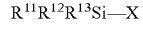

$R^{11}R^{12}R^{13}Si$—X

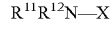

$R^{11}R^{12}N$—X

$R^{11}N$—$X_2$

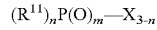

$(R^{11})_nP(O)_m$—$X_{3-n}$

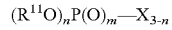

$(R^{11}O)_nP(O)_m$—$X_{3-n}$

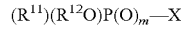

$(R^{11})(R^{12}O)P(O)_m$—X wherein:
X is selected from the group consisting of Cl, Br, I, $OR^{10}$ (as defined above), $SR^{14}$, $SeR^{14}$, $OC(=O)R^{14}$, $OP(=O)R^{14}$, $OP(=O)(OR^{14})_2$, $OP(=O)OR^{14}$, O—$N(R^{14})_2$, S—$C(=S)$ $N(R^{14})_2$, CN, NC, SCN, CNS, OCN, CNO and $N_3$, where $R^{14}$ is aryl or a straight or branched $C_1$-$C_{20}$ (preferably $C_1$-$C_{10}$) alkyl group, or where an $N(R^{14})_2$ group is present, the two $R^{14}$ groups may be joined to form a 5-, 6- or 7-membered heterocyclic ring (in accordance with the definition of "heterocyclyl" above); and $R^{11}$, $R^{12}$ and $R^{13}$ are each independently selected from the group consisting of H, halogen, $C_1$-$C_{20}$ alkyl (preferably $C_1$-$C_{10}$ alkyl and more preferably $C_1$-$C_6$ alkyl), $C_3$-$C_8$ cycloalkyl, $R^8_3$Si, $C(=Y)R^5$, $C(=Y)NR^6R^7$ (where $R^5$-$R^7$ are as defined above), COCl, OH (preferably only one of $R^{11}$, $R^{12}$ and $R^{13}$ is OH), CN, $C_2$-$C_{20}$ alkenyl or alkynyl (preferably $C_2$-$C_6$ alkenyl or alkynyl, and more preferably allyl or vinyl), oxiranyl, glycidyl, $C_2$-$C_6$ alkylene or alkenylene substituted with oxiranyl or glycidyl, aryl, heterocyclyl, aralkyl, aralkenyl (aryl-substituted alkenyl, where aryl is as defined above, and alkenyl is vinyl which may be substituted with one or two $C_1$-$C_6$ alkyl groups and/or halogen atoms [preferably chlorine]), $C_1$-$C_6$ alkyl in which from 1 to all of the hydrogen atoms (preferably 1) are replaced with halogen (preferably fluorine or chlorine where 1 or more hydrogen atoms are replaced, and preferably flourine, chlorine or bromine where 1 hydrogen atom is replaced) and $C_1$-$C_6$ alkyl substituted with from 1 to 3 substituents (preferably 1) selected from the group consisting of $C_1$-$C_4$ alkoxy, aryl, heterocyclyl, C(=Y)$R^5$ (where $R^5$ is as defined above), C(=Y)NR$^6$R$^7$ (where $R^6$ and $R^7$ are as defined above), oxiranyl and glycidyl; preferably such that no more than two of $R^{11}$, $R^{12}$ and $R^{13}$ are H (more preferably no more than one of $R^{11}$, $R^{12}$ and $R^{13}$ is H);

m is 0 or 1; and n is 0, 1 or 2.

Free radical initiators such as AIBN or TBPO and CuX2 are also useful in the processes of this disclosure (e.g., see reverse ATRP).

In the present disclosure, X is preferably Cl, Br of I. Cl-containing initiators generally provide (1) a slower reaction rate and (2) higher product polydispersity than the corresponding Br-containing initiators. However, Cl-terminated polymers generally have higher thermal stability than the corresponding Br-terminated polymers.

When an alkyl, cycloalkyl, or alkyl-substituted aryl group is selected for one of $R^{11}$, $R^{12}$ and $R^{13}$, the alkyl group may be further substituted with an X group as defined above. Thus, it is possible for the initiator to serve as a starting molecule for branch or star (co)polymers. One example of such an initiator is a 2,2-bis(halomethyl)-1,3-dihalopropane (e.g., 2,2-bis(chloromethyl)-1,3-dichloropropane, 2,2-bis(bromomethyl)-1,3-dibromopropane), and a preferred example is where one of $R^{11}$, $R^{12}$ and $R^{13}$ is phenyl substituted with from one to five $C_1$-$C_6$ alkyl substituents, each of which may independently be further substituted with a X group (e.g., α,α'-dibromoxylene, tetrakis- or hexakis(α-chloro- or α-bromomethyl)-benzene, 1,1,1-tris(4-(2-bromoisobutyryloxy)phenyl)ethane)).

Preferred initiators include 1-phenylethyl chloride and 1-phenylethyl bromide (e.g., where $R^{11}$=Ph, $R^{12}$=CH$_3$, $R^{13}$=H and X=Cl or Br), chloroform, carbon tetrachloride, 2-chloropropionitrile, $C_1$-$C_6$-alkyl esters of a 2-halo-$C_1$-$C_6$-carboxylic acid (such as 2-chloropropionic acid, 2-bromopropionic acid, 2-chloroisobutyric acid, 2-bromoisobutyric acid, etc.), p-halomethylstyrenes and compounds of the formula $C_6H_x(CH_2X)_y$ or $CX_{x'}[(CH_2)_n(CH_2X)]_{y'}$, where X is Cl or Br, x+y=6, x'+y'=4, 0 is less than or equal to n is less than or equal to 5 and both y' and y is greater than or equal to 1. More preferred initiators include 1-phenylethyl chloride, 1-phenylethyl bromide, methyl 2-chloropropionate, ethyl 2-chloropropionate, methyl 2-bromopropionate, ethyl 2-bromoisobutyrate, p-chloromethylstyrene, αα'-dichloroxylene, α,α'-dibromoxylene and hexakis(α-bromomethyl) benzene. Bromoinitiators are preferred to chloroinitiators.

More preferred initiators include, for example, 4-methoxybenzenesulfonyl chloride (MBSC), allylbromide (AB), α,α'-dichloro-p-xylene (DCPX), α,α'-dibromo-p-xylene (DBPX), α,α'-dichloro-p-xylene (DCPX), 1,1'-biphenylyl 1,4-bis(2-bromoacetate) (DB1BP), (1-bromoethyl) benzene (BEB), 1,1'-biphenylyl 1,4-bis(2-bromopropionate) (DB2BP), ethyl α-bromoisobutyrate, 1,1'-biphenylyl 1,4-bis (2-bromoisobutyrate) (DB3BP), bis-4,4'-(2-bromoisobutyryloxy)methylphenyl (DB3BPA), 1,1,1-tris(4-(2-bromoiso-butyryloxy)phenyl)ethane (TB3Ph), tetrabromomethane (CBr$_4$), tetrachloromethane (CCl$_4$), bromotrichloromethane (CBrCl$_3$), p-toluenesulfonyl chloride, cis-1,4-dichloro-2-butene, and mixtures thereof.

The molar ratio of initiator to the transition metal compound can vary over a wide range, preferably from about 1:0.001 to about 1:3, more preferably from about 1:0.01 to about 1:3, and even more preferably from about 1:0.1 to about 1:2.

Transition Metal-Ligand Complex Catalysts

The transition metal employed in the transition metal-ligand complex compound is suitably selected from a group 3-10 transition metal or lanthanide or actinide. The transition metal compound can be a simple organic or inorganic compound, for example chloride, bromide, sulphate, acetate and carbonate. Preferably the transition metal compound is selected from a complex containing neutral, monoanionic or dianionic ligands. The ligands can be monodentate, bidentate, tridentate or tetradentate. The ligands preferably comprise at least one C, N, P, O or S atom.

Any transition metal compound which can participate in a redox cycle with the initiator and dormant polymer chain is suitable for use in the present disclosure. Preferred transition metal compounds are those which do not lead to side reactions. Particularly suitable transition metal compounds are those of the formula $M_t^{n+}X'_n$, where:

$M_t^{n+}$ may be, for example, selected from the group consisting of Cu$^0$, Cu$^{1+}$, Cu$^{2+}$, Au$^0$, Au$^+$, Au$^{2+}$, Au$^{3+}$, Ag$^0$, Ag$^+$, Ag$^{2+}$, Hg$^0$, Hg$^+$, Hg$^{2+}$, Ni$^0$, Ni$^+$, Ni$^{2+}$, Ni$^{3+}$, Pd$^0$, Pd$^+$, Pd$^{2+}$, Pt$^0$, Pt$^+$, Pt$^{+2}$, Pt$^{+3}$, Pt$^{+4}$, Rh$^0$, Rh$^+$, Rh$^{2+}$, Rh$^{3+}$, Rh$^{4+}$, Co$^0$, Co$^+$, Co$^{2+}$, Co$^{3+}$, Ir$^0$, Ir$^+$, Ir$^{2+}$, Ir$^{3+}$, Ir$^{4+}$, Fe$^0$, Fe$^{2+}$, Fe$^{3+}$, Ru$^0$, R$^{2+}$, Ru$^{3+}$, Ru$^{4+}$, Ru$^{5+}$, R$^{6+}$, Os$^0$, Os$^{2+}$, Os$^{3+}$, Os$^{4+}$, Re$^0$, Re$^{2+}$, Re$^{3+}$, Re$^{4+}$, Re$^{6+}$, Re$^{7+}$, Mn$^0$, Mn$^{2+}$, Mn$^{3+}$, Mn$^{4+}$, Cr$^0$, Cr$^{2+}$, Cr$^{3+}$, Mo$^0$, Mo$^+$, Mo$^{2+}$, Mo$^{3+}$, W$^0$, W$^{2+}$, W$^{3+}$, V$^0$, V$^{2+}$, V$^{3+}$, V$^{4+}$, V$^{5+}$, Nb$^0$, Nb$^{2+}$, Nb$^{+3}$, Nb$^{4+}$, Nb$^{5+}$, Ta$^0$, Ta$^{3+}$, Ta$^{4+}$, Ta$^{5+}$, Zn$^0$, Zn$^+$ or Zn$^{2+}$;

X' may be, for example, selected from the group consisting of halogen, OH, (O)$_{1/2}$, $C_1$-$C_6$-alkoxy, (SO$_4$)$_{1/2}$, (PO$_4$)$_{1/3}$, (HPO$_4$)$_{1/2}$, (H$_2$PO$_4$), triflate, hexafluorophosphate, methanesulfonate, arylsulfonate (preferably benzenesulfonate or toluenesulfonate), SeR$^{14}$, CN, NC, N$_3$, SCN, RCSS, CNS, OCN, CNO, N$_3$ and R$^{15}$ is CO$_2$ or CS$_2$ where R$^{14}$ is as defined above and R$^{15}$ is H or a straight or branched $C_1$-$C_6$ alkyl group (preferably methyl) or aryl (preferably phenyl) which may be substituted from 1 to 5 times with a halogen (preferably 1 to 3 times with fluorine or chlorine), and combinations thereof on the same metal; and n is the formal charge on the metal (e.g., 0 is less than or equal to n is less than or equal to 7).

The molar ratio of the transition metal compound to ligand can vary over a wide range, preferably from about 0.1:10 to about 0.5:5, more preferably from about 1:1 to about 1:2.

Suitable ligands for use in the present disclosure include compounds having one or more carbon, nitrogen, oxygen, phosphorus and/or sulfur atoms which can coordinate to the transition metal through a σ-bond, ligands containing two or more carbon atoms which can coordinate to the transition metal through a π-bond, ligands having a carbon atom which can coordinate to the transition metal through a σ-bond but which do not form a carbon-carbon bond with the monomer under the conditions of the polymerizing step (e.g., ligands which do not participate in a β-addition reactions with (coordinated) monomers; and ligands which can coordinate to the transition metal through a μ-bond or a η-bond. Other ligands include cyclopentadienyl ligands like FeCp$_2$, or N-heterocyclic carbene ligands. See, for example, http://www.sigmaaldrich.com/chemistry/chemical-synthesis/technology-spotlights/carbene-ligands.html and http://en.wikipedia.org/wiki/Persistent_carbene Preferred C-, N-, O-, P- and S-containing ligands may have one of the following formulas:

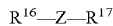

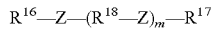

where:

$R^{16}$ and $R^{17}$ are independently selected from the group consisting of H, $C_1$-$C_{20}$ alkyl, aryl, heterocyclyl, and $C_1$-$C_6$ alkyl substituted with $C_1$-$C_6$ alkoxy, $C_1$-$C_4$ dialkylamino, $C(=Y)R^5$, $C(=Y)R^6R^7$ and/or $YC(=Y)RB$, where Y, $R^5$, $R^6$, $R^7$ and $R^8$ are as defined above; or $R^{16}$ and $R^{17}$ can be joined to form a saturated, unsaturated or heterocyclic ring as described above for the "heterocyclyl" group;

Z is a covalent bond, O, S, $NR^{19}$ or $PR^{19}$, where $R^{19}$ is selected from the same group as $R^{16}$ and $R^{17}$, each $R^{18}$ is independently a divalent group selected from the group consisting of $C_2$-$C_4$ alkylene (alkanediyl) and $C_2$-$C_4$ alkenylene where the covalent bonds to each Z are at vicinal positions (e.g., in a 1,2-arrangement) or at β-positions (e.g., in a 1,3-arrangement) and $C_3$-$C_8$ cycloalkanediyl, $C_3$-$C_8$ cycloalkenediyl, arenediyl and heterocyclylene where the covalent bonds to each Z are at vicinal positions; and m is from 1 to 6.

In addition to the above ligands, each of $R^{16}$—Z and $R^{17}$—Z can form a ring with the $R^{18}$ group to which the Z is bound to form a linked or fused heterocyclic ring system (such as is described above for "heterocyclyl"). Alternatively, when $R^{16}$ and/or $R^{17}$ are heterocyclyl, Z can be a covalent bond (which may be single or double), $CH_2$ or a 4- to 7-membered ring fused to $R^{16}$ and/or $R^{17}$, in addition to the definitions given above for Z. Exemplary ring systems for the present ligand include bipyridyl, bipyrrole, 1,10-phenanthroline, a cryptand, a crown ether, etc.

Where Z is $PR^{19}$, $R^{19}$ can also be $C_1$-$C_{20}$-alkoxy.

Also included as suitable ligands in the present disclosure are CO (carbon monoxide), porphyrins and porphycenes, the latter two of which may be substituted with from 1 to 6 (preferably from 1 to 4) halogen atoms, $C_1$-$C_6$ alkyl groups, $C_1$-$C_6$-alkoxy groups, $C_1$-$C_6$ alkoxycarbonyl, aryl groups, heterocyclyl groups, and $C_1$-$C_6$ alkyl groups further substituted with from 1 to 3 halogens.

Further ligands suitable for use in the present disclosure include compounds of the formula $R^{20}R^{21}C(C(=Y)R^5)_2$, where Y and $R^5$ are as defined above, and each of $R^{20}$ and $R^{21}$ is independently selected from the group consisting of H, halogen, $C_1$-$C_{20}$ alkyl, aryl and heterocyclyl, and $R^{20}$ and $R^{21}$ may be joined to form a $C_3$-$C_8$ cycloalkyl ring or a hydrogenated (i.e., reduced, non-aromatic or partially or fully saturated) aromatic or heterocyclic ring (consistent with the definitions of "aryl" and "heterocyclyl" above), any of which (except for H and halogen) may be further substituted with 1 to 5 and preferably 1 to 3 $C_1$-$C_6$ alkyl groups, $C_1$-$C_6$ alkoxy groups, halogen atoms and/or aryl groups. Preferably, one of $R^{20}$ and $R^{21}$ is H or a negative charge.

Additional suitable ligands include, for example, ethylenediamine, propylenediamine, or polyethyleneimine, which may be substituted from one to four times on the amino nitrogen atom with a $C_1$-$C_4$ alkyl group or a carboxymethyl group; aminoethanol and aminopropanol, both of which may be substituted from one to three times on the oxygen and/or nitrogen atom with a $C_1$-$C_4$ alkyl group; ethylene glycol and propylene glycol, both of which may be substituted one or two times on the oxygen atoms with a $C_1$-$C_4$ alkyl group; diglyme, triglyme, tetraglyme, etc.

Suitable carbon-based ligands include arenes (as described above for the "aryl" group) and the cyclopentadienyl ligand. Preferred carbon-based ligands include benzene (which may be substituted with from one to six $C_1$-$C_4$ alkyl groups [e.g., methyl]) and cyclopentadienyl (which may be substituted with from one to five methyl groups, or which may be linked through an ethylene or propylene chain to a second cyclopentadienyl ligand). Where the cyclopentadienyl ligand is used, it may not be necessary to include a counteranion (X') in the transition metal compound.

Preferred ligands include unsubstituted and substituted pyridines and bipyridines (where the substituted pyridines and bipyridines are as described above for "heterocyclyl"), acetonitrile, $(R^{10}O)_3P$, $PR^{10}_3$, 1,10-phenanthroline, porphyrin, cryptands such as $K_{222}$, and crown ethers such as 18-crown-6. The most preferred ligands are bipyridyl, 4,4'-dialkyloxy-bipyridyls, and $(R^{10}O)_3P$.

More preferred ligands include 2,2'-bipyridine (bpy), 4,4'-dinonyl-2,2'-dipyridyl (dnN-bpy), 4,4'-di-tert-butyl-2,2'-dipyridyl TB-bpy), 4,4'-dimethoxy-2,2'-bipyridine (MeO-bpy), 4,4'-dimethylamino-2,2'-bipyridine ($Me_2N$-bpy) 2,2', 6',2"-terpyridine (terpy), 1,10-phenanthroline (phen), trans-N-(2-pyridylmethylene)aniline (2-pma), 1,3-bis(2,6-di-i-propylphenyl)imidazol-2-ylidene, 1,1,4,7,10,10-hexamethyltriethylenetetramine (HMTETA), N,N,N',N", N"-pentamethyldiethylenetriamine (PMDETA), tris[2-(dimethylamino)ethyl]amine ($Me_6TREN$), tributylphosphine ($PBu_3$), triphenylphosphine ($PPh_3$), tris (trimethylsilyl)phosphine ($P(TMS)_3$), phenantroline, quinoline, tris[(2-pyridyl)methyl]amine (TPMA), N,N,N',N'-tetrakis(2-pyridylmethyl)ethylenediamine (TPEN), crown ether (e.g., 18 crown 6), and mixtures thereof.

The preferred ligands have low nucleophilicity and low basicity, preferably the lowest nucleophilicity and lowest basicity possible. Otherwise, the ligands will quaternize with the allyl halide chain end. This reaction is accelerated in polar solvents. Thus, lower polarity solvents such as toluene are preferred.

A preformed transition metal-ligand complex can be used in place of a mixture of transition metal compound and ligand without affecting the behavior of the polymerization.

The present disclosure also concerns an atom or group transfer radical polymerization process employing a solubilized catalyst, which in a preferred embodiment, results in a homogeneous polymerization system. In this embodiment, the method employs a ligand having substituents rendering the transition metal-ligand complex at least partially soluble, preferably more soluble than the corresponding complex in which the ligand does not contain the substituents, and more preferably, at least 90 to 99% soluble in the reaction medium.

In this embodiment, the ligand may have one of the formulas $R^{16}$—Z—$R^{17}$, $R^{16}$—Z—$(R^{18}$—Z$)_m$—$R^{17}$ or $R^{20}R^{21}C(C(=Y)R^5)_2$ above, where at least one of $R^{16}$ and $R^{17}$ or at least one of $R^{20}$ and $R^{21}$ are $C_2$-$C_{20}$ alkyl, $C_1$-$C_6$ alkyl substituted with $C_1$-$C_6$ alkoxy and/or $C_1$-$C_4$ dialkylamino, or are aryl or heterocyclyl substituted with at least one aliphatic substituent selected from the group consisting of $C_1$-$C_{20}$ alkyl, $C_2$-$C_{20}$ alkylene, $C_2$-$C_{20}$ alkynylene and aryl such that at least two, preferably at least four, more preferably at least six, and most preferably at least eight carbon atoms are members of the aliphatic substituent(s). Particularly preferred ligands for this embodiment of the disclosure include 2,2'-bipyridyl having at least two alkyl substituents containing a total of at least eight carbon atoms, such as 4,4'-di-(5-nonyl)-2,2'-bipyridyl (dNbipy), 4,4'-di-n-heptyl-2,2'-bipyridyl (dHbipy) and 4,4'-di-tert-butyl-2,2'-bipyridyl (dTbipy).

The reducing agent useful in the process of this disclosure comprises a free radical initiator, an organic reducing agent, a transition metal, electrochemical methods/electrolysis, or mixtures thereof. In particular, the reducing agent includes azobisisobutyronitrile (AIBN) or tet butyl peroxide (TBPO), the organic reducing agent comprises vitamin C or tin octanoate, or excess ligand, the transition metal comprises Zn(0), Fe(0), or Cu(0), $Mn_2(CO)_{10}$, and light irradiation. Preferably, the reducing agent is sufficient to enable concentration of the transition metal-ligand complex catalyst to be reduced in the process.

In the present polymerization, the amounts and relative proportions of initiator, transition metal compound and ligand are those effective to conduct ATRP. Initiator of with the present initiator/transition metal compound/ligand system are generally very good (e.g., at least 25%, preferably at least 50%, more preferably >80%, and most preferably >90%). Accordingly, the amount of initiator can be selected such that the initiator concentration is from $10^{-4}$ M to 3M, preferably $10^{-3}$–$10^{-1}$ M. Alternatively, the initiator can be present in a molar ratio of from $10^{-4}$:1 to 0.5:1, preferably from $10^{-3}$:1 to $5 \times 10^{-2}$:1, relative to monomer. An initiator concentration of 0.1-1M is particularly useful for preparing end-functional polymers.

The molar proportion of transition metal compound relative to initiator is generally that which is effective to polymerize the selected monomer(s), but may be from 0.0001:1 to 10:1, preferably from 0.1:1 to 5:1, more preferably from 0.3:1 to 2:1, and most preferably from 0.9:1 to 1.1:1. Conducting the polymerization preferably in a homogeneous system and using reducing agents for the higher oxidation state of the catalyst, such as in the ICAR, AGERT, SRNI, ARGET, photo-ATRP, and e-ATRP proceduces, may permit reducing the concentration of transition metal and ligand such that the molar proportion of transition metal compound to initiator is as low as 0.00001:1 to 0.001:1.

Similarly, the molar proportion of ligand relative to transition metal compound is generally that which is effective to polymerize the selected monomer(s), but can depend upon the number of coordination sites on the transition metal compound which the selected ligand will occupy. One of ordinary skill understands the number of coordination sites on a given transition metal compound which a selected ligand will occupy, The amount of ligand may be selected such that the ratio of (a) coordination sites on the transition metal compound to (b) coordination sites which the ligand will occupy is from 0.1:1 to 100:1, preferably from 0.2:1 to 10:1, more preferably from 0.5:1 to 3:1, and most preferably from 0.8:1 to 2:1. However, as is also known in the art, it is possible for a solvent or for a monomer to act as a ligand. For the purposes of this application, however, the monomer is preferably (a) distinct from and (b) not included within the scope of the ligand, although in some embodiments (e.g., the present process for preparing a graft and/or hyperbranched (co)polymer), the monomer may be self-initiating (i.e., capable of serving as both initiator and monomer). Nonetheless, certain monomers, such as acrylonitrile, certain (meth)acrylates and styrene, are capable of serving as ligands in the present disclosure, independent of or in addition to their use as a monomer.

Ratios (weight) of reagents employed in ATRP techniques can vary depending on the particular ATRP process. An exemplary summary of typical ratios (weight) of reagents employed in various ATRP techniques is set forth below. As used in the summary below, M is monomer, R—X is initiator, CuIX is metal halide I, CuIIX is metal halide II, L is ligand, RA is reducing agent, and AIBN is azobisisobutyronitrile.

| Method | M/R-X/CuIX/CuIIX | L | RA | AIBN |
| --- | --- | --- | --- | --- |
| Normal ATRP | 200/1/1/— | 1 | — | — |
| Reverse ATRP | 200/—/—/1 | 1 | — | 0.5 |
| SR&NI ATRP | 200/1/—/0.2 | 0.2 | — | 0.1 |
| AGET ATRP | 200/1/—/0.2 | 0.2 | 0.18 | — |
| ARGET ATRP | 200/1/—/<0.01 | 0.1 | <0.1 | — |
| ICAR ATRP | 200/1/—/<0.01 | 0.01 | — | <0.1 |
| RAFT | 200/1 dithioester/—/— | — | — | 0.1 | including, for example, the so called normal ATRP, reverse ATRP, AGET-ATRP, ARGET-ATRP, ICAR ATRP, SARA-ATRP, SR&NI ATRP, e-ATRP, photo-ATRP, etc.

In particular, the monomer/initiator/metal halide I/metal halide II/ligand/reducing agent ratio (molar) employed in normal ATRP is about 200/1/1/0.1/3/0. The preferred monomer/initiator/metal halide I/metal halide II/ligand/reducing agent ratio employed in normal ATRP is about 100/1/1/0/2/0. The more preferred monomer/initiator/metal halide I/metal halide II/ligand/reducing agent ratio employed in normal ATRP is about 100/1/1/0/1/0.

In particular, the monomer/initiator/metal halide I/metal halide II/ligand/reducing agent ratio (molar) employed in reverse ATRP is about 200/1/0/2/6. The preferred monomer/initiator/metal halide I/metal halide II/ligand/reducing agent ratio employed in reverse ATRP is about 100/1/0/2/4. The more preferred monomer/initiator/metal halide I/metal halide II/ligand/reducing agent ratio employed in reverse ATRP is about 100/1/0/2/2.

In particular, the monomer/initiator/metal halide I/metal halide II/ligand/reducing agent ratio (molar) employed in AGET-ATRP is about 200/1/0/0.2/0.2/0.2. The preferred monomer/initiator/metal halide I/metal halide II/ligand/reducing agent ratio employed in AGET-ATRP is about 200/1/0/0.1/0.2/0.2. The more preferred monomer/initiator/metal halide I/metal halide II/ligand/reducing agent ratio employed in AGET-ATRP is about 100/1/0/0.1/0.1/0.1.

In particular, the monomer/initiator/metal halide I/metal halide II/ligand/reducing agent ratio (molar) employed in ARGET-ATRP is about 200/1/0/0.02/0.2/0.2. The preferred monomer/initiator/metal halide I/metal halide II/ligand/reducing agent ratio employed in ARGET-ATRP is about 200/1/0/0.01/0.2/0.1. The more preferred monomer/initiator/metal halide I/metal halide II/ligand/reducing agent ratio employed in ARGET-ATRP is about 200/1/0/0.005/0.1/0.05.

In particular, the monomer/initiator/metal halide I/metal halide II/ligand/reducing agent ratio (molar) employed in ICAR ATRP is about 200/1/0/0.02/0.02/0.2. The preferred monomer/initiator/metal halide I/metal halide II/ligand/reducing agent ratio employed in ICAR ATRP is about 200/1/0/0.01/0.01/0.1. The more preferred monomer/initiator/metal halide I/metal halide II/ligand/reducing agent ratio employed in ICAR ATRP is about 200/1/0/0.005/0.005/0.1.

In particular, the monomer/initiator/metal halide I/metal halide II/ligand/reducing agent ratio (molar) employed in SARA-ATRP is about 200/1/0/0.02/0.02/10. The preferred monomer/initiator/metal halide I/metal halide II/ligand/reducing agent ratio employed in SARA-ATRP is about 200/1/0/0.02/0.02/5. The more preferred monomer/initiator/metal halide I/metal halide II/ligand/reducing agent ratio employed in SARA-ATRP is about 200/1/0/0.02/0.02/1.

In particular, the monomer/initiator/metal halide I/metal halide II/ligand/reducing agent ratio (molar) employed in SR&NI ATRP is about 200/1/0/0.2/0.2/0.1. The preferred monomer/initiator/metal halide I/metal halide II/ligand/reducing agent ratio employed in SR&NI ATRP is about 200/1/0/0.1/0.1/0.05. The more preferred monomer/initiator/metal halide I/metal halide II/ligand/reducing agent ratio employed in SR&NI ATRP is about 100/1/0/0.1/0.1/0.05.

In particular, the monomer/initiator/metal halide I/metal halide II/ligand/reducing agent ratio (molar) employed in e-ATRP is about 200/1/0/0.1/0.3/electrical current. The preferred monomer/initiator/metal halide I/metal halide II/ligand/reducing agent ratio employed in e-ATRP is about 200/1/0/0.05/0.2/electrical current. The more preferred monomer/initiator/metal halide I/metal halide II/ligand/reducing agent ratio employed in e-ATRP is about 200/1/0/0.01/0.01/electrical current.

In particular, the monomer/initiator/metal halide I/metal halide II/ligand/reducing agent ratio (molar) employed in photo-ATRP is about 200/1/0/0.1/0.3/irradiation or the monomer/initiator/metal halide I/metal halide II/ligand/reducing agent ratio is 200/1/0/0.1/0.3/0.5, where the reducing agent is a photosensitive compound such as $Mn_2(CO)_{10}$ and the like, under irradiation. The preferred monomer/initiator/metal halide I/metal halide II/ligand/reducing agent ratio employed in photo-ATRP is about 200/1/0/0.05/0.2/irradiation. The more preferred monomer/initiator/metal halide I/metal halide II/ligand/reducing agent ratio employed in photo-ATRP is about 200/1/0/0.01/0.01/irradiation.

The present polymerization is conducted in the presence of solvent, water or in bulk. Suitable solvents include ethers, cyclic ethers, $C_5$-$C_{10}$ alkanes, $C_5$-$C_8$ cycloalkanes which may be substituted with from 1 to 3 $C_1$-$C_4$ alkyl groups, aromatic hydrocarbon solvents, halogenated hydrocarbon solvents, acetonitrile, dimethylformamide, ethylene carbonate, propylene carbonate, dimethyl carbonate, dimethylsulfoxide, dimethylsulfone, water, mixtures of such solvents, and supercritical solvents (such as $CO_2$, $C_1$-$C_4$ alkanes in which any H may be replaced with F, etc.). The present polymerization may also be conducted in accordance with known suspension, emulsion, miniemulsion, gas phase, dispersion, precipitation and reactive injection molding polymerization processes, particularly miniemulsion and dispersion polymerization processes.

Suitable ethers include compounds of the formula $R^{22}OR^{23}$, in which each of $R^{22}$ and $R^{23}$ is independently an alkyl group of from 1 to 6 carbon atoms or an aryl group (such as phenyl) which may be further substituted with a $C_1$-$C_4$-alkyl or $C_1$-$C_4$-alkoxy group. Preferably, when one of $R^{22}$ and $R^{23}$ is methyl, the other of $R^{22}$ and $R^{23}$ is alkyl of from 4 to 6 carbon atoms, $C_1$-$C_4$-alkoxyethyl or p-methoxyphenyl. Examples include diethyl ether, ethyl propyl ether, dipropyl ether, methyl t-butyl ether, di-t-butyl ether, glyme (dimethoxyethane), diglyme (diethylene glycol dimethyl ether), 1,4-dimethoxybenzene, etc.

Suitable cyclic ethers include THF and dioxane. Suitable aromatic hydrocarbon solvents include benzene, toluene, o-xylene, m-xylene, p-xylene and mixtures thereof. Suitable halogenated hydrocarbon solvents include $CH_2Cl_2$, 1,2-dichloroethane and benzene substituted from 1 to 6 times with fluorine and/or chlorine, although preferably, the selected halogenated hydrocarbon solvent(s) does not act as an initiator under the polymerization reaction conditions.

The term organic solvent or diluent is used herein conventionally; that is, it refers to organic compounds that will not polymerize or enter into the structure of the polymer to be produced. Typically, these organic solvents are non-reactive or inert to the catalyst composition. Exemplary organic solvents include aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain with the polymer. The performance characteristics of the polymer are generally not affected appreciably when the content of high molecular weight hydrocarbons is less than about 5% by weight of the polymer.

The amount of solvent is not narrowly critical and can be in conventional amounts known in the art. The solvent must be capable of at least partially solubilizing the transition metal-ligand complex catalyst. The solvent should also be capable of dissolving polymer. The solvent should not favor side reactions such as quaternization or elimination of the terminal functional group of the dormant polymer chain.

ATRP may also be conducted either in bulk or in an aqueous medium to prepare water-soluble or water-miscible polymers. Water-soluble polymers are important scientifically and commercially, because they find a wide range of applications in mineral-processing, water-treatment, oil recovery, etc. The present ATRP process can be conducted in an aqueous medium (e.g., suspension or emulsion polymerization). An "aqueous medium" refers to a water-containing mixture which is liquid at reaction and processing temperatures. Examples include water, either alone or admixed with a water-soluble $C_1$-$C_4$ alcohol, ethylene glycol, glycerol, acetone, methyl ethyl ketone, dimethylformamide, dimethylsulfoxide, dimethylsulfone, toluene, hexamethylphosphoric triamide, or a mixture thereof (i.e., water+ any of the solvents described herein). Additionally, the pH of the aqueous medium may he adjusted to a desired value with a suitable acid or base (e.g., phosphoric acid, hydrochloric acid, ammonium hydroxide, NaOH, $NaHCO_3$, $Na_2CO_3$, etc.). However, the preferred aqueous medium is water.

In accordance with this disclosure, low polarity solvents that do not favor nucleophilic reations such as those of the labile allyl halide chain ends plus amines or phospines or base catalyzed elimination reactions (i.e., all reactions with polar transition states) are preferred.

Polymers produced by the present process may be useful in general as molding materials, as barrier or surface materials, as adhesives, or as rubbers. However, the polymers produced by the present process, which typically will have uniform, predictable, controllable and/or tunable properties relative to polymers produced by conventional radical polymerization, will be most suitable for use in specialized or performance applications.

For example, block copolymers of polystyrene and polyacrylate (e.g., PSt-PA-PSt triblock copolymers) are useful thermoplastic elastomers. Poly(methyl methacrylate)-polyacrylate triblock copolymers (e.g., PMMA-PA-PMMA) are useful, fully acrylic thermoplastic elastomers. Homo- and copolymers of styrene, (meth)acrylates and/or acrylonitrile are useful plastics, elastomers and adhesives. Either block or random copolymers of styrene and a (meth)acrylate or acrylonitrile may be useful thermoplastic elastomers having high solvent resistance. Other block copolymers can be found, for example, at the following sites:
http://en.wikipedia.org/wiki/Styrene-butadiene
http://www.firesyn.com/resource_library.asp
http://www.kraton.com/products/Kraton_D_SBS.php
http://en.wikipedia.org/wiki/Polybutadiene.

Furthermore, block copolymers in which the blocks alternate between polar monomers and non-polar monomers produced by the present disclosure are useful amphiphilic surfactants or dispersants for making highly uniform polymer blends. Star polymers produced by the present process are useful high-impact (co)polymers. For example, STYROLUX™, an anionically-polymerized styrene-butadiene star block copolymer, is a known, useful high-impact copolymer. See, for example, http://en.wikipedia.org/wiki/Styrene-butadiene.

The (co)polymers of the present disclosure (and/or a block thereof) may have an average degree of polymerization (DP) of at least 3, preferably at least 5, and more preferably at least 10, and may have a weight and/or number average molecular weight of at least 250 g/mol, preferably at least 500 g/mol, more preferably at least 1,000 g/mol, even more preferably at least 5,000 g/mol, and most preferably at least 10,000 g/mol. The present (co)polymers, due to their "living" character, can have a maximum molecular weight without limit. However, from a practical perspective, the present (co)polymers and blocks thereof may have an upper weight or number average molecular weight of, e.g., 5,000,000 g/mol, preferably 1,000,000 g/mol, more preferably 500,000 g/mol, and even more preferably 250,000 g/mol. For example, when produced in bulk, the number average molecular weight may be up to 1,000,000 (with a minimum weight or number average molecular weight as mentioned above).

The number average molecular weight may be determined by size exclusion chromatography (SEC) or, when the initiator has a group which can be easily distinguished from the monomer(s), by NMR spectroscopy.

Thus, the present disclosure also encompasses novel end-functional, telechelic linear and hyperbranched homopolymers, and block, multi-block, star, gradient, random, graft or "comb" and hyperbranched copolymers. Each of the these different types of copolymers will be described hereunder.

Because ATRP is a "living" polymerization, it can be started and stopped, practically at will. Further, the polymer product retains the functional group "X" necessary to initiate a further polymerization. Thus, in one embodiment, once the first monomer is consumed in the initial polymerizing step, a second monomer can then be added to form a second block on the growing polymer chain in a second polymerizing step. Additional polymerizations with the same or different monomer(s) can be performed to prepare multi-block copolymers.

Furthermore, since ATRP is radical polymerization, blocks can be prepared in essentially any order. One is not necessarily limited to preparing block copolymers where the sequential polymerizing steps must flow from the least stabilized polymer intermediate to the most stabilized polymer intermediate, such as is necessary in ionic polymerization, especially when using a halogen exchange ATRP process. Thus, one can prepare a multi-block copolymer in which a polyacrylonitrile or a poly(meth)acrylate block is prepared first, then a styrene or butadiene block is attached thereto, but also in the reverse order, etc.

As is described herein, certain advantageous reaction design choices will become apparent. However, one is not limited to those advantageous reaction design choices in the present disclosure.

Furthermore, a linking group is not necessary to join the different blocks of the present block copolymer. One can simply add successive monomers to form successive blocks. Further, it is also possible (and in some cases advantageous) to first isolate a (co)polymer produced by the present ATRP process, then react the polymer with an additional monomer using a different initiator/catalyst system (to "match" the reactivity of the growing polymer chain with the new monomer). In such a case, the product polymer acts as the new initiator for the further polymerization of the additional monomer.

(Co)Polymers

The present disclosure encompasses homopolymers having a formula:

$$A-[(M^1)_h]-X$$

and random copolymers having a formula:

$$A-[(M^1)_i(M^2)_j]-X$$

$$A-[(M^1)_i(M^2)_j(M^3)_k]-X$$

$$A-[(M^1)_i(M^2)_j(M^3)_k \ldots (M^u)_l]-X$$

where A may be $R^{11}R^{12}R^{13}C$, $R^{11}R^{12}R^{13}Si$, $(R^{11})_mSi$, $R^{11}R^{12}N$, $(R^{11})_nP$, $(R^{11}O)_nP$, $(R^{11})(R^{12}O)P$, $(R^{11})_nP(O)$, $(R^{11}O)_nP(O)$ or $(R^{11})(R^{12}O)P(O)$; $R^{11}$, $R^{12}$, $R^{13}$ and X are as defined above; $M^1$, $M^2$, $M^3$, ... up to $M^u$ are each a radically polymerizable diene monomer and optionally a radically (co)polymerizable monoene monomer (as defined above); h, i, j, k ... up to l are each average degrees of polymerization of at least 3; and i, j, k ... up to l represent molar ratios of the radically polymerizable monomers $M^1$, $M^2$, $M^3$, ... up to $M^u$.

Preferably, one or more of $M^1$, $M^2$, $M^3$, ... up to $M^u$ has the formula:

$$R^{1'}R^{2'}C=CR^{3'}CR^{4'}=CR^{5'}CR^{6'}$$

wherein $R^{1'}$ to $R^{6'}$ are as defined above; and optionally one or more of $M^1$, $M^2$, $M^3$, ... up to $M^u$ has the formula:

$$R^1R^2C=CR^3R^4$$

wherein $R^1$ to $R^4$ are as defined above.

Preferably, these (co)polymers have either a weight or number average molecular weight of at least 250 g/mol, more preferably at least 500 g/mol, even more preferably 1,000 g/mol and most preferably at least 3,000 g/mol. Preferably, the (co)polymers have a polydispersity of 1.50 or less, more preferably 1.35 or less, even more preferably 1.25 or less and most preferably 1.20 or less. Although the present gels may have a weight or number average molecular weight well above 5,000,000 g/mol, from a practical perspective, the present (co)polymers and blocks thereof may have an upper weight or number average molecular weight of, e.g., 5,000,000 g/mol, preferably 1,000,000 g/mol, more preferably 500,000 g/mol, and even more preferably 250,000 g/mol.

Preferred random copolymers include those prepared from any combination of a diene selected from butadiene and/or isoprene and a monoene selected from styrene, vinyl acetate, acrylonitrile, acrylamide and/or $C_1$-$C_8$ alkyl (meth)acrylates.

The present disclosure also concerns block copolymers of the formula:

$$A-(M^1)_p-(M^2)_q-X$$

$$A-(M^1)_p-(M^2)_q-(M^3)_r-X$$

$$A-(M^1)_p-(M^2)_q-(M^3)_r-\ldots-(M^u)_s-X$$

wherein A and X are as defined above; $M^1$, $M^2$, $M^3$, ... up to $M^u$ are each a radically polymerizable diene monomer and optionally a radically (co)polymerizable monoene monomer (as defined above) selected such that the monomers in adjacent blocks are not identical (although monomers in non-adjacent blocks may be identical) and p, q, r, ... up to s are independently selected such that the average degree of polymerization and/or the weight or number average molecular weight of each block or of the copolymer as a whole may be as described above for the present (co)polymers. After an appropriate end group conversion reaction (conducted in accordance with known methods), X may also be, for example, H, OH, $N_3$, $NH_2$, COOH or $CONH_2$.

Preferred block copolymers may have the formula $$R^{11}R^{12}R^{13}C-(M^1)_p-(M^2)_q-X$$

$$R^{11}R^{12}R^{13}C-(M^1)_p-(M^2)_q-(M^3)_r-X$$

$$R^{11}R^{12}R^{13}C-(M^1)_p-(M^2)_q-(M^3)_r- \quad . \quad . \quad . \\ -(M^u)_s-X$$

Preferably, each block of the present block copolymers has a polydispersity of 1.50 or less, more preferably 1.35 or less, even more preferably 1.25 or less and most preferably 1.20 or less. The present block copolymer, as a complete unit, may have a polydispersity of 3.0 or less, more preferably 2.5 or less, even more preferably 2.0 or less and most preferably 1.50 or less.

The present disclosure may be used to prepare periodic or alternating copolymers. The present ATRP process is particularly useful for producing alternating copolymers where one of the monomers has one or two bulky substituents (e.g., where at least one of $M^1$, $M^2$, $M^3$, ... up to $M^u$ are each 1,1-diarylethylene, didehydromalonate $C_1$-$C_{20}$ diesters, $C_1$-$C_{20}$ diesters of maleic or fumaric acid, maleic anhydride and/or maleic diimides [where Y is $NR^8$ as defined above], etc.), from which homopolymers may be difficult to prepare, due to steric considerations. Thus, some preferred monomer combinations for the present alternating copolymers containing "bulky" substituents include combinations of butadiene or isoprene with styrene, acrylonitrile and/or $C_1$-$C_8$ esters of (meth)acrylic acid, with maleic anhydride, $C_1$-$C_8$ alkyl maleimides and/or 1,1-diphenylethylene.

Copolymerization of monomers with donor and acceptor properties results in the formation of products with predominantly alternating monomer structure. These copolymers can exhibit interesting physical and mechanical properties that can be ascribed to their alternating structure.

The alternating copolymers can be produced using the present method. Alternating copolymers are prepared by copolymerization of one or more monomers having electron-donor properties (e.g., unsaturated hydrocarbons, vinyl ethers, etc.) with one or more monomers having electron acceptor type properties (acrylates, methacrylates, unsaturated nitriles, unsaturated ketones, etc.). Thus, the present disclosure also concerns an alternating copolymer of the formula:

$$A-(M^1-M^2)_p-X$$

$$A-(M^1-M^2)_p-(M^2-M^1)_q-X$$

$$A-(M^1-M^2)_p-(M^2-M^1)_q-(M^1-M^2)_r-X$$

$$A-(M^1-M^2)_p-(M^2-M^1)_q-(M^1-M^2)_r-\ldots \\ -(M^{v}-M^{y})_s-X$$

where A and X are as defined above. $M^1$ and $M^2$ are each a radically polymerizable diene monomer and optionally a radically (co)polymerizable monoene monomer (as defined above), and $M^v$ is one of $M^1$ and $M^2$ and $M^y$ is the other of $M^1$ and $M^2$. However, p, q, r, ... up to s are independently selected such that the average degree of polymerization and/or the weight or number average molecular weight of the copolymer as a whole or of each block may be described above for the present end-functional or random (co)polymers. The description "r . . . up to s" indicates that any number of blocks equivalent to those designated by the subscripts p, q and r can exist between the blocks designated by the subscripts r and s.

Preferably, the present alternating copolymers have either a weight or number average molecular weight of at least 250 g/mol, more preferably 500 g/mol, even more preferably 1,000 g/mol, and most preferably 3,000 g/mol. Preferably, the present alternating copolymers have a maximum weight or number average molecular weight of 5,000,000 g/mol, preferably 1,000,000 g/mol and even more preferably 500,000 g/mol, although the upper the limit of the molecular weight of the present "living" (co)polymers is not limited. Preferably, the present alternating copolymers have a polydispersity of 1.50 or less, more preferably 1.35 or less, even more preferably 1.25 or less and most preferably 1.20 or less.

The present random or alternating copolymer can also serve as a block in any of the present block, star, graft, comb or hyperbranched copolymers.

Where the A (or preferably $R^{11}R^{12}R^{13}C$) group of the initiator contains a second "X" group, ATRP may be used to prepare "telechelic" (co)polymers. "Telechelic" homopolymers may have the following formula:

$$X-M_p-(A)-M_p-X$$

where A (preferably $R^{11}R^{12}R^{13}C$) and X are as defined above, M is a radically polymerizable diene monomer as defined above, and p is an average degree of polymerization of at least 3, subject to the condition that A is a group bearing an X substituent.

Such telechelic homopolymers preferably have either a weight or number average molecular weight of at least 250 g/mol, more preferably at least 500 g/mol, even more preferably at least 1,000 g/mol, and most preferably at least 3,000 g/mol, and/or have a polydispersity of 1.50 or less, more preferably 1.3 or less, even more preferably 1.2 or less and most preferably 1.15 or less. From a practical standpoint, the present alternating copolymers may have a maximum weight or number average molecular weight of 5,000,000 g/mol, preferably 1,000,000 g/mol, more preferably 500,000 g/mol, and even more preferably 250,000 g/mol, although the upper limit of the molecular weight of the present "living" (co)polymers is not particularly limited.

Block copolymers prepared by ATRP from an initiator having a second "X" group may have one of the following formulas:

$$X-(M^2)_q-(M^1)_p-(A)-(M^1)_p-(M^2)_q-X$$

$$X-(M^3)_r-(M^2)_q-(M^1)_p-(A)-(M^1)_p-(M^2)_q- \\ (M^3)_r-X$$

$$X-(M^u)_s-\ldots (M^3)_r-(M^2)_q-(M^1)_p-(A)- \\ (M^1)_p-(M^2)_q-(M^3)_r-\ldots (M^u)_s-X$$

and random copolymers may have one of the following formulas:

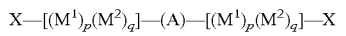

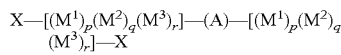

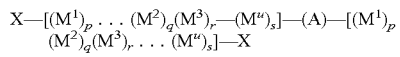

where A (preferably $R^{11}R^{12}R^{13}C$), X, $M^1$, $M^2$, $M^3$, ... up to $M^u$, and p, q, r, ... up to s are as defined above, subject to the condition that A is a group bearing an X substituent.

ATRP of the present disclosure can be used to prepare gradient copolymers. Gradient copolymers have a controlled structure and composition which changes gradually and in a systematic and predictable manner along the copolymer chain. Due to this composition distribution and consequent unusual interchain interactions, gradient copolymers are expected to have very unique thermal properties (e.g., glass transition temperatures and/or melting points). They may also exhibit unprecedented phase separation and uncommon mechanical behavior, and may provide unique abilities as surfactants or as modifiers for blending incompatible materials.

Gradient copolymers can be obtained in a system without a significant chain-breaking reaction, such as ATRP. To control the copolymer composition, it is beneficial to maintain continuous growth of the polymer chain and regulate the comonomers' feed composition during the course of the reaction. Otherwise, the distribution of the monomer units along the polymer chain may be random or block-like.

Gradient copolymers may he prepared via ATRP copolymerization of two or more monomers with different homopolymerization reactivity ratios (e.g., $r^1 >> r^2$, where $r^1$ may be greater than 1 and $r^2$ may be less than 1). Such comonomers usually do not copolymerize randomly. For example, in conventional radical polymerization, a mixture of homopolyiners is obtained.

In the present controlled system, where the polymer chain is not terminated at any stage of the reaction, initially only the more (or most) reactive monomer reacts until its concentration decreases to such a level that the less (or second most) reactive monomer begins to incorporate into the growing polymer chains. The less reactive monomer is gradually incorporated into the polymer chain to a greater extent, and its content in the chain increases, as the more reactive monomer is further consumed. Finally, only the least reactive monomer is present in the system and as it reacts, it forms a block of the least reactive monomer at the end of the chain. The gradient of composition in such a copolymer is controlled by the difference in the reactivity ratios and the rate with which each of the monomers reacts. It might also be considered an inherent control over the copolymer's composition, which can be altered by intentionally changing the concentration of one or more of the monomers.

Thus, in an example of the gradient copolymerization including two distinct monomers (i.e., a diene monomer and a monoene monomer), the polymerizing step of the present method of controlled atom or group transfer polymerization may comprise polymerizing first and second radically polymerizable monomers present in amounts providing a molar ratio of the first monomer to the second monomer of from a:b to b:a, where a and b are each from 0 to 100 and (a+b)=100, then adding an additional amount of the first and/or second monomer providing a molar ratio of the first monomer to the second monomer of from c:d to d:c, where c differs from a, d differs from b and (c+d)=100, and if desired, repeating as often as desired the adding step such that if c>a, the molar proportion (or percentage) of the first monomer increases, but if d>b, the molar proportion (or percentage) of the second monomer increases. The adding step(s) may be continuous, in intermittent portions or all at once.

In accordance with the ATRP process of the present disclosure, gradient polymers can be prepared having the formula:

where A and X are as defined above, $M^1$ and $M^2$ are each a radically polymerizable diene monomer and optionally a radically (co)polymerizable monoene monomer (as defined above) haying different reactivities (preferably in which the ratio of homopolymerization and/or copolymerization reactivity rates are at least 1.5, more preferably at least 2 and most preferably at least 3), a, b, c and d are non-negative numbers independently selected such that a+b=c+d=100, wherein the a:b ratio is from 99:1 to 50:50, the c:d ratio is from 50:50 to 99:1, and the molar proportion of $M^1$ to $M^2$ gradually decreases along the length of the polymer chain from a:b to c:d, and n, m, x and y are independently an integer of at least 2, preferably at least 3, more preferably at least 5 and most preferably at least 10. The weight or number average molecular weight of each block or of the copolymer as a whole may be as described above for the present (co)polymers. Preferably, A is $R^{11}R^{12}R^{13}C$, and X is a halogen.

When either the initiator or a monomer contains a substituent bearing a remote (i.e., unconjugated) ethylene, acetylene or azide moiety, ATRP can be used to prepare cross-linked polymers and copolymers.

The ATRP process of the present disclosure is also useful for forming so-called "star" polymers and copolymers. Thus, where the initiator has three or more "X" groups, each of the "X" groups can serve as a polymerization initiation site. Thus, the present disclosure also encompasses star (co)polymers of the formula:

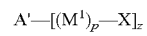

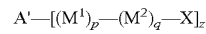

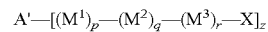

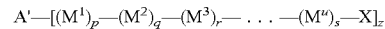

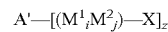

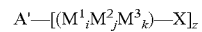

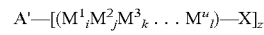

where A' is the same as A with the proviso that $R^{11}$, $R^{12}$ and $R^{13}$ combined contain from 2 to 5 X groups, where X is as defined above; $M^1$, $M^2$, $M^3$, ... $M^u$ are as defined above for the present block copolymers; and z is from 3 to 6. Preferably, A' is $R^{11}R^{12}R^{13}C$, and X is halogen (preferably chlorine or bromine).

Initiators suitable for use in preparing the present star (co)polymers are those in which the A (or preferably $R^{11}R^{12}R^{13}C$) group possesses at least three substituents which can be "X" (as defined above). Preferably, these substituents are identical to "X". Examples of such initiators include compounds of the formula $C_6H_x(CH_2X)_y$ or $CH_{x'}(CH_2X)_{y'}$, where X is a halogen, x+y=6, x'+y'=4 and y and y' are each greater than or equal to 3. Preferred initiators of this type include 2,2-bis(chloromethyl)-1,3-dichloropropane, 2,2-bis(bromomethyl)-1,3-dibromopropane, α,α'α''-trichloro- and α,α'α''-tribromocumene, and tetrakis- and hexakis(α-chloro- and α-bromomethyl)benzene), the most preferred being hexakis(α-bromomethyl)benzene and 1,1,1-tris(4-(2-bromoisobutyryloxy)phenyl)ethane)).

Branched and hyperbranched polymers may also be prepared in accordance with the ATRP process of the present disclosure. The synthesis of hyperbranched polymers can give dendritic molecules in a single, one-pot reaction.

The present disclosure also concerns a process for preparing hyperbranched polymers by ATRP, preferably in "one-pot", e.g., in a single reaction sequence without substantial purification steps, and more specifically, in a single reaction vessel without any intermediate purification steps, using the present process and at least one radically polymerizable monomer in which at least one of $R^1$, $R^2$, $R^3$ and $R^4$ also contains a radically transferable X group, optionally in the absence of an initiator (or if an initiator is used, the X group of the monomer may be the same or different from the X group of the initiator).

The ATRP process of the present disclosure can also prepare hyperbranched (co)polymer of the formula:

$$M^1-(M^1{}_aM^2{}_bM^3{}_c \ldots M^u{}_d)-X_e$$

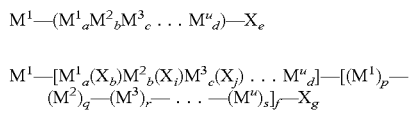

where $M^1$ is a radically polymerizable monomer having both a carbon-carbon multiple bond and at least one X group (as defined above); $M^2$, $M^3$ ... up to $M^u$ are each a radically polymerizable diene monomer and optionally a radically (co)polymerizable monoene monomer (as defined above); a, b, c ... up to d are numbers of at least zero such that the sum of a, b, c ... up to d is at least 2, preferably at least 3, more preferably at least 4 and most preferably at least 5; e is the sum of the products of (i) a and the number of X groups on $M^1$, (ii) b and the number of X groups on $M^2$, (iii) c and the number of X groups on $M^3$ ... up to (iv) d and the number of X groups on $M^u$; f is less than or equal to e and (g+h+i+j+k)=e.

The ATRP process of the present disclosure can also be used to prepare cross-linked polymers and gels. By conducting the polymerizing step which produces the present branched and/or hyperbranched (co)polymers for a longer period of time, gelled polymers may be formed. For example, by varying the amount or proportion of a monoene monomer in the reaction mixture (e.g., relative to solvent or other monomer(s)), the cross-link density may be varied and the reaction time may be lowered or increased.

The present disclosure also encompasses graft or "comb" copolymers, prepared by sequential polymerizations. For example, a first (co)polymer may be prepared by conventional radical polymerization, then a second (or one or more further) (co)polymer chains or blocks may be grafted onto the first (co)polymer by ATRP; a first (co)polymer may be prepared by ATRP, then one or more further (co)polymer chains or blocks may be grafted onto the first (co)polymer by conventional radical polymerization; or the first (co)polymer may be prepared and the further (co)polymer chains or blocks may be grafted thereonto by sequential ATRP's.

A combination of ATRP and one or more other polymerization methods can also be used to prepare different blocks of a linear or star block copolymer (i.e., when extending one or several chains from a base (co)polymer). Alternatively, a combination of ATRP and one or more other polymerization methods can be used to prepare a "block homopolymer", in which distinct blocks of a homopolymer having one or more different properties (e.g., tacticity) are prepared by different polymerization processes. Such "block homopolymers" may exhibit microphase separation.

The present disclosure further concerns a method of preparing a graft or "comb" (co)polymer which includes the present ATRP process, which may comprise reacting a first (co)polymer having either a radically transferable X substituent (as defined above) or a group that is readily converted (by known chemical methods) into a radically transferable substituent with a mixture of (i) transition metal compound capable of participating in a reversible redox cycle with the first (co)polymer, (ii) a ligand (as defined above) and (iii) one or more radically polymerizable monomers (as defined above) to form a reaction mixture containing the graft or "comb" (co)polymer, then isolating the formed graft or "comb" (co)polymer from the reaction mixture. The method may further comprise the step of preparing the first (co)polymer by conventional radical, anionic, cationic or metathesis polymerization or by a first ATRP, in which at least one of the monomers has a $R^1$-$R^4$ substituent which is encompassed by the description of the "X" group above. Where the catalyst and/or initiator used to prepare the first (co)polymer (e.g., a Lewis acid used in conventional cationic polymerization, a conventional metathesis catalyst having a metal-carbon multiple bond, a conventional organolithium reagent) may be incompatible with the chosen ATRP initiation/catalyst system, or may produce an incompatible intermediate, the process may further comprise the step of deactivating or removing the catalyst and/or initiator used to prepare the first (co)polymer prior to the grafting step (i.e., reacting the first (co)polymer with subsequent monomer(s) by ATRP).

Alternatively, the method of preparing a graft or "comb" (co)polymer may comprise preparing a first (co)polymer by the present ATRP process, then grafting a number of (co)polymer chains or blocks onto the first (co)polymer by forming the same number of covalent bonds between the first (co)polymer and one or more polymerizable monomers (e.g., by conventional radical polymerization, conventional anionic polymerization, conventional cationic polymerization, conventional metathesis polymerization, or the present ATRP process) polymerizing the polymerizable monomer(s) in accordance with the conventional or ATRP processes mentioned to form a reaction mixture containing the graft or "comb" (co)polymer, then isolating the formed graft or "comb" (co)polymer from the reaction mixture.

The graft or "comb" (co)polymers prepared by the ATRP process of the present disclosure can have the formula:

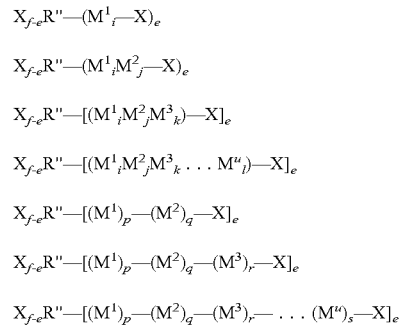

where R" is a first (co)polymer remainder from a first copolymer having a formula $RX_f$, f is greater than or equal to e; e is a number having an average of at least 2.5, preferably at least 3.0, more preferably at least 5.0, and most preferably at least 8.0; X is as defined above (and is preferably a halogen); $M^1$, $M^2$, $M^3$, . . . up to $M^u$ are each a radically polymerizable diene monomer and optionally a radically (co)polymerizable monoene monomer (as defined above); p, q, r and s are selected to provide weight or number average molecular weights for the corresponding block is at least 100 g/mol, preferably at least 250 g/mol, more preferably at least 500 g/mol and even more preferably at least 1,000 g/mol; and i, j, k . . . up to l represent molar ratios of the radically polymerizable monomers $M^1$, $M^2$, $M^3$, . . . up to $M^u$. The polydispersity, average degree of polymerization and/or the maximum weight or number average molecular weight of the (co)polymer or component thereof (e.g., base polymer or graft side-chain) may be as described above.

In the present copolymers, each of the blocks may have a number average molecular weight in accordance with the homopolymers described above. Thus, the present copolymers may have a molecular weight which corresponds to the number of blocks (or in the case of star polymers, the number of branches times the number of blocks) times the number average molecular weight range for each block.

Polymers and copolymers produced by the present process have low polydispersities for (co)polymers produced by radical polymerization. Typically, the ratio of the weight average molecular weight to number average molecular weight ("$M_w/M_n$") is less than or equal to 1.5, preferably less than or equal to 1.4, and can be as low as 1.10 or less.

Because the "living" (co)polymer chains retain an initiator fragment in addition to an X or X' as an end group or as a substituent in the polymer chain, they may be considered end-functional or in-chain (multi)functional (co)polymers. Such (co)polymers may be used directly or be converted to other functional groups for further reactions, including crosslinking, chain extension, reactive injection molding (RIM), and preparation of other types of polymers (such as polyurethanes, polyimides, etc.).

In the present disclosure, polymers with various specifically desired structures and architectures can be purposely produced. In terms of topology, such structures and architectures may include linear, star, comb, graft, hyperbranched, dendritic, cyclic, network, and the like. In terms of sequence/composition distribution such structures and architectures may include homopolymer, random copolymer, block copolymer, graft copolymer, gradient copolymer, tapered copolymer, periodic copolymer, alternating copolymer, and the like.

Polymers prepared with the inventive process may be useful in a wide variety of applications. The examples of these applications include, but not limited to, rubbers, adhesives, dispersants, surfactants, emulsifiers, elastomers, coating, painting, thermoplastic elastomers, diagnostic and supporters, engineering resins, ink components, lubricants, polymer blend components, paper additives, biomaterials, water treatment additives, cosmetics components, antistatic agents, food and beverage packaging materials, release compounding agents in pharmaceuticals applications.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

EXAMPLES

Figure 2:
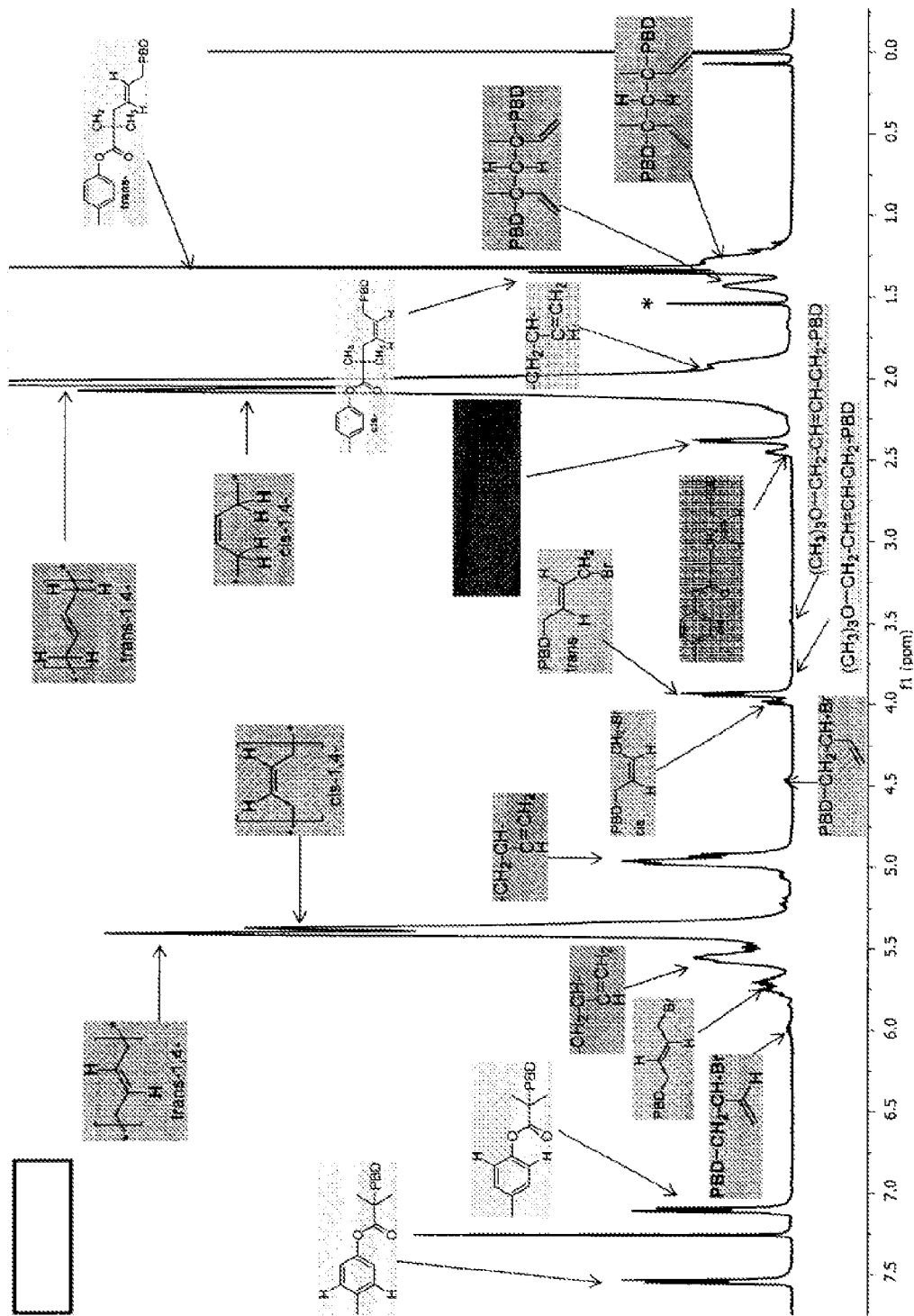
FIG. 2 depicts the labeling and assignment of the nuclear magnetic resonances (NMR) of a sample of polybutadiene initiated from 1,1-biphenyl 1,4-bis(2-bromoisobutyrate). Yellow depicts resonances associated with the initiator, blue depicts resonances associated with the connectivity between the initiator and the first repeat unit of the polymer, violet depicts resoanaces associated with the polymer, and green depicts resonances associated with the bromine chain end.
Figure 3:
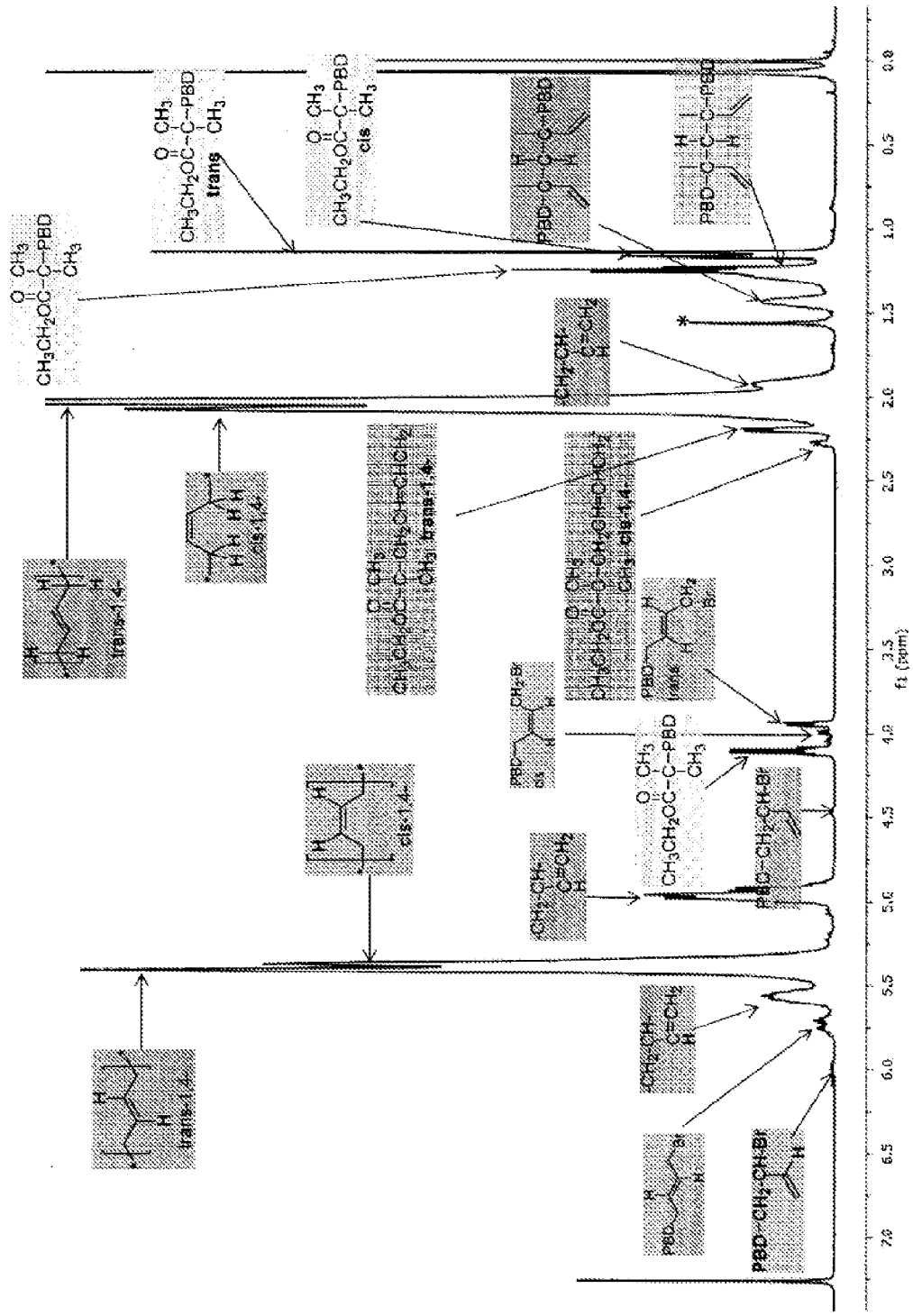
FIG. 3 depicts $^1$H NMR spectra of polybutadiene (PBD) initiated from ethyl bromoisobutyrate alkyl and sulfonyl initiators useful in the processes of this disclosure.
Figure 4:
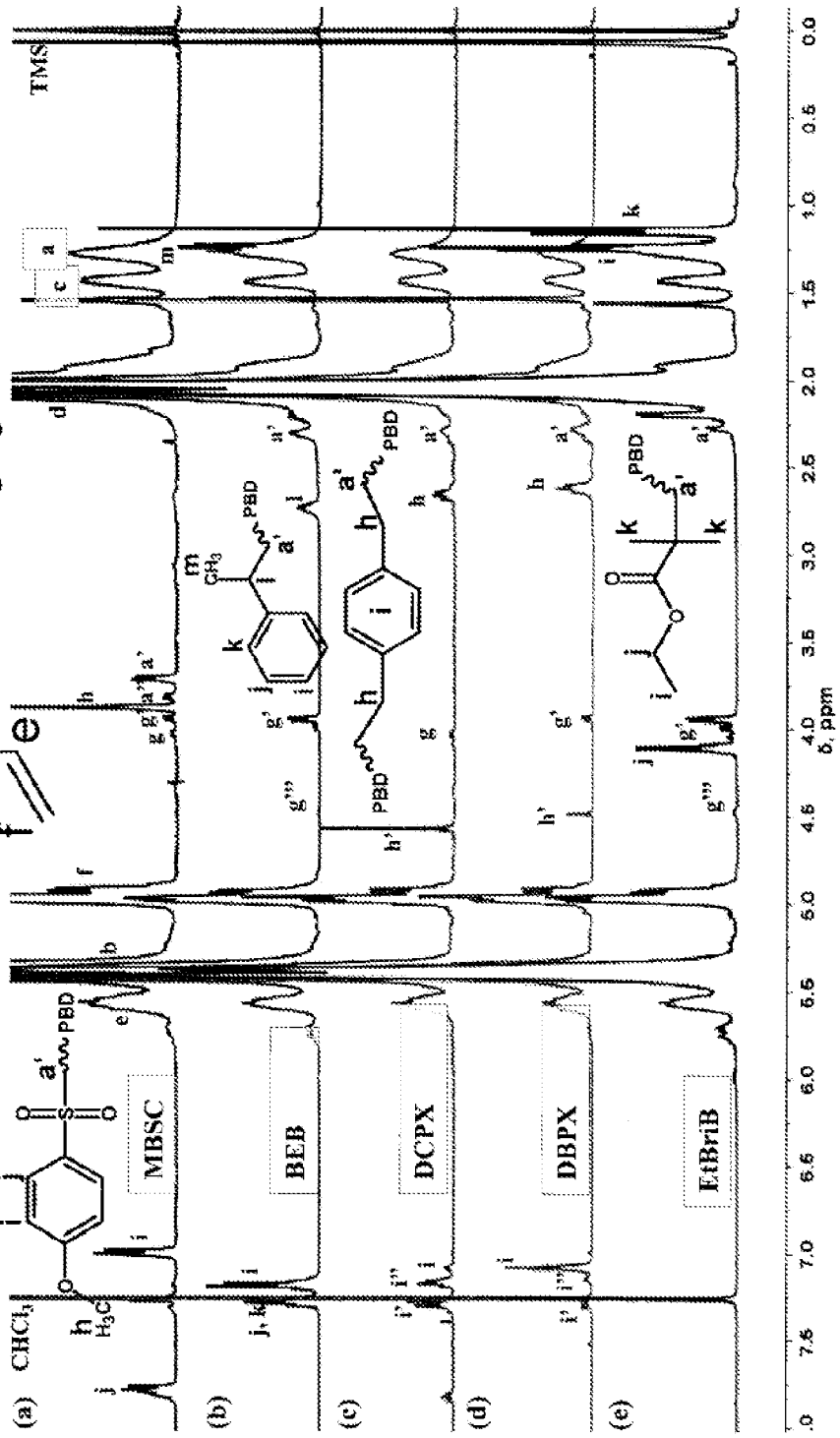
FIG. 4 depicts $^1$H NMR spectra of polybutadiene (PBD) initiated from ethyl bromoisobutyrate alkyl and sulfonyl initiators useful in the processes of this disclosure.
Figure 5A:
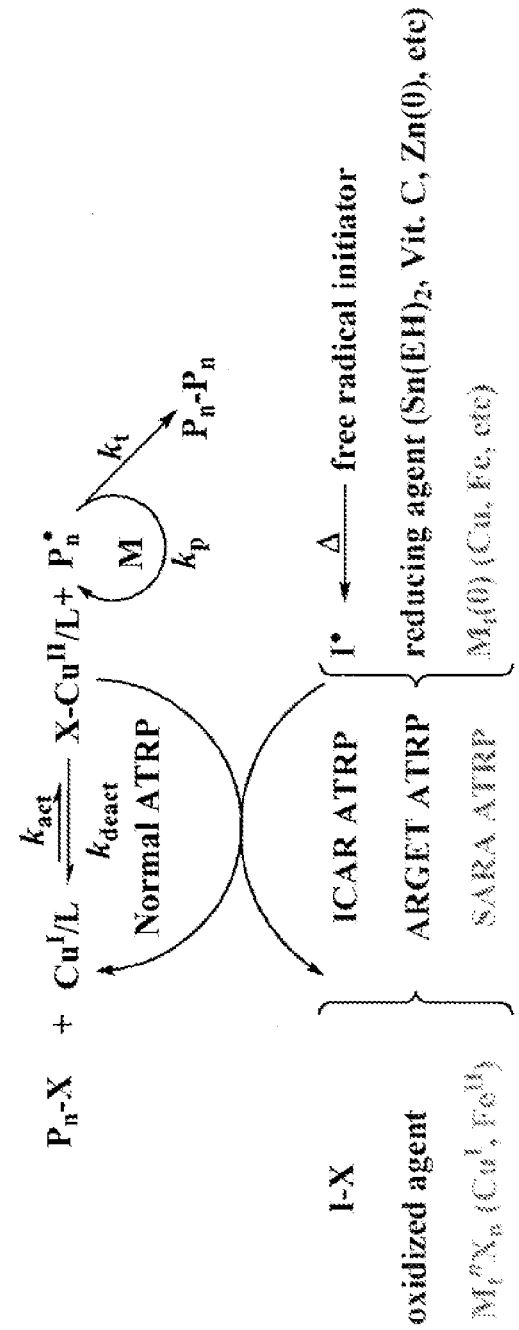
FIGS. 5A depicts a general reaction scheme showing on the top the typical equilibrium in normal ATRP, and on the bottom, the low catalyst versions of ATRP, namely ICAR, ARGET and SARA ATRP.
Figure 7:
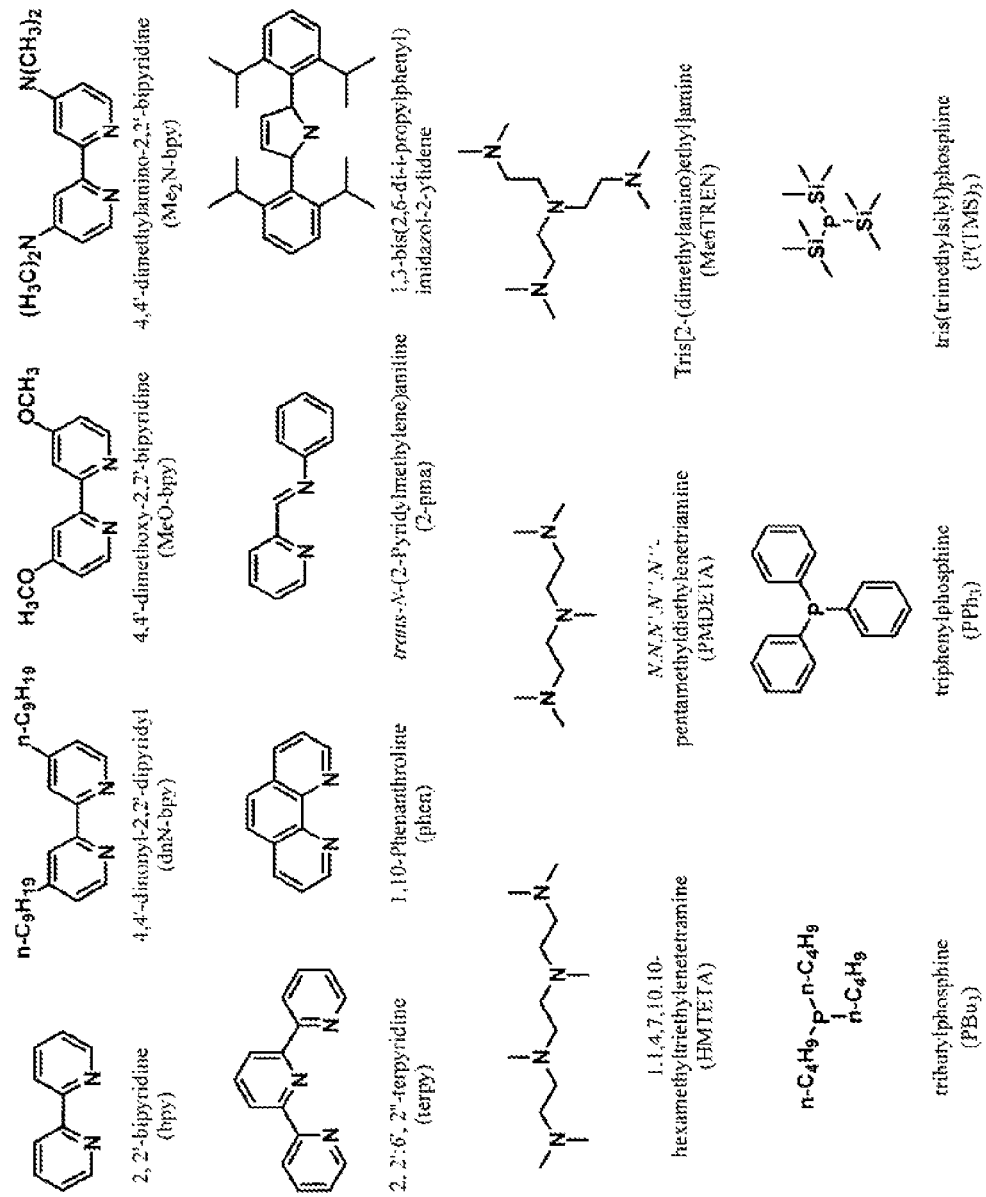
FIG. 7 depicts illustrative ligand structures useful in the transition metal compound catalysts used in the processes of this disclosure.

Polybutadiene (PBD) and polyisoprene (PI) were prepared in accordance with the ATRP process of this disclosure. FIG. 2 shows chain-end nuclear magnetic resonance (NMR) of (A) initiator fragment and first unit of butadiene bonded to an initiator and (B) halide-capped and eliminated end units. FIG. 3 shows $^1$H NMR spectra of polybutadiene (PBD) initiated from alkyl and sulfonyl initiators. FIG. 4 lists chain end characterizations for butadiene prepared in accordance with the ATRP process of this disclosure.

Figure 8:
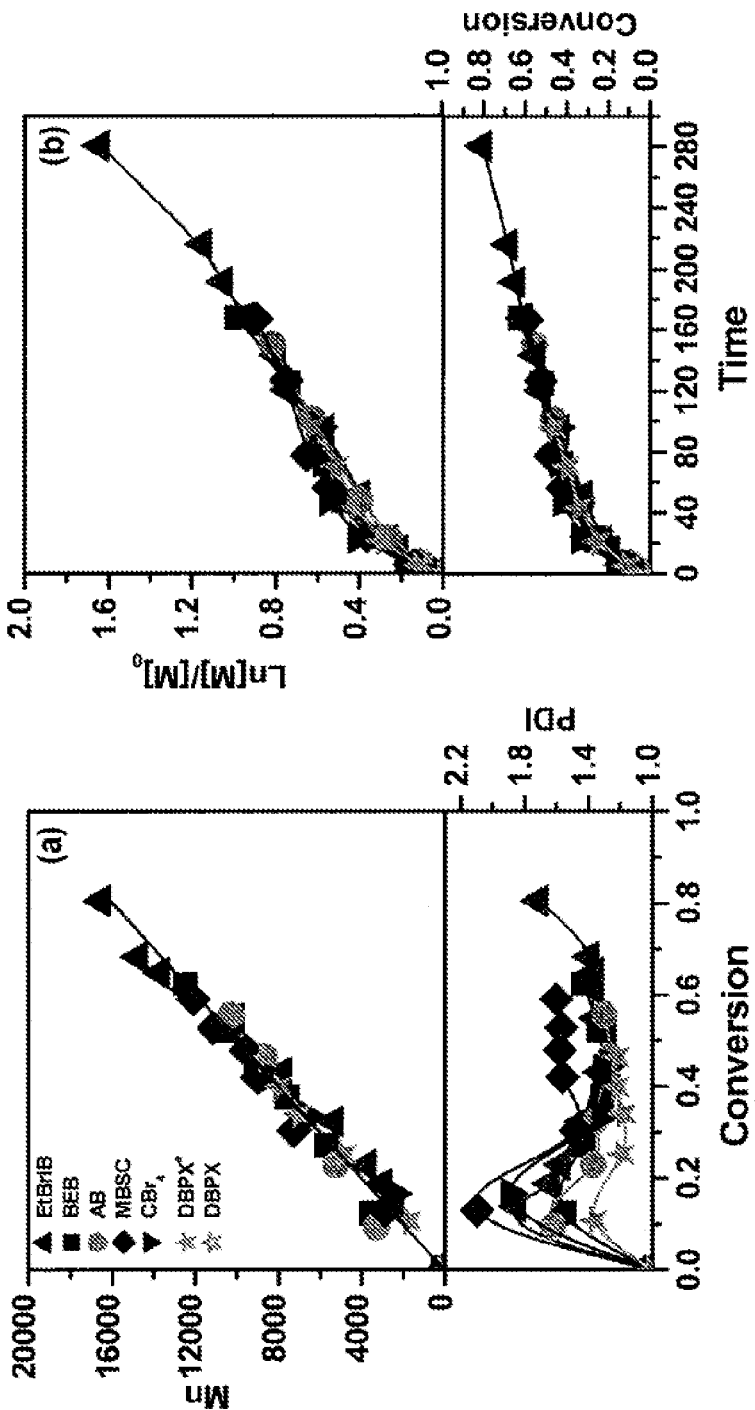
FIG. 8 graphically depicts the effect of initiators in the CuBr-mediated butadiene polymerization in toluene. Part (a) shows the dependence of M$_n$ and M$_w$/M$_n$ on conversion. Part (b) shows pseudofirst-order kinetics. [BD]/[Initiator]/[CuBr]/[bpy]=100/1/1/3, T=110° C.
Figure 10:
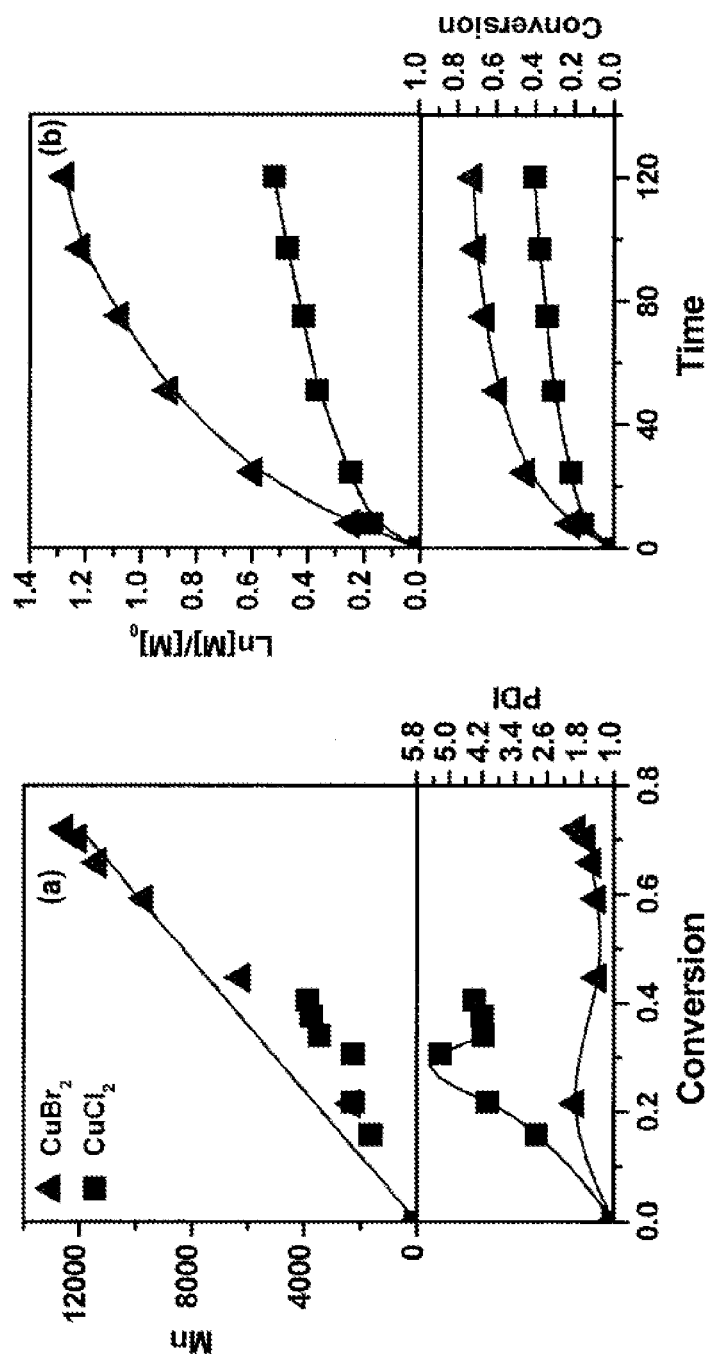
FIG. 10 graphically depicts CuBr$_2$- and CuCl$_2$-mediated butadiene reverse ATRP in toluene initiated from AlBN. Part (a) shows the dependence of M$_n$ and M$_w$/M$_n$ on conversion. Part (b) shows pseudofirst-order kinetics. [BD]/[AIBN]/[CuX$_2$]/[bpy]=100/1/2/6, T=110° C.

FIG. 8 graphically depicts the effect of initiators in the CuBr-mediated butadiene polymerization in toluene. Part (a) shows the dependence $M_n$ and $M_w/M_n$ on conversion. Part (b) shows pseudofirst-order kinetics. [BD]/[Initiator]/[CuBr]/[bpy]=100/1/1/3, T=110° C. FIG. 10 lists data showing the effect of initiators in the CuBr-mediated butadiene polymerization in toluene at 110° C.

Figure 9:
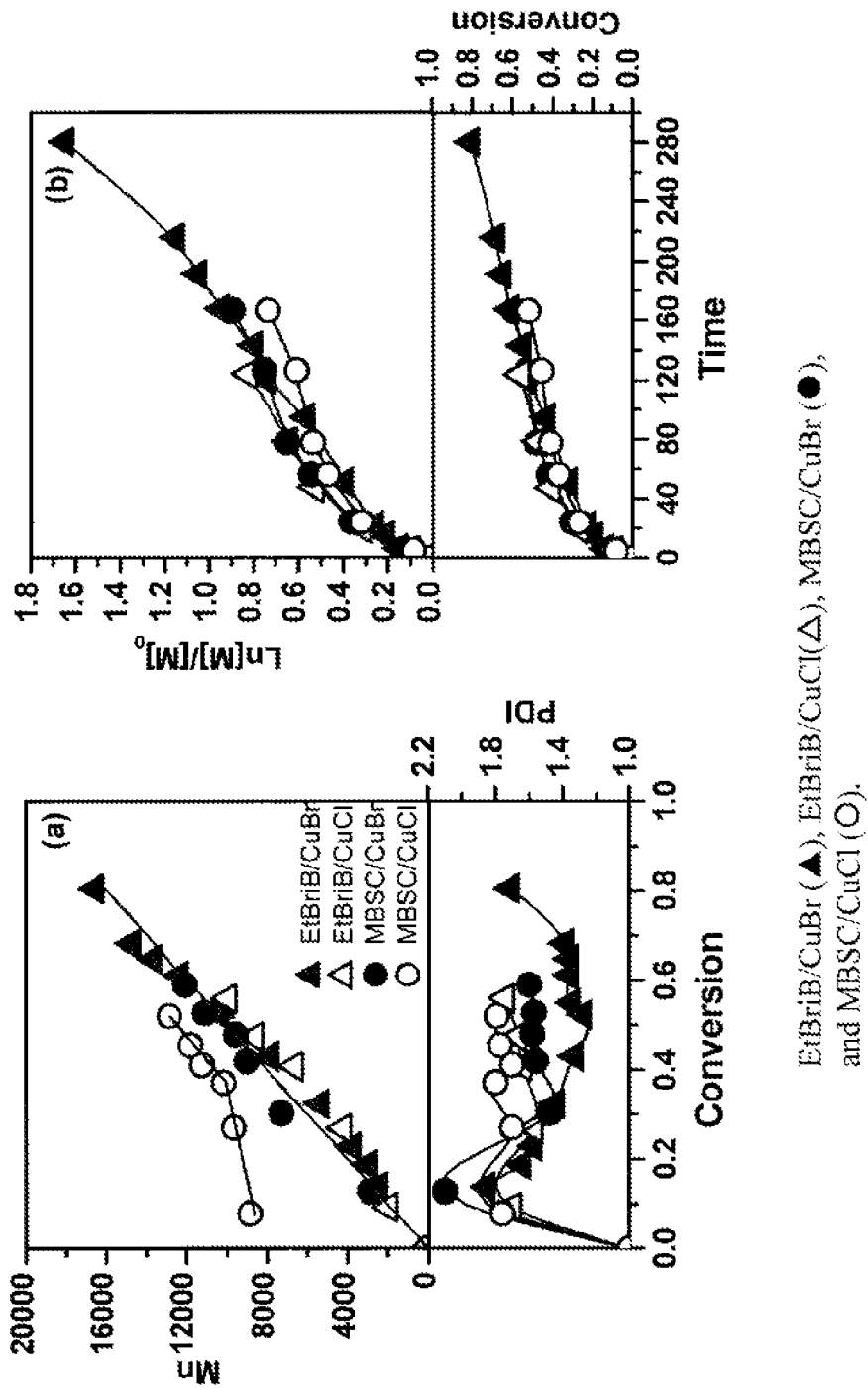
FIG. 9 graphically depicts the effect of CuX/RY (X, Y=Cl, Br) halide combinations in the CuX-mediated butadiene polymerization in toluene initiated from EtBriB and MBSC. Part (a) shows the dependence of M$_n$ and M$_w$/M$_n$ on conversion. Part (b) shows pseudofirst-order kinetics. [BD]/[I]/[CuX]/[bpy]=100/1/1/3, T=110° C.

FIG. 9 graphically depicts the effect of CuX/RY (X, Y=Cl, Br) halide combinations in the CuX-mediated butadiene polymerization in toluene initiated from EtBriB and MBSC. Part (a) shows the dependence of $M_n$ and $M_w/M_n$ on conversion. Part (b) shows pseudofirst-order kinetics. [BD]/[I]/[CuX]/[bpy]=100/1/1/3, T=110° C.

Figure 12:
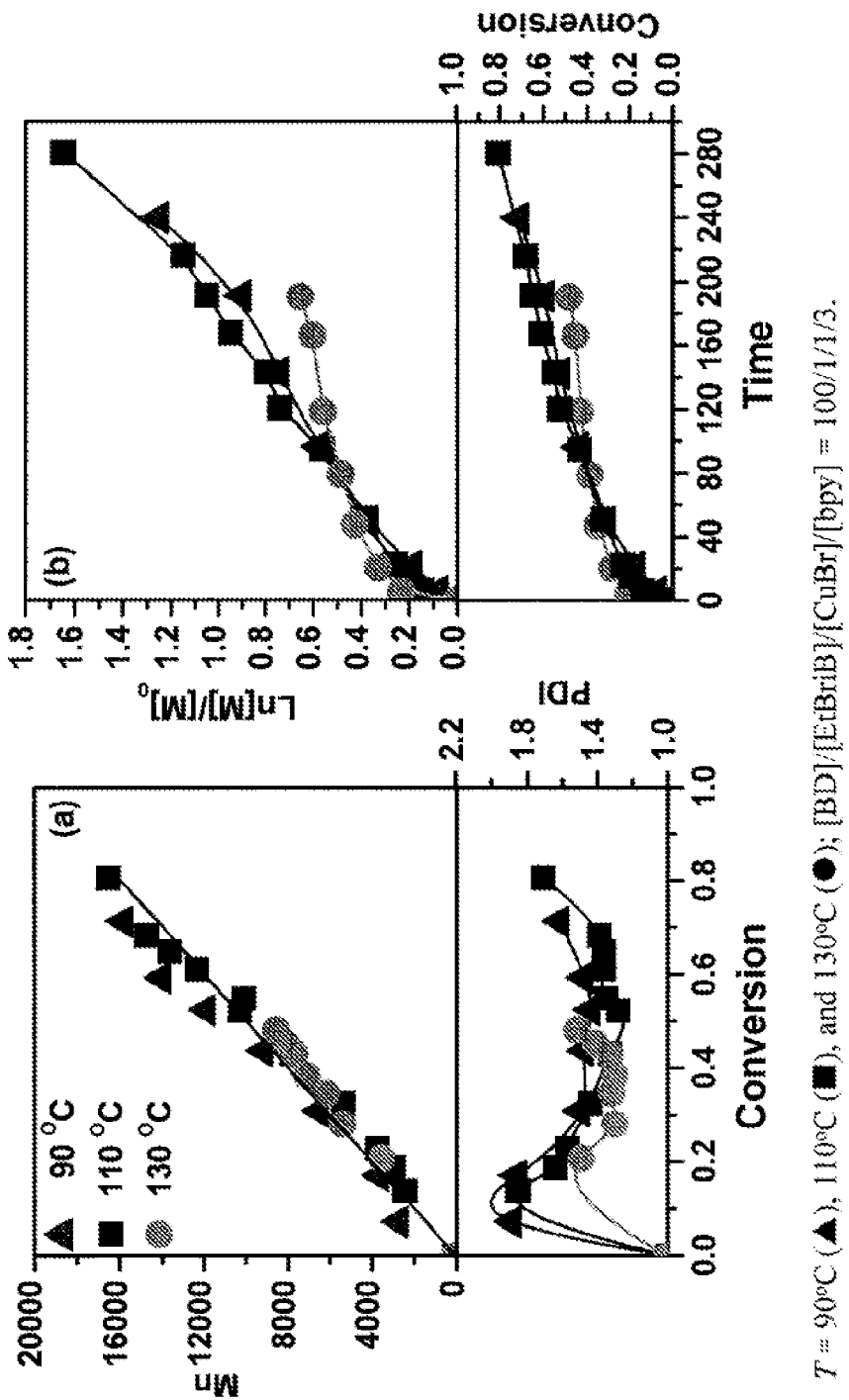
FIG. 12 graphically depicts the effect of temperature in the CuBr-mediated butadiene polymerization in toluene initiated from EtBriB. Part (a) shows the dependence of M$_n$ and M$_w$/M$_n$ on conversion. Part (b) shows the pseudofirst-order kinetics. [BD]/[EtBriB]/[CuBr]/[bpy]=100/1/1/3.

FIG. 11 graphically depicts the effect of temperature in the CuBr-mediated butadiene polymerization in toluene initiated from EtBriB. Part (a) shows the dependence of $M_n$ and $M_w/M_n$ on conversion. Part (b) shows the pseudofirst-order kinetics. [BD]/[EtBriB]/[CuBr]/[bpy]=100/1/1/3. FIG. 12 lists data showing the effect of temperature in the CuBr-mediated butadiene polymerization in toluene. [BD]/[EtBriB]/[CuBr]/[Bpy]=100/1/1/3, T=110° C. $M_n$ was determined by gel permeation chromatography in THF against linear polystyrene standards.

Figure 14:
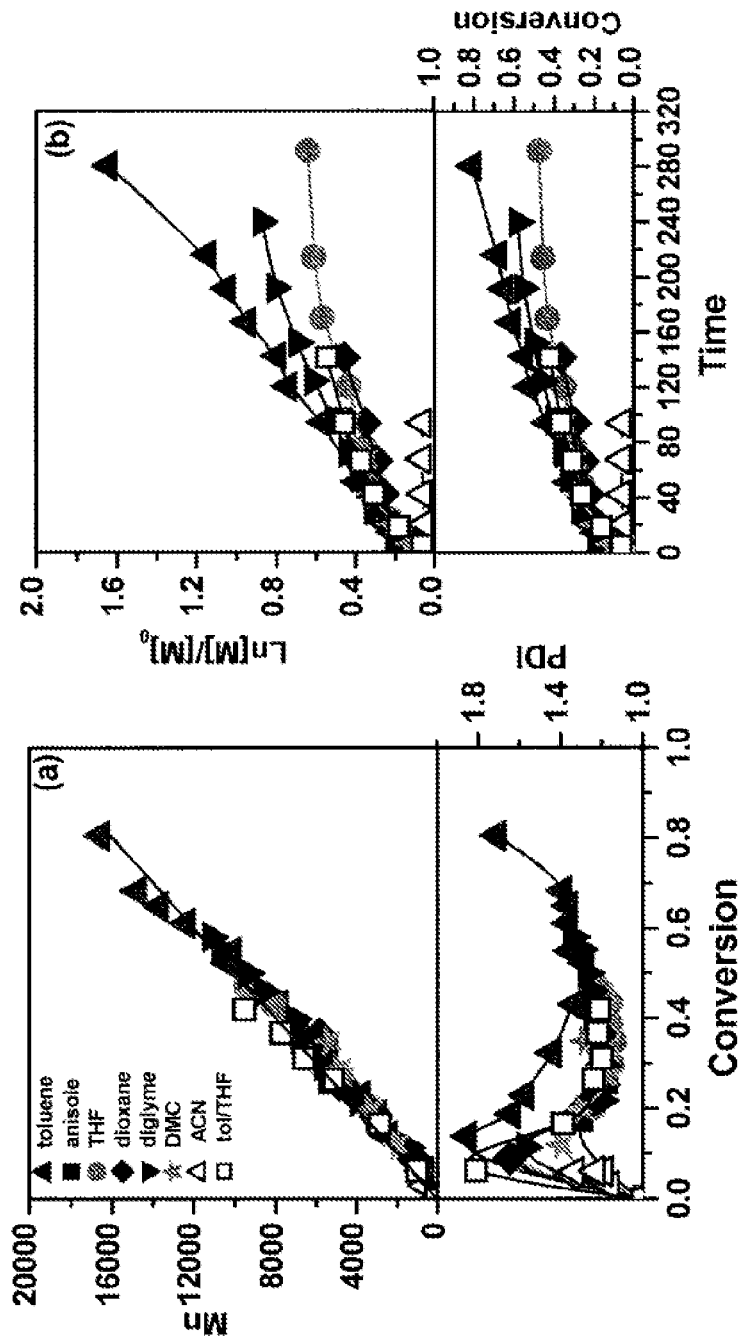
FIG. 14 graphically depicts the effect of solvents in the CuBr-mediated butadiene polymerization initiated from EtBriB. Part (a) shows the dependence of M$_n$ and M$_w$/M$_n$ on conversion. Part (b) shows pseudofirst-order kinetics. [BD]/[EtBriB]/[CuBr]/[bpy]=100/1/1/3, T=110° C.

FIG. 13 graphically depicts the effect of solvents in the CuBr-mediated butadiene polymerization initiated from EtBriB. Part (a) shows the dependence of $M_n$ and $M_w/M_n$ on conversion. Part (b) shows pseudofirst-order kinetics. [BD]/[EtBriB]/[CuBr]/[bpy]=100/1/1/3, T=110° C. FIG. 14 lists data showing the effect of solvents in the CuBr-mediated butadiene polymerization. [BD]/[EtBriB]/[CuBr]/[Bpy]=100/1/1/3, T=110° C. The toluene/THF has a v/v of 1/1. FIG. 15 graphically depicts the effect of solvents in the CuBr-mediated butadiene polymerization initiated from EtBriB. Part (a) shows the dependence of $M_n$ and $M_w/M_n$ on conversion. Part (b) shows pseudofirst-order kinetics. [BD]/[EtBriB]/[CuBr]/[bpy]=100/1/1/3, T=130° C.

Figure 16:
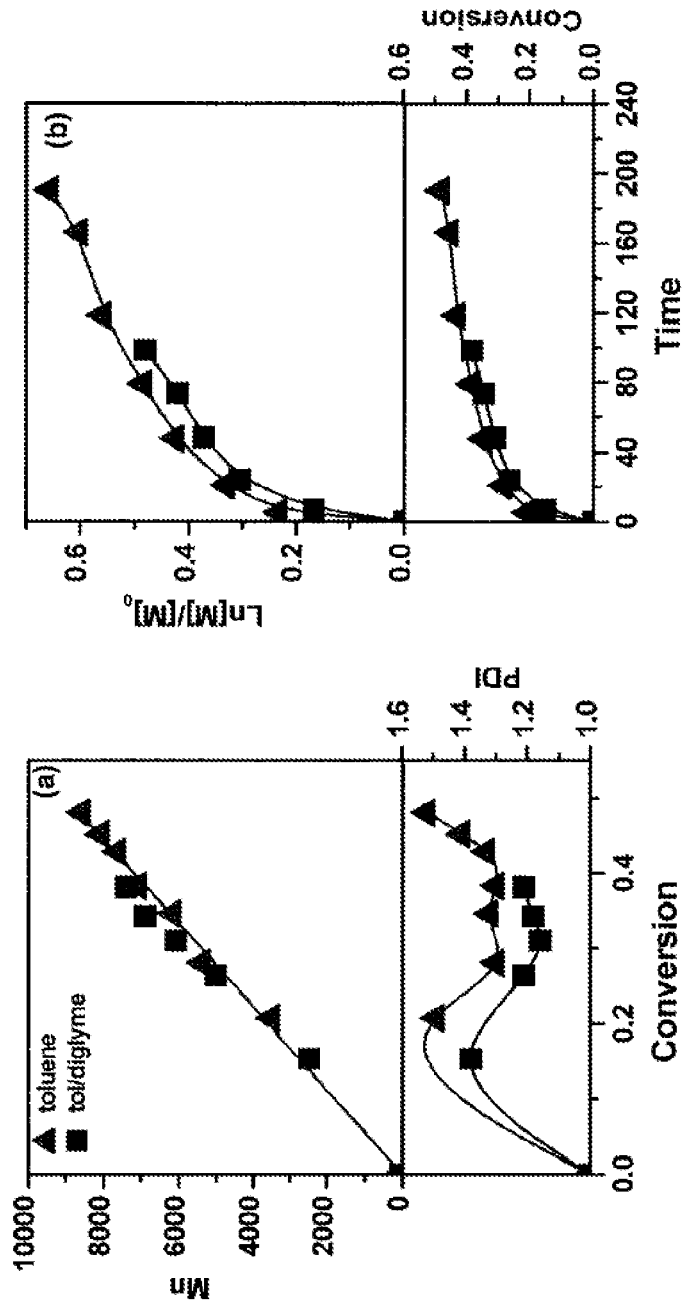
FIG. 16 graphically depicts the effect of solvents in the CuBr-mediated butadiene polymerization initiated from EtBriB. Part (a) shows the dependence of M$_n$ and M$_w$/M$_n$ on conversion. Part (b) shows pseudofirst-order kinetics. [BD]/[EtBriB]/[CuBr]/[bpy]=100/1/1/3, T=130° C.
Figure 17:
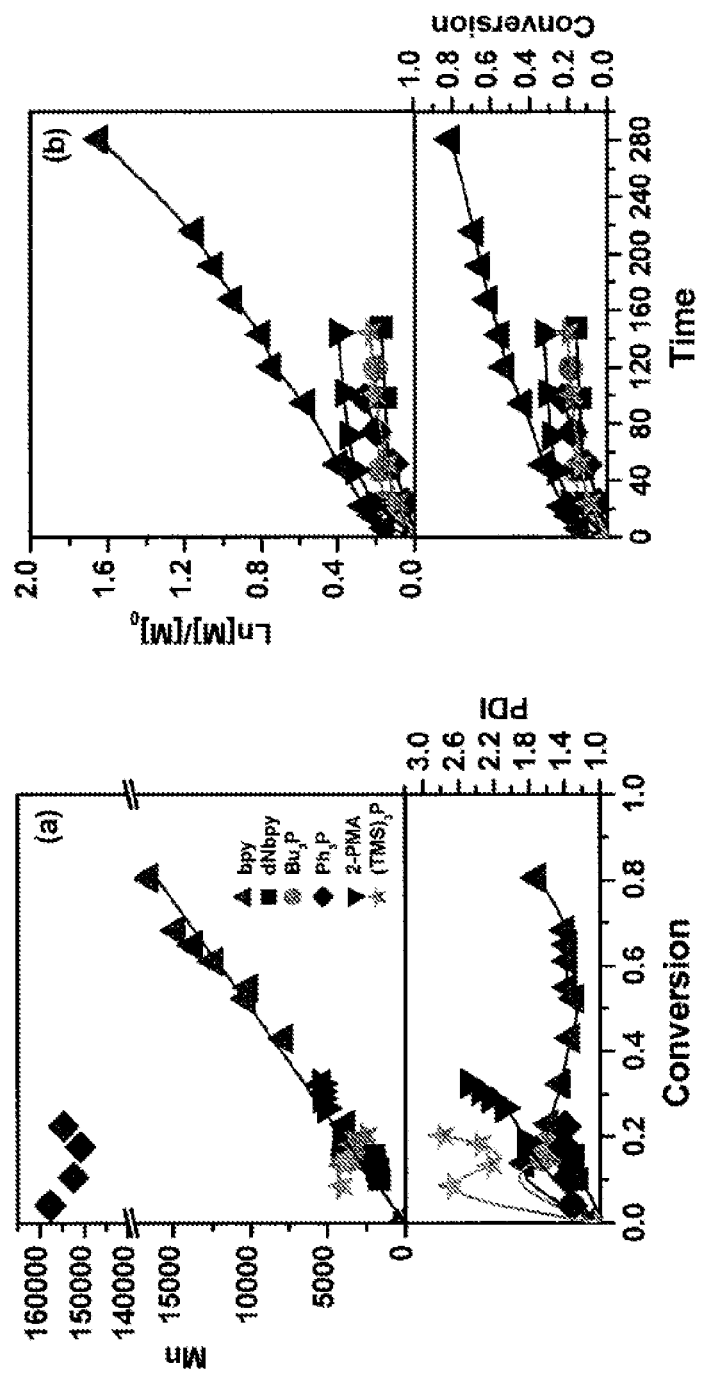
FIG. 17 graphically depicts the effect of ligands in the CuBr-mediated butadiene polymerization in toluene initiated from EtBriB. Part (a) shows the dependence of M$_n$ and M$_w$/M$_n$ on conversion. Part (b) shows pseudofirst-order kinetics. T=110° C.

FIG. 16 graphically depicts the effect of ligands in the CuBr-mediated butadiene polymerization in toluene initiated from EtBriB. Part (a) shows the dependence of $M_n$ and $M_w/M_n$ on conversion. Part (b) shows pseudofirst-order kinetics. T=110° C. FIG. 17 graphically depicts the effect of ligands in the CuBr-mediated butadiene polymerization in diglyme. Part (a) shows the dependence of $M_n$ and $M_w/M_n$ on conversion. Part (b) shows pseudofirst-order kinetics. T=110° C.

Figure 18:
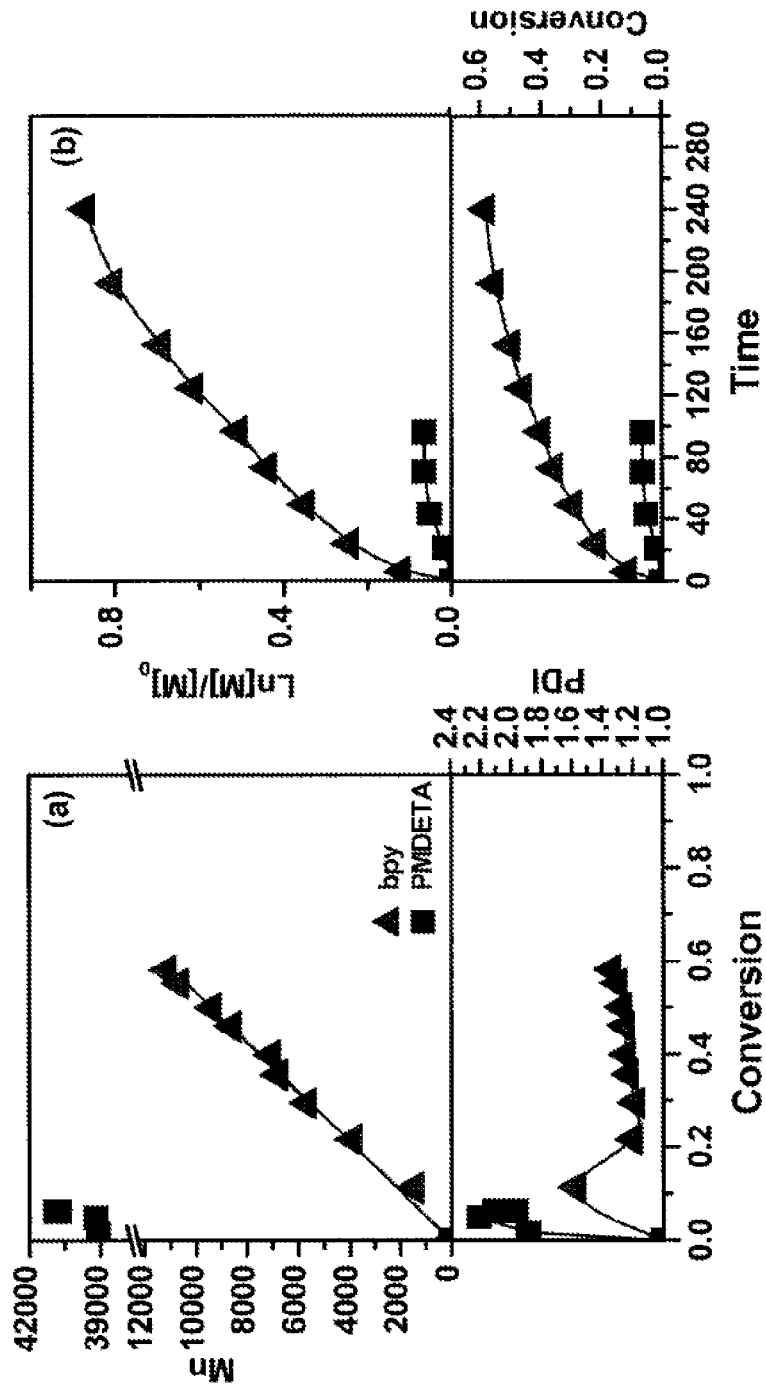
FIG. 18 graphically depicts the effect of ligands in the CuBr-mediated butadiene polymerization in diglyme. Part (a) shows the dependence of M$_n$ and M$_w$/M$_n$ on conversion. Part (b) shows pseudofirst-order kinetics. T=110° C.
Figure 19:
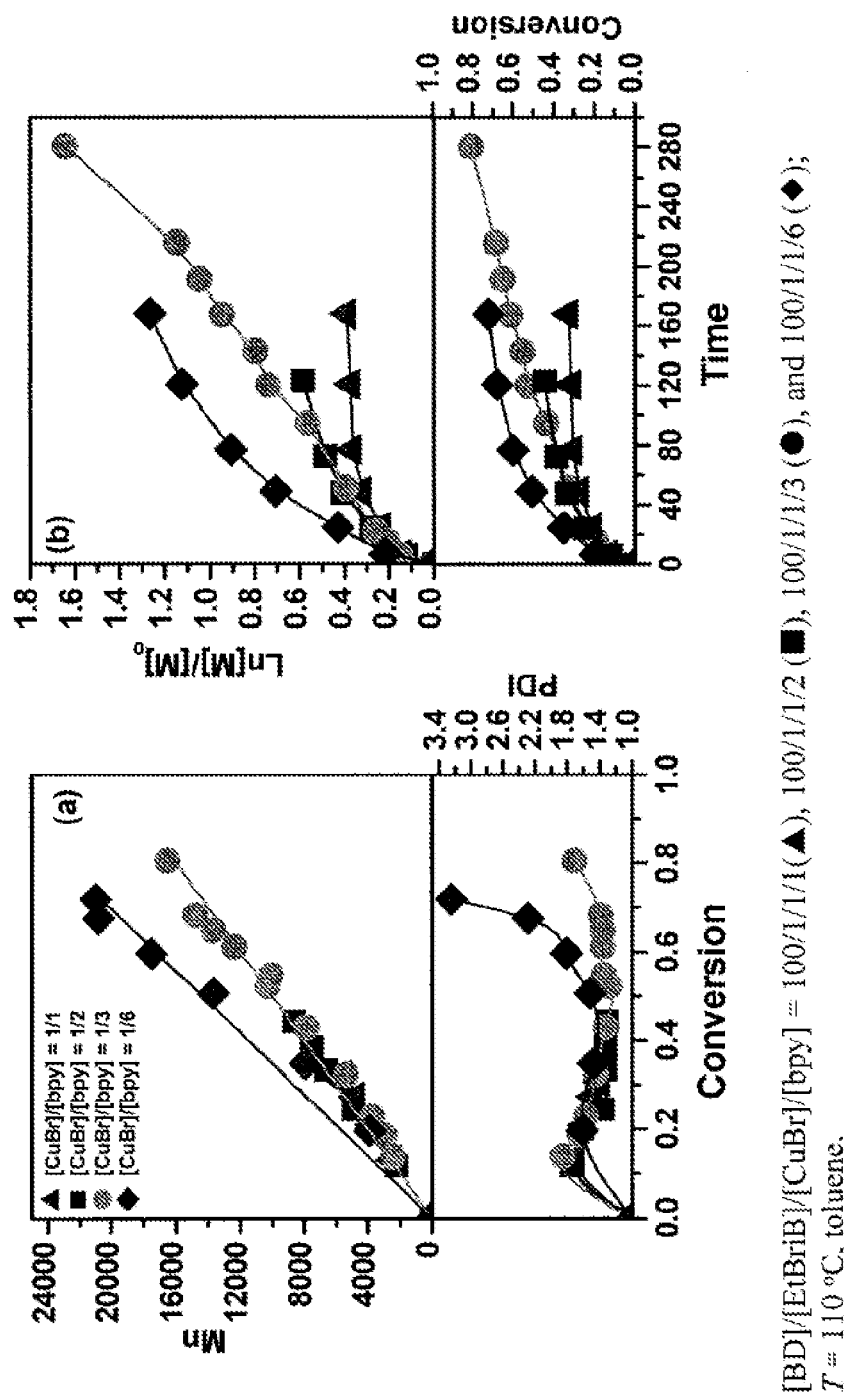
FIG. 19 graphically depicts the effect of [CuBr]/[bpy] ratio in the CuBr-mediated butadiene polymerization in toluene initiated from EtBriB. Part (a) shows the dependence of M$_n$ and M$_w$/M$_n$ on conversion. Part (b) shows pseudofirst-order kinetics. T=110° C.

FIG. 18 graphically depicts the effect of [CuBr]/[bpy] ratio in the CuBr-mediated butadiene polymerization in toluene initiated from EtBriB. Part (a) shows the dependence of $M_n$ and $M_w/M_n$ on conversion. Part (b) shows pseudofirst-order kinetics. T=110° C. FIG. 19 lists data showing the effect of [CuBr]/[bpy] ratio in the CuBr-mediated butadiene polymerization in toluene initiated from EtBriB.

Figure 21:
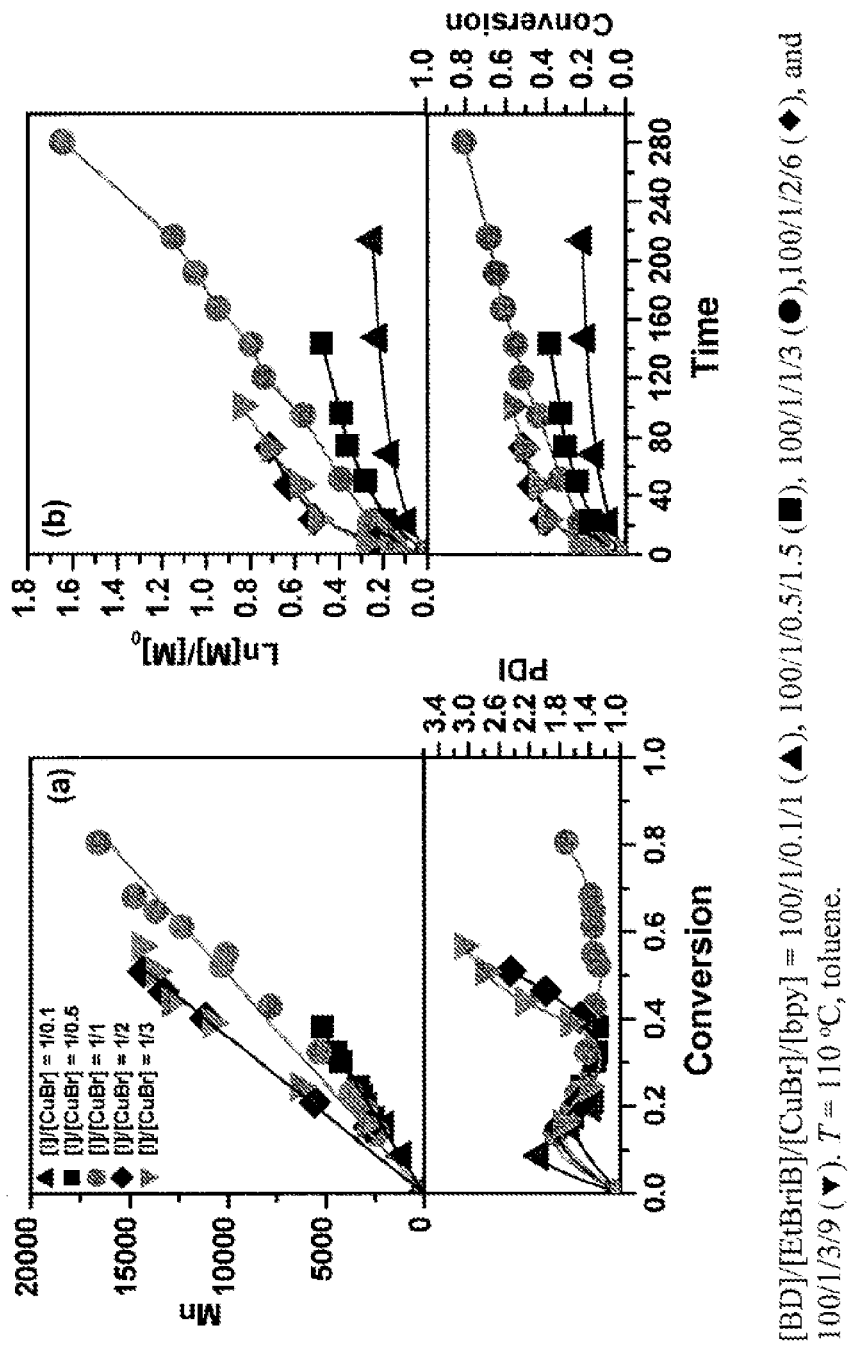
FIG. 21 graphically depicts the effect of [I]/[CuBr] ratio in the CuBr-mediated butadiene polymerization in toluene initiated from EtBriB. Part (a) shows the dependence of M$_n$ and M$_w$/M$_n$ on conversion. Part (b) shows pseudofirst-order kinetics. T=110° C.

FIG. 20 graphically depicts the effect of [I]/[CuBr] ratio in the CuBr-mediated butadiene polymerization in toluene initiated from EtBriB. Part (a) shows the dependence of $M_n$ and $M_w/M_n$ on conversion. Part (b) shows pseudofirst-order kinetics. T=110° C. FIG. 21 lists data showing the effect of [I]/[CuBr] ratio in the CuBr-mediated butadiene polymerization in toluene initiated from EtBriB. FIG. 22 graphically depicts the effect of [I]/[CuBr] ratio in the CuBr-mediated butadiene polymerization in THF initiated from EtBriB. Part (a) shows the dependence of $M_n$ and $M_w/M_n$ on conversion. Part (b) shows pseudofirst-order kinetics. T=110° C.

Figure 23:
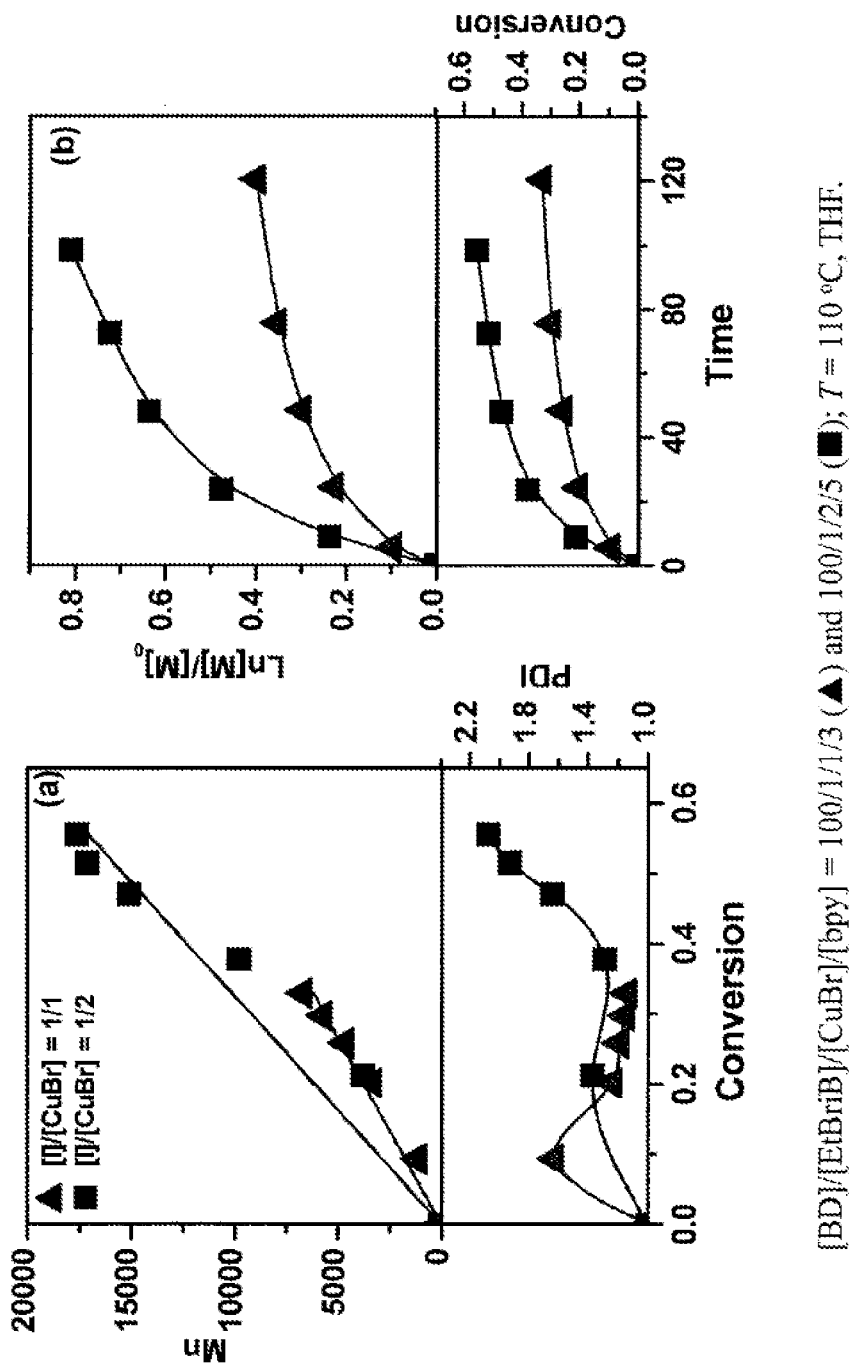
FIG. 23 graphically depicts the effect of [I]/[CuBr] ratio in the CuBr-mediated butadiene polymerization in THF initiated from EtBriB. Part (a) shows the dependence of $M_n$ and $M_w/M_n$ on conversion. Part (b) shows pseudofirst-order kinetics. T=110° C.
Figure 24:
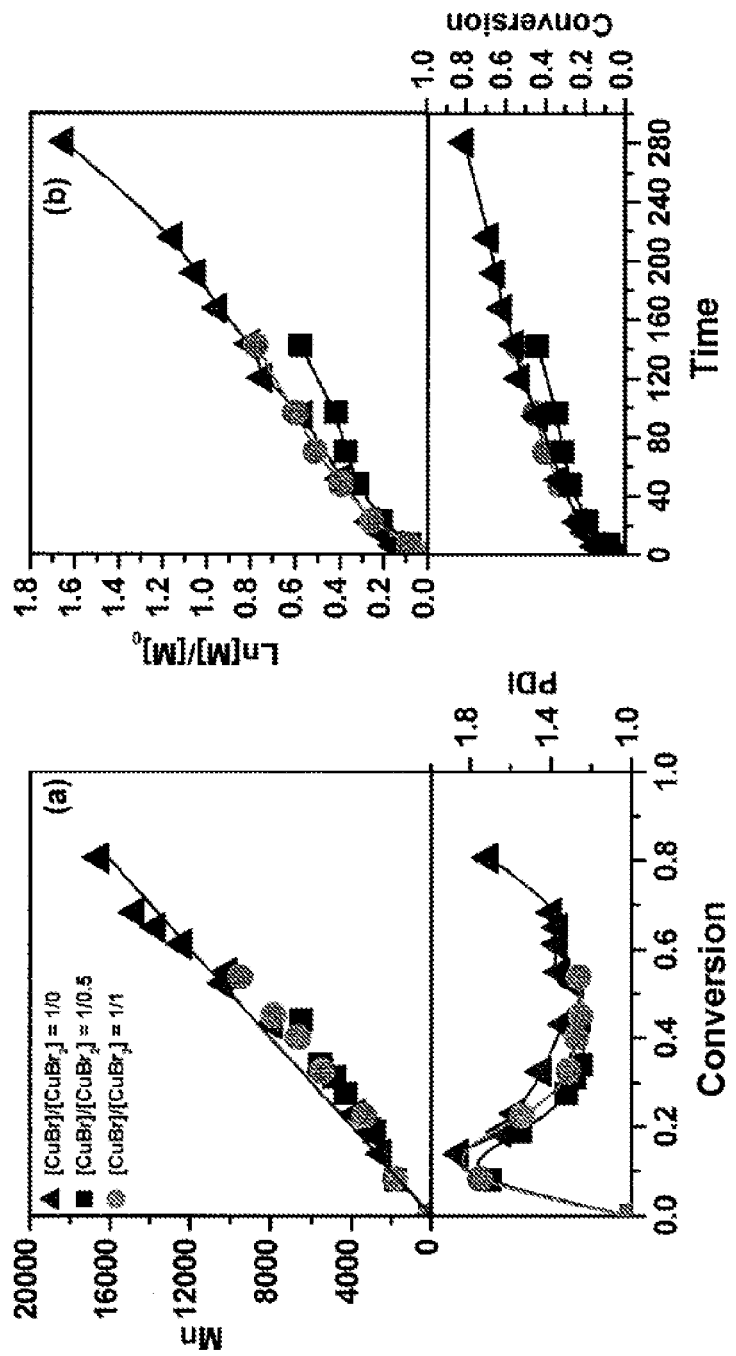
FIG. 24 graphically depicts the effect of $CuBr_2$ addition in the CuBr-mediated butadiene polymerization in toluene initiated from EtBriB. Part (a) shows the dependence of $M_n$ and $M_w/M_n$ on conversion. Part (b) shows pseudofirst-order kinetics. T=110° C.

FIG. 23 graphically depicts the effect of $CuBr_2$ addition in the CuBr-mediated butadiene polymerization in toluene initiated from EtBriB. Part (a) shows the dependence of $M_n$ and $M_w/M_n$ on conversion. Part (b) shows pseudofirst-order kinetics. T=110° C. FIG. 24 lists data showing the effect of $CuBr_2$ addition in the CuBr-mediated isoprene polymerization in toluene initiated from EtBriB.

Figure 26:
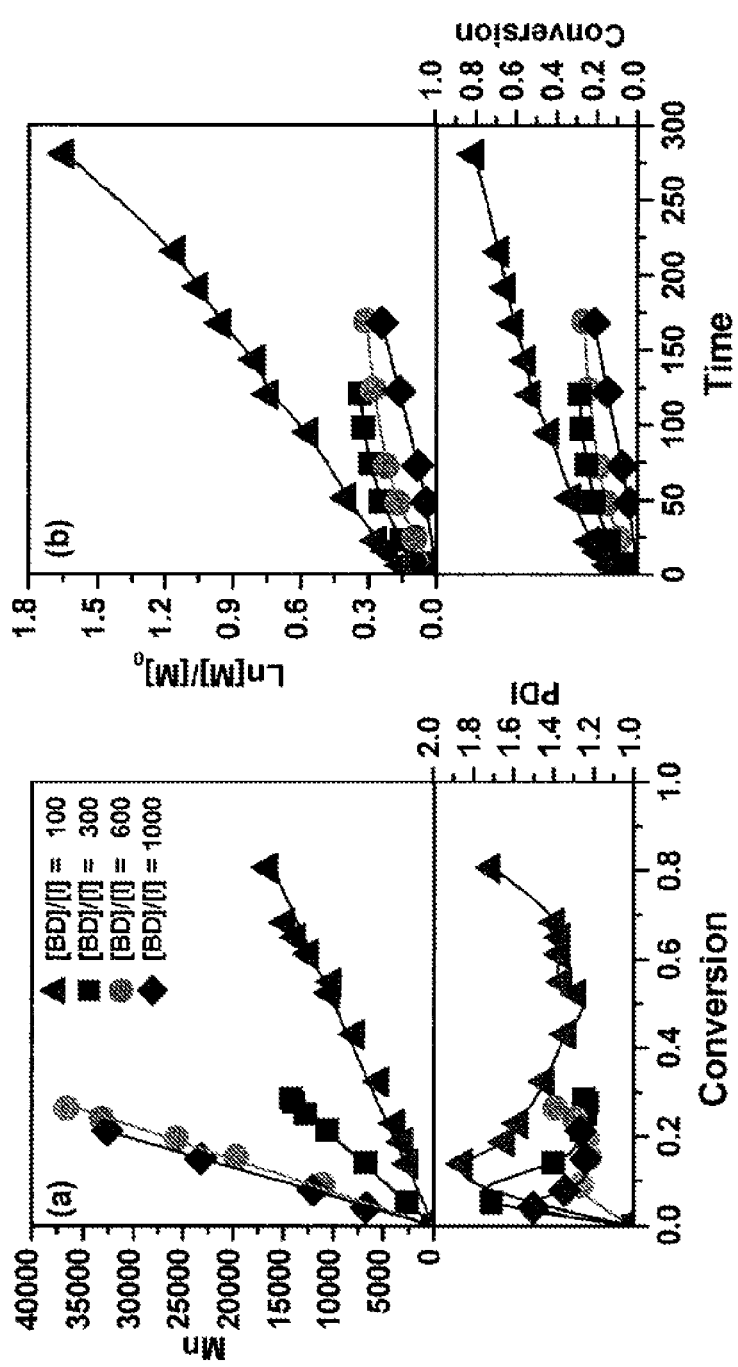
FIG. 26 graphically depicts the effect of [BD]/[I] ratio in the CuBr-mediated butadiene polymerization initiated from EtBriB. Part (a) shows the dependence of $M_n$ and $M_w/M_n$ on conversion. Part (b) shows pseudofirst-order kinetics. T=110° C.

FIG. 25 graphically depicts the effect of [BD]/[I] ratio in the CuBr-mediated butadiene polymerization initiated from EtBriB. Part (a) shows the dependence of $M_n$ and $M_w/M_n$ on conversion. Part (b) shows pseudofirst-order kinetics. T=110° C. FIG. 26 graphically depicts the effect of simultaneously increasing the [BD]/[I] ratio and the [I]/[CuBr]/[Bpy] ratios in the CuBr-mediated butadiene polymerization initiated from EtBriB. Part (a) shows the dependence of $M_n$ and $M_w/M_n$ on conversion. Part (b) shows pseudofirst-order kinetics. T=110° C.

Figure 27:
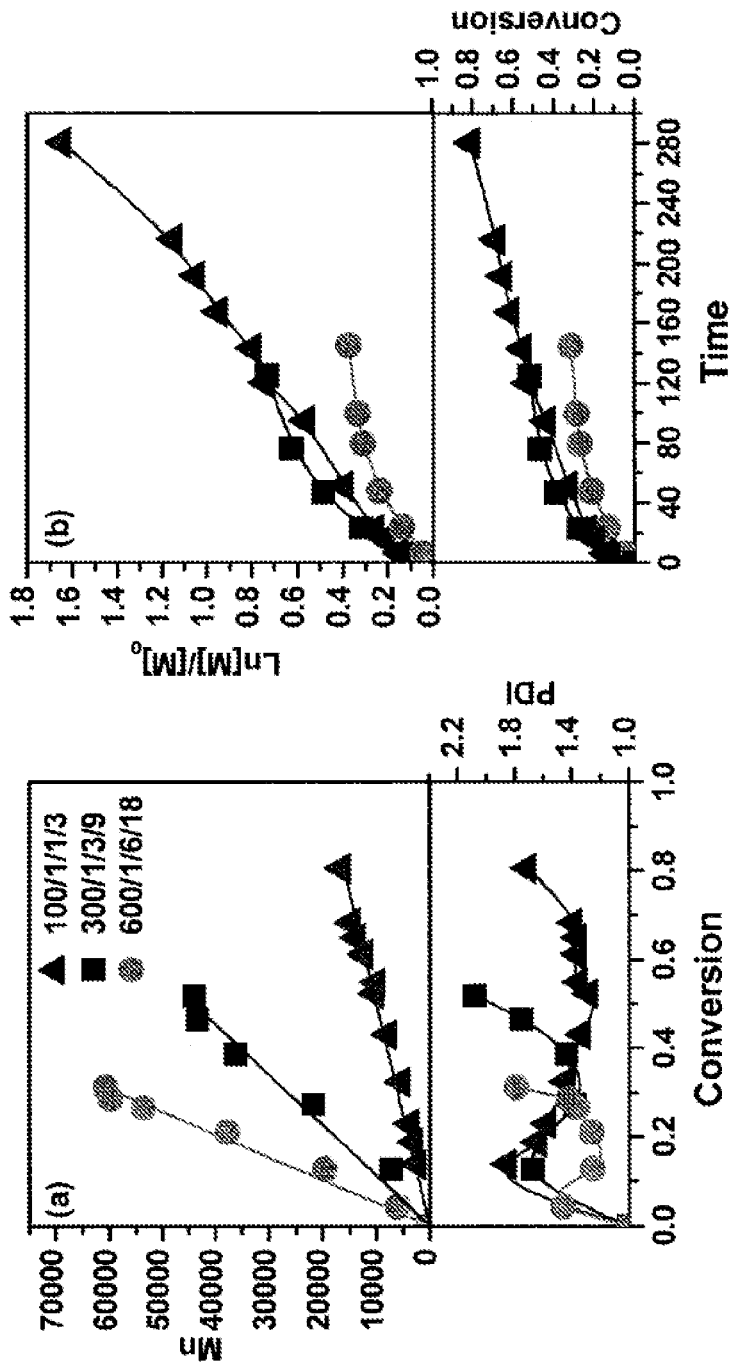
FIG. 27 graphically depicts the effect of simultaneously increasing the [BD]/[I] ratio and the [I]/[CuBr]/[Bpy] ratios in the CuBr-mediated butadiene polymerization initiated from EtBriB. Part (a) shows the dependence of $M_n$ and $M_w/M_n$ on conversion. Part (b) shows pseudofirst-order kinetics. T=110° C.

FIG. 27 graphically depicts a comparison of $M_n$ and $M_w/M_n$ dependence on conversion between precipitated and crude samples in the CuBr-mediated butadiene polymerization in toluene initiated from EtBriB. T=110° C.

Figure 28:
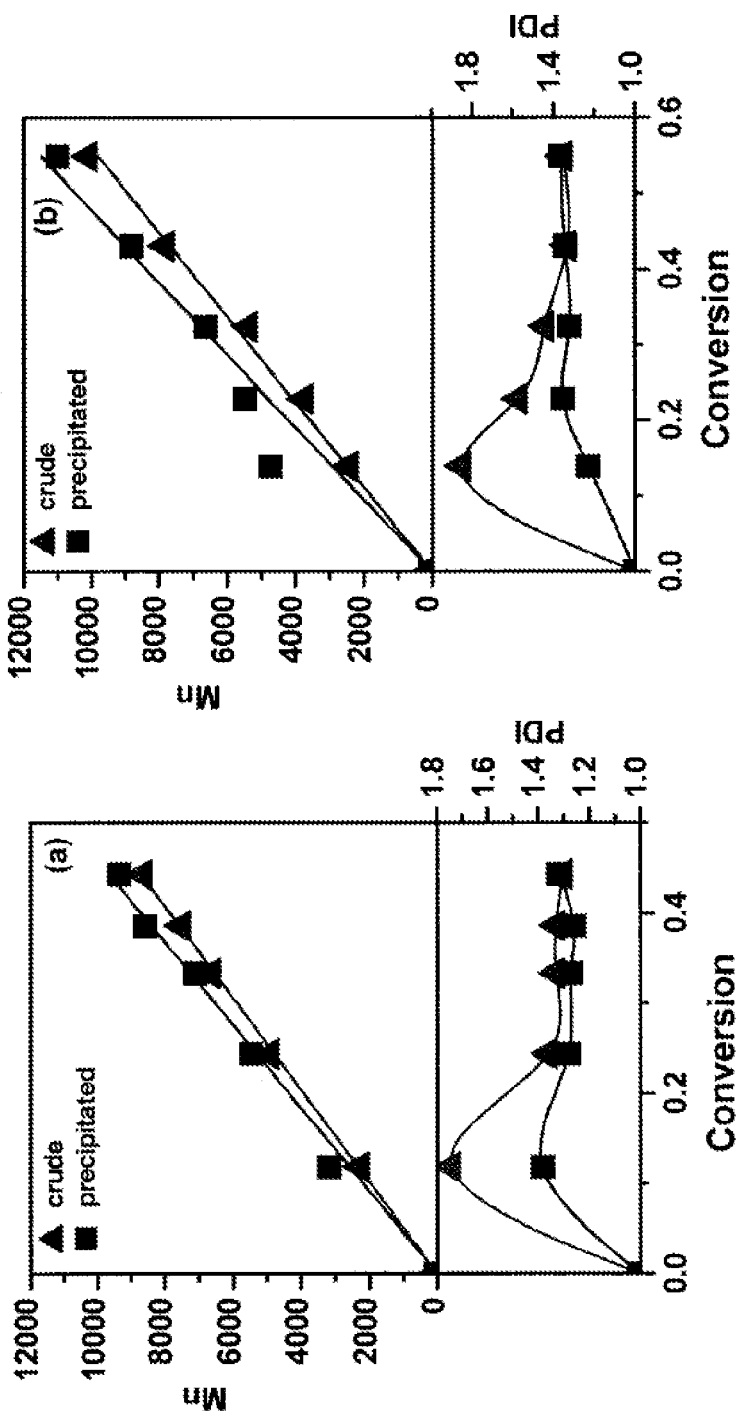
FIG. 28 graphically depicts a comparison of $M_n$ and $M_w/M_n$ dependence on conversion between precipitated and crude samples in the CuBr-mediated butadiene polymerization in toluene initiated from EtBriB. T=110° C.

FIG. 28 graphically depicts the effect of initiators and solvents in the CuBr-mediated butadiene polymerization. Part (a) shows the dependence of $M_n$ and $M_w/M_n$ on conversion. Part (b) shows pseudofirst-order kinetics. [BD]/[I]/[CuBr]/[bpy]=100/1/1/3, T=110° C.

Figure 29:
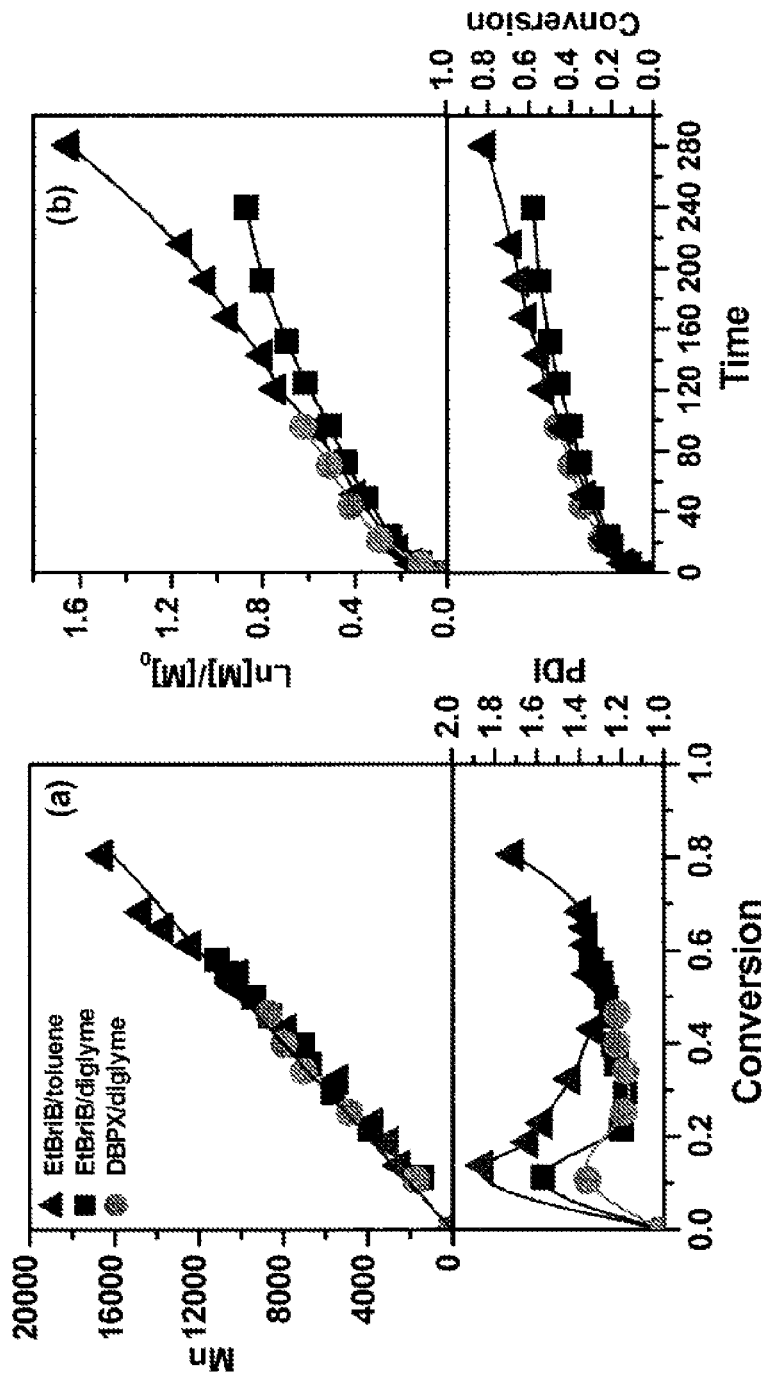
FIG. 29 graphically depicts the effect of initiators and solvents in the CuBr-mediated butadiene polymerization. Part (a) shows the dependence of $M_n$ and $M_w/M_n$ on conversion. Part (b) shows pseudofirst-order kinetics. [BD]/[I]/[CuBr]/[bpy]=100/1/1/3, T=110° C.
Figure 30:
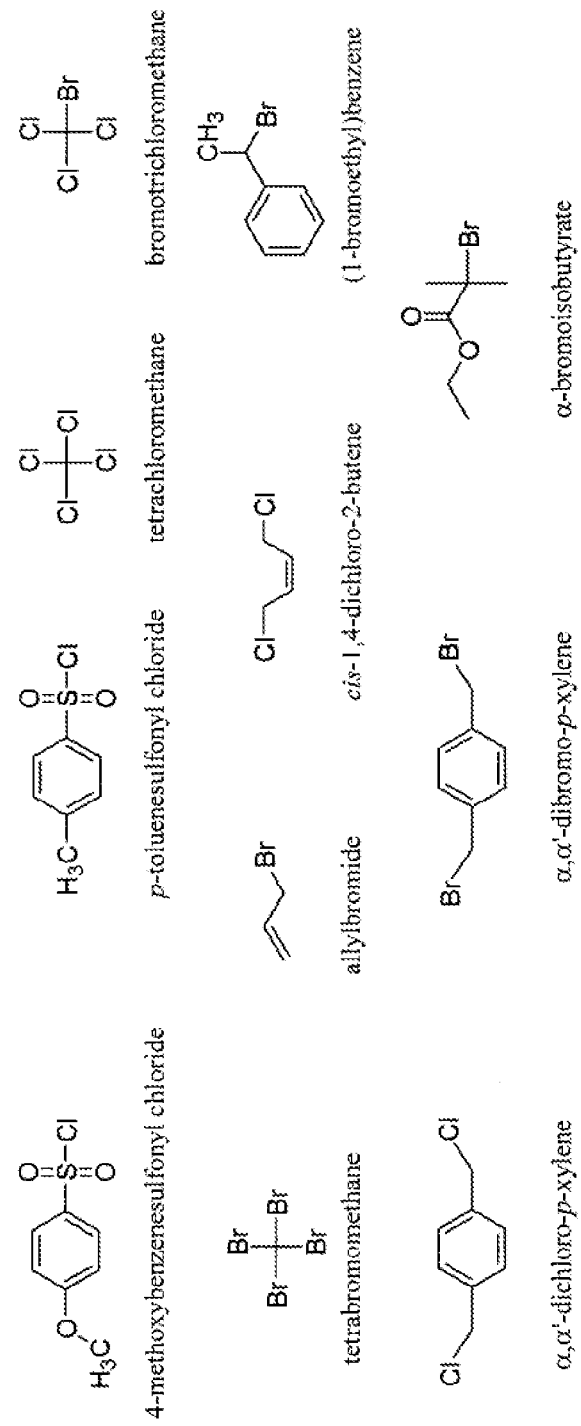
FIG. 30 depicts illustrative initiator structures useful in the processes of this disclosure.

FIG. 29 graphically depicts $CuBr_2$- and $CuCl_2$-mediated butadiene reverse ATRP in toluene initiated from AIBN. Part (a) shows the dependence of $M_n$ and $M_w/M_n$ on conversion. Part (b) shows pseudofirst-order kinetics. [BD]/[AIBN]/[CuX$_2$]/[bpy]=100/1/2/6, T=110° C.

Figure 31:
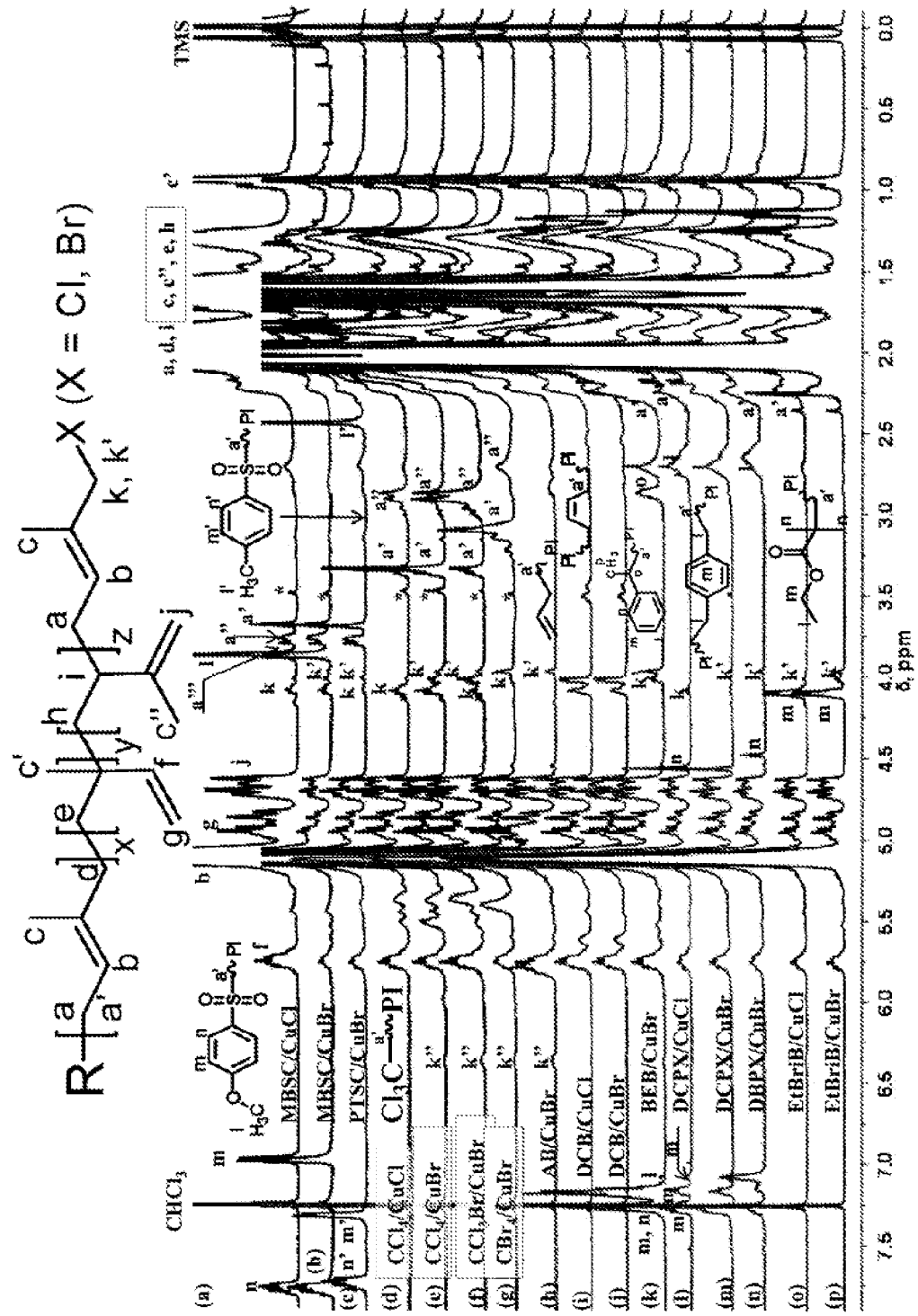
FIG. 31 depicts $^1$H NMR spectra of polyisoprene initiated from alkyl and sulfonyl initiators useful in the processes of this disclosure.
Figure 34:
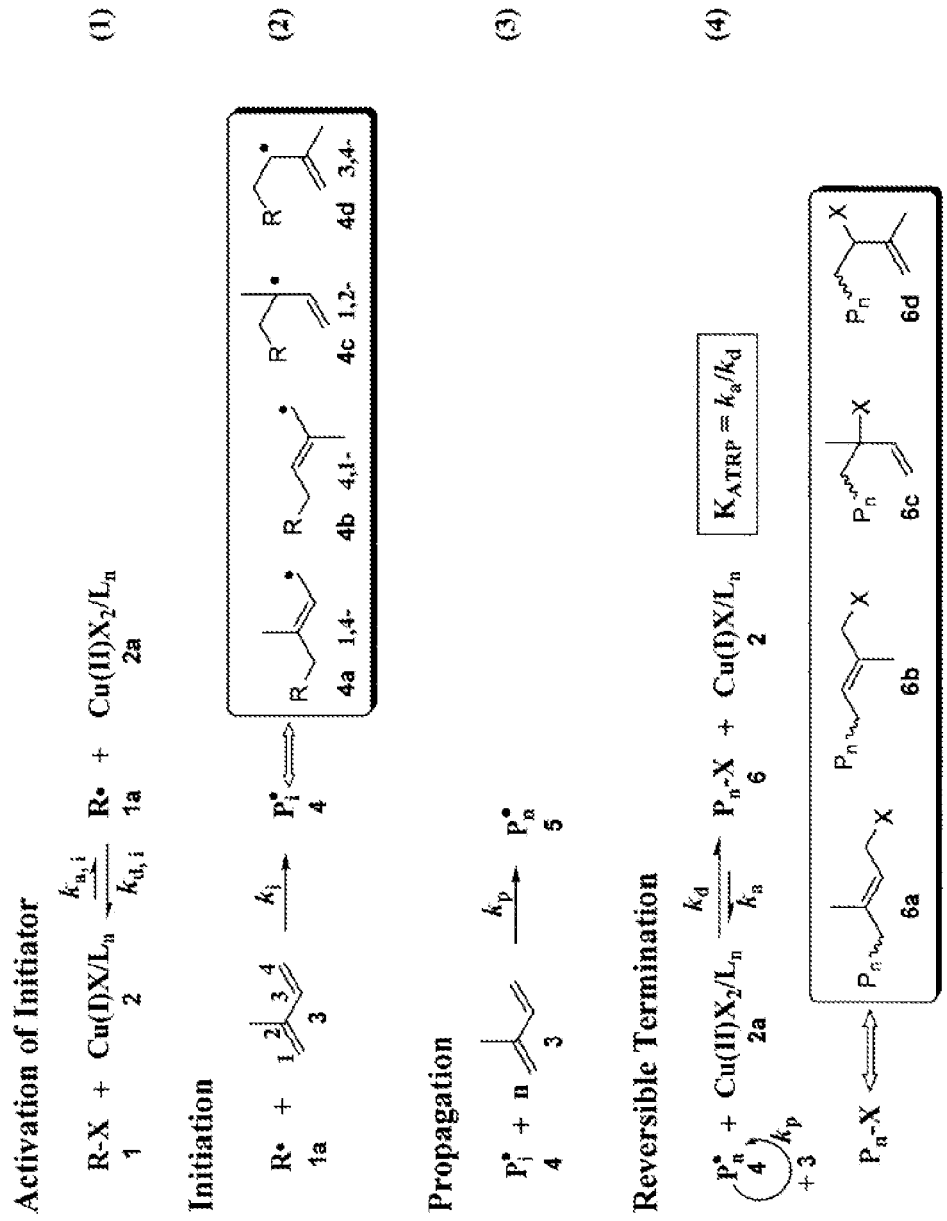
FIG. 34 depicts a reaction scheme showing activation of an initiator, initiation, propagation and reversible termination.
Figure 35A:
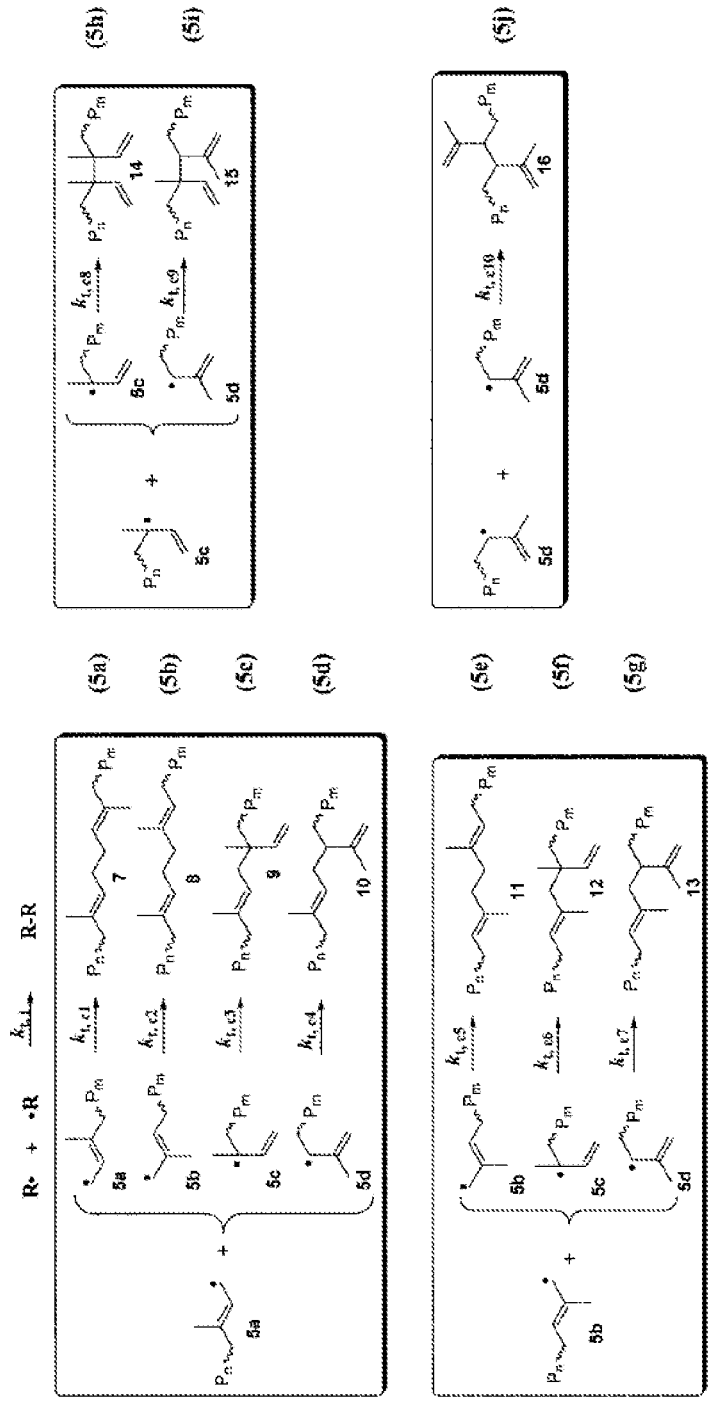
Figure 36:
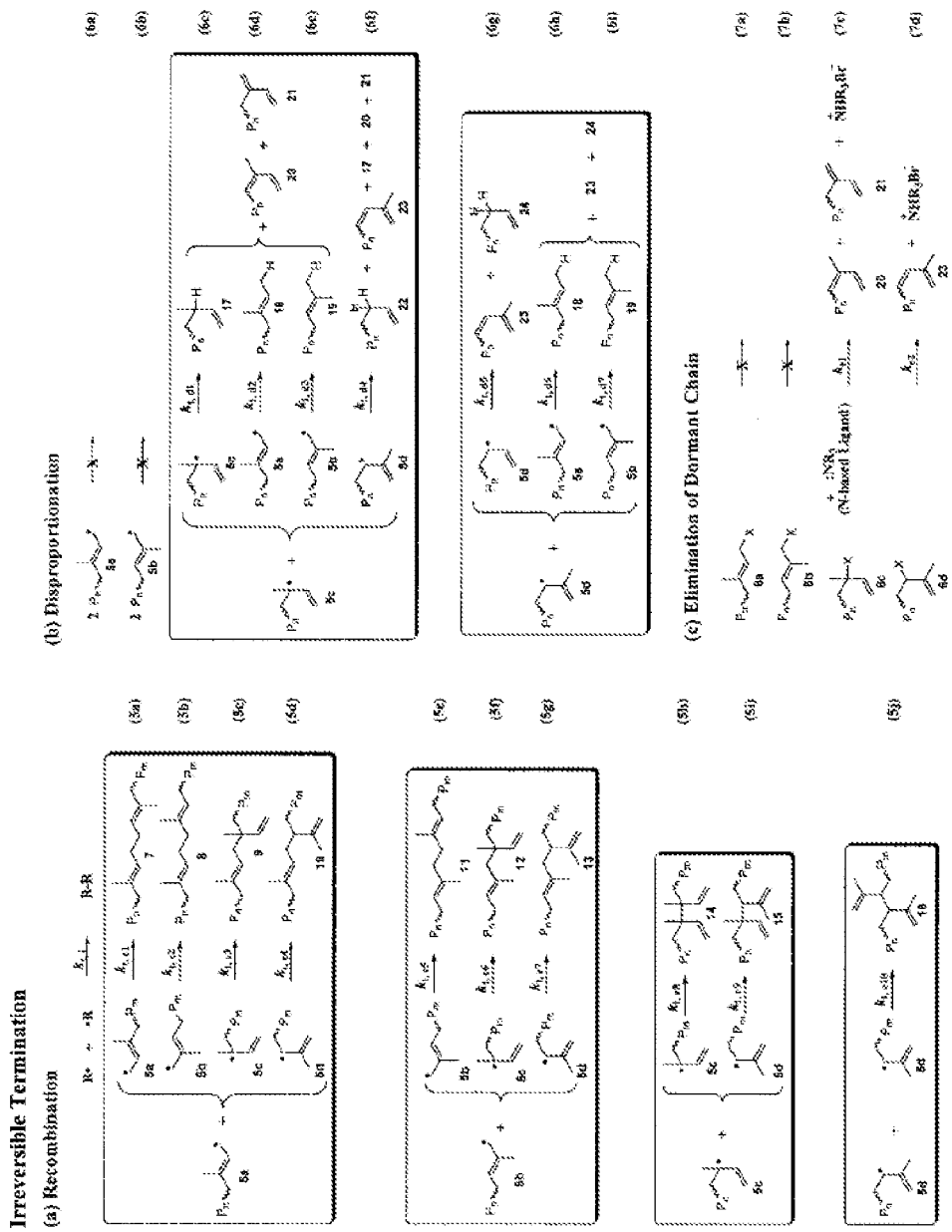
FIG. 36 depicts reaction schemes showing irreversible termination, i.e., recombination, disproportionation and elimination of dormant chain
Figure 37:
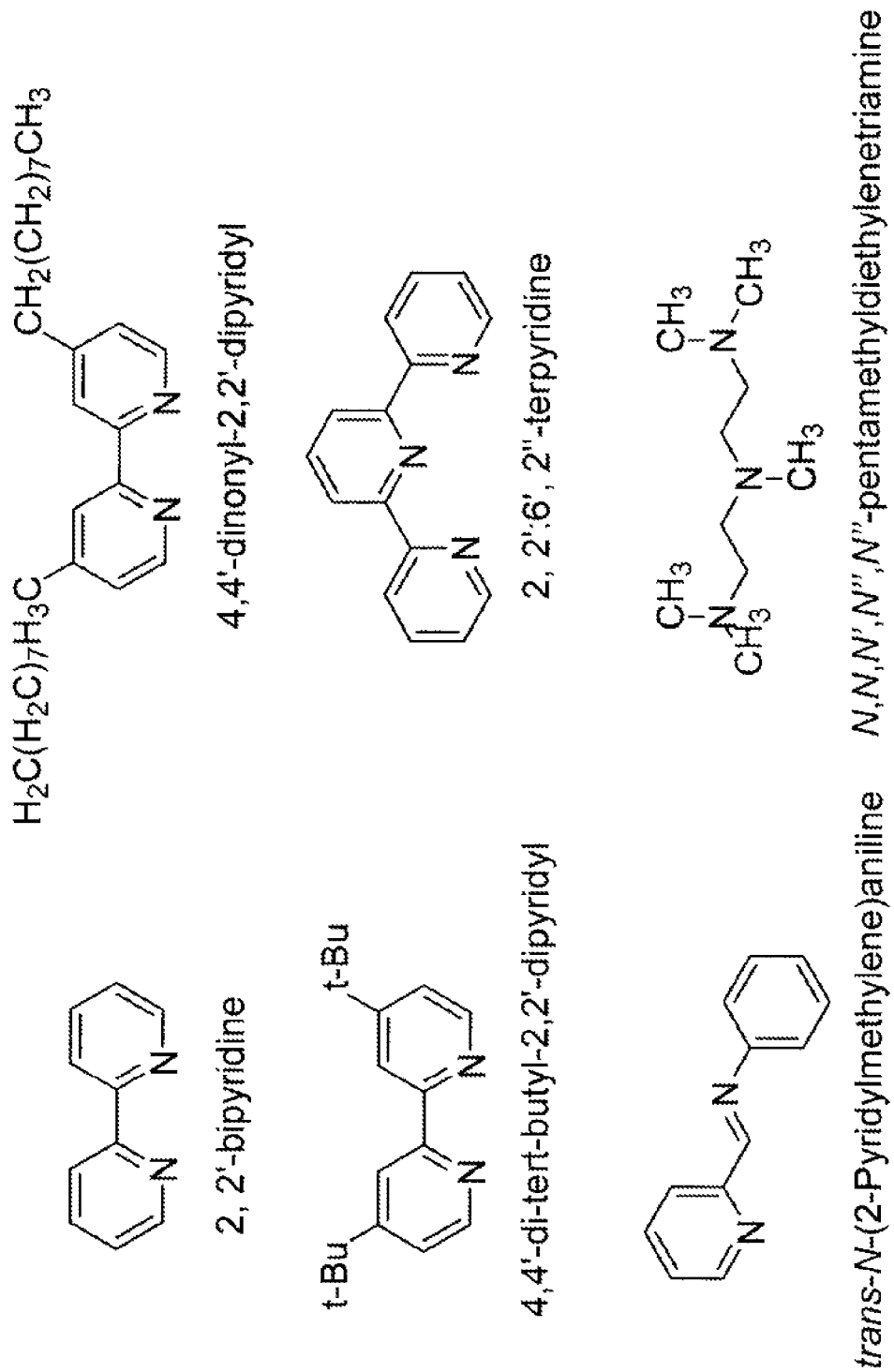
FIG. 37 depicts illustrative ligand structures useful in the transition metal compound catalysts used in the processes of this disclosure.

FIG. 31 depicts $^1$H NMR spectra of polyisoprene initiated from alkyl and sulfonyl initiators. FIG. 32 depicts structural assignments for the nuclear magnetic resonance (NMR) spectra of (A) initiator fragment and first unit of isoprene bonded to an initiator and (B) halide-capped and eliminated end units. FIG. 33 lists chain end characterizations for isoprene prepared in accordance with the ATRP process of this disclosure.

Figure 38:
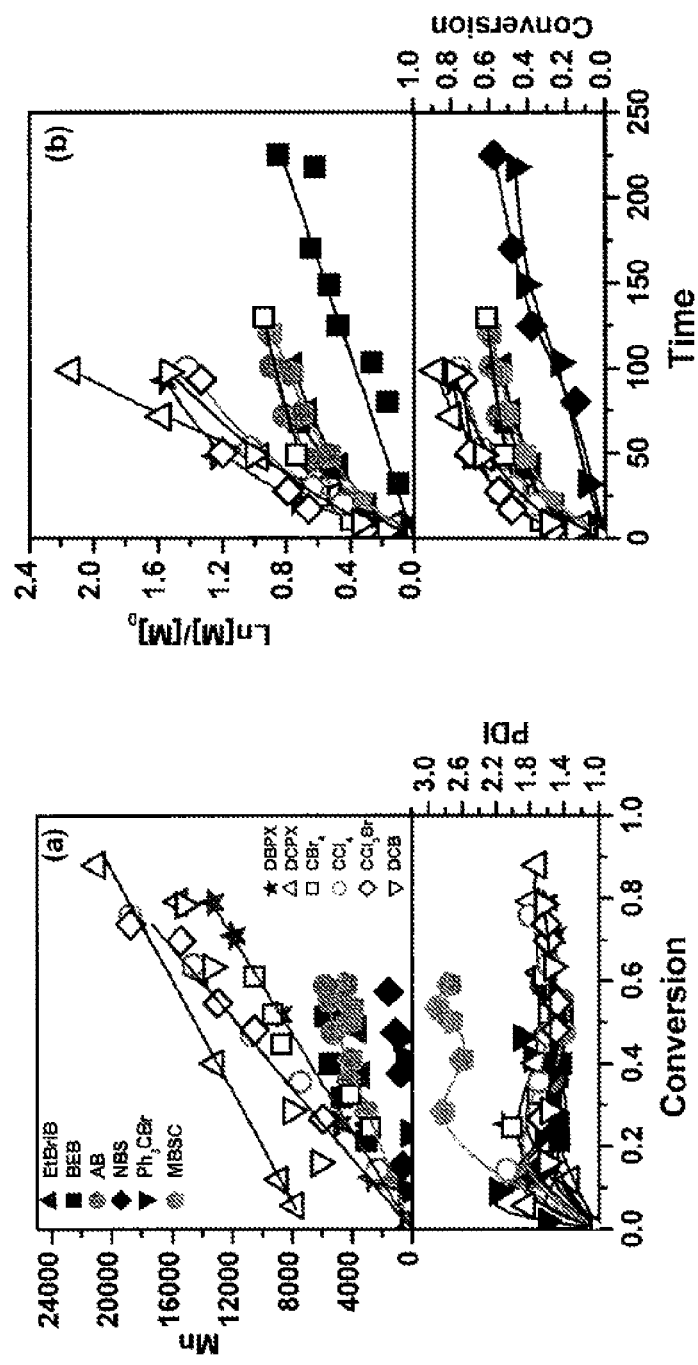
FIG. 38 graphically depicts the effect of Cl and Br containing initiators in the CuBr-mediated isoprene polymerization in toluene. Part (a) shows the dependence of $M_n$ and $M_w/M_n$ on conversion. Part (b) shows pseudofirst-order kinetics T=110° C.
Figure 39:
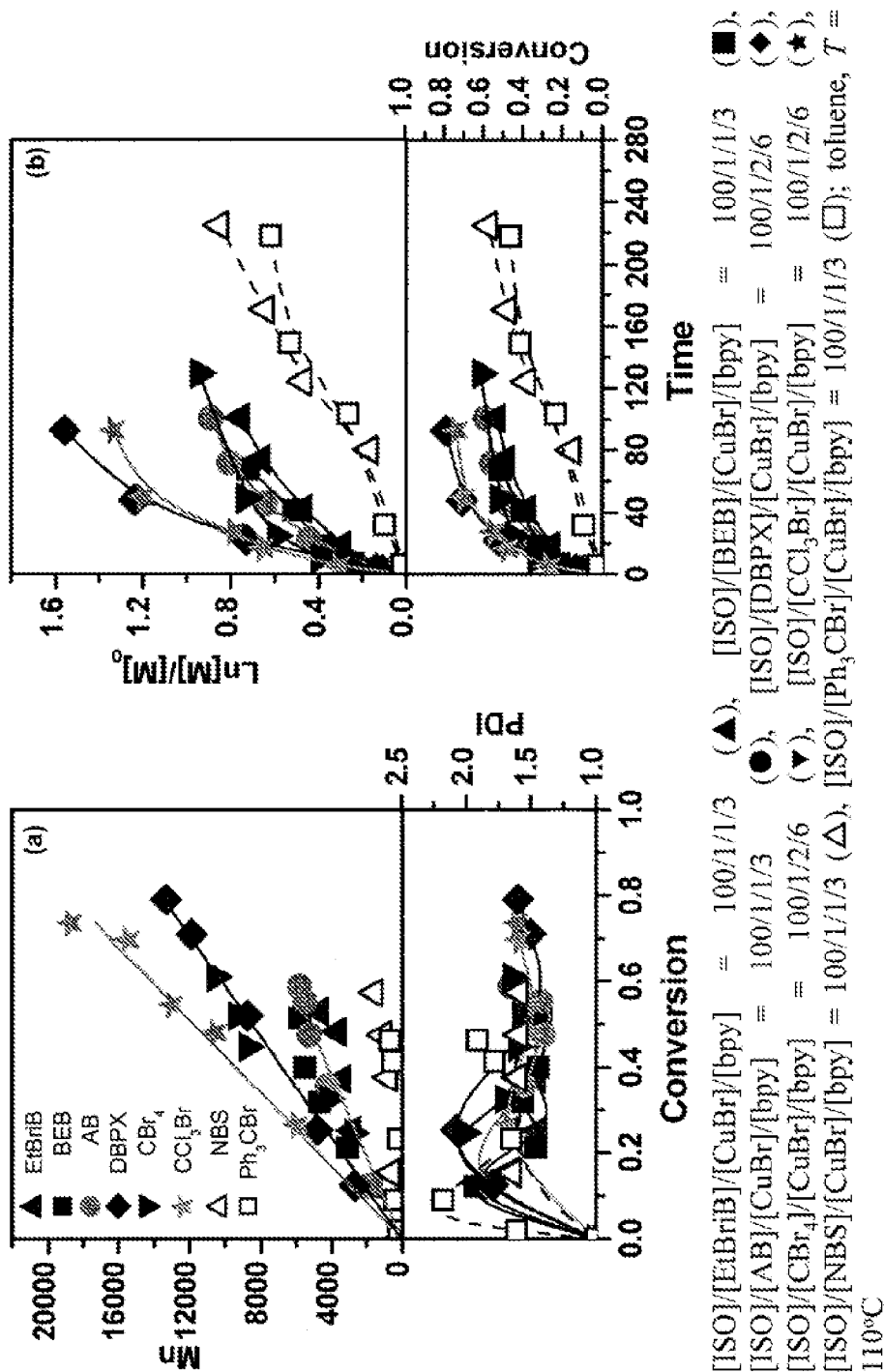
FIG. 39 graphically depicts the effect of the Br containing initiators in the CuBr-mediated isoprene polymerization in toluene. Part (a) shows the dependence of $M_n$ and $M_w/M_n$ on conversion. Part (b) shows pseudofirst-order kinetics. T=110° C.

FIG. 38 graphically depicts the effect of Cl and Br containing initiators in the CuBr-mediated isoprene polymerization in toluene. Part (a) shows the dependence of $M_n$ and $M_w/M_n$ on conversion. Part (b) shows pseudofirst-order kinetics. T=110° C. FIG. 39 graphically depicts the effect of the Br containing initiators in the CuBr-mediated isoprene polymerization in toluene. Part (a) shows the dependence of $M_n$ and $M_w/M_n$ on conversion. Part (b) shows pseudofirst-order kinetics. T=110° C.

Figure 40:
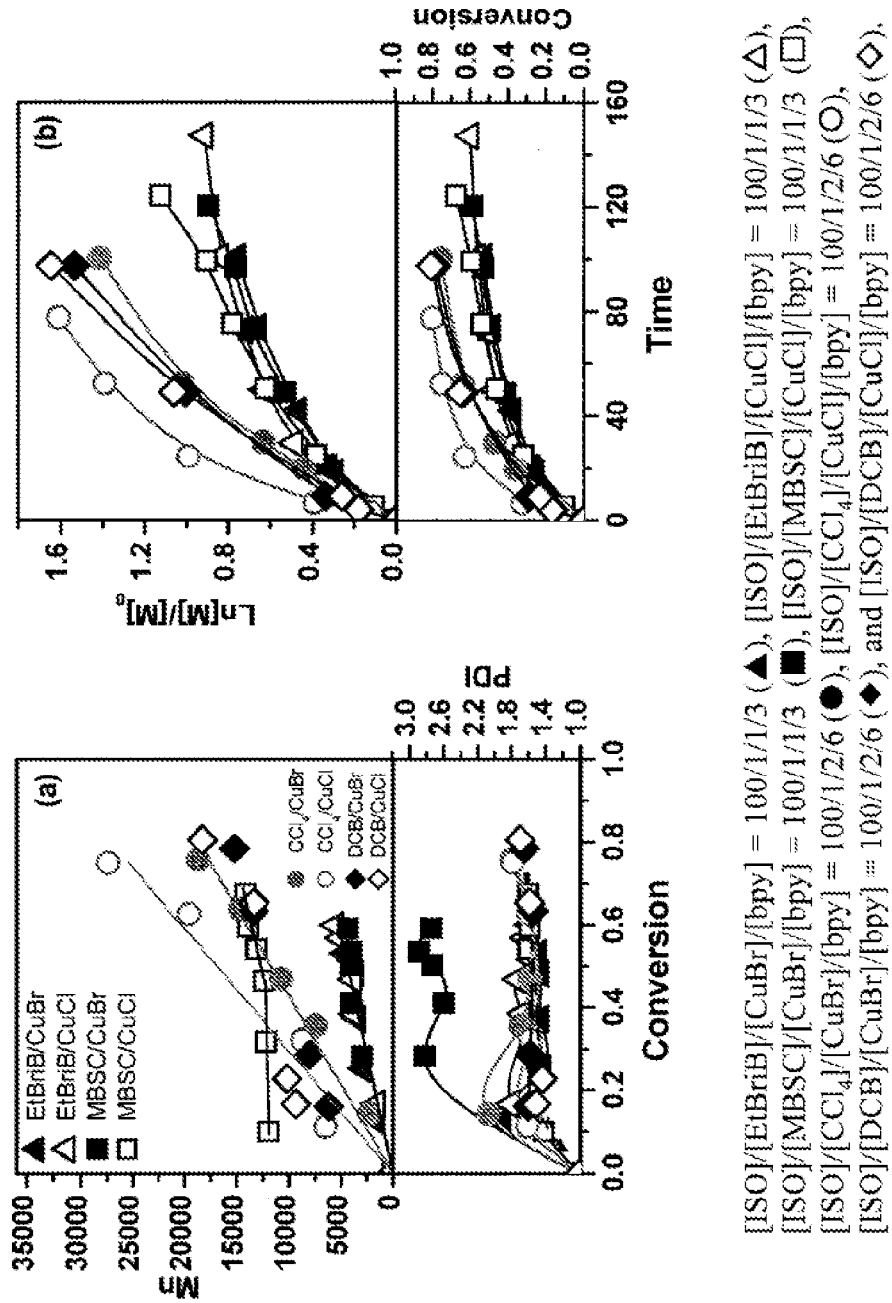
FIG. 40 graphically depicts the effect of CuX/RY (X, Y=Cl, Br) halide combinations in the CuX-mediated isoprene polymerization in toluene. Part (a) shows the dependence of $M_n$ and $M_w/M_n$ on conversion. Part (b) shows pseudofirst-order kinetics. T=110° C.

FIG. 40 graphically depicts the effect of CuX/RY (X, Y=Cl, Br) halide combinations in the CuX-mediated isoprene polymerization in toluene. Part (a) shows the dependence of $M_n$ and $M_w/M_n$ on conversion. Part (b) shows pseudofirst-order kinetics. T=110° C. FIG. 41 lists data showing the effects of halides in the CuBr-mediated isoprene polymerization in toluene.

Figure 42:
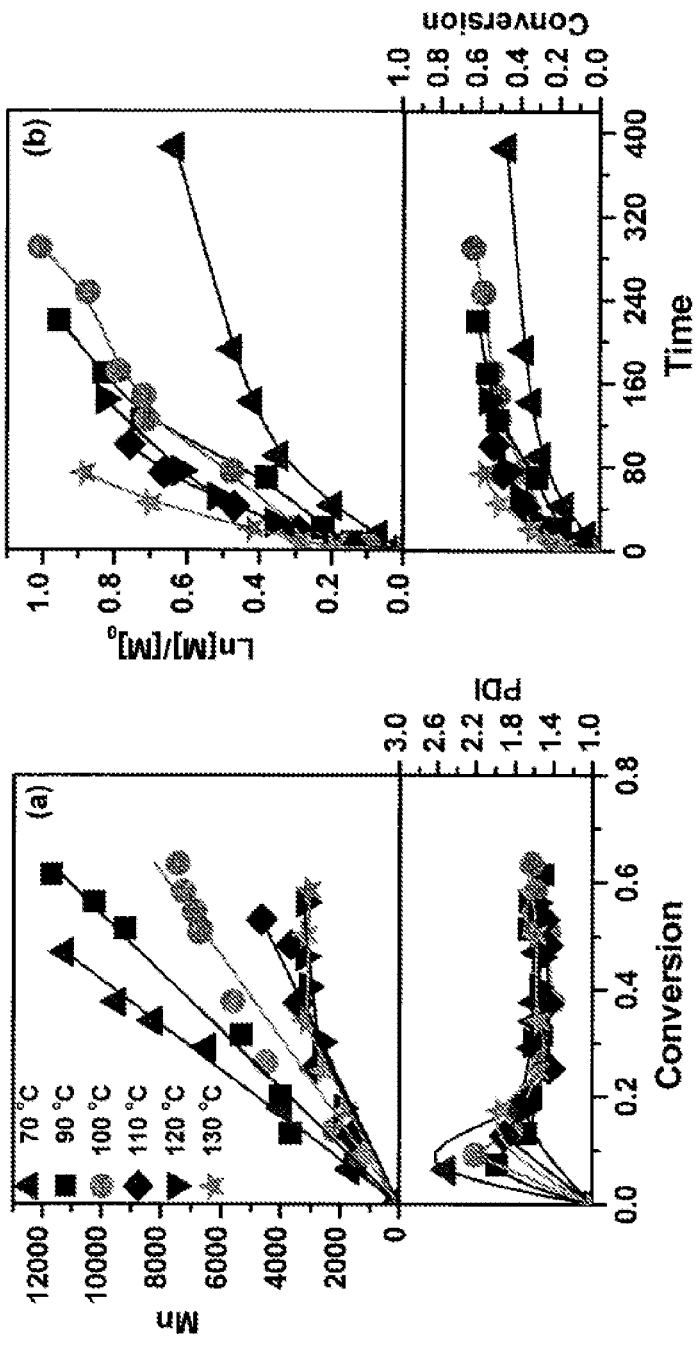
FIG. 42 graphically depicts the effect of temperature in the CuBr-mediated isoprene polymerization initiated from EtBriB. Part (a) shows the dependence of $M_n$ and $M_w/M_n$ on conversion. Part (b) shows pseudofirst-order kinetics. [ISO]/[EtBriB]/[CuBr]/[bpy]=100/1/1/3 in toluene.

FIG. 42 graphically depicts the effect of temperature in the CuBr-mediated isoprene polymerization initiated from EtBriB. Part (a) shows the dependence of $M_n$ and $M_w/M_n$ on conversion. Part (b) shows pseudofirst-order kinetics. [ISO]/[EtBriB]/[CuBr]/[bpy]=100/1/1/3 in toluene. FIG. 43 lists data showing the effects of temperature in the CuBr-mediated isoprene polymerization initiated from EtBriB.

Figure 44:
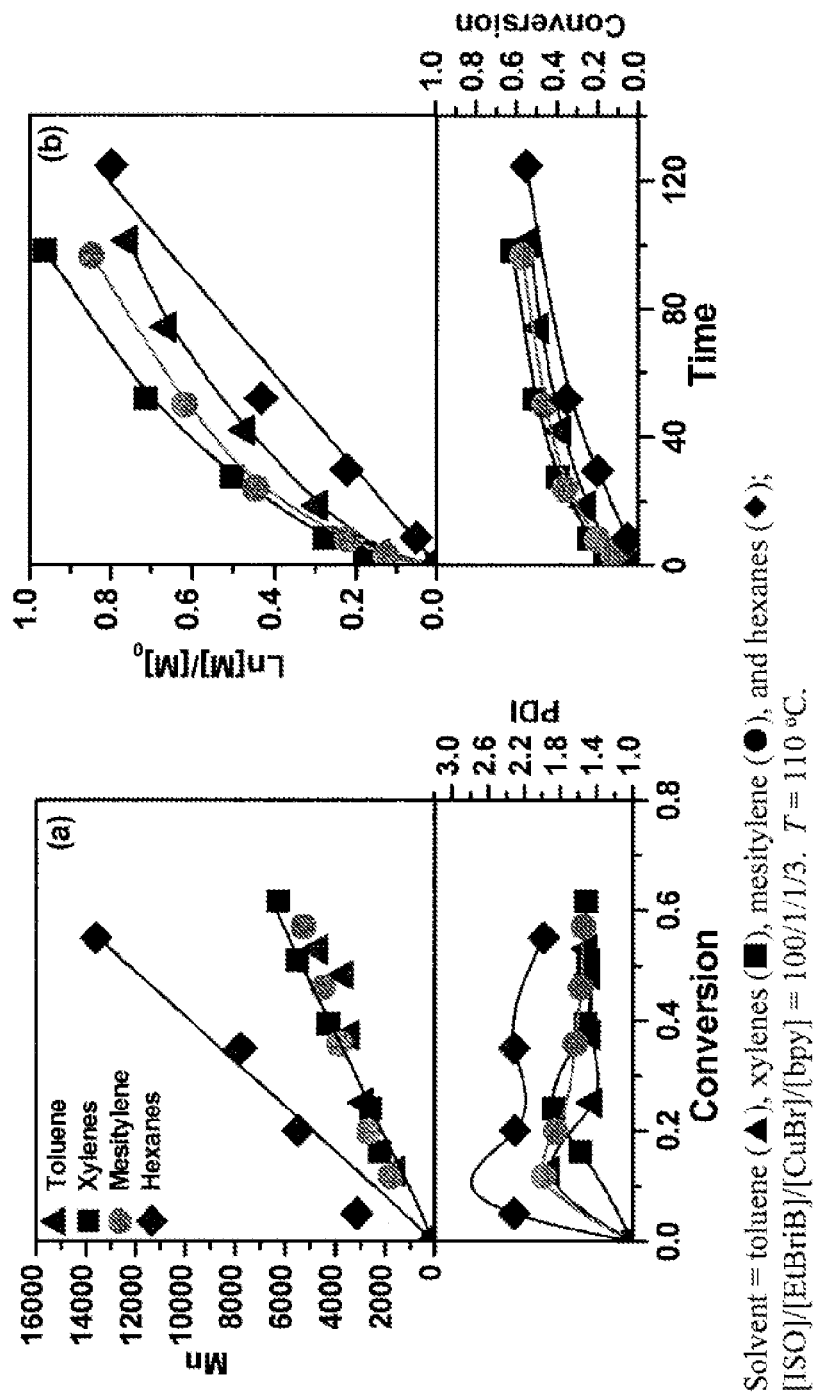
FIG. 44 graphically depicts the effect of non-polar solvents in the CuBr-mediated isoprene polymerization. Part (a) shows the dependence of $M_n$ and $M_w/M_n$ on conversion. Part (b) shows pseudofirst-order kinetics. [ISO]/[EtBriB]/[CuBr]/[bpy]=100/1/1/3, T=110° C.
Figure 45:
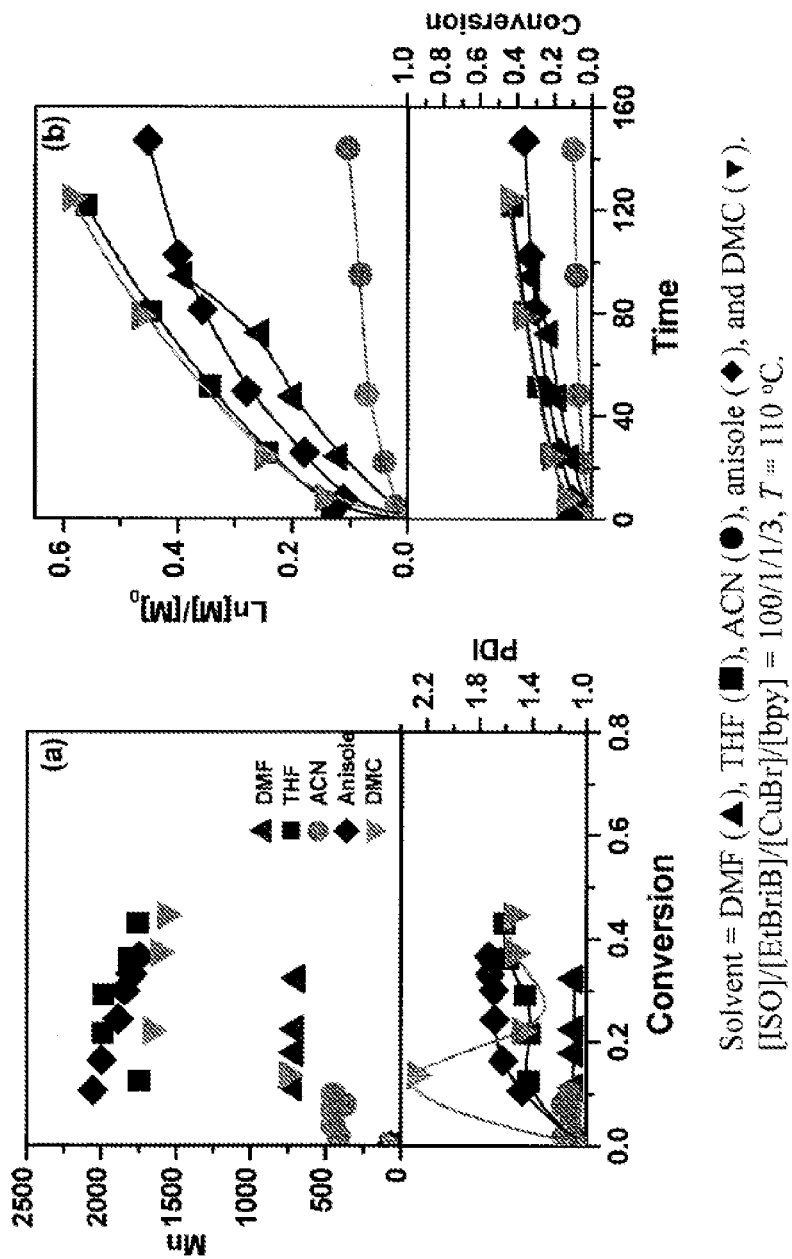
FIG. 45 sets forth the effect of polar solvents in the CuBr-mediated isoprene polymerization. Part (a) dependence of $M_n$ and $M_w/M_n$ on conversion. Part (b) shows pseudofirst-order kinetics. [ISO]/[EtBriB]/[CuBr]/[bpy]=100/1/1/3. T=110° C.

FIG. 44 graphically depicts the effect of non-polar solvents in the CuBr-mediated isoprene polymerization. Part (a) shows the dependence of $M_n$ and $M_w/M_n$ on conversion. Part (b) shows pseudofirst-order kinetics. [ISO]/[EtBriB]/[CuBr]/[bpy]=100/1/1/3, T=110° C. FIG. 45 sets forth the effect of polar solvents in the CuBr-mediated isoprene polymerization. Part (a) dependence of $M_n$ and $M_w/M_n$ on conversion. Part (b) shows pseudofirst-order kinetics. [ISO]/[EtBriB]/[CuBr]/[bpy]=100/1/1/3, T=110° C. FIG. 46 lists data showing the effect of non-polar and polar solvents in the CuBr-mediated isoprene polymerization.

Figure 47:
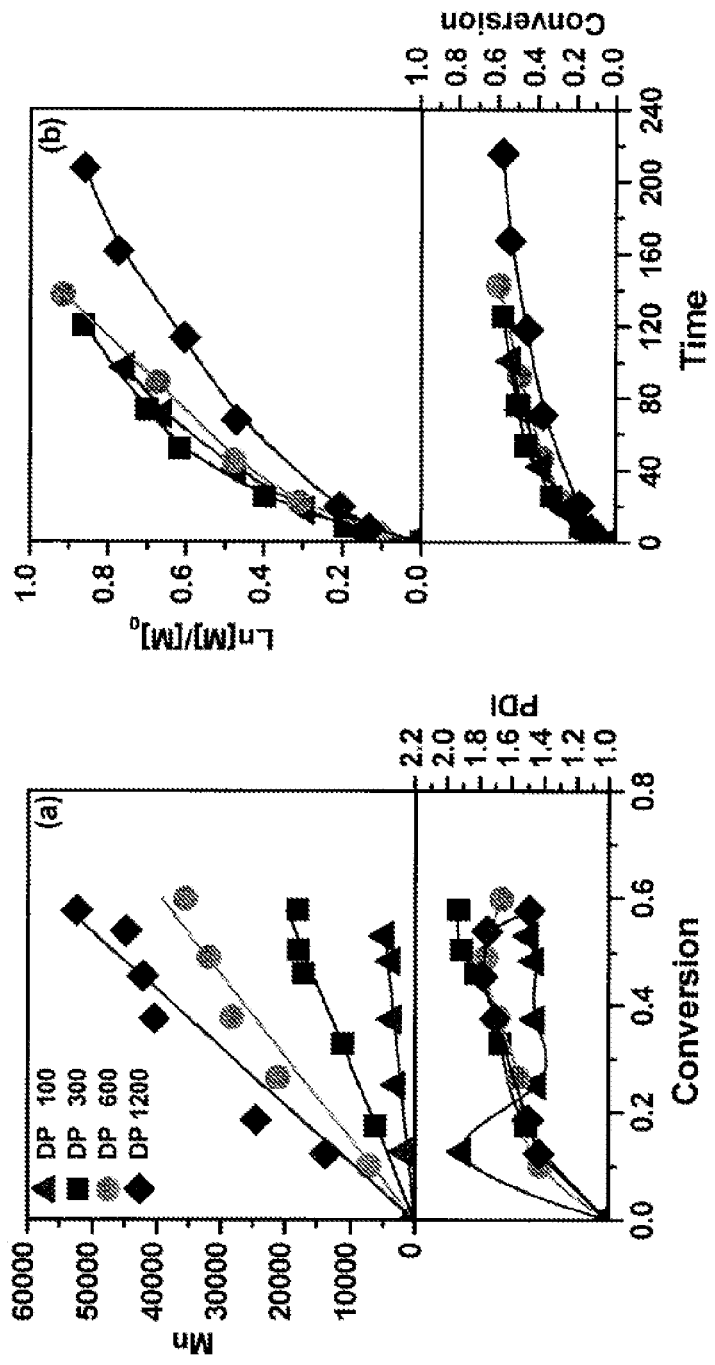
FIG. 47 graphically depicts the effect of [ISO]/[I] ratio in the CuBr-mediated isoprene polymerization initiated from EtBriB. Part (a) shows the dependence of $M_n$ and $M_w/M_n$ on conversion. Part (b) shows pseudofirst-order kinetics. T=110° C.

FIG. 47 graphically depicts the effect of [ISO]/[I] ratio in the CuBr-mediated isoprene polymerization initiated from EtBriB. Part (a) shows the dependence of $M_n$ and $M_w/M_n$ on conversion. Part (b) shows pseudofirst-order kinetics. T=110° C.

Figure 48:
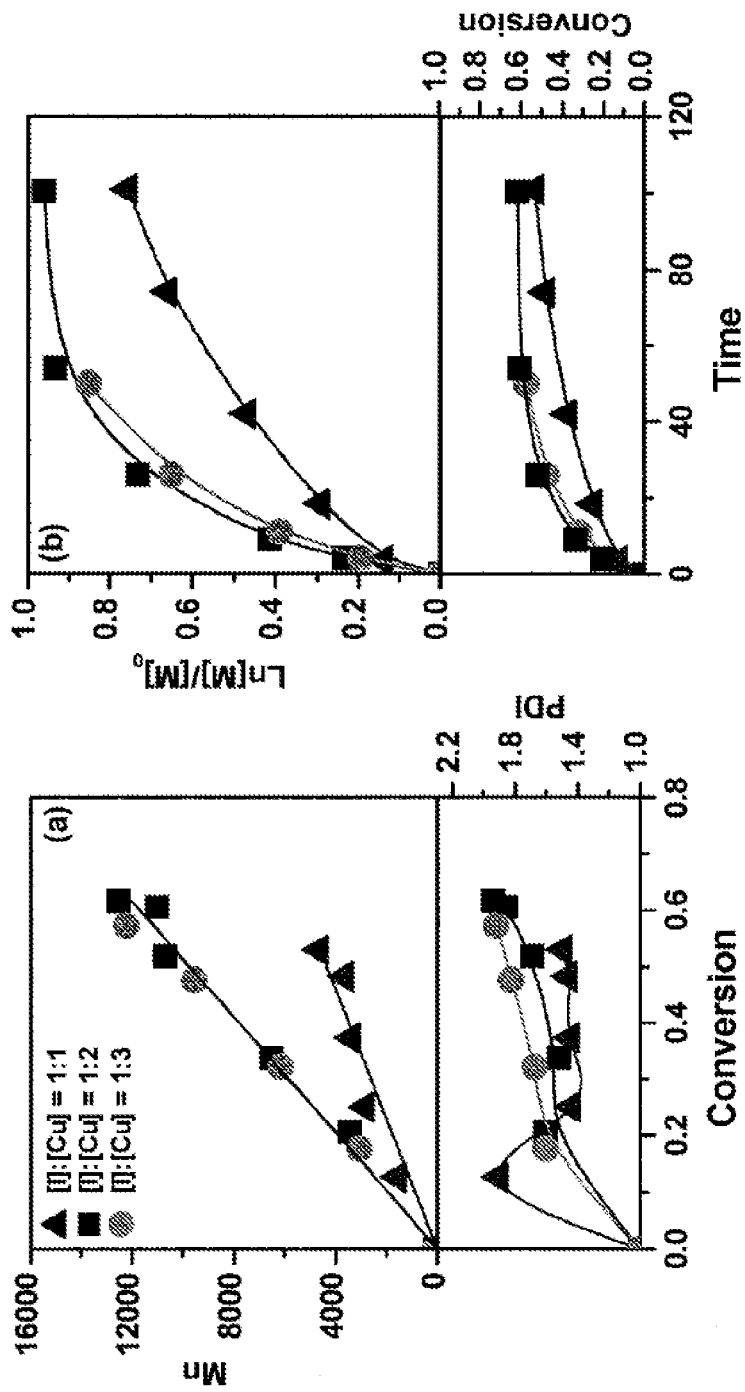
FIG. 48 graphically depicts the effect of [I]/[CuBr] ratio in the CuBr-mediated isoprene polymerization in toluene initiated from EtBriB. Part (a) shows the dependence of $M_n$ and $M_w/M_n$ on conversion. Part (b) shows pseudofirst-order kinetics. T=110° C.

FIG. 48 graphically depicts the effect of [I]/[CuBr] ratio in the CuBr-mediated isoprene polymerization in toluene initiated from EtBriB. Part (a) shows the dependence of $M_n$ and $M_w/M_n$ on conversion. Part (b) shows pseudofirst-order kinetics. T=110° C. FIG. 49 lists data showing the effect of [I]/[CuBr] ratio in the CuBr-mediated isoprene polymerization in toluene initiated from EtBriB.

Figure 50:
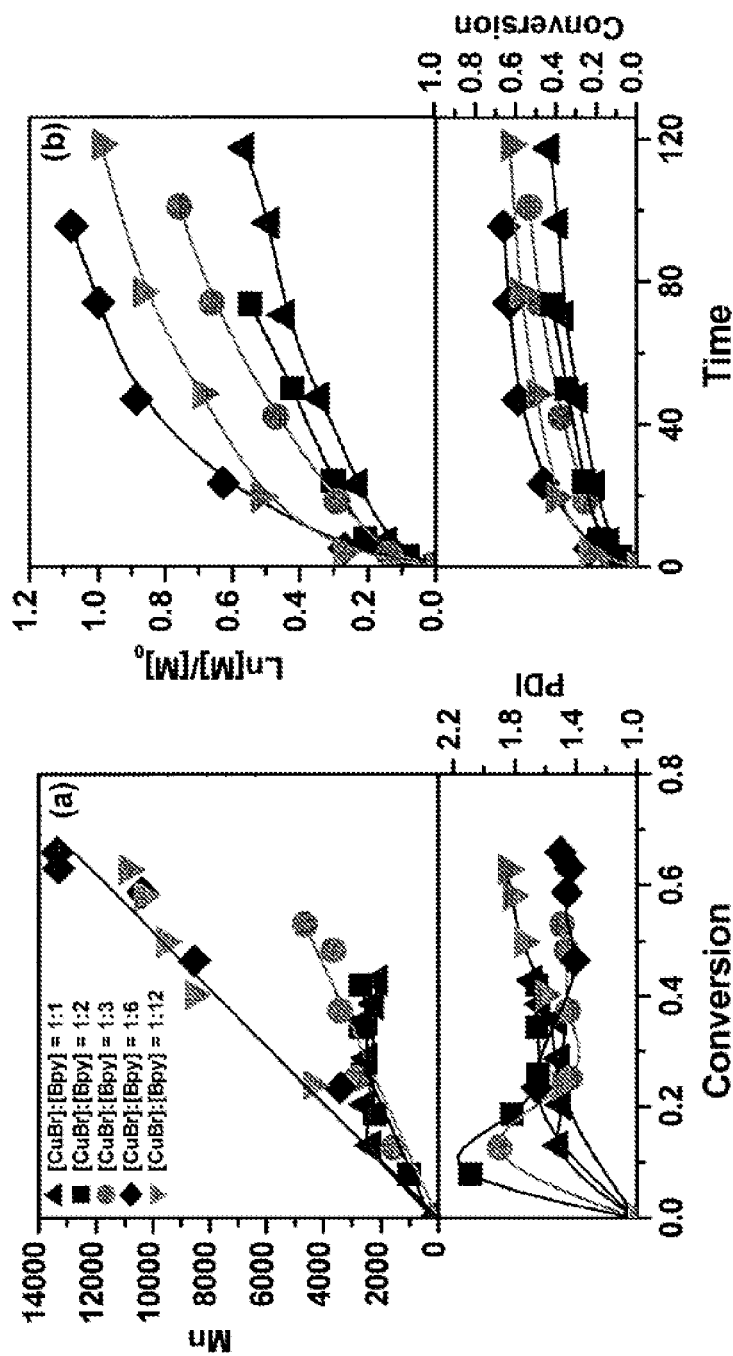
FIG. 50 graphically depicts the effect of [CuBr]/[bpy] ratio in the CuBr-mediated isoprene polymerization in toluene initiated from EtBriB. Part (a) shows the dependence of $M_n$ and $M_w/M_n$ on conversion. Part (b) shows pseudofirst-order kinetics. T=110° C.

FIG. 50 graphically depicts the effect of [CuBr]/[bpy] ratio in the CuBr-mediated isoprene polymerization in toluene initiated from EtBriB. Part (a) shows the dependence of $M_n$ and $M_w/M_n$ on conversion. Part (b) shows pseudofirst-order kinetics. T=110° C. FIG. 51 lists data showing the effect of [CuBr]/[bpy] ratio in the CuBr-mediated isoprene polymerization in toluene initiated from EtBriB.

Figure 52:
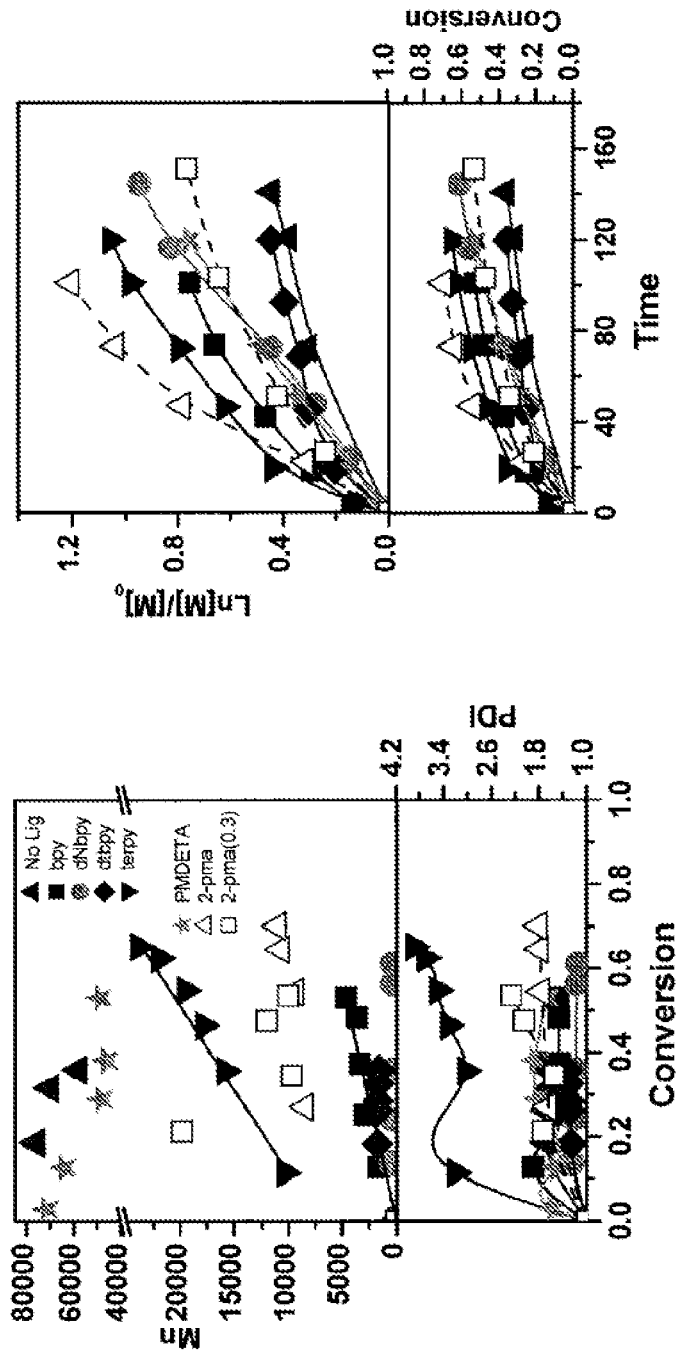
FIG. 52 graphically depicts the effect of ligands in the CuBr-mediated isoprene polymerization in toluene initiated from EtBriB. Part (a) shows the dependence of $M_n$ and $M_w/M_n$ on conversion. Part (b) shows pseudofirst-order kinetics. T=110° C.
Figure 53:
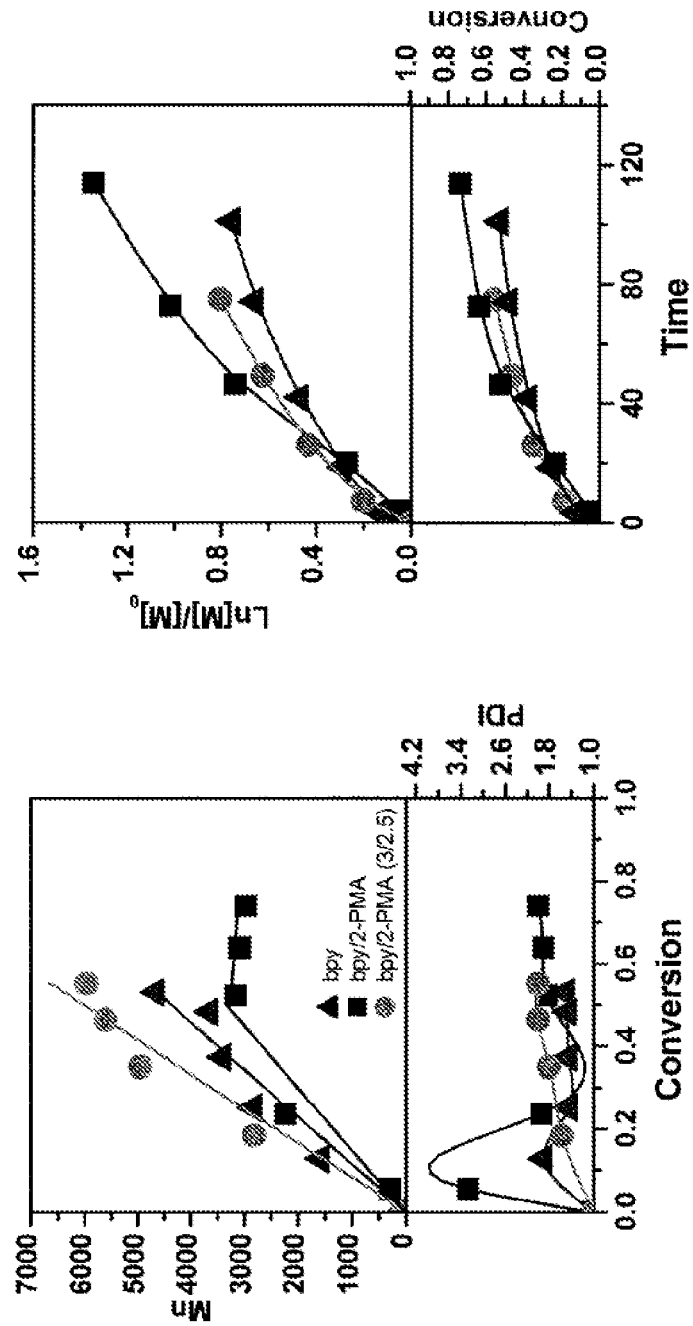
FIG. 53 graphically depicts the effect of mixed-ligands in the CuBr-mediated isoprene polymerization in toluene initiated from EtBriB. Part (a) shows the dependence of $M_n$ and $M_w/M_n$ on conversion. Part (b) shows pseudofirst-order kinetics. T=110° C.

FIG. 52 graphically depicts the effect of ligands in the CuBr-mediated isoprene polymerization in toluene initiated from EtBriB. Part (a) shows the dependence of $M_n$ and $M_w/M_n$ on conversion. Part (b) shows pseudofirst-order kinetics. T=110° C. FIG. 53 graphically depicts the effect of mixed-ligands in the CuBr-mediated isoprene polymerization in toluene initiated from EtBriB. Part (a) shows the dependence of $M_n$ and $M_w/M_n$ on conversion. Part (b) shows pseudofirst-order kinetics. T=110° C. FIG. 54 lists data showing the effect of ligands and mixed-ligands in the CuBr-mediated isoprene polymerization in toluene initiated from EtBriB.

Figure 55:
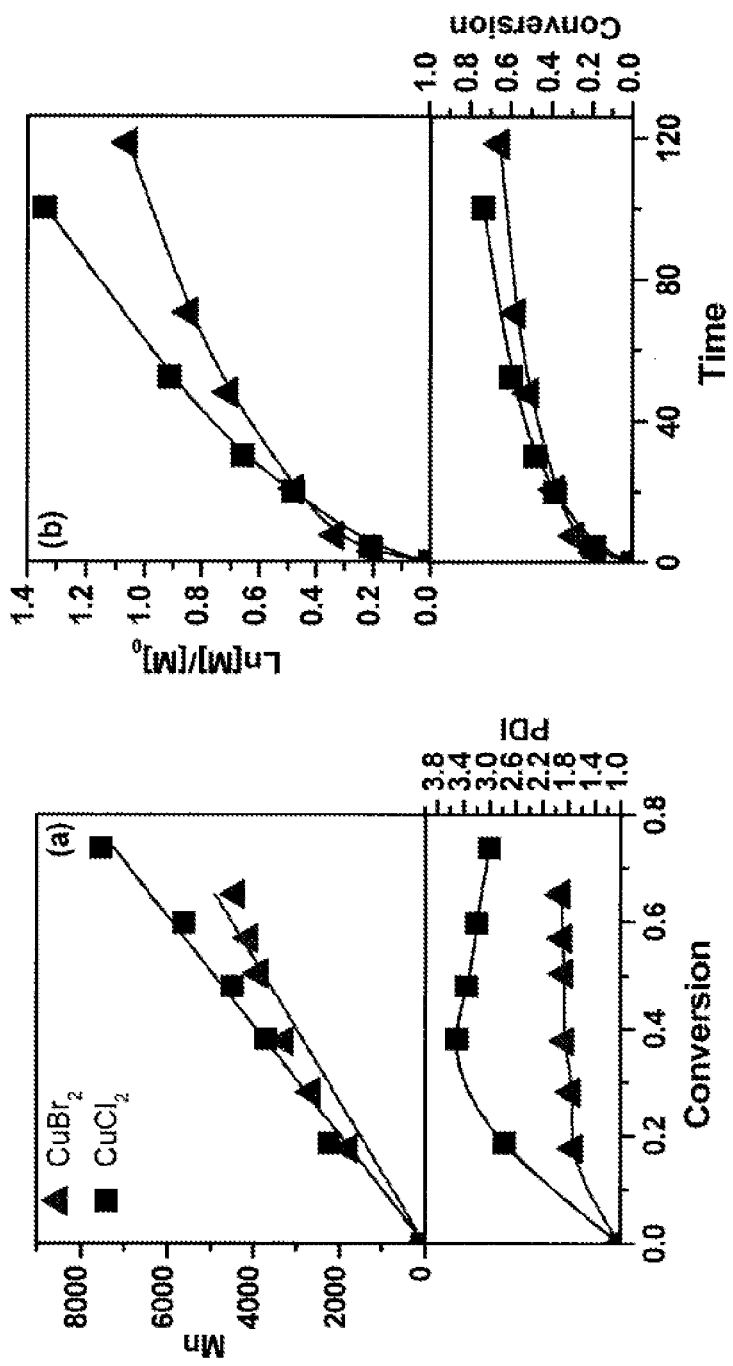
FIG. 55 graphically depicts $Cu^{II}$-mediated reverse ATRP of isoprene in toluene initiated from AIBN. Part (a) shows the dependence of $M_n$ and $M_w/M_n$ on conversion. Part (b) shows pseudofirst-order kinetics. T=110° C.

FIG. 55 graphically depicts $Cu^{II}$-mediated reverse ATRP of isoprene in toluene initiated from AIBN. Part (a) shows the dependence of $M_n$ and $M_w/M_n$ on conversion. Part (b) shows pseudofirst-order kinetics. T=110° C.

Figure 56:
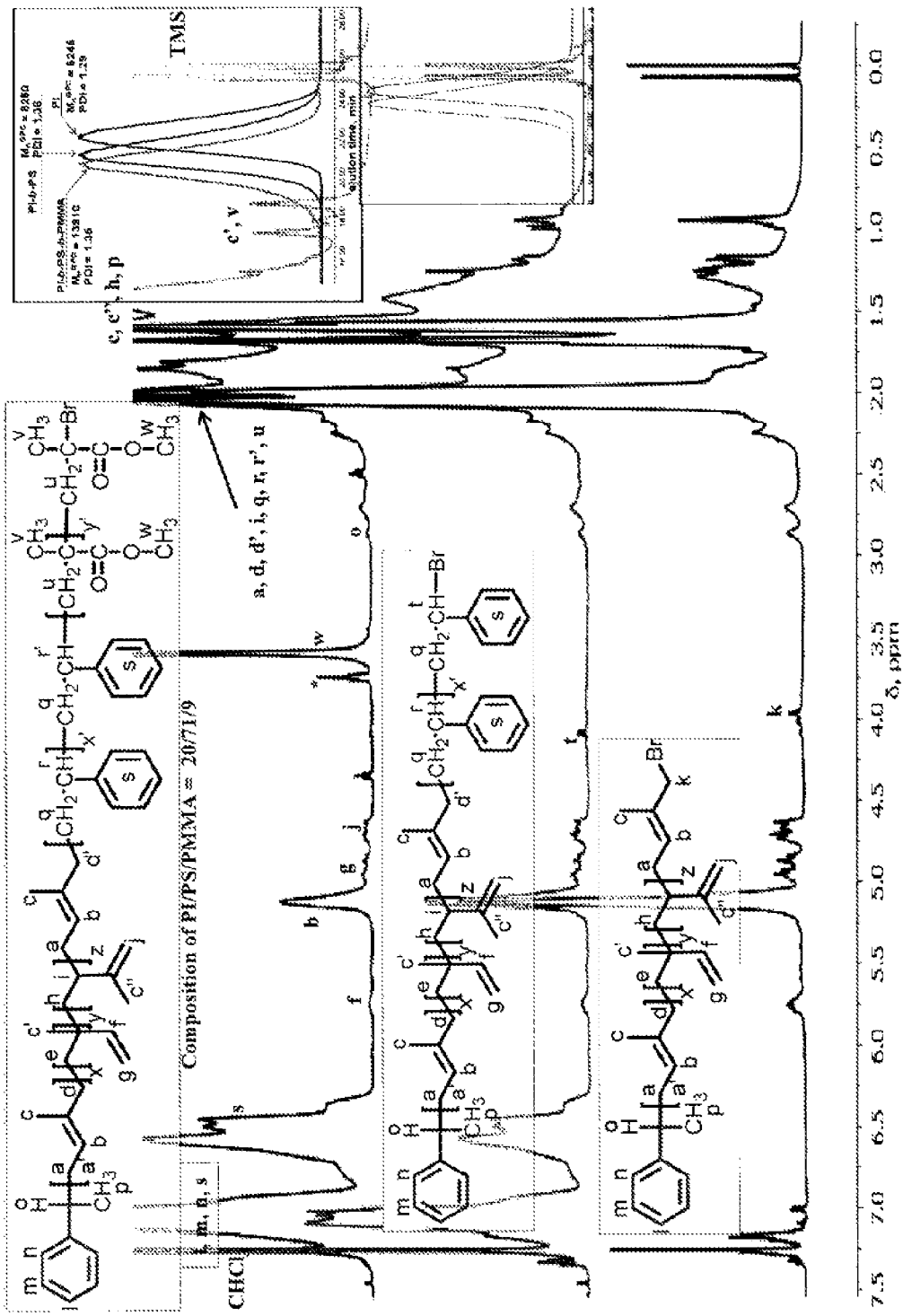
FIG. 56 depicts $^1$H NMR spectra of bromine terminated polyisoprene, bromine terminated (polyisoprene-b-polystyrene) and of polyisoprene-b-polystyrene-b-poly(methyl methacrylate) prepared in accordance with the processes of this disclosure.
Figure 57:
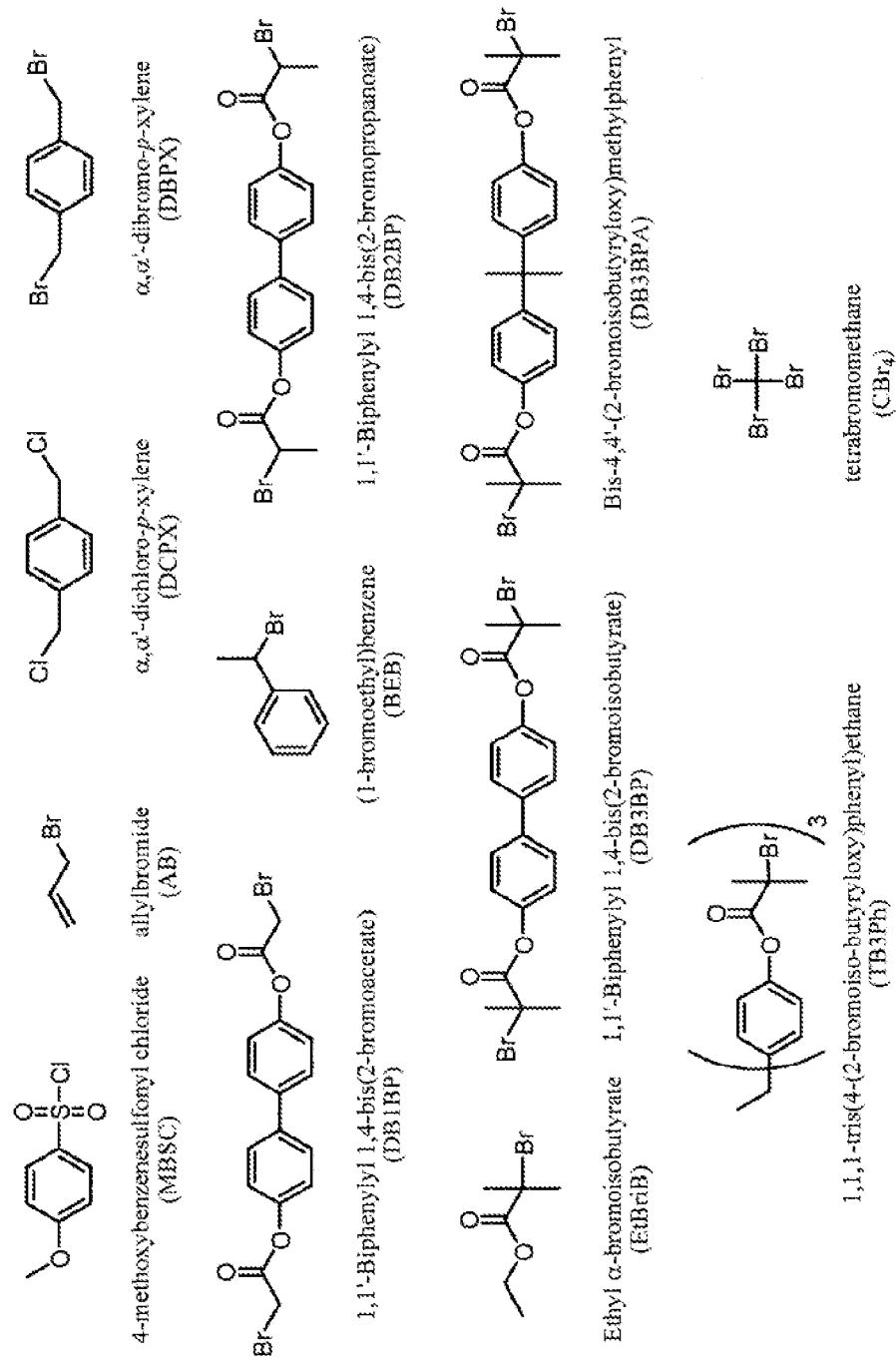
FIG. 57 depicts illustrative initiator structures useful in the processes of this disclosure.
Figure 58:
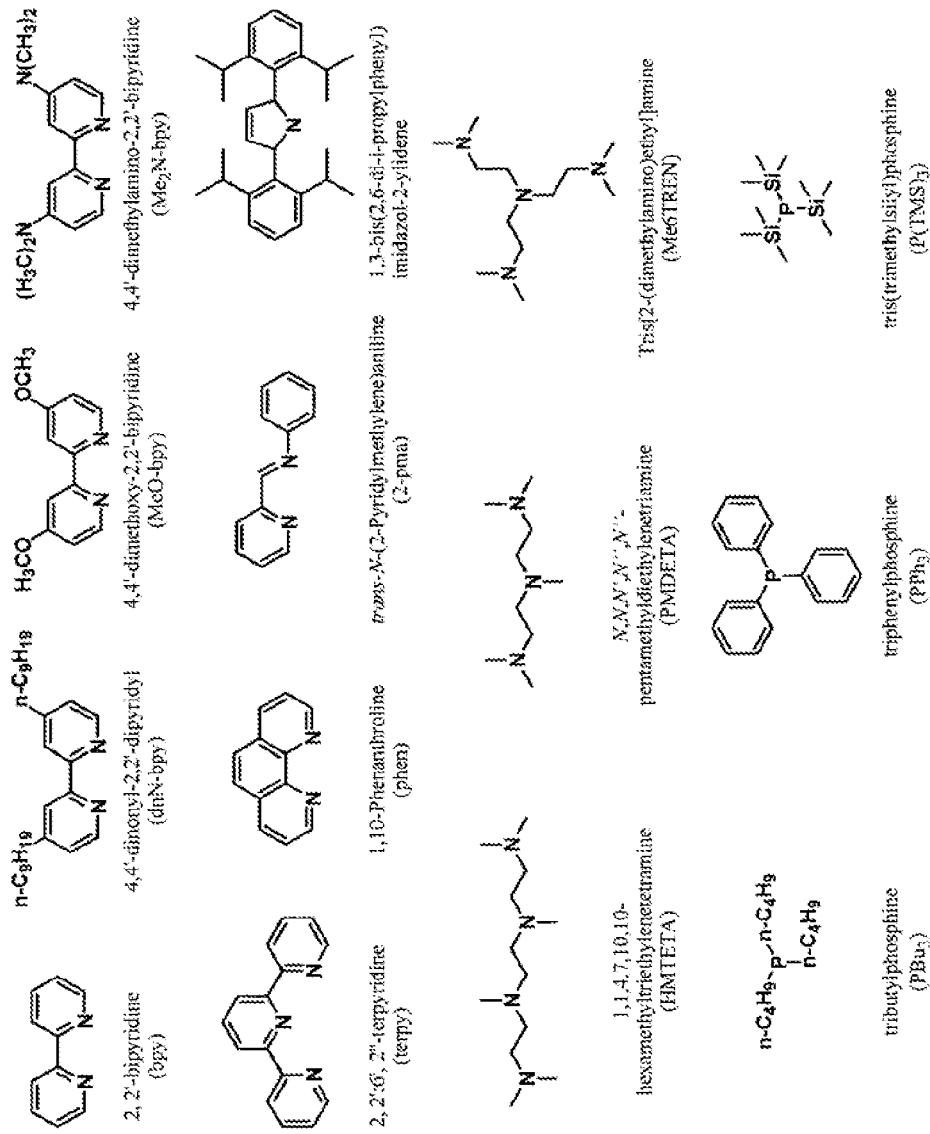
FIG. 58 depicts illustrative ligand structures useful in the transition metal compound catalysts used in the processes of this disclosure.
Figure 59:
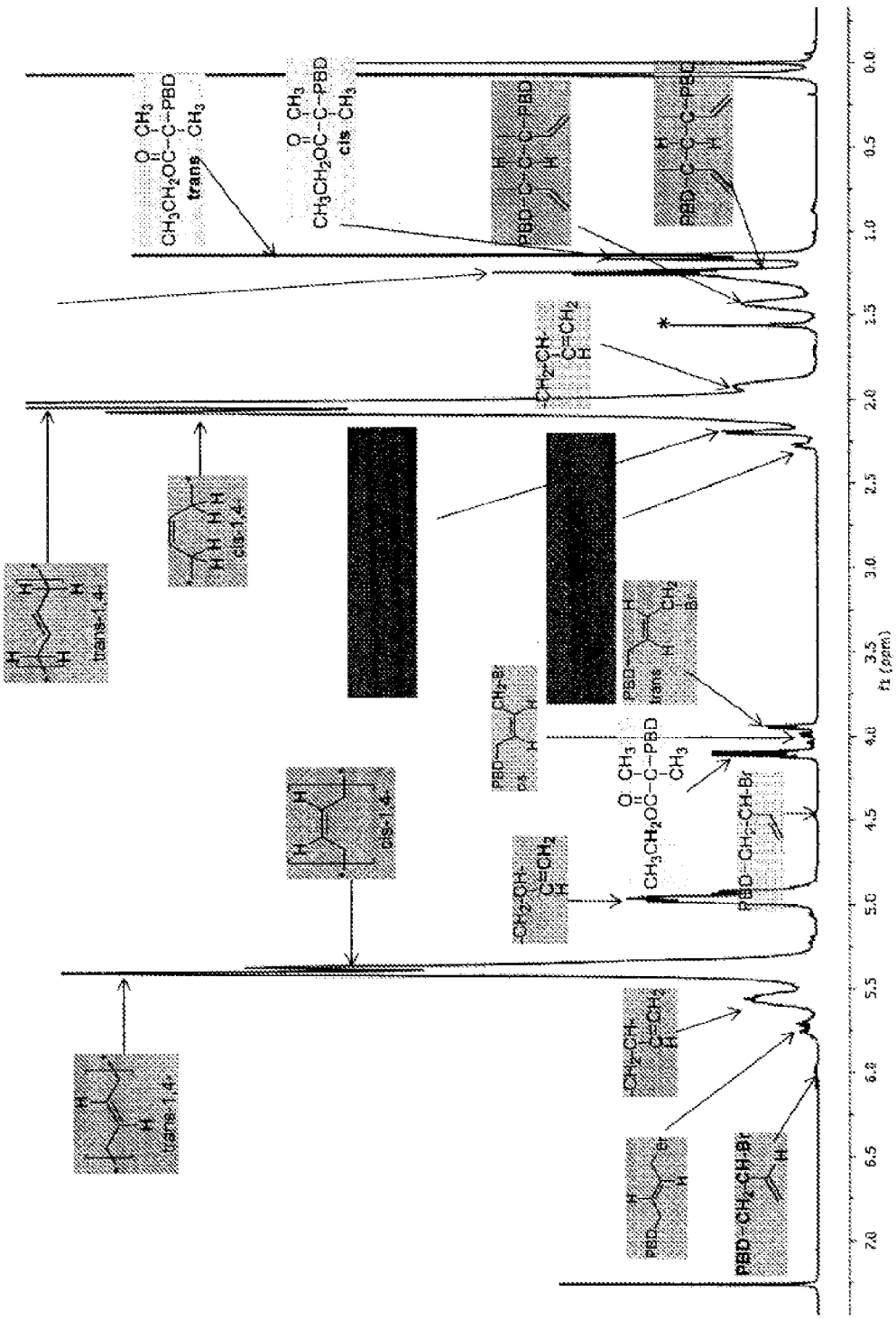
FIG. 59 depicts $^1$H NMR spectra of PBD initiated from ethyl α-bromoisobutyrate (EtBriB) initiators for normal ATRP useful in the processes of this disclosure.
Figure 60:
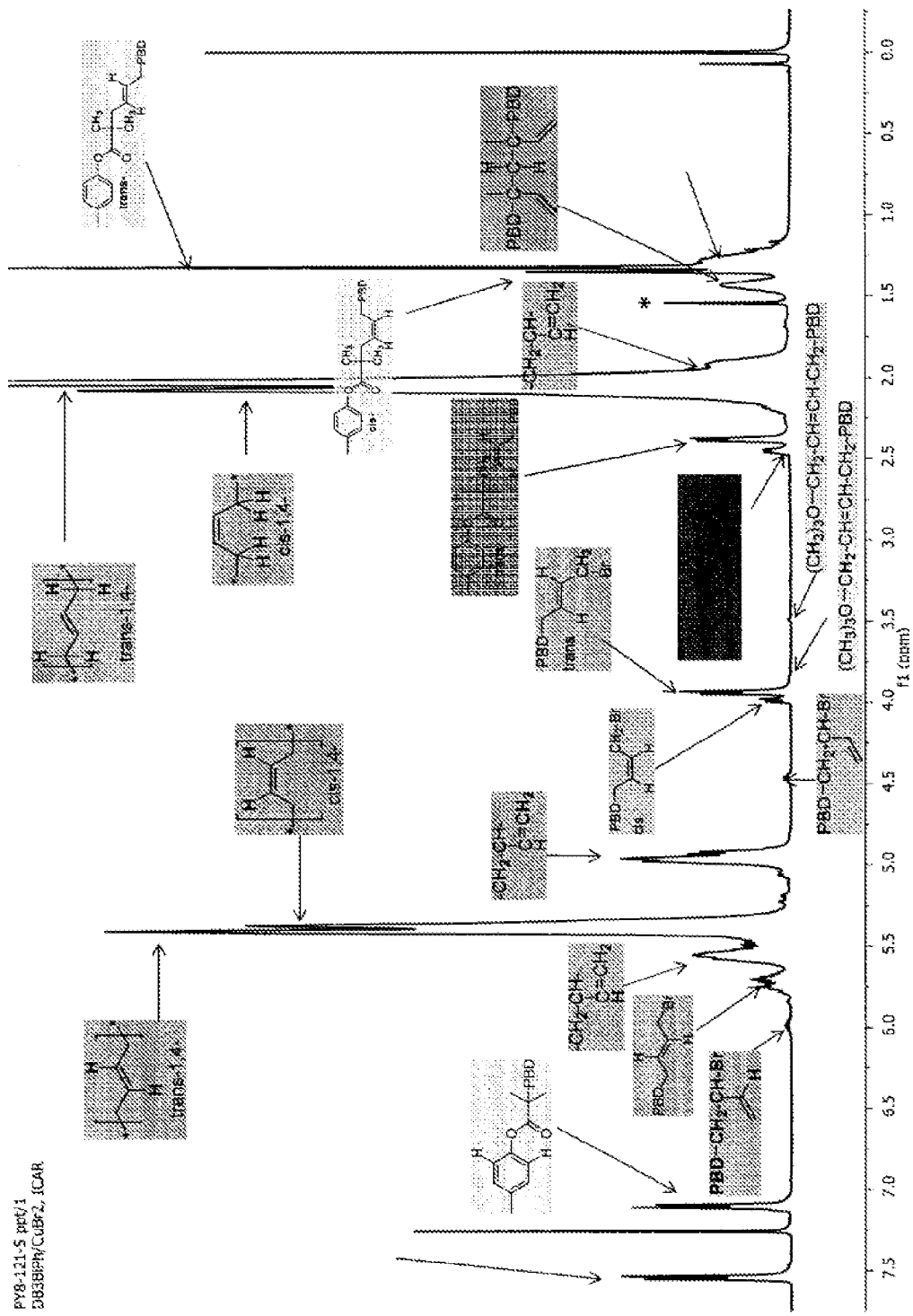
FIG. 60 depicts $^1$H NMR spectra of PBD initiated from 1,1'-biphenyl 1,4-bis(2-bromoisobutyrate) (DB3BiPh) initiators for ICAR (initiators for continuous activator regeneration) ATRP useful in the processes of this disclosure.

FIG. 56 depicts $^1$H NMR spectra of bromine terminated polyisoprene, bromine terminated (polyisoprene-b-polystyrene) and of polyisoprene-b-polystyrene-b-poly(methyl methacrylate) prepared in accordance with the processes of this disclosure.

A number of mono, di and trifunctional halides (MBSC, EtBriB, BEB, AB, CBr$_4$, DCPX, DBPX, DB1BP, DB2BP, DB3BP, DB3BPA, TB3PM, etc.) were evaluated as initiators. As a prelude to reaction optimization, MBSC, EtBriB, BEB, AB, DCPX, DBPX and DB3BP were first tested as BD-ATRP initiators in one-data-point experiments, using a classic set of stoichiometric ATRP conditions ([BD]/[I]/

[CuBr or CuCl]/[bpy]=100/1/1/3) at 110° C. in toluene. In all cases, the presence of the initiator fragments and halide chain ends, as well as the typical free radical distribution of the isomeric BD units in the main chain, confirmed the successful initiation and respectively, the radical ATRP mechanism.

Figure 61:
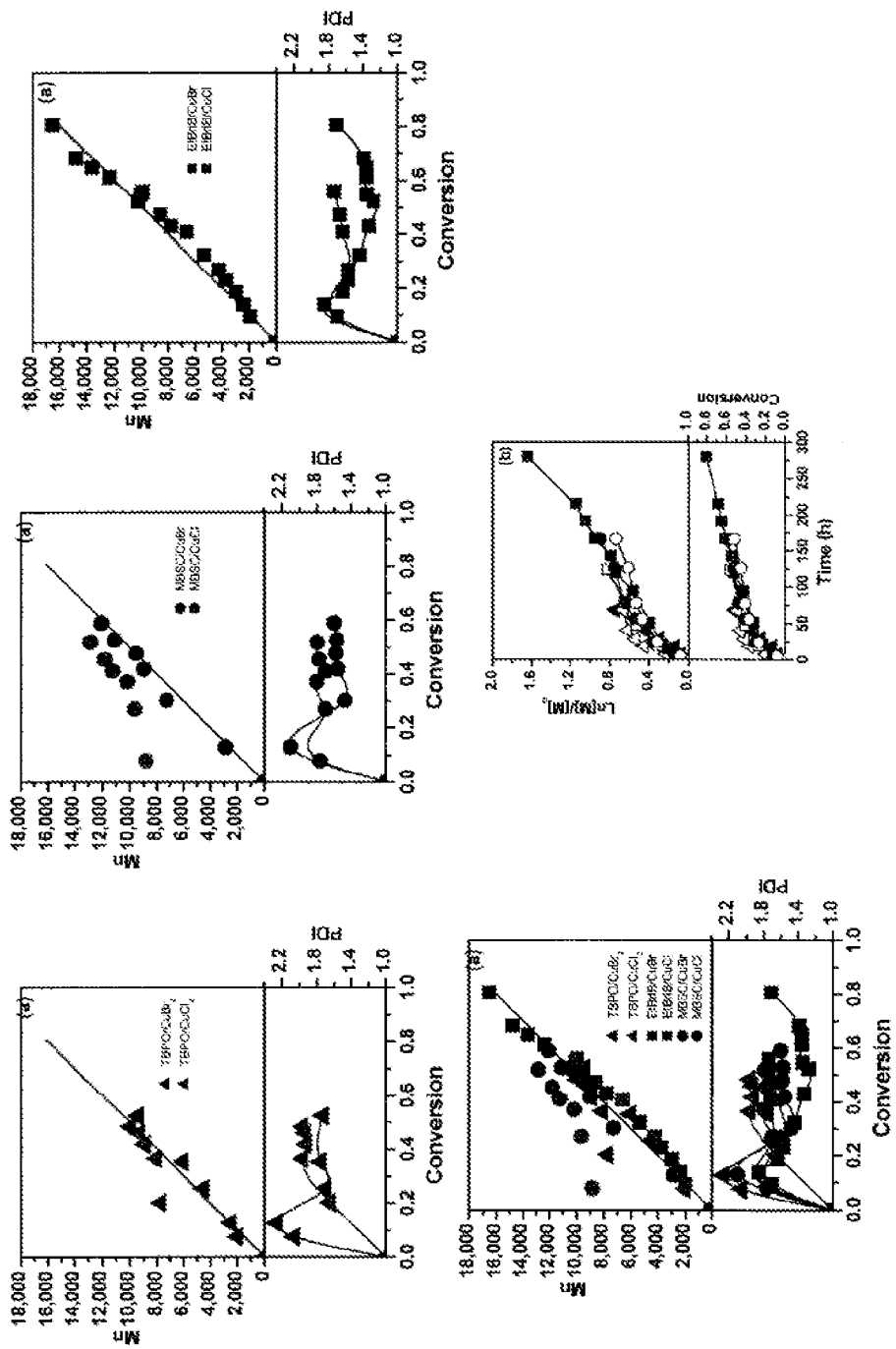
FIG. 61 depicts the effect of halides in TBPO reverse, MBSC and EBIB ATRP in accordance with the processes of this disclosure.
Figure 62:
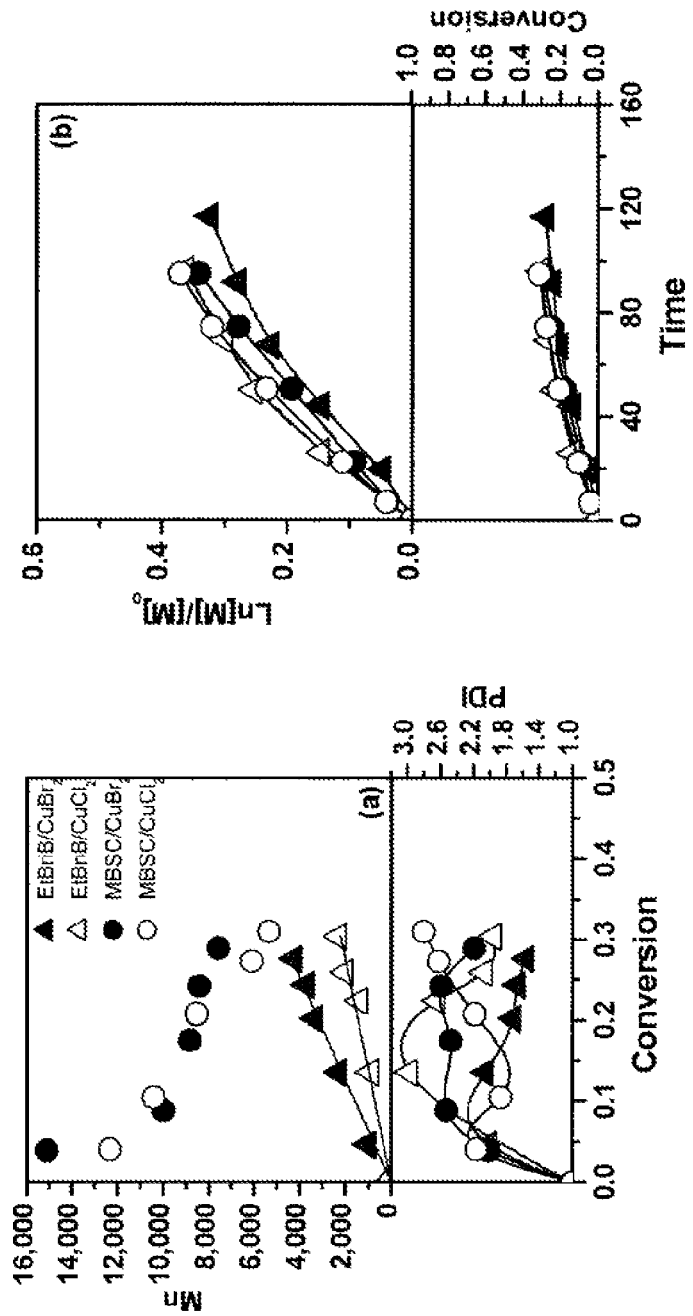
FIG. 62 depicts the effect of halides in the CuX-mediated butadiene polymerization in toluene initiated from EtBriB and MBSC, in accordance with the processes of this disclosure. Part (a) shows the dependence of $M_n$ and $M_w/M_n$ on conversion. Part (b) shows pseudofirst-order kinetics.
Figure 63:
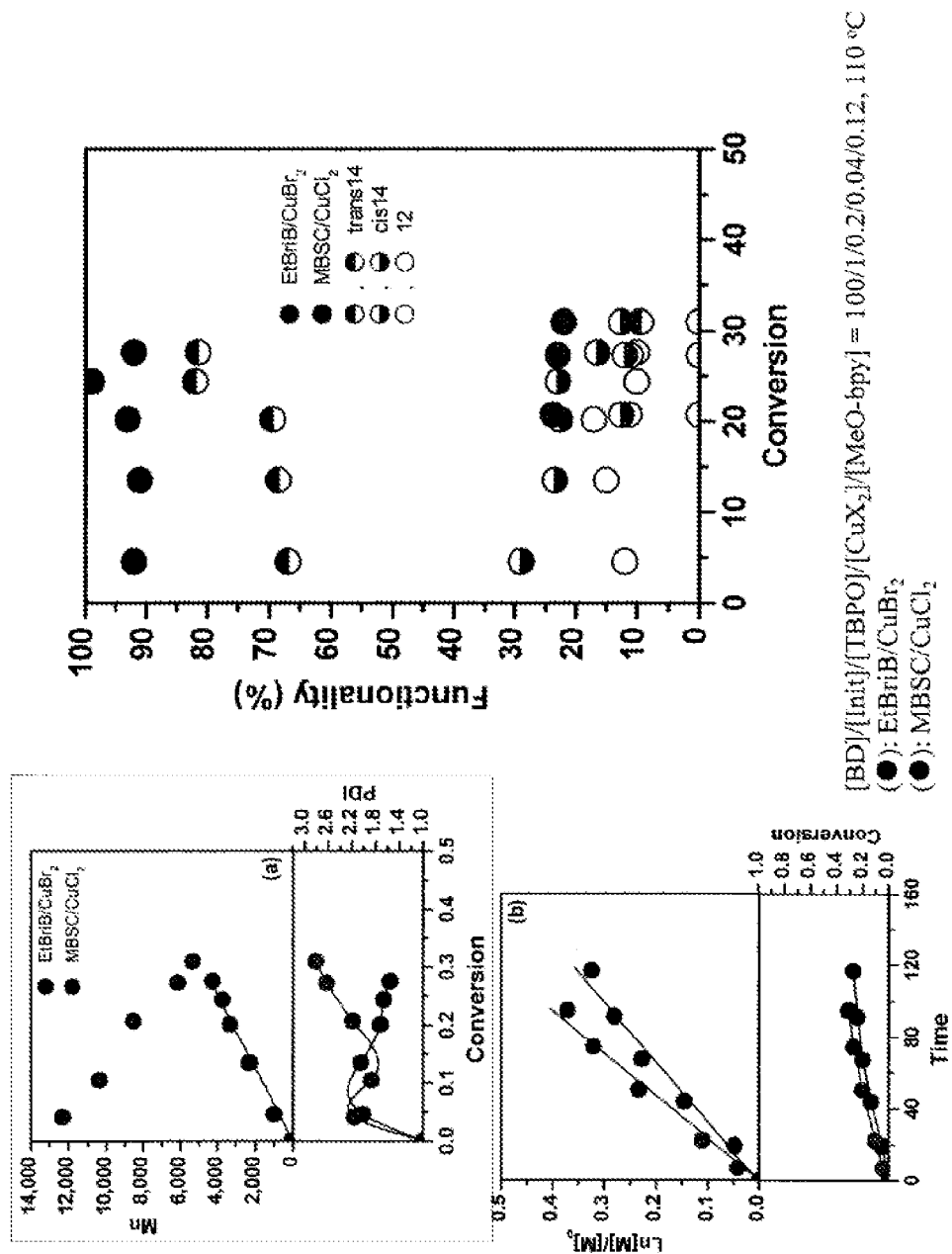
FIG. 63 depicts an ICAR functionality comparison of Br/Br versus Cl/Cl, in accordance with the processes of this disclosure.

As the $K_{deact\ CuX2}^{PBD}$ (or the chain transfer constant of $CuX_2$ towards $PBD^{\bullet}$) is not known, in order to evaluate the effect of the nature of the halide of the R—X initiator and of the CuX catalyst on the deactivation efficiency of the allelic $PBD^{\bullet}$ radicals by $CuX_2$/bpy (X=Cl, Br), a series of >10 butadiene polymerizations were sampled kinetically, first in reverse ATRP ([BD]/[TBPO]/[$CuX_2$]/[bpy]=100/1/2/6), and subsequently in both conventional ATRP ([BD]/[R—Y]/[CuX]/[L]=100/1/1/3) and ICAR-ATRP ([BD]/[R—Y]/[TBPO]/[$CuX_2$]/[L]=100/1/0.2/0.04/1.2) with various (R—Y=MBS—Cl, EBriB, X=Cl, Br, L=bpy, MeO-bpy combinations. See FIGS. 61-63.

Accordingly, while TBPO/$CuCl_2$ and MBSC/CuCl provided non-linear kinetics, a poor $M_n$ profile, as well as broader PDI, a CRP with a linear dependence of $M_n$ on conversion narrower PDI, and linear kinetics were observed for TBPO/$CuBr_2$, MBSC/CuBr, EBriB/CuCl and EBriB/CuBr.

Likewise, in ICAR-ATRP (FIG. 62) where the dominant halide chain end (>95%) is derived from the R—X initiator not $CuX_2$, while very similar, linear kinetics were observed with both $CuCl_2$ and $CuBr_2$, MBSCl presented a free radical polymerization with chain transfer to the initiator, whereas a CRP with a linear dependence of $M_n$ on conversion was seen for EtBriB. Moreover, an NMR kinetic investigation of the total halide chain end functionality (CEF, see FIG. 63), revealed that $CEF_{CuBr2}^{EtBrib}$=~90%>>$CEF_{CuCl2}^{MBSCl}$=~25%, irrespective of conversion.

Thus, the superiority of bromine as a preferred halide for BD-ATRP is supported by both the TBPO/$CuBr_2$>TBPO/$CuCl_2$, EtBriB/CuBr>MBSC/CuBr>EtBriB/CuCl>MBSC/CuCl, and EtBriB/$CuBr_2$>EtBriB/$CuCl_2$>>MBSC/$CuBr_2$>MBSC/$CuCl_2$ trends in the PDI values for both ATRP methods, as well as by the EtBriB/$CuBr_2$>>MBSC/$CuCl_2$ ICAR-CEF values, and is consistent with $CuCl_2$ being a poorer deactivator ($k_{deact}^{CuBr2}/k_{deact}^{CuCl2}$>1, $K_{ATRP}^{RBr/CuBr}/K_{ATRP}^{RCl/CuCl}$~10, and especially $K_{ATRP}^{CuBr2,\ TPMA\ Allyl-Br,\ 22°\ C}/K_{ATRP\ CuCl,\ TPMA}^{Allyl-Cl,\ 22°\ C}$=7.39) than $CuBr_2$ with both bpy and MeO-bpy ligands.)

Figure 64:
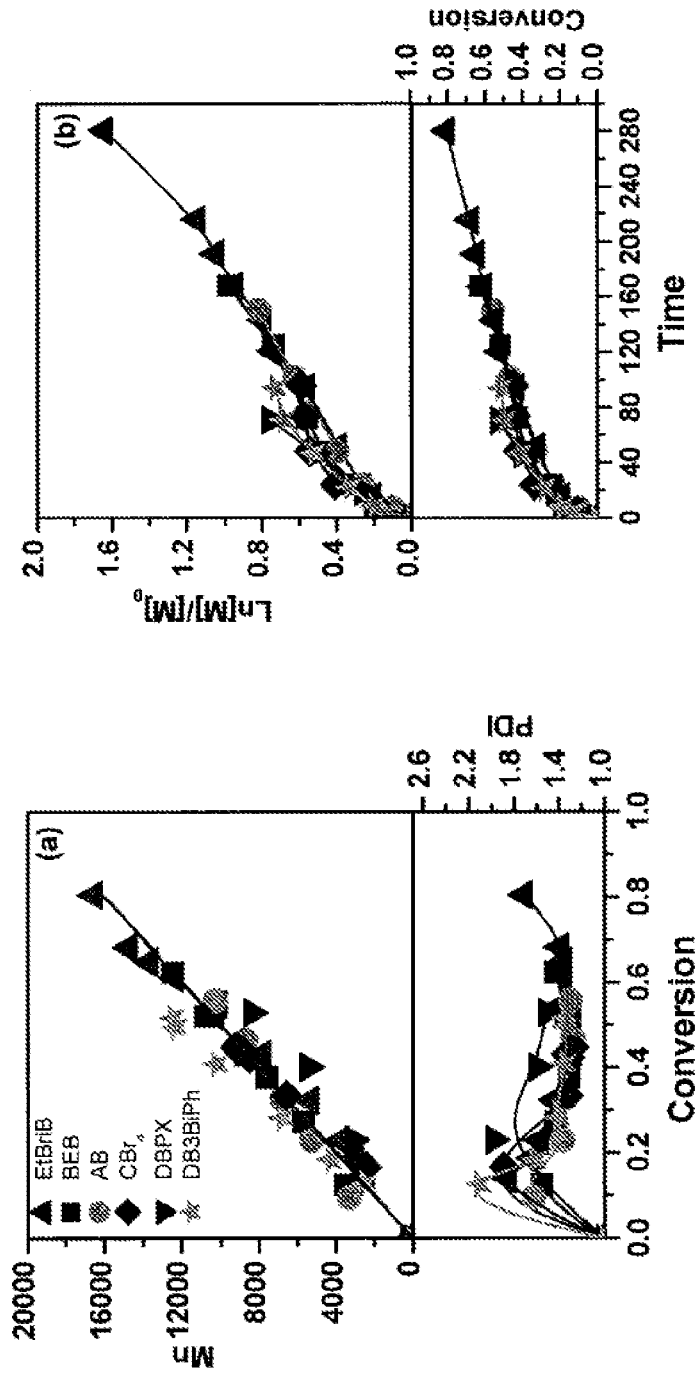
FIG. 64 depicts the effect of initiators in the CuBr-mediated butadiene polymerization in toluene in accordance with the processes of this disclosure. Part (a) shows dependence of $M_n$ and $M_w/M_n$ on conversion. Part (b) shows pseudofirst-order kinetics.
Figure 65:
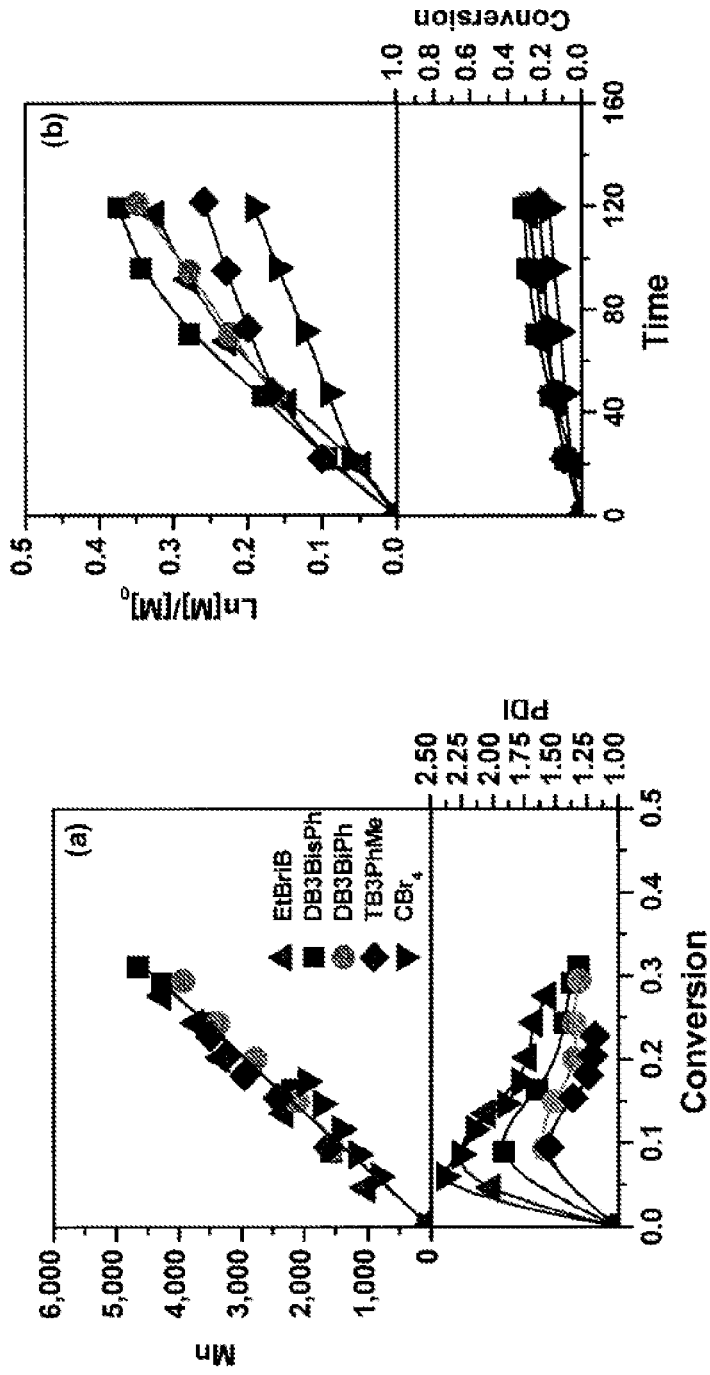
FIG. 65 depicts the effect of initiator in the CuBr-mediated butadiene polymerization in toluene in accordance with the processes of this disclosure. Part (a) shows (a) dependence of $M_n$ and $M_w/M_n$ on conversion. Part (b) shows pseudofirst-order kinetics.

Thus, further optimization was carried out only with R—Br/CuBr pairs. Selected examples of the kinetics of conventional ATRP and ICAR-ATRP are presented in FIGS. 64 and 65.

In normal ATRP (RBr=AB, BEB, EtiBrB, $CBr_4$, DBPX and DB3BP), a linear dependence of $M_n$ on conversion, in conjunction with reasonably narrow PDI values of ~1.4 (unprecipitated samples) at conversions up to at least 70% was observed in all cases. Moreover, since all initiators generate radicals more reactive than the propagating PBD allyl radical, they are all as effective in adding to butadiene. Thus, they all present very similar values of the initiator efficiency (IE=$M_n^{Theor}/M_n^{exp\ GFC,Pst}$IE~0.3 by GPC vs. PSt standards) and ensure that, as required for CRP, the rate of initiation is faster than the rate of propagation. In fact, GPC calibrated with PSt standards overestimates Mn, and thus, the real values of the IE should be larger.

In ICAR-ATRP (RBr=DB1BP, DB2BP, DBPX, EtEriB, DB3BP, DB3BPA, $CBr_4$ and TB3PM), the effect of primary, secondary and tertiary bromides, as well as that of mono, di and trifunctional tertiary bromoester initiators was additionally evaluated with DB1BP/DB2BP/DB3BP or DBPX/BEB and respectively with EtBriB/DB3BP/TB3PM comparisons. As such, consistent with the slower activation of primary and secondary alkyl halides, a pseudo FRP was observed for the primary DB1BP and DBPX. Moreover, while both secondary BEB and DB2BP provided CRPs, BEB was a less efficient initiator. By contrast, while the dormant PBD-Br chain is predominantly primary, the reversible activation/deativation cycle still occurs efficiently, due to the lower bond dissociation energy of the allyl halide. While all other initiators also provided a CRP with a clear dependence of $M_n$ on conversion, qualitatively, the PDI values decreased not only with initiator reactivity, but also with increasing the initiator functionality, i.e. $PDI_{EtBriB}$~1.5>$PDI_{DB3BP}$~1.3>$PDI_{TB3PM}$~1.2, albeit also with decreasing the R—Br/$CuBr_2$ ratio per functional group. Conversely, very similar rates were observed for EtBriB, DB3BP, DB3BPA, TB3PM, EBIB, while slower rates were obtained for $CBr_4$, DB1BP, DB2BP. The kinetics were linear in all cases, except for an upwards curvature on DB2BP and slight downward curvature for TB3PM. TB3PM also represents the first example of a star polybutadiene prepared by ATRP.

A comparison of the same initiators in both normal and ICAR-ATRP reveals that at the same temperature, solvent and DP, while both systems present very similar values of the IE=0.3-0.4, due to the lower amount of catalyst, ICAR polymerizations are slightly more selective, i.e., more sensitive to the nature of the initiator (e.g. DBPX and BEB), and also slower (TBPO-dependent) than normal ATRP.

As such, the ubiquitous EtBriB initiator and its difunctional analogs DB3 were used in subsequent ATRP and ICAR experiments.

Ligands and solvents are tremendously important parameters in ATRP. Indeed, while their influence on $k_{deact}$ is relatively weak by comparison, they affect $k_{act}$ and $K_{ATRP}$ of styrene and (meth)acrylates over many orders of magnitude. However, while dienes should parallel these trends, due to the increased propensity of sterically unencumbered primary (1,4-PBD) and secondary (1,2-PBD) allyl halides to nucleophilic substitutions as well as to dehydrohalogenations driven by the formation of conjugated terminal double bonds or allenes, they represent an extreme case. As such, by contrast to conventional monomers, the ligand and solvent effects for dienes are significantly modulated by the amines and phosphines additionally acting as bases or nucleophiles in polar solvent assisted chain end quarternizations and dehydrohalogenations, as well as by $CuX_2$/L induced oxidations, β-H abstractions, or potential CuX/diene complexation. Likewise, the relatively stable allyl radical also implies comparatively slower deactivation and faster activation vs. other monomers.

Figure 66:
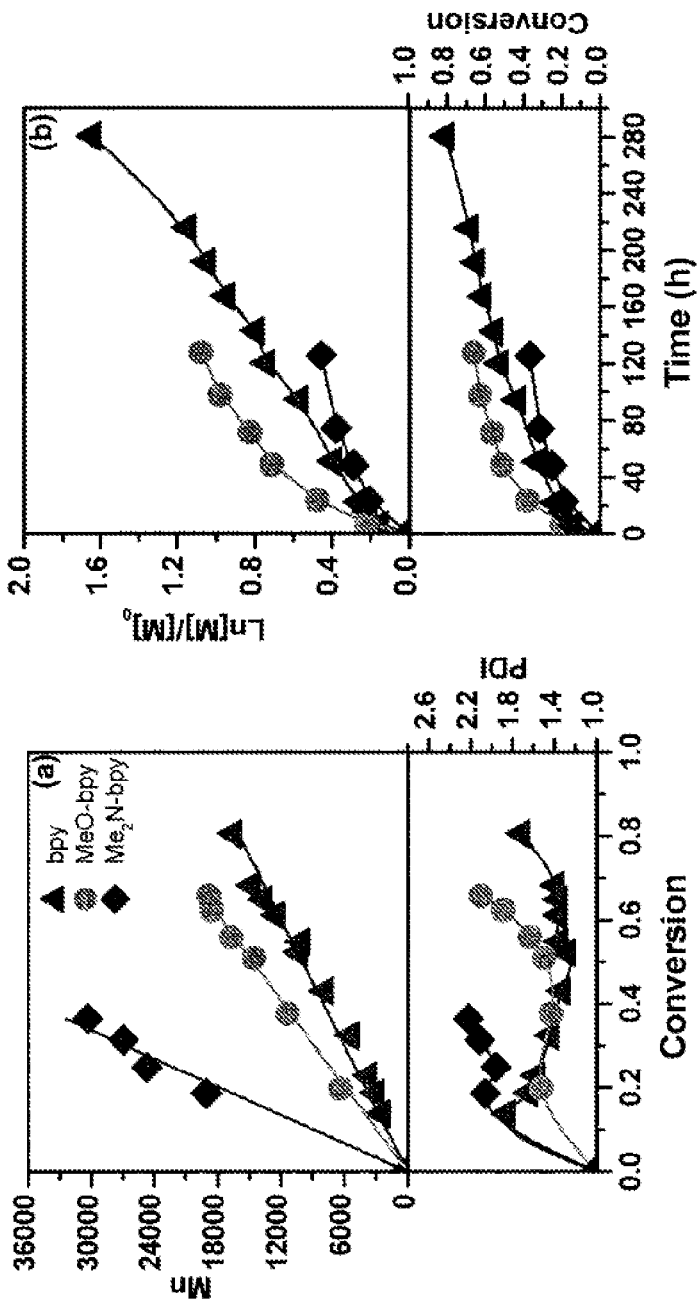
FIG. 66 depicts Effect of EDG substituents on ligand in the CuBr-mediated butadiene polymerization in accordance with the processes of this disclosure. Part (a) shows (a) dependence of $M_n$ and $M_w/M_n$ on conversion. Part (b) shows pseudofirst-order kinetics.
Figure 67:
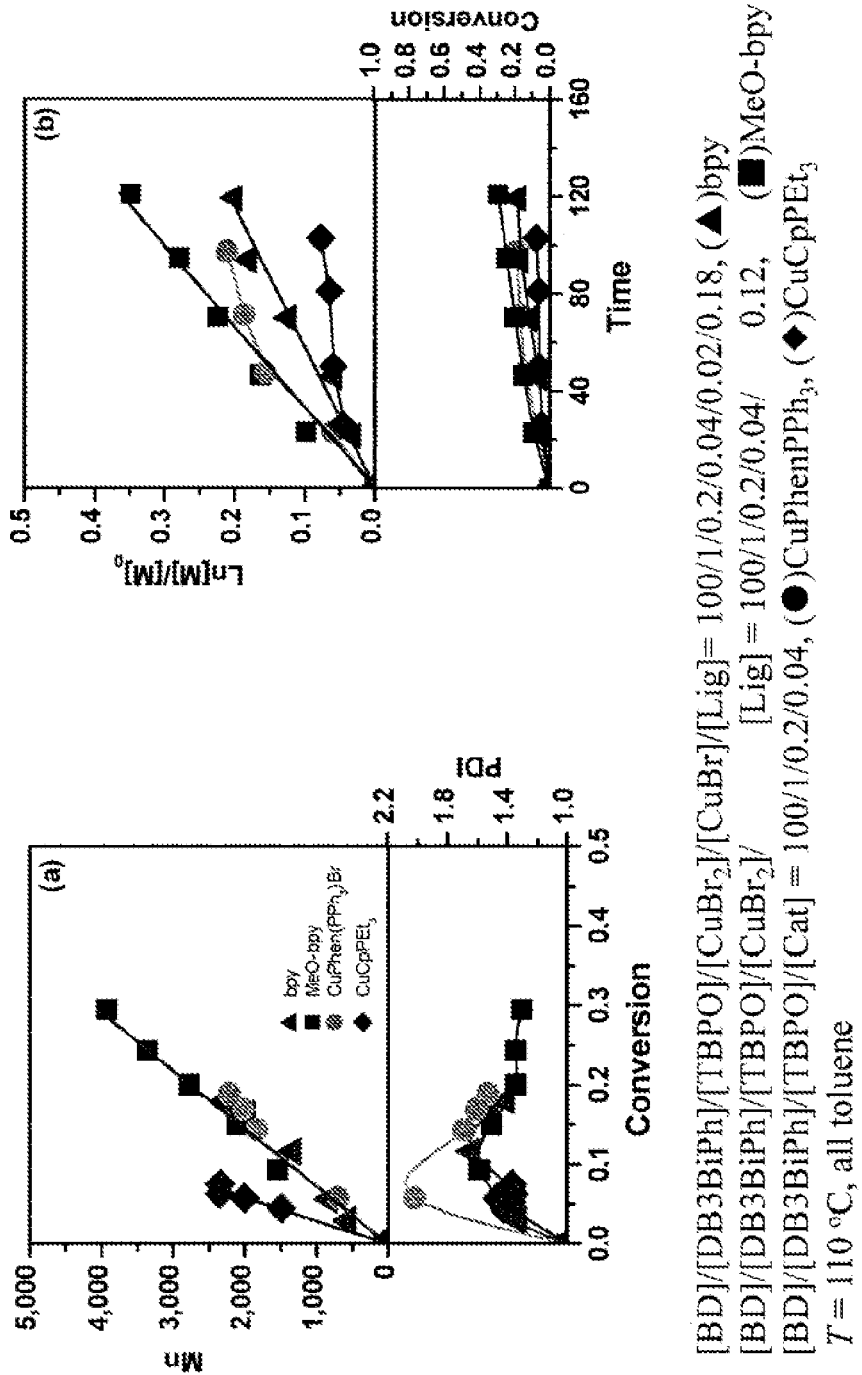
FIG. 67 depicts ICAR ligand effect in accordance with the processes of this disclosure.

The ligand effect was studied in normal ATRP and ICAR-ATRP using typical ratios of [BD]/[EtBriB]/[CuBr]/[Lig]=100/1/1/2-6 (ATRP) and respectively of [BD]/[DB3BP]/[TBPO]/[$CuBr_2$]/[Lig]=100/1/0.2/0.04/0.06-0.12 (ICAR), in toluene at 110° C., (see FIGS. 66 and 67). While problems in diene ATRP were previously ascribed to catalyst coordination, this is probably not the case. Indeed, although CuX complexes with weakly coordinating mono-olefins like MA, MMA, St and octene do exist, they do not interfere with the ATRP of the respective monomers. Moreover, by contrast to Pt, Pd, or CuOTf complexes with 1,5-hexadiene and isopropenylacetylene, which are slightly more stable at rt, $\eta^2$-ligated, conjugated diene-bridged complexes (CuX-μDiene-CuX, X=Cl, Br; BD, ISO, dimethylbutadiene), can only be prepared and characterized at T=−78° C. to −100° C., as they decompose instantaneously at rt, and especially at the high temperatures (T>100° C.) required for diene-ATRP. Moreover, even while in large excess during polymerization, the very weak carbon Lewis base diene or polymer unsaturations cannot compete effectively with the strong N and P-Lewis base, polar ligands, and at best, CuX/L/alkene mixed ligand complexes may transiently form. Thus, by contrast to polar monomers like AN, coordination is probably of minimal consequences for dienes, even at the low Cu levels associated with ICAR. As such, no change was observed in the NMR chemical shift of BD in the presence of CuBr or $CuBr_2$ at rt. Moreover, no CuX or $CuX_2$ solubilization and very poor polymerization was observed in the absence of ligands, in bulk or toluene, for both ATRP and ICAR.

Subsequently, a series of ligands (including bpy, dNbpy, MeObpy, $(CH_3)_2$N-bpy, tBu-bpy, terpy, phen, quinolone, 2-pma, NHC, HMTETA, PMDETA, $Me_6$TREN, TPMA, TMEDA, $PEt_3$, $PBu_3$, $P(TMS)_3$, $PPh_3$, Cp, mesityl) was investigated in normal and ICAR-ATRP in toluene at 110° C. In all cases, the polymerizations were inhomogeneous.

In ATRP, $PBu_3$ and $P(TMS)_3$, provided very slow and nonlinear kinetics and poor polymerizations, whereas $PPh_3$ presented linear kinetics, but a typical FRP with CT to the initiator. PMDETA afforded only trace polymer (in diglyme). A very weak dependence of $M_n$ on conversion with broad PDI and nonlinear kinetics were observed for pyridine ligands like 2-pma and dNbpy, while a broad, poor CRP but with fast and linear kinetics emerged for terpy. Finally, a moderate CRP with a linear $M_n$ vs conversion dependence but with lower initiator efficiency and curved kinetics was seen for the very active $NMe_2$-bpy.

Likewise, in ICAR, diNBpy and $Cu(PPh_3)_3Cl$ led to oligomers and respectively polymers, but with curved kinetics and poor conversions. $Me_6$TREN, PMDETA, Cu(NHC)Cl and respectively $Me_2$Nbpy and HMTETA led to FRP or FRP with CT to the initiator, but all displayed linear and relatively similar kinetics. Interestingly, a CRP with a linear dependence of $M_n$ on conversion, albeit with curved kinetics emerged for $CpCuPEt_3$ and $Phen(PPh_3)CuBr$.

Finally, by far the best results, i.e. BD-CRP with linear dependence of $M_n$ on conversion, relatively narrow PDI ~1.4 and linear kinetics up to high conversion (>70%, ATRP) were obtained for both normal and ICAR-ATRP using the ubiquitous bpy ligand, as well as the more active MeO-bpy, which afforded slightly lower IE in ATRP, but faster rate than bpy in normal ATRP and ICAR-ATRP.

As such, these results do not directly parallel the trends from other monomers. Most likely, in addition to CuX/L and $CuX_2$/L mediated chain end oxidation or catalytic radical termination, the major side reactions promoted by the very active, but also nucleophilic and basic tertiary amines ($Me_6$TREN, PMDETA, HMTETA, $Me_2$N-bpy, dnBpy etc.) and phosphines, are the base assisted dehydrohalogenation or nucleophilic alkylation/quaternization of the allyl halide chain end followed by thermal β-H elimination. Indeed, primary, allyl, and and benzyl halides react very readily with amines reminiscent of ATRP ligands, even at rt and in uncatalyzed reactions, but especially fast at T>100° C. Moreover, quaternization was also observed in ATRP even for the more stable PMMA-Br with $Me_6$TREN.

Figure 68:
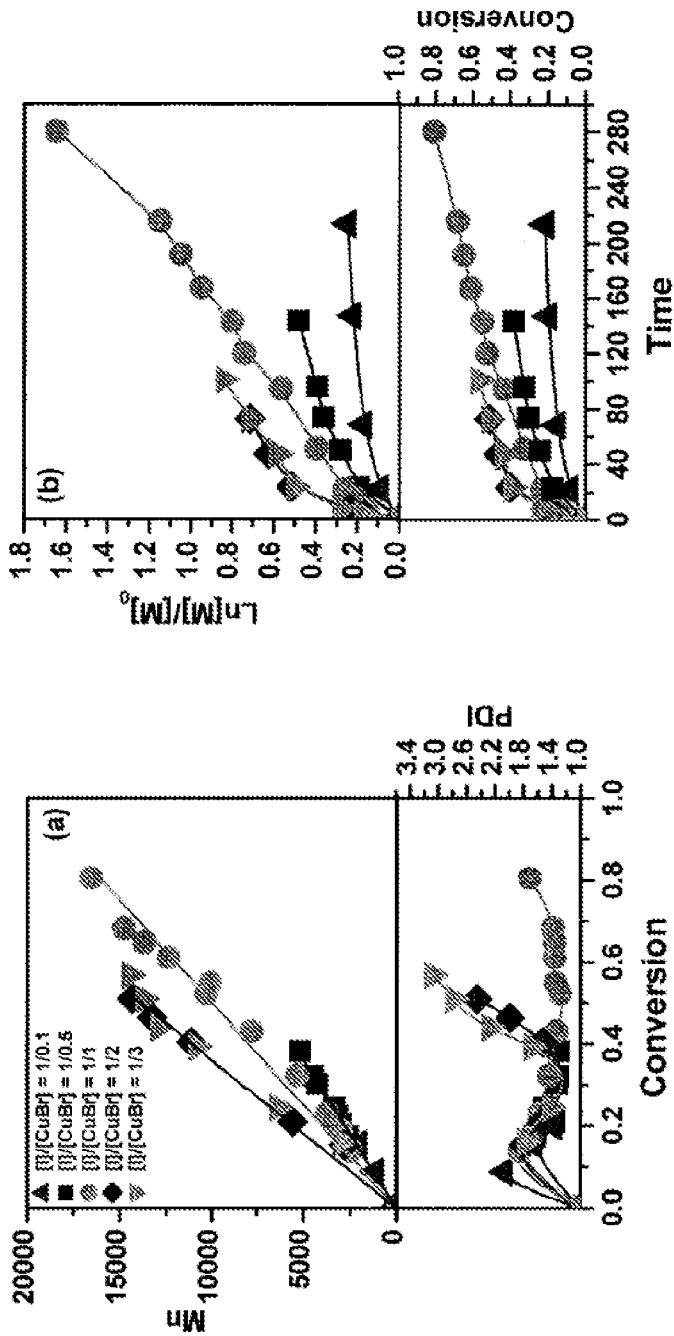
FIG. 68 depicts the effect of [I]/[CuBr]/[lig] ratio in bpy and dMbpy in the CuBr-mediated butadiene polymerization in toluene initiated from EtBriB in accordance with the processes of this disclosure. Part (a) shows the dependence of $M_n$ and $M_w/M_n$ on conversion. Part (b) shows pseudofirst-order kinetics.

To further support these assertions, several sets of control experiments including NMR chain end analysis and kinetic investigations, were carried out. First, NMR, confirmed a rapid alkylation of AB and of PBD-Br with PMDETA, but a much slower reaction with bpy. In a subsequent kinetic series, the effect of the [Initiator]/[CuX] was explored in a gradient of 9 ratios in between ATRP and ICAR, i.e., [BD]/[EtBriB]/[CuBr]/[bpy]=100/1/0.1/1, 100/1/0.5/1.5, 100/1/1/3, 100/1/2/6 and 100/1/3/9 (see FIG. 68). As expected, the polymerization rate increased continuously with the amount of CuBr and of bpy, and all ratios except the typical 100/1/1/3 lead to curved kinetics. Moreover, while a CRP with a linear dependence of on conversion was observed in all cases, the IE decreased, while the PDI increased significantly with conversion for excess catalyst/ligand. Correspondingly, this was paralleled by a dramatic decrease in the halide CEF with conversion. A similar trend in Mn, PDI and IE was observed for DBPX and DB3BP.

Figure 69:
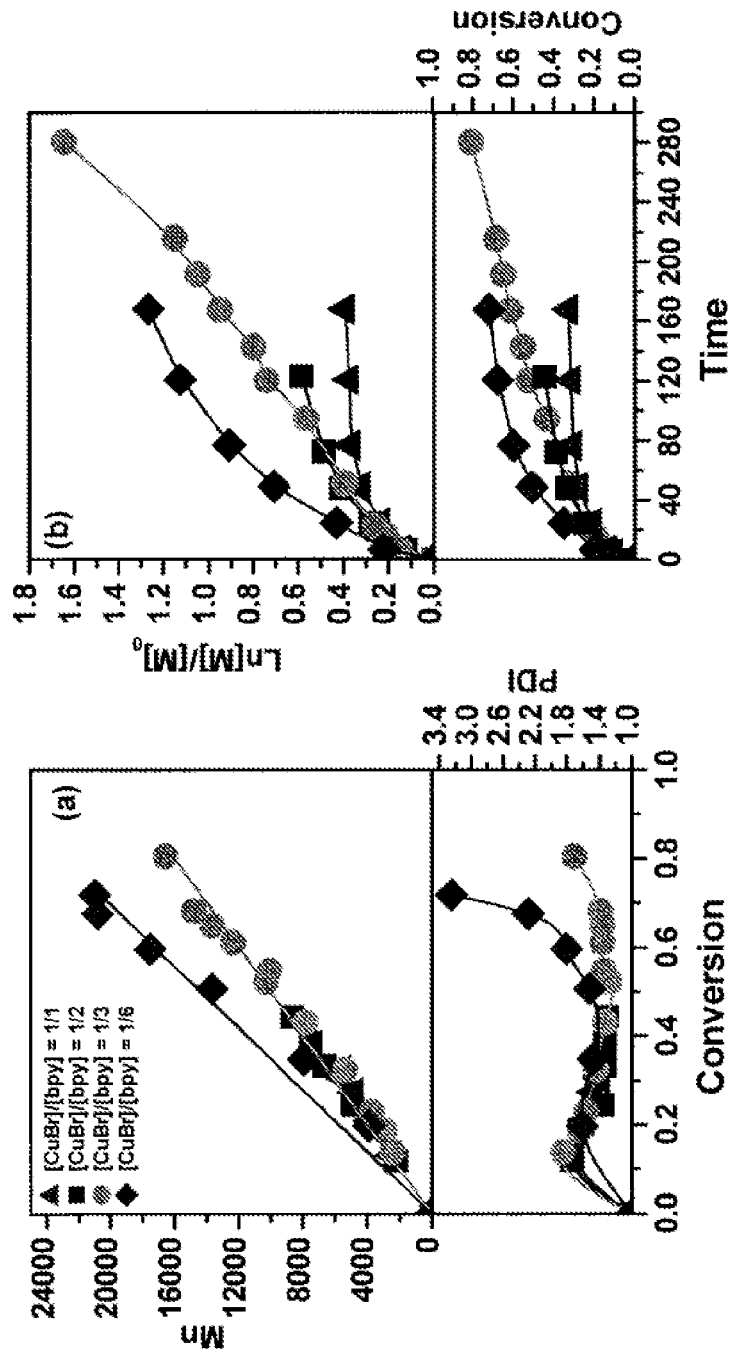
FIG. 69 depicts the effect of [CuBr]/[bpy] ratio in the CuBr-mediated butadiene polymerization in toluene initiated from EtBriB in accordance with the processes of this disclosure. Part (a) shows the dependence of $M_n$ and $M_w/M_n$ on conversion. Part (b) shows pseudofirst-order kinetics.
Figure 70:
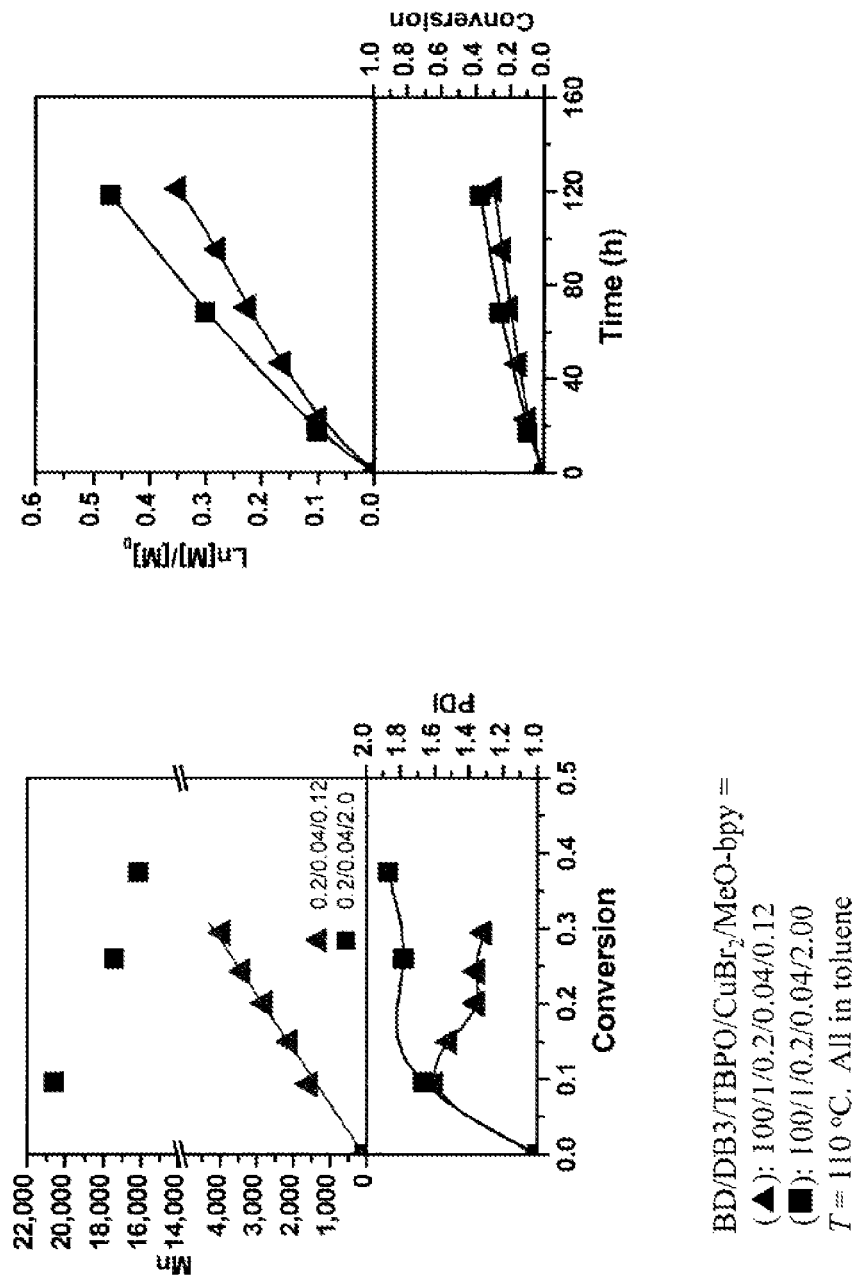
FIG. 70 depicts ICAR MeO-[bpy] concentration effect (no chain end in NMR) in accordance with the processes of this disclosure.
Figure 71:
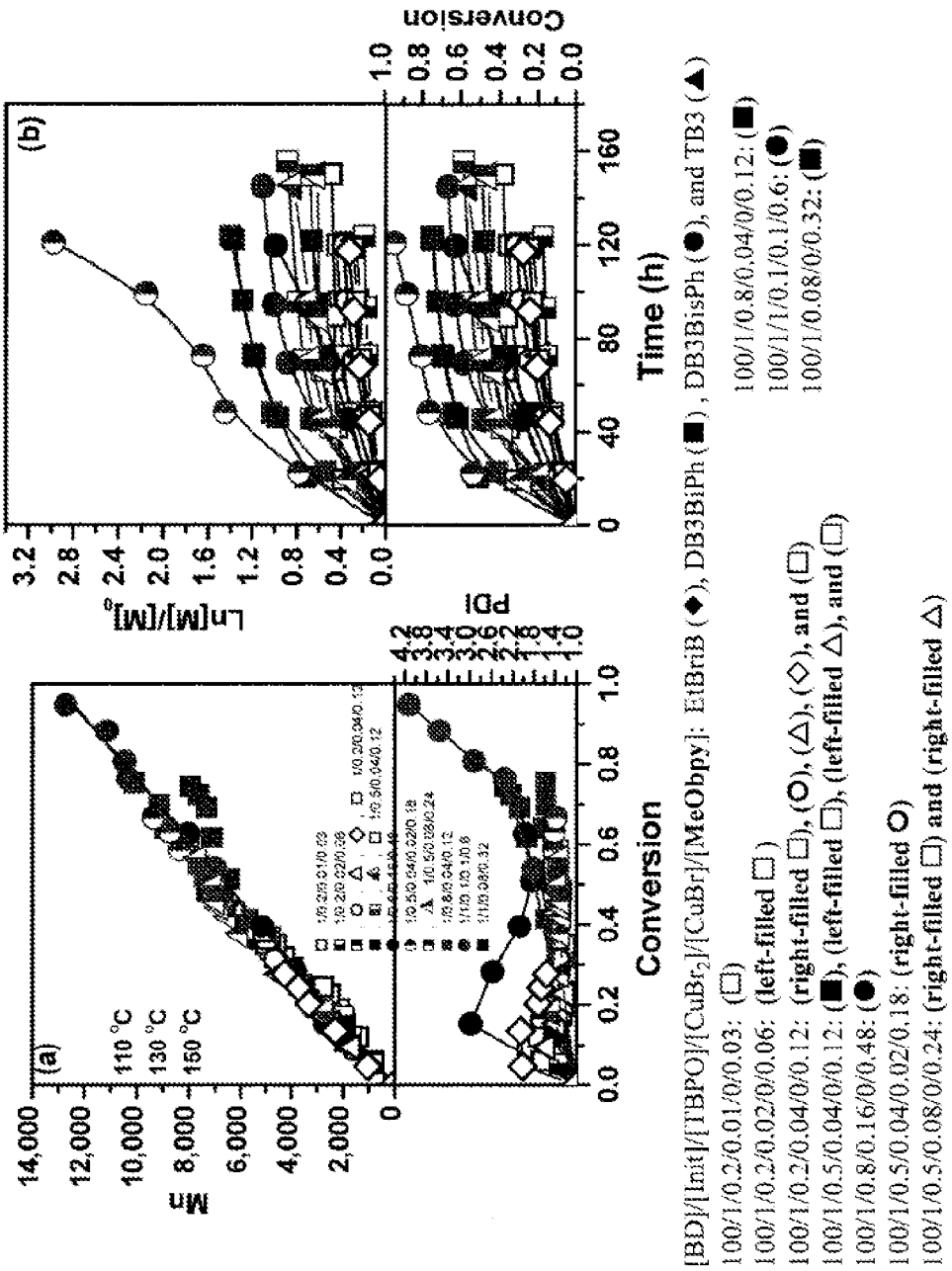
FIG. 71 depicts an ICAR master plot showing temperature and ratios effect in accordance with the processes of this disclosure.

A complementary experiment set involved the kinetic evaluation of the effect of the amount of ligand in normal and ICAR-ATRP, i.e., [BD]/[EtBriB]/[CuBr]/[bpy]=100/1/1/1, 100/1/1/2, 100/1/1/3, and 100/1/1/6 and respectively [BD]/[DB3BP]/[TBPO]/[$CuBr_2$]/[MeO-bpy]=100/1/0.2/0.04/0.12 and 100/1/0.2/0.04/2.00 in ICAR. In n-ATRP (see FIG. 69) a CRP with a linear $M_n$ vs conversion dependence was again observed, and likewise, the polymerization rate increased with the bpy amount in all cases. However, only the 100/1/1/3 ratio afforded linear kinetics, whereas excess ligand lowered the IE, severely broadened the PDI, and drastically lowered the CEF (see FIG. 70). Likewise, increasing the amount of ligand in ICAR (see FIG. 70) converted the CRP into an FRP with chain transfer to the initiator, and also led to a dramatic decrease in the halide.

Both sets of kinetic experiments converge to illustrate the detrimental effects of excess ligand and catalyst and indicate that side reactions (i.e., alkylation, elimination and possible reduction of $CuBr_2$ to CuBr) scale directly with the ligand amount.

Like ligands, solvents dramatically affect the ATRP equilibrium and influence $K_{ATRP}$ across at least six orders of magnitude. Indeed, due to the better solvation of the more polar $CuX_2$, which also promotes lower PDI values, $K_{ATRP}$ increases rapidly ($k_{act}$ increases and $k_{deact}$ decreases) with solvent polarity. However, similarly to the ligand effect, the expected trends in diene ATRP are again masked by solvent influence on the allyl halide chain end side reactions.

The solvent effect was investigated kinetically in ATRP with standard [BD]/[EtBriB]/[CuBr]/[bpy]=100/1/1/3, at T=110° C. conditions in toluene, anisole, THF, dioxane, diglyme, dimethyl carbonate, acetonitrile, DMF as well as in toluene/THF mixtures. As such, while homogeneous, only trace polymerization occurred in the very polar ACN and DMF. By contrast, while all polymerizations were inhomogeneous, a CRP with a linear dependence of $M_n$ on conversion, a remarkably constant IE=0.3, and except toluene, with very similar PDI values of ~1.2 in the 20%-50% conversion range, was obtained for all other solvents. However, while the mildly polar anisole, THF, dioxane, diglyme, and DMC better solubilize CuBr2/dbpy and accordingly afford lower PDI values, the corresponding kinetics also present a slight curvatures, symptomatic of chain end loss. As such, while with initially broader PDI, the least polar toluene remains the only solvent with the fastest and linear kinetics up to high (>80%) conversions.

These trends are consistent with the effect of solvent polarity and basicity on polar nucleophilic reactions such as those of allyl halides with amines and phosphines, and on polar HX eliminations (e.g., from PSt-X chain ends). Indeed, as seen for PMMA-Br/$Me_6$/TREN, control reactions of allyl bromide and PBD-Br with bpy and PMDETA in toluene and respectively in ACN under reaction conditions indicated quaternization, but much slower in toluene.

While due to the lower catalyst/ligand amount, ICAR is expected to, and as seen herein, does indeed provide fewer corresponding side reactions than ATRP, in both cases the same halide/amine side reaction is occurring. As such, in ATRP, excess ligand consumes the allyl halide chain ends, whereas in ICAR, excess allyl halide or halide initiator consumes the free ligand and may even quaternize a N of the polyamine that is still coordinating copper. Thus, in terms of halogen conservation, the halides end up not as termination-derived $CuX_2$, but as HX or onium halides. These trends scale remarkably well with the nucleophilicity and basicity of the ligands, and with solvent polarity and their ability to complex CuX and $CuX_2$, and elegantly explain why the highly activating, but also highly basic and nucleophilic $Me_6TREN$, PMDETA etc gave poor polymerizations, whereas low nucleophilicity (sterics), low basicity ($pK_b$=9.56), as well as high $k_{deact}$ bpy and high $K_{ATRP}$ MeO-bpy are optimum in this series of ligands for both ATRP and ICAR. Indeed, while more active ligands increase $k_{act}$, and $K_{ATRP}$, this is less important for bpy, given that the allyl halides are so easily activated anyway. Likewise, while deactivation happen for most ligands, it is probably quickly followed by halide/active ligand related side reactions which mask this effect. Thus, since the expected —$CH_2$—CH=CH—$CH_2$—$N^+R_3/X^-$ or —$CH_2$—CH(CH=$CH_2$)—$N^+R_3/X^-$ resonances at ~4 ppm were not observed in NMR, most likely, fast decomposition/elimination/fragmentation leads to unsaturated chain ends, the resonances of which overlap with the main chain unsaturations.

The kinetics of butadiene in normal ATRP and ICAR-ATRP were subsequently investigated at 90° C., 110° C. and 130° C. +150 (see FIG. 72) in both normal and ICAR-ATRP. (Katrp increases with temp). Remarkably, a linear dependence of $M_n$ on conversion indicative of a CRP process was observed in all cases, and the IE remained relatively constant (IE~0.3). However, while at T=90° C. and 110° C. the kinetics were not appreciably affected by temperature with higher PDI at higher conversions, as well as a curvature in the kinetic plots, indicting either chain end loss or accumulation of $CuBr_2$ was observed at T=130° C. As the narrowest PDI was observed at T=110° C., this value was selected as an optimum temperature. For ICAR, this also includes the effect of temp on the kinetics of TBPO decomposition. Conversely, the high temperature requirement also promotes an increase in the Diels Alder dimerization of BD to 4-vinyl cylcohexene.

Figure 72:
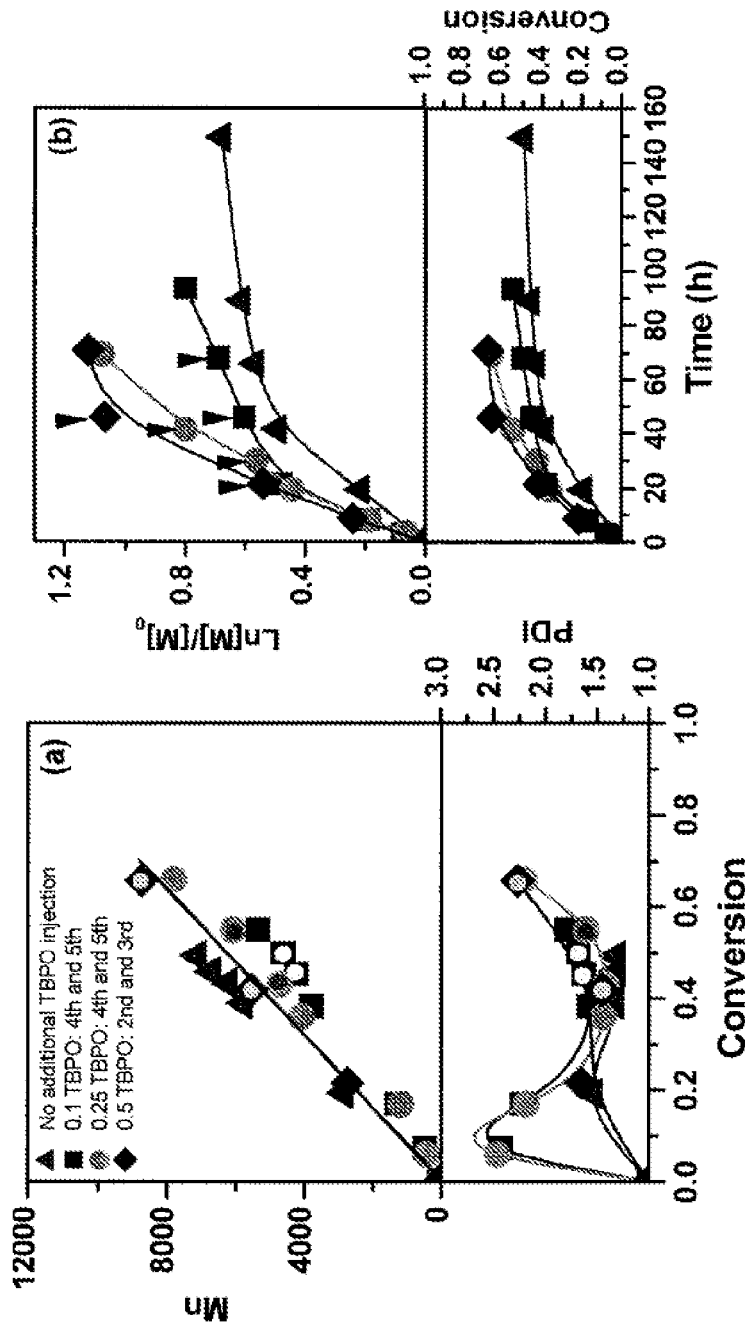
FIG. 72 depicts the effect of the step wise addition of TBPO in accordance with the processes of this disclosure.

In an effort to optimize the ICAR process towards faster reactions as well as minimizing the amount of copper towards ppm levels, the combined effect of temperature (T=110° C., 130° C. and 150° C.) and reagent ratios ([BD]/[DB3BiPh]/[TBPO]/[CuBr_2]/[dMeObpy]=100/1/0.2/0.04/0.12, 100/1/0.5/0.04/0.12, 100/1/0.5/0.08/0.24, 100/1/0.8/0.04/0.12, 100/1/1/0.08/0.32) was explored in a series of kinetic ICAR experiments, and is presented in FIG. 72. A CRP with a linear dependence of $M_n$ on conversion was observed in all cases, and in accordance with the ICAR mechanism, the initiator efficiency remained constant and displayed a remarkable independence on reaction conditions. As expected, the rate increased with the amount of TBPO and with temperature. However, while at 110° C. the kinetics remained linear for >120 hours, a linear portion up to ~48 hours and ~24 hours followed by a curvature, was observed at 130° C. and respectively 150° C. Aside from temperature effects on side reactions, this is remarkably consistent with the kinetics of the TBPO decomposition. Indeed, at 110° C., even after 120 hours there still is ~30% of the TBPO left. By contrast, >99% of the TPBO has decomposed in 48 hours or 6 hours at 130° C. and respectively at 150° C. (or >90% in ~24 and respectively 3 hours). As such, all polymerizations start as ICAR-ATRPs, but after all TBPO has decomposed, the higher temperature ones continue as regular ATRPs with substoichiometric amounts of $CuBr_2$, thus leading to the curvature in the kinetic plots.

Figure 73:
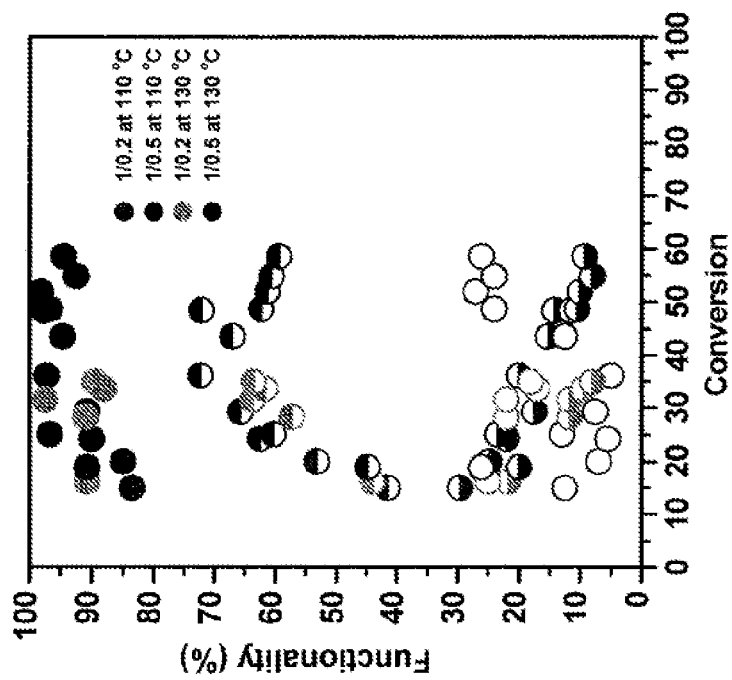
FIG. 73 depicts the effect of temperature in the CuBr-mediated butadiene polymerization initiated from DB3BiPh in toluene in accordance with the processes of this disclosure. Part (a) shows the dependence of $M_n$ and $M_w/M_n$ on conversion. Part (b) shows pseudofirst-order kinetics.

As such, subsequent stepwise/batch addition of extra TBPO after the initial one has decomposed, would compensate for lost chains. Indeed, for an ICAR with [BD]/[DB3BiPh]/[TBPO]/[CuBr_2]/[MeO-bpy]=100/1/0.5/0.08/0.24 (see FIG. 73) the addition of extra 0.1, 0.25 or 0.5 TBPO equivalents at 24 hour intervals (corresponding to the consumption of >90% of the TBPO at 130° C.) lead to CRPs with straight kinetics, albeit at the expense of an increase in PDI.

Figure 74:
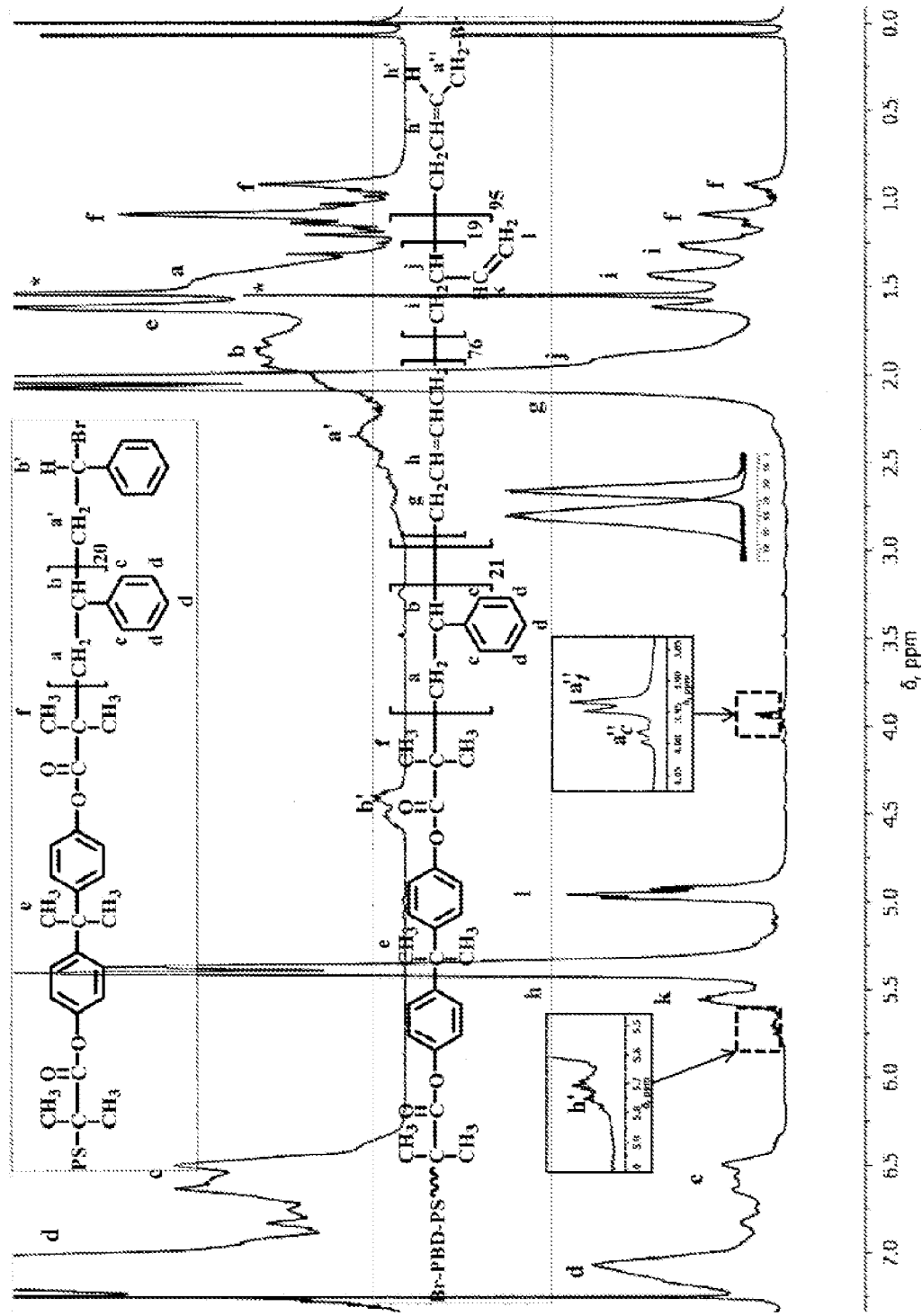
FIG. 74 depicts $^1$H NMR spectra of bromine terminated polybutadiene/polystyrene prepared in accordance with the processes of this disclosure.

An NMR investigation of the polybutadiene (PBD) prepared by ICAR-ATRP reveals that, while the total halide functionality remains at least >85%, while the 1,4-trans increase, the 1,4 cis halide chain ends decrease with conversion. (See FIG. 74). Such high chain end functionality is of paramount importance in the synthesis of block copolymers.

Having established optimum temperature, solvent and ligand systems, we then decided to explore the scope and limitations of BD-ATRP towards the synthesis of PBD with various molecular weights (DP=degree of polymerization) and if possible with faster rates, as well as towards the synthesis of more complex block or star architectures. The DP effect was investigated kinetically at two levels of CuBr/bpy at each DP, with [BD]/[EtBriB]/[CuBr]/[bpy]=100/1/1/3, 300/1/1/3, 300/1/3/9, 600/1/1/3, 600/1/6/18, 1000/1/1/3 and 1000/1/5/15 (in diglyme), while keeping the amount of BD constant. A CRP with a linear dependence of $M_n$ on conversion was observed in all cases, and as expected, $M_n$ increased, while the polymerization rate decreased with the [BD]/[EtBriB] ratio. Conversely, as seen above, increasing [CuBr] and [bpy] at the same DP, lead to faster polymerizations, but lower IE and higher PDI values. Since low PDI are favored by increasing DP, $M_n$ up to ~30,000 could he obtained with PDI as low as ~1.2. Conversely, high $M_n$ up to ~100,000 was produced, but with broader PDI.

The BD-ATRP was evaluated in the synthesis of more complex architectures such as stars and blocks.

Figure 75:
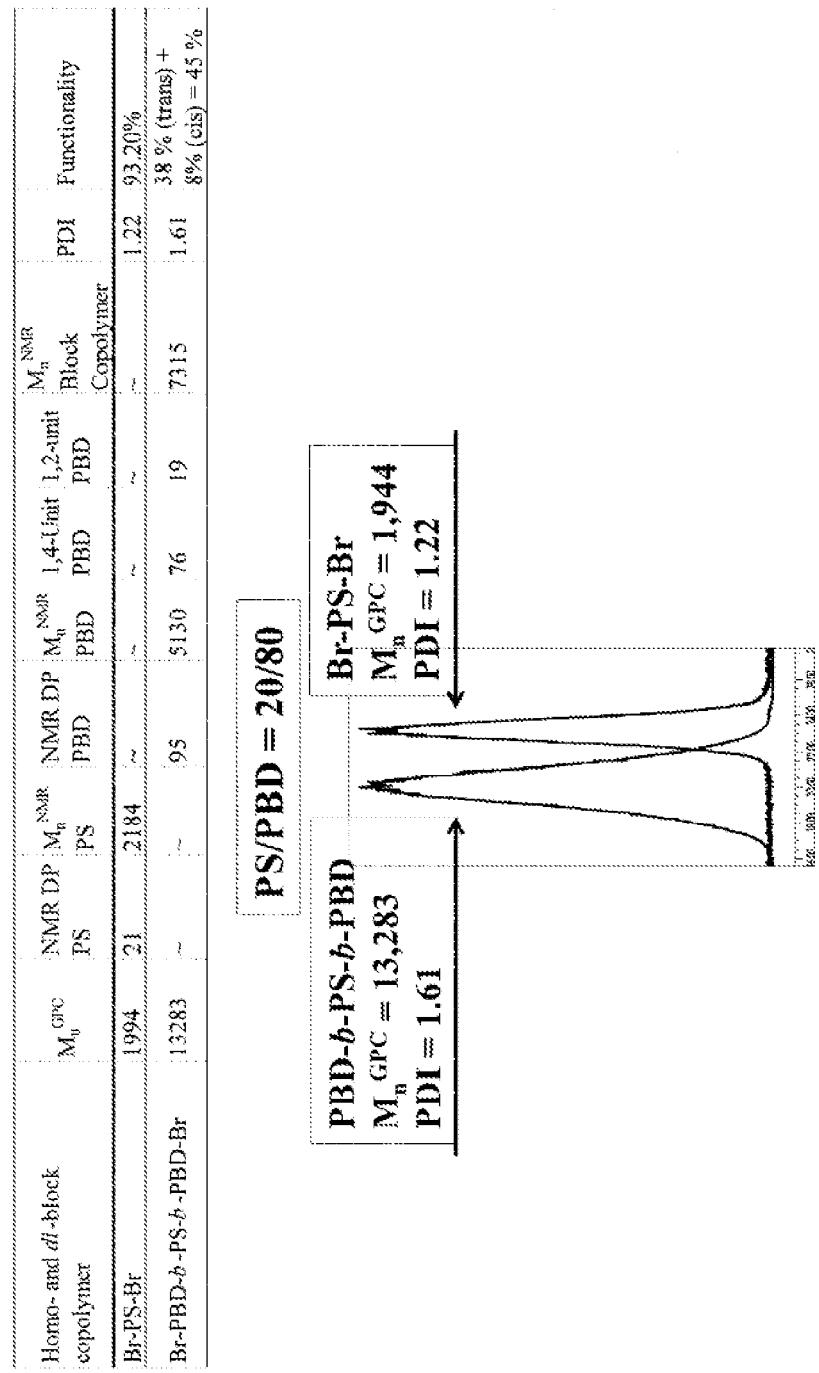
FIG. 75 depicts $^1$H NMR spectra of bromine terminated polybutadiene/polystyrene block copolymer prepared in accordance with the processes of this disclosure.
Figure 76:
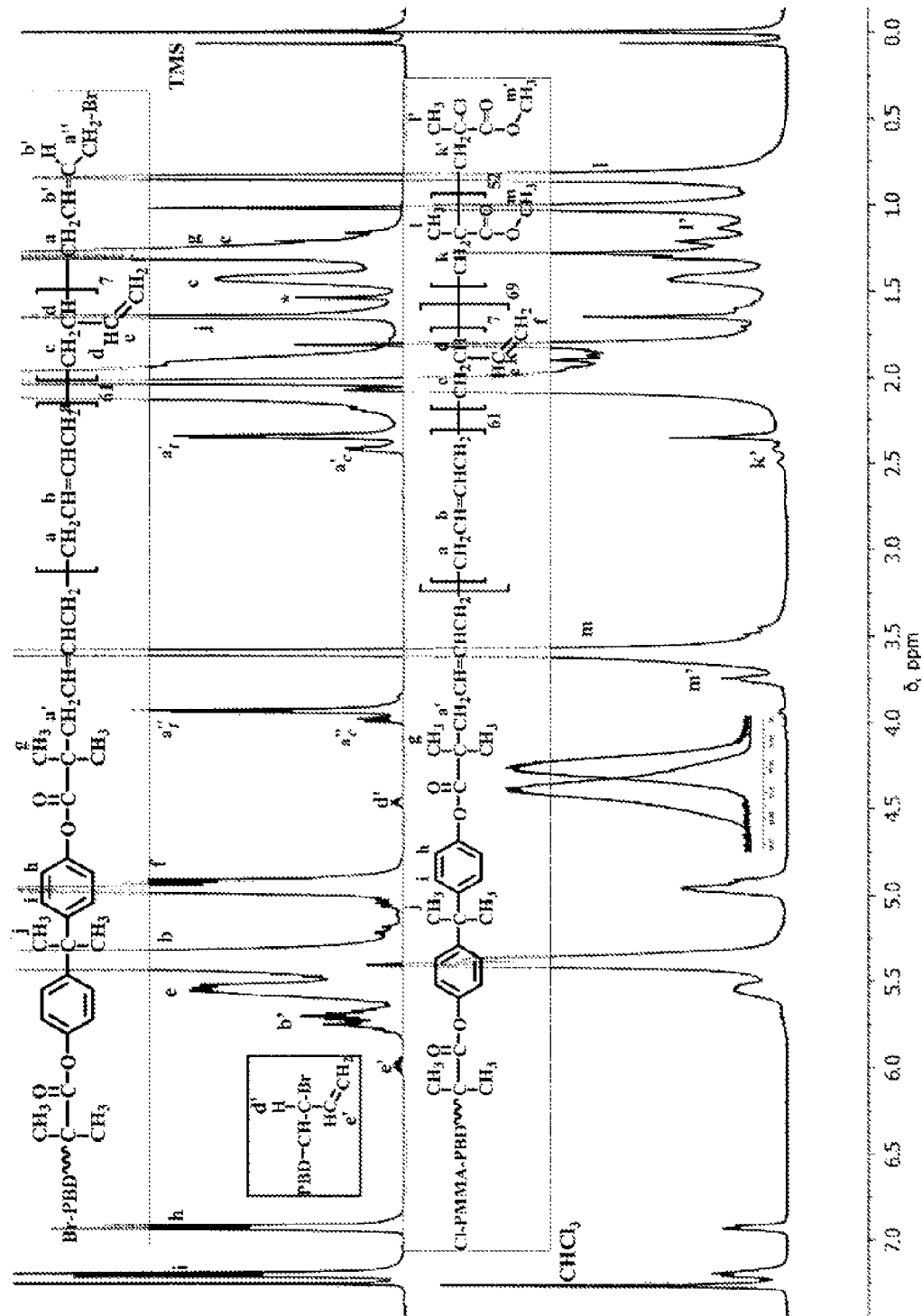
FIG. 76 depicts $^1$H NMR spectra of chlorine terminated polybutadiene/polymethylmethacrylate block copolymer prepared in accordance with the processes of this disclosure.

The synthesis of a three arm star was evaluated kinetically from a three arm initiator $CH_3C[Ph—CO—C(CH_3)_2—Br]_3$ by ICAR-ATRP at 110 and 130 with various ratios. The successful synthesis was confirmed by NMR and GPC (see FIGS. 75-77). As seen for all other Br initiators, the IE was not affected by the ratios or temperature, and stars with Mn~8000 and PDI~1.3 could be obtained.

The utility of BD-ATRP was also demonstrated in the synthesis of industrially relevant BD-ran-AN and AN-ran-BD-ran-St random copolymers and of BD block copolymers (FIGS. 75-79).

Halide terminated macroinitiators can be used as initiators for butadiene, or halide terminated polybutadiene can be used to initiate another monomer. The first approach is very likely to work, since as demonstrated above, all model initiators add efficiently to BD. However, while allyl halides have high $k_{act}$ and $K_{ATRP}$ values, as they generate more stable, delocalized radicals, they are also expected to be less efficient initiators towards monomers that generate less stable radicals than diener. Nonetheless, as demonstrated herein by the initiation with allyl bromide, the model compound of the BD chain end, they are efficient initiators for BD. Moreover, they were also shown to initiate the ATRP of styrene, MMA and vinyl chloride, especially when taking advantage of the halide exchange (R—Br/CuCl) concept.

Other non-basic, non-nucleophilic, but activating ligands may be even more successful especially in the industrially relevant, high pressure, emulsion diene polymerizations. Indeed, while the slow BD propagation rate constant ($kp_{BD} < 10^2$ L mol$^{-1}$ s$^{-1}$) leads to long polymerization times, the kinetics can be dramatically accelerated by carrying out the reaction at higher temperature and especially higher pressures. Moreover, even better polymerization control is expected due to the increase of the ratio of the propagation vs. termination rate constants with increasing pressure. Higher pressures can minimize or eliminate side reactions.

Photoirradiated ATRP can be conducted in an embodiment of this disclosure. In such case, the ATRP polymerization is preferably photocontrollable, that is, the polymerization proceeds mainly under UV or visible or laser irradiation at room temperature while maintaining controlled Mn and low Mw/Mn throughout the procedure.

All patents and patent applications, test procedures, and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A free radical or controlled radical polymerization process of atom or group transfer radical polymerization, said process comprising polymerizing at least one conjugated diene monomer in the presence of an initiator, a transition metal-ligand complex catalyst, a reducing agent, and an organic solvent or water, under reaction conditions and for a time sufficient to controllably polymerize the at least one conjugated diene monomer to form a (co)polymer.

2. The process of claim 1 wherein said conjugated diene monomer is represented by the formula $$R^{1'}R^{2'}C=CR^{3'}CR^{4'}=CR^{5'}CR^{6'}_3$$

wherein $R^{1'}$ to $R^{6'}$ are independently halogen, cyano, hydrogen, a substituted or unsubstituted hydrocarbon residue, or a substituted or unsubstituted heteroatom-containing hydrocarbon residue.

3. The process of claim 1 wherein said at least one conjugated diene monomer comprises a C-, N-, O-, P- or S-containing conjugated diene monomer.

4. The process of claim 2 wherein $R^{1'}$ to $R^{6'}$ are independently selected from hydrogen, halogen, alkyl, alkenyl, cycloalkyl, aryl, aralkyl, alkaryl, ester, and cyano.

5. The process of claim 1 wherein the at least one conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-penta-diene, 3-methyl-1,3-pentadiene, 4-methyl-1,3-pentadiene, 2,4-hexadiene, and mixtures and derivatives thereof.

6. The process of claim 1 wherein the at least one conjugated diene monomer is selected from conjugated diene monomers that propagate with an allyl radical.

7. The process of claim 1 further comprising polymerizing one or more radically (co)polymerizable monoene monomers with the at least one conjugated diene monomer.

8. The process of claim 7 wherein said one or more radically (co)polymerizable monoene monomer is represented by the formula $$R^1R^2C=CR^3R^4$$

wherein $R^1$ to $R^4$ are independently halogen, cyano, hydrogen, a substituted or unsubstituted hydrocarbon residue, or a substituted or unsubstituted heteroatom-containing hydrocarbon residue.

9. The process of claim 7 wherein said one or more radically (co)polymerizable monoene monomer comprises a C-, N-, O-, P- or S-containing monoene monomer.

10. The process of claim 8 wherein $R^1$ to $R^4$ are independently selected from hydrogen, halogen, alkyl, cycloalkyl, carboxyalkyl, oxycarbonyl, aryl, aralkyl, alkaryl, a N-, O-, P- or S-containing residue.

11. The process of claim 7 wherein said monoene monomer comprises an acrylate, methacrylate, methacrylamide, ethylene, propylene, butene, hexene, 4-methylpentene-1,1-octene, norbornene, substituted norbornene, styrene, acrylonitrile, methacrylonitrile, vinyl halide, florinated alkene, or mixtures thereof.

12. The process of claim 1 wherein said initiator comprises a halide, pseudohalide, alkyl halide, aryl sulfonyl compound, aryl halide, allyl halide, haloester compound, dithioester, fluoroalkyl halide, polyhalide, fluorinated halide, or mixtures thereof.

13. The process of claim 1 wherein said initiator is represented by the formula $$R^{11}OR^{12}S(=O)_2-X,$$

$$R^{11}R^{12}S(=O)_2-X,$$

$$R^{11}OC(=O)R^{12}-X,$$

$$R^{11}R^{12}R^{13}C-X,$$

$$R^{11}C(=O)-X,$$

$$R^{11}R^{12}R^{13}Si-X,$$

$$R^{11}R^{12}N-X,$$

$$R^{11}N-X_2,$$

$$(R^{11})_nP(O)_m-X_{3-n},$$

$$(R^{11}O)_nP(O)_m-X_{3-n}, \text{ or}$$

$$(R^{11})(R^{12}O)P(O)_m-X$$

wherein

X is selected from the group consisting of Cl, Br, I, $OR^{10}$, where $R^{10}$ is alkyl of from 1 to 20 carbon atoms, $SR^{14}$, $SeR^{14}$, $OC(=O)R^{14}$, $OP(=O)R^{14}$, $OP(=O)(OR^{14})_2$, $OP(=O)OR^{14}$, $O-N(R^{14})_2$, $S-C(=S)N(R^{14})_2$, S—C(=S)(R$^{14}$)$_2$, O—C(=S)N(R$^{14}$)$_2$, S—C(=O)N(R$^{14}$)$_2$, COOR, CN, NC, SCN, CNS, OCN, CNO and N$_3$, where R$^{14}$ is aryl or a straight or branched C$_1$-C$_{20}$ alkyl group, or where an N(R$^{14}$)$_2$ group is present, the two R$^{14}$ groups may be joined to form a 5-, 6- or 7-membered heterocyclic ring;

R$^{11}$, R$^{12}$ and R$^{13}$ are each independently selected from the group consisting of H, halogen, C$_1$-C$_{20}$ alkyl, C$_3$-C$_8$ cycloalkyl, R$^8_3$Si, C(=Y)R$^5$, C(=Y)NR$^6$R$^7$, where R$^5$ and R$^7$ are independently H or alkyl of from 1 to 20 carbon atoms, or R$^6$ and R$^7$ may be joined together to form an alkylene group of from 2 to 5 carbon atoms; COCl, OH, CN, C$_2$-C$_{20}$ alkenyl or alkynyl, oxiranyl, glycidyl, C$_2$-C$_6$ alkylene or alkenylene substituted with oxiranyl or glycidyl, aryl, heterocyclyl, aralkyl, aralkenyl, C$_1$-C$_6$ alkyl in which from 1 to all of the hydrogen atoms are replaced with halogen and C$_1$-C$_6$ alkyl substituted with from 1 to 3 substituents selected from the group consisting of C$_1$-C$_4$ alkoxy, aryl, heterocyclyl, C(=Y)R$^5$, C(=Y)NR$^6$R$^7$, oxiranyl and glycidyl;

m is 0 or 1; and n is 0, 1 or 2.

14. The process of claim 1 wherein the initiator is selected from the group consisting of 4-methoxybenzenesulfonyl chloride (MBSC), allylbromide (AB), α,α'-dichloro-p-xylene (DCPX), α,α'-dibromo-p-xylene (DBPX), α,α'-dichloro-p-xylene (DCPX), 1,1'-biphenylyl 1,4-bis(2-bromoacetate) (DB1BP), (1-bromoethyl)benzene (BEB), 1,1'-biphenylyl 1,4-bis(2-bromopropionate) (DB2BP), ethyl α-bromoisobutyrate, 1,1'-biphenylyl 1,4-bis(2-bromoisobutyrate) (DB3BP), bis-4,4'-(2-bromoisobutyryloxy)methylphenyl (DB3BPA), 1,1,1-tris(4-(2-bromoiso-butyryloxy)phenyl)ethane (TB3Ph), tetrabromomethane (CBr$_4$), tetrachloromethane (CCl$_4$), bromotrichloromethane (CBrCl$_3$), p-toluenesulfonyl chloride, cis-1,4-dichloro-2-butene, and mixtures thereof.

15. The process of claim 1 wherein the transition metal comprises Cu$^0$, Cu$^{1+}$, Cu$^{2+}$, Au$^0$, Au$^+$, Au$^{2+}$, Au$^{3+}$, Ag$^0$, Ag$^+$, Ag$^{2+}$, Hg$^0$, Hg$^+$, Hg$^{2+}$, Ni$^0$, Ni$^+$, Ni$^{2+}$, Ni$^{3+}$, Pd$^0$, Pd$^+$, Pd$^{2+}$, Pt$^0$, Pt$^+$, Pt$^{+2}$, Pt$^{+3}$, Pt$^{+4}$, Rh$^0$, Rh$^+$, Rh$^{2+}$, Rh$^{3+}$, Rh$^{4+}$, Co$^0$, Co$^+$, Co$^{2+}$, Co$^{3+}$, Ir$^0$, Ir$^+$, Ir$^{2+}$, Ir$^{3+}$, Ir$^{4+}$, Fe$^0$, Fe$^{2+}$, Fe$^{3+}$, Ru$^0$, R$^{2+}$, Ru$^{3+}$, Ru$^{4+}$, Ru$^{5+}$, R$^{6+}$, Os$^0$, Os$^{2+}$, Os$^{3+}$, Os$^{4+}$, Re$^0$, Re$^{2+}$, Re$^{3+}$, Re$^{4+}$, Re$^{6+}$, Re$^{7+}$, Mn$^0$, Mn$^{2+}$, Mn$^{3+}$, Mn$^{4+}$, Cr$^0$, Cr$^{2+}$, Cr$^{3+}$, Mo$^0$, Mo$^+$, Mo$^{2+}$, Mo$^{3+}$, W$^0$, W$^{2+}$, W$^{3+}$, V$^0$, V$^{2+}$, V$^{3+}$, V$^{4+}$, V$^{5+}$, Nb$^0$, Nb$^{2+}$, Nb$^{+3}$, Nb$^{4+}$, Nb$^{5+}$, Ta$^0$, Ta$^{3+}$, Ta$^{4+}$, Ta$^{5+}$, Zn$^0$, Zn$^+$ or Zn$^{2+}$.

16. The process of claim 1 wherein the transition metal comprises Cu$^0$, Cu$^{1+}$, Cu$^{2+}$, Fe$^0$, Fe$^{2+}$, or Fe$^3$.

17. The process of claim 1 wherein the transition metal comprises Cu$^0$, Cu$^{1+}$, or Cu$^{2+}$.

18. The process of claim 1 wherein the transition metal-ligand complex comprises a C-, N-, O-, P- or S-containing ligand.

19. The process of claim 1 wherein the ligand is represented by the formula:

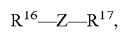

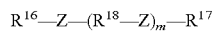

wherein:

R$^{16}$ and R$^{17}$ are independently selected from the group consisting of H, C$_1$-C$_{20}$ alkyl, aryl, heterocyclyl, and C$_1$-C$_6$ alkyl substituted with C$_1$-C$_6$ alkoxy, C$_1$-C$_4$ dialkylamino, C(=Y)R$^5$, C(=Y)R$^6$R$^7$ and/or YC(=Y)RB, where Y, R$^5$, R$^6$, R$^7$ and R$^8$ are independently H or alkyl of from 1 to 20 carbon atoms, or R$^6$ and R$^7$ may be joined together to form an alkylene group of from 2 to 5 carbon atoms; or R$^{16}$ and R$^{17}$ can be joined to form a saturated, unsaturated or heterocyclic ring;

Z is a covalent bond, O, S, NR$^{19}$ or PR$^{19}$, where R$^{19}$ is selected from the same group as R$^{16}$ and R$^{17}$, each R$^{18}$ is independently a divalent group selected from the group consisting of C$_2$-C$_4$ alkylene (alkanediyl) and C$^2$-C$_4$ alkenylene where the covalent bonds to each Z are at vicinal positions or at β-positions and C$_3$-C$_8$ cycloalkanediyl, C$_3$-C$_8$ cycloalkenediyl, arenediyl and heterocyclylene where the covalent bonds to each Z are at vicinal positions; and m is from 1 to 6.

20. The process of claim 1 wherein the ligand is selected from the group consisting of 2,2'-bipyridine (bpy), 4,4'-dinonyl-2,2'-dipyridyl (dnN-bpy), 4,4'-di-tert-butyl-2,2'-dipyridyl TB-bpy), 4,4'-dimethoxy-2,2'-bipyridine (MeO-bpy), 4,4'-dimethylamino-2,2'-bipyridine (Me$_2$N-bpy), 2,2',6',2"-terpyridine (terpy), 1,10-phenanthroline (phen), trans-N-(2-pyridylmethylene)aniline (2-pma), 1,3-bis(2,6-di-i-propylphenyl)imidazol-2-ylidene, 1,1,4,7,10,10-hexamethyltriethylenetetramine (HMTETA), N,N,N',N",N"-pentamethyldiethylenetriamine (PMDETA), tris[2-(dimethylamino)ethyl]amine (Me$_6$TREN), tributylphosphine (PBu$_3$), triphenylphosphine (PPh$_3$), tris(trimethylsilyl)phosphine (P(TMS)$_3$), phenantroline, quinoline, tris[(2-pyridyl)methyl]amine (TPMA), N,N,N',N'-tetrakis(2-pyridylmethyl)ethylenediamine (TPEN), crown ether, and mixtures thereof.

21. The process of claim 1 wherein the ligand has low nucleophilicity and low basicity sufficient not to react with an allyl halide chain end.

22. The process of claim 1 wherein the transition metal-ligand complex comprises a transition metal compound and a ligand and the molar ratio of the transition metal compound to ligand is from about 1:0.00001 to about 1:10.

23. The process of claim 1 wherein the transition metal-ligand complex comprises a transition metal compound the molar ratio of initiator to transition metal compound is from about 1:0.00001 to about 1:10.

24. The process of claim 1 wherein the reducing agent comprises a free radical initiator, an organic reducing agent, a transition metal, photoirradiation, electrical current, or mixtures thereof.

25. The process of claim 1 wherein the initiator comprises azobisisobutyronitrile (AIBN) or tert butyl peroxide (TBPO), the reducing agent comprises vitamin C or tin octanoate, and the transition metal comprises Zn(0), Fe(0), or Cu(0), and Mn$_2$(CO)$_{10}$, and mixtures thereof.

26. The process of claim 1 wherein the reducing agent is sufficient to enable concentration of the transition metal-ligand complex catalyst to be reduced in the process compared to a process in which the reducing agent is absent.

27. The process of claim 1 wherein the organic solvent is selected from ethers, cyclic ethers, C$_5$-C$_{10}$ alkanes, C$_5$-C$_8$ cycloalkanes which may be substituted with from 1 to 3 C$_1$-C$_4$ alkyl groups, aromatic hydrocarbon solvents, halogenated hydrocarbon solvents, acetonitrile, dimethylformamide, dimethyl carbonate, ethylene carbonate, propylene carbonate, dimethylsulfoxide, dimethylsulfone, diglyme, water, mixtures of such solvents, and supercritical solvents, and mixtures thereof.

28. The process of claim 1 wherein the organic solvent is selected from toluene, xylene, anisole, tetrahydrofuran (THF), dioxane, diglyme, dimethyl carbonate (DMC), ethylene carbonate, propylene carbonate, acetonitrile (ACN), or mixtures thereof.

29. The process of claim 1 wherein the organic solvent is a non-polar organic solvent.

30. The process of claim 1 which is photoirradiated ATRP.

31. The process of claim 1 wherein the initiator, transition metal-ligand complex catalyst, reducing agent and organic solvent are sufficient to minimize or eliminate one or more side reactions of an allyl halide chain end.

32. The process of claim 1 which is normal ATRP, reverse ATRP, AGET-ATRP, ARGET-ATRP, ICAR ATRP, SARA-ATRP, SR&NI ATRP, e-ATRP, photo-ATRP, or emulsion polymerization.

* * * * *